US011873315B2

(12) United States Patent
Kang et al.

(10) Patent No.: US 11,873,315 B2
(45) Date of Patent: Jan. 16, 2024

(54) CHIRAL N-HETEROCYCLIC PHOSPHORODIAMIDIC ACIDS (NHPAS) AND DERIVATIVES AS NOVEL BRøNSTED ACID CATALYSTS

(71) Applicant: The Board Of Regents Of The Nevada System Of Higher Education On Behalf Of The University Of Nevada, Las Vegas, NV (US)

(72) Inventors: Jun Yong Kang, Las Vegas, NV (US); Hai Huang, Clear Water Bay (HK)

(73) Assignee: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

( * ) Notice: Subject to any disclaimer, the term of this patent is extended or adjusted under 35 U.S.C. 154(b) by 0 days.

(21) Appl. No.: 17/583,159

(22) Filed: Jan. 24, 2022

(65) Prior Publication Data

US 2022/0144868 A1 May 12, 2022

Related U.S. Application Data

(63) Continuation of application No. 16/622,451, filed as application No. PCT/US2018/037868 on Jun. 15, 2018, now Pat. No. 11,248,014.

(60) Provisional application No. 62/568,645, filed on Oct. 5, 2017, provisional application No. 62/566,834, filed on Oct. 2, 2017, provisional application No. 62/521,086, filed on Jun. 16, 2017.

(51) Int. Cl.

| | |
|---|---|
| ***B01J 31/02*** | (2006.01) |
| ***C07F 9/32*** | (2006.01) |
| ***C07F 9/40*** | (2006.01) |
| ***C07F 9/6584*** | (2006.01) |
| ***C07F 9/6553*** | (2006.01) |

(52) U.S. Cl.

CPC ....... *C07F 9/65848* (2013.01); *B01J 31/0264* (2013.01); *C07F 9/3241* (2013.01); *C07F 9/4056* (2013.01); *C07F 9/655345* (2013.01); *B01J 2231/40* (2013.01); *B01J 2531/002* (2013.01)

(58) Field of Classification Search

None

See application file for complete search history.

(56) References Cited

FOREIGN PATENT DOCUMENTS

| | | | | |
|---|---|---|---|---|
| JP | 2008157980 | A | * | 7/2008 |
| WO | WO-2014/093723 | A2 | | 6/2014 |
| WO | WO-2018/232315 | A1 | | 12/2018 |

OTHER PUBLICATIONS

D'Auria et al. "Reactivity of Thienyl Phosphonyl Carbinols in Acidic Medium: Synthesis of Aryl—and Alkoxy-Thienyl Methan Derivatives" Synthetic Communications, vol. 22, Issue 5, pp. 699-727. (Year: 1992).*

Pubchem, Substance Record for SID 274528142, Available Date: Dec. 18, 2015 [retrieved on Aug. 6, 2018]. Retrieved from the Internet: <URL: https://pubchem.ncbi.nlm.nih.gov/substance/274528142>.

Pubchem, Substance Record for SID 104130235, Available Date: Jan. 20, 2011 [retrieved on Aug. 6, 2018]. Retrieved from the Internet: <URL: https://pubchem.ncbi.nlm.nih.gov/substance/104130235>.

Huang et al., Organocatalytic Phosphonylation of in Situ Formed o-Quinone Methides, Organic Letters, vol. 19, No. 21, Oct. 24, 2017. Retrieved from the Internet: <URL: https://pubs.acs.org/doi/suppl/10.1021/acs.orglett.7b03019>.

Kattuboina, et al. (2008) "Chiral N-phosphonyl imine chemistry: new reagents and their applications for asymmetric reactions" *Tetrahedron Letters*, vol. 49, No. 10, pp. 1573-1577.

* cited by examiner

*Primary Examiner* — Joseph R Kosack

(74) *Attorney, Agent, or Firm* — Ballard Spahr LLP

(57) ABSTRACT

Provided herein are diaryl and arylalkyl phosphonates, useful as intermediates in, for example, the synthesis of leukocyte elastase inhibitors, potassium channel modulators, chemiluminescence materials, and flame retardants, and methods for making same. Also provided are N-heterocyclic phosphorodiamidic acids (NHPAs) useful in reactions such as, for example, in the preparation of diaryl and arylalkyl phosphonates. This abstract is intended as a scanning tool for purposes of searching in the particular art and is not intended to be limiting of the present invention.

9 Claims, 10 Drawing Sheets

CHIRAL N-HETEROCYCLIC PHOSPHORODIAMIDIC ACIDS (NHPAS) AND DERIVATIVES AS NOVEL BRøNSTED ACID CATALYSTS

CROSS-REFERENCE TO RELATED APPLICATIONS

This application is continuation of U.S. application Ser. No. 16/622,451, filed on Dec. 13, 2019, which is a national stage filing under 35 U.S.C. § 371 of International Application No. PCT/US2018/037868, filed on Jun. 15, 2018, which claims the benefit of U.S. Provisional Application No. 62/521,086, filed on Jun. 16, 2017, U.S. Provisional Application No. 62/566,834, filed on Oct. 2, 2017, and U.S. Provisional Application No. 62/568,645, filed on Oct. 5, 2017, the contents of which are incorporated herein by reference in their entireties.

BACKGROUND

The activation of a small molecule by a chiral organocatalyst has been realized as one of the most powerful tools for asymmetric synthesis (Taylor and Jacobsen (2006) *Angew. Chem., Int. Ed.* 45: 1520-1543; Yu and Wang (2008) *Chem.-Asian J.* 3: 516-532; Doyle and Jacobsen (2007) *Chem. Rev.* 107: 5713-5743; Parmar et al. (2014) *Chem. Rev.* 114: 9047-9153). Accordingly, a large number of organic chiral catalysts have been developed and successfully applied in the stereoselective transformation of small organic molecules (Bernardi et al. (2012) *Org. Biomol. Chem.* 10: 2911-2922). Among them, Brønsted acids such as BINOL-derived (Parmar et al. (2014) *Chem. Rev.* 114: 9047-9153; Shibasaki and Matsunaga (2006) *Chem. Soc. Rev.* 35: 269-279; Chen et al. (2003) *Chem. Rev.* 103: 3155-3212) and SPINOL-derived (Xie and Zhou (2008) *Acc. Chem. Res.* 41: 581-593; Zhu and Zhou (2012) *Acc. Chem. Res.* 45: 1365-1377) phosphoric acids have demonstrated efficiency and versatility in many synthetic transformations. However, the synthesis of those phosphoric acid derivatives requires a multitude of steps with low overall yields. Consequently, the development phosphoric acid catalysts that are highly reactive and accessible via a concise synthesis is highly desirable. These needs and others are met by the present invention.

SUMMARY

In accordance with the purpose(s) of the invention, as embodied and broadly described herein, the invention, in one aspect, relates to N-heterocyclic phosphorodiamidic acids and methods of using these complexes for the generation of, for example, ortho-quinone methides, which are versatile building blocks of pharmaceuticals and other biologically significant small molecules.

Disclosed are compounds having a structure represented by a formula selected from:

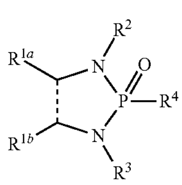

and

-continued

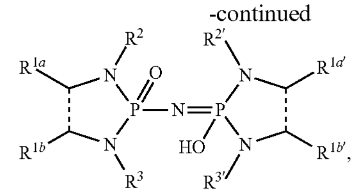

wherein each occurrence of ⋱ is a single covalent bond; wherein each of $R^{1a}$, $R^{1b}$, $R^{1a'}$, and $R^{1b'}$, when present, is independently selected from hydrogen, C1-C4 alkyl, and $Ar^1$; wherein each occurrence of $Ar^1$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; or wherein each of $R^{1a}$ and $R^{1b}$ are optionally covalently bonded together and, together with the intermediate atoms, comprise a 5- to 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; or wherein each of $R^{1a'}$ and $R^{1b'}$, when present, are optionally covalently bonded together and, together with the intermediate atoms, comprise a 5- to 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; and wherein each of $R^2$, $R^3$, $R^{2'}$, and $R^{3'}$, when present, are independently selected from —$Si(R^{20a})(R^{20b})R^{20c}$, $Ar^2$, and —$C(R^{21a})(R^{21b})Ar^2$; wherein each occurrence of $R^{20a}$, $R^{20b}$, and $R^{20c}$, when present, is independently selected from C1-C4 alkyl and phenyl; wherein each occurrence of $R^{21a}$ and $R^{21b}$, when present, is independently selected from hydrogen and C1-C4 alkyl; wherein each occurrence of $Ar^2$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl; or wherein each occurrence of ⋱ is a double covalent bond; wherein each of $R^{1a}$ and $R^2$ are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$; wherein each occurrence of $R^{22a}$ and $R^{22b}$, when present, is independently selected from hydrogen and C1-C4 alkyl; wherein each occurrence of $Ar^3$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; wherein each of $R^{1a'}$ and $R^{2'}$, when present, are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —C($R^{22a}$)($R^{22b}$)$Ar^3$; wherein each of $R^{1b}$ and $R^3$ are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$; wherein each occurrence of $R^{23a}$ and $R^{23b}$, when present, is independently selected from hydrogen and C1-C4 alkyl; wherein occurrence of $Ar^4$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; and wherein each of $R^{1b'}$ and $R^{3'}$, when present, are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$; wherein $R^4$, when present, is selected from —OH and —$NHR^{24}$; wherein $R^{24}$, when present, is an amine protecting group, provided that when the compound has a structure represented by a formula:

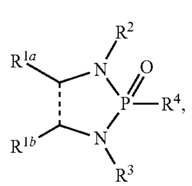

wherein each of $R^{1a}$ and $R^{1b}$ are hydrogen and $R^2$ and $R^3$ are $Ar^2$, then each occurrence of $Ar^2$ is substituted with 1, 2, or 3 groups independently selected from halogen, —$NO_2$, —CN, —OH, —SH, —$NH_2$, C1-C4 haloalkyl, C1-C4 cyanoalkyl, C1-C4 hydroxyalkyl, C1-C4 haloalkoxy, C1-C4 thioalkyl, C1-C4 alkylthiol, C1-C4 aminoalkyl, C1-C4 alkylamino, and (C1-C4)(C1-C4) dialkylamino, or wherein each of $R^{1a}$ and $R^{1b}$ are hydrogen, $R^2$ and $R^3$ are independently —C($R^{21a}$)($R^{21b}$)$Ar^2$, and $Ar^2$ is unsubstituted C10 aryl, then each occurrence of $R^{21a}$ is not hydrogen, or wherein each of $R^{1a}$ and $R^{1b}$ are optionally covalently bonded together and, together with the intermediate atoms, comprise an unsubstituted 6-membered cycloalkyl, $R^2$ and $R^3$ are independently —C($R^{21a}$)($R^{21b}$)$Ar^2$, and $Ar^2$ is unsubstituted C10 aryl, then each occurrence of $R^{21a}$ is not hydrogen, or a salt thereof.

Also disclosed are compounds selected from:

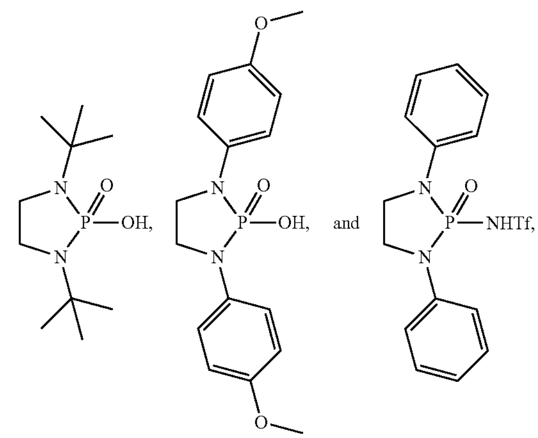

or a salt thereof.

Also disclosed are compounds selected from:

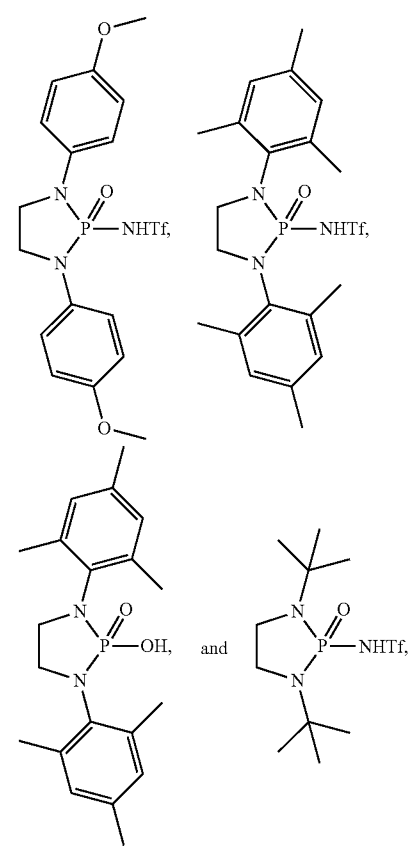

or a salt thereof.

Also disclosed are compounds having a structure represented by a formula:

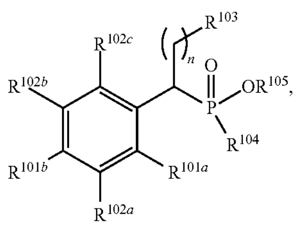

wherein n is selected from 0 and 1; wherein each of $R^{101a}$ and $R^{101b}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino, provided that at least one of $R^{101a}$ and $R^{101b}$ is —OH, —SH, or C1-C4 alkylamino; wherein each of $R^{102a}$, $R^{102b}$, and $R^{102c}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; wherein $R^{103}$ is selected from C4-C8 alkyl and $Ar^{101}$, provided that when $R^{103}$ is C4-C8 alkyl, then either: (a) at least one of $R^{101a}$ and $R^{101b}$ is —SH or C1-C4 alkylamino, or (b) then $R^{101b}$ is —OH; wherein $Ar^{101}$, when present, is selected from C6-C10 aryl and C5-C6 heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl; wherein $R^{104}$ is selected from C1-C4 alkoxy and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; and wherein $R^{105}$ is C1-C4 alkyl, provided that when n is 0, $R^{101a}$ is —OH, $R^{103}$ is C6 aryl, $R^{104}$ is ethoxy, and $R^{103}$ is ethyl, then either: (c) at least two of $R^{101b}$, $R^{102a}$, $R^{102b}$, and $R^{102c}$ are not hydrogen, (d) $R^{103}$ is substituted with 2 or 3 groups, or (e) at least one of $R^{101b}$, $R^{201a}$, $R^{102b}$, and $R^{102c}$ is not hydrogen and $R^{103}$ is substituted with 1, 2, or 3 groups; and provided that when n is 0, $R^{101b}$ is —OH, and $R^{103}$ is C6 aryl or C6 heteroaryl, then either: (f) each of $R^{102a}$ and $R^{102b}$ is hydrogen; or (g) one of $R^{102a}$ and $R^{102b}$ is hydrogen and $R^{104}$ is not the same as —$OR^5$, or a pharmaceutically acceptable salt thereof.

Also disclosed are compounds selected from:

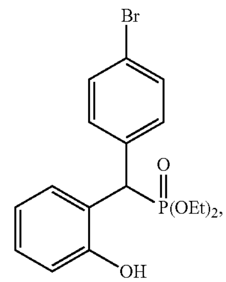
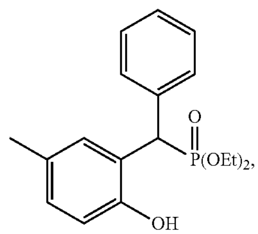
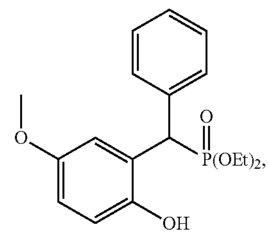
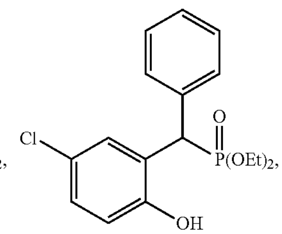
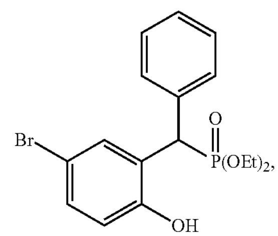
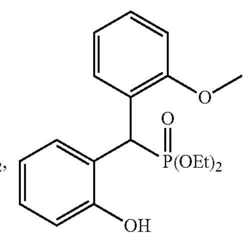
,
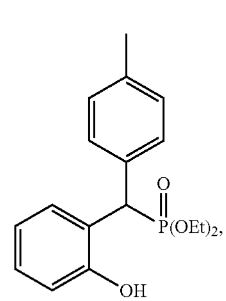
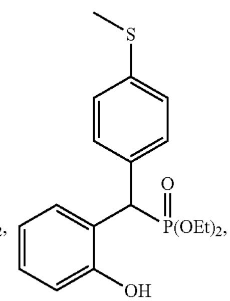
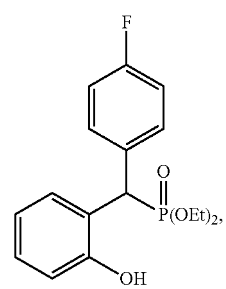
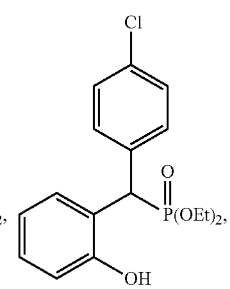
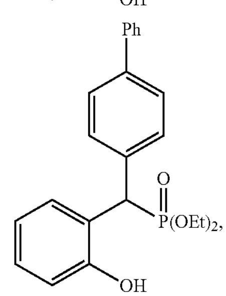
and
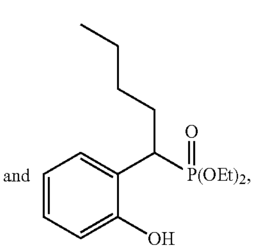

or a pharmaceutically acceptable salt thereof.

Also disclosed are methods of making a disclosed compound.

Also disclosed are methods of using a disclosed compound.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying figures, which are incorporated in and constitute a part of this specification, illustrate several aspects and together with the description serve to explain the principles of the invention.

FIG. 3A shows an $^{1}$H NMR spectrum of the reaction mixture of the scheme as shown in the section entitled "In Situ NMR Study. " FIG. 3B shows an $^{1}$H NMR spectrum of the reaction mixture of the scheme as shown in the section entitled "In Situ NMR Study" with the addition of iPrOH.

FIG. 4A shows an $^{13}$C NMR spectrum of the reaction mixture of the scheme as shown in the section entitled "In Situ NMR Study. " FIG. 4B shows an $^{13}$C NMR spectrum of the reaction mixture of the scheme as shown in the section entitled "In Situ NMR Study" with the addition of iPrOH.

Figure 1:
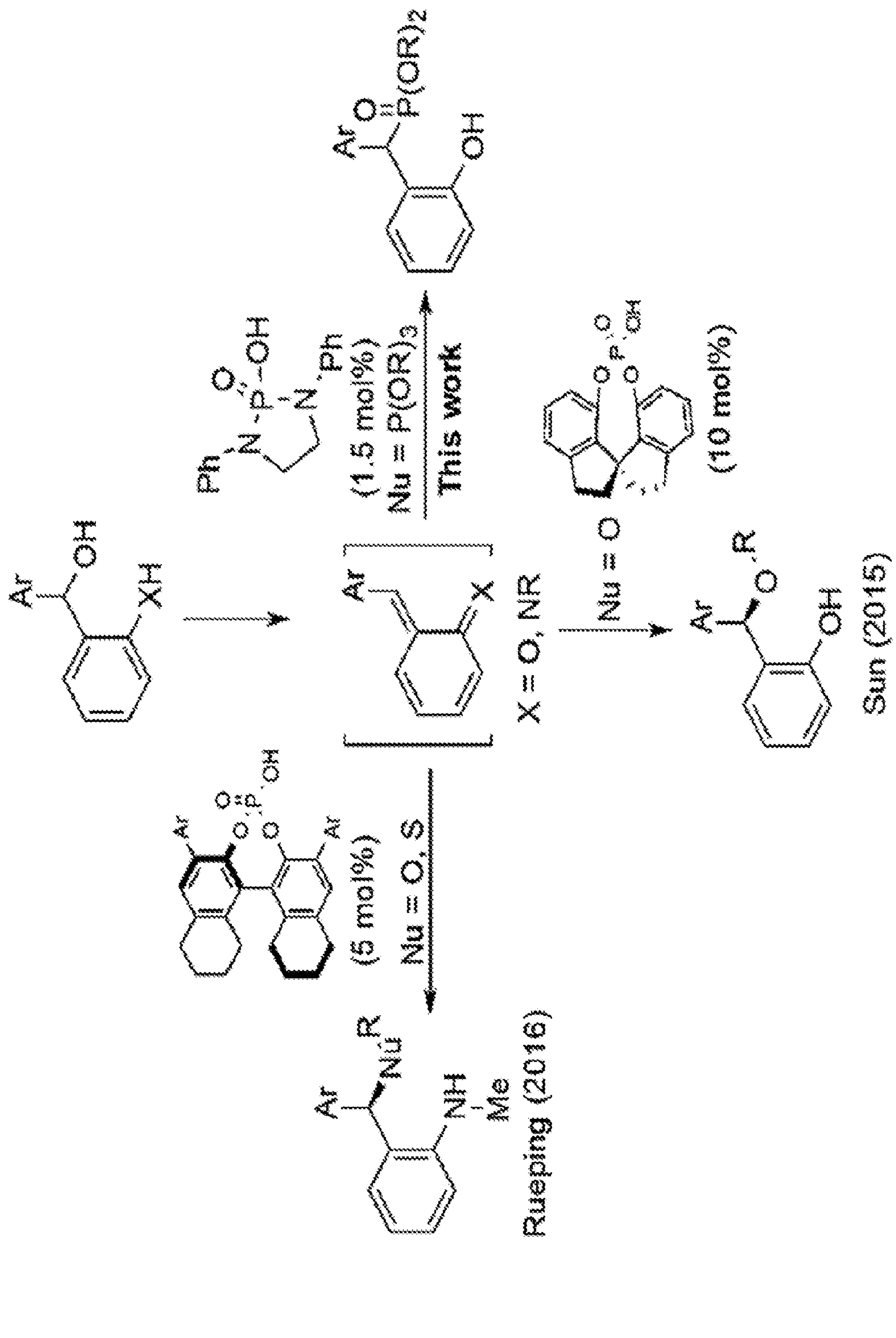
FIG. 1 shows a representative schematic of a diastereoselective phospha-Michael addition reaction of dialkyl phenylphosphites to o-QMs.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

It is appreciated that certain features of the disclosure, which are, for clarity, described in the context of separate aspects, can also be provided in combination in a single aspect. Conversely, various features of the disclosure which are, for brevity, described in the context of a single aspect, can also be provided separately or in any suitable subcombination.

For the terms "for example" and "such as," and grammatical equivalences thereof, the phrase "and without limitation" is understood to follow unless explicitly stated otherwise.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

All compounds, and salts thereof (e.g., pharmaceutically acceptable salts), can be found together with other substances such as water and solvents (e.g., hydrates and solvates).

Compounds provided herein also can include tautomeric forms. Tautomeric forms result from the swapping of a single bond with an adjacent double bond together with the concomitant migration of a proton. Tautomeric forms include prototropic tautomers that are isomeric protonation states having the same empirical formula and total charge. Example prototropic tautomers include ketone-enol pairs, amide-imidic acid pairs, lactam-lactim pairs, enamine-imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

Compounds provided herein can also include all isotopes of atoms occurring in the intermediates or final compounds. Isotopes include those atoms having the same atomic number but different mass numbers. For example, isotopes of hydrogen include hydrogen, tritium, and deuterium.

The phrase "pharmaceutically acceptable" is employed herein to refer to those compounds, materials, compositions, and/or dosage forms that are, within the scope of sound medical judgment, suitable for use in contact with the tissues of human beings and animals without excessive toxicity, irritation, allergic response, or other problem or complication, commensurate with a reasonable benefit/risk ratio.

Also provided herein are pharmaceutically acceptable salts of the compounds described herein. As used herein, the term "pharmaceutically acceptable salts" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the compounds provided herein include the conventional non-toxic salts of the parent compound formed, for example, from non-toxic inorganic or organic acids. The pharmaceutically acceptable salts of the compounds provided herein can be synthesized from the parent compound that contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two. In various aspects, a non-aqueous media like ether, ethyl acetate, alcohols (e.g., methanol, ethanol, iso-propanol, or butanol) or acetonitrile (ACN) can be used. Lists of suitable salts are found in *Remington's Pharmaceutical Sciences,* 17th ed., Mack Publishing Company, Easton, Pa., 1985, p. 1418 and *Journal of Pharmaceutical Science,* 66, 2 (1977). Conventional methods for preparing salt forms are described, for example, in *Handbook of Pharmaceutical Salts: Properties, Selection, and Use*, Wiley-VCH, 2002.

In various aspects, the compounds provided herein, or salts thereof, are substantially isolated. By "substantially isolated" is meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

As used herein, chemical structures that contain one or more stereocenters depicted with dashed and bold bonds (i.e. ) are meant to indicate absolute stereochemistry of the stereocenter(s) present in the chemical structure. As used herein, bonds symbolized by a simple line do not indicate a stereo-preference. Unless otherwise indicated to the contrary, chemical structures, which include one or more stereocenters, illustrated herein without indicating absolute or relative stereochemistry encompass all possible stereoisomeric forms of the compound (e.g., diastereomers and enantiomers) and mixtures thereof. Structures with a single bold or dashed line, and at least one additional simple line, encompass a single enantiomeric series of all possible diastereomers.

Resolution of racemic mixtures of compounds can be carried out using appropriate methods. An exemplary method includes fractional recrystallization using a chiral resolving acid that is an optically active, salt-forming organic acid. Suitable resolving agents for fractional recrystallization methods are, for example, optically active acids, such as the D and L forms of tartaric acid, diacetyltartaric acid, dibenzoyltartaric acid, mandelic acid, malic acid, lactic acid, or the various optically active camphorsulfonic acids such as camphorsulfonic acid. Other resolving agents suitable for fractional crystallization methods include stereoisomerically pure forms of methylbenzylamine (e.g., S and R forms, or diastereomerically pure forms), 2-phenylglycinol, norephedrine, ephedrine, N-methylephedrine, cyclohexylethylamine, 1,2-diaminocyclohexane, and the like.

Resolution of racemic mixtures can also be carried out by elution on a column packed with an optically active resolving agent (e.g., dinitrobenzoylphenylglycine). Suitable elution solvent compositions can be determined by one skilled in the art.

The expressions "ambient temperature" and "room temperature" as used herein are understood in the art and refer generally to a temperature, e.g., a reaction temperature, that is about the temperature of the room in which the reaction is carried out, for example, a temperature from about 20° C. to about 30° C.

At various places in the present specification, divalent linking substituents are described. It is specifically intended that each divalent linking substituent include both the forward and backward forms of the linking substituent. For example, —NR(CR'R")$_n$— includes both —NR(CR'R")$_n$— and —(CR'R")$_n$NR—. Where the structure clearly requires a linking group, the Markush variables listed for that group are understood to be linking groups.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. As used herein, the term "substituted" means that a hydrogen atom is removed and replaced by a substituent. It is to be understood that substitution at a given atom is limited by valency.

Throughout the definitions, the term "$C_{n-m}$" indicates a range that includes the endpoints, wherein n and m are integers and indicate the number of carbons. Examples include $C_{1-4}$, $C_{1-6}$, and the like.

As used herein, the term "$C_{n-m}$ alkyl," employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In various aspects, the alkyl group contains from 1 to 6 carbon atoms, from 1 to 4 carbon atoms, from 1 to 3 carbon atoms, or 1 to 2 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In various aspects, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In various aspects, the alkynyl moiety contains 2 to 6, 2 to 4, or 2 to 3 carbon atoms.

As used herein, the term "$C_{n-m}$ alkylene," employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In various aspects, the alkylene moiety contains 2 to 6, 2 to 4, 2 to 3, 1 to 6, 1 to 4, or 1 to 2 carbon atoms.

As used herein, the term "$C_{n-m}$ alkoxy," employed alone or in combination with other terms, refers to a group of formula —O-alkyl, wherein the alkyl group has n to m carbons. Example alkoxy groups include methoxy, ethoxy, propoxy (e.g., n-propoxy and isopropoxy), tert-butoxy, and the like. In various aspects, the alkyl group has 1 to 6, 1 to 4, or 1 to 3 carbon atoms.

As used herein, the term "$C_{n-m}$ alkylamino" refers to a group of formula —NH(alkyl), wherein the alkyl group has n to m carbon atoms. In various aspects, the alkyl group has 1 to 6, 1 to 4, or 1 to 3 carbon atoms.

As used herein, the term "$C_{n-m}$ alkoxycarbonyl" refers to a group of formula —C(O)O-alkyl, wherein the alkyl group has n to m carbon atoms. In various aspects, the alkyl group has 1 to 6, 1 to 4, or 1 to 3 carbon atoms.

As used herein, the term "$C_{n-m}$ alkylcarbonyl" refers to a group of formula —C(O)— alkyl, wherein the alkyl group has n to m carbon atoms. In various aspects, the alkyl group has 1 to 6, 1 to 4, or 1 to 3 carbon atoms.

As used herein, the term "$C_{n-m}$ alkylcarbonylamino" refers to a group of formula —NHC(O)-alkyl, wherein the alkyl group has n to m carbon atoms. In various aspects, the alkyl group has 1 to 6, 1 to 4, or 1 to 3 carbon atoms.

As used herein, the term "$C_{n-m}$ alkylsulfonylamino" refers to a group of formula —NHS(O)$_2$-alkyl, wherein the alkyl group has n to m carbon atoms. In various aspects, the alkyl group has 1 to 6, 1 to 4, or 1 to 3 carbon atoms.

As used herein, the term "aminosulfonyl" refers to a group of formula —S(O)$_2$NH$_2$.

As used herein, the term "$C_{n-m}$ alkylaminosulfonyl" refers to a group of formula —S(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_{n-m}$ alkyl)aminosulfonyl" refers to a group of formula —S(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_{n-m}$ alkylaminosulfonylamino" refers to a group of formula —NHS(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_{n-m}$ alkyl)aminosulfonylamino" refers to a group of formula —NHS(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminocarbonylamino," employed alone or in combination with other terms, refers to a group of formula —NHC(O)NH$_2$.

As used herein, the term "$C_{n-m}$ alkylaminocarbonylamino" refers to a group of formula —NHC(O)NH (alkyl), wherein the alkyl group has n to m carbon atoms. In various aspects, the alkyl group has 1 to 6, 1 to 4, or 1 to 3 carbon atoms.

As used herein, the term "di($C_{n-m}$ alkyl)aminocarbonylamino" refers to a group of formula —NHC(O)N(alkyl)$_2$, wherein each alkyl group independently has n to m carbon atoms. In various aspects, each alkyl group has, independently, 1 to 6, 1 to 4, or 1 to 3 carbon atoms.

As used herein, the term "$C_{n-m}$ alkylcarbamyl" refers to a group of formula —C(O)—NH(alkyl), wherein the alkyl group has n to m carbon atoms. In various aspects, the alkyl group has 1 to 6, 1 to 4, or 1 to 3 carbon atoms.

As used herein, the term "thio" refers to a group of formula —SH.

As used herein, the term "$C_{n-m}$ alkylthio" refers to a group of formula —S-alkyl, wherein the alkyl group has n to m carbon atoms. In various aspects, the alkyl group has 1 to 6, 1 to 4, or 1 to 3 carbon atoms.

As used herein, the term "$C_{n-m}$ alkylsulfinyl" refers to a group of formula —S(O)— alkyl, wherein the alkyl group has n to m carbon atoms. In various aspects, the alkyl group has 1 to 6, 1 to 4, or 1 to 3 carbon atoms.

As used herein, the term "$C_{n-m}$ alkylsulfonyl" refers to a group of formula —S(O)$_2$— alkyl, wherein the alkyl group has n to m carbon atoms. In various aspects, the alkyl group has 1 to 6, 1 to 4, or 1 to 3 carbon atoms.

As used herein, the term "amino" refers to a group of formula —$NH_2$.

As used herein, the term "carbamyl" to a group of formula —C(O)$NH_2$.

As used herein, the term "carbonyl," employed alone or in combination with other terms, refers to a —C(═O)— group, which may also be written as C(O).

As used herein, the term "cyano-$C_{1-3}$ alkyl" refers to a group of formula —($C_{1-3}$ alkylene)-CN.

As used herein, the term "HO—$C_{1-3}$ alkyl" refers to a group of formula —($C_{1-3}$ alkylene)-OH.

As used herein, the term "$C_{1-3}$ alkoxy-$C_{1-3}$ alkyl" refers to a group of formula —($C_{1-3}$ alkylene)-O($C_{1-3}$ alkyl).

As used herein, the term "carboxy" refers to a group of formula —C(O)OH.

As used herein, the term "di($C_{n-m}$-alkyl)amino" refers to a group of formula —N(alkyl)$_2$, wherein the two alkyl groups each has, independently, n to m carbon atoms. In various aspects, each alkyl group independently has 1 to 6, 1 to 4, or 1 to 3 carbon atoms.

As used herein, the term "di($C_{n-m}$-alkyl)carbamyl" refers to a group of formula —C(O)N(alkyl)$_2$, wherein the two alkyl groups each has, independently, n to m carbon atoms. In various aspects, each alkyl group independently has 1 to 6, 1 to 4, or 1 to 3 carbon atoms.

As used herein, "halo" refers to F, Cl, Br, or I. In various aspects, the halo group is F or C1.

As used herein, "$C_{n-m}$ haloalkoxy" refers to a group of formula —O-haloalkyl having n to m carbon atoms. An example haloalkoxy group is $OCF_3$. In various aspects, the haloalkoxy group is fluorinated only. In various aspects, the alkyl group has 1 to 6, 1 to 4, or 1 to 3 carbon atoms.

As used herein, the term "$C_{n-m}$ haloalkyl," employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In various aspects, the haloalkyl group is fluorinated only. In various aspects, the alkyl group has 1 to 6, 1 to 4, or 1 to 3 carbon atoms.

As used herein, the term "amine base" refers to a mono-substituted amine group (i.e., primary amine base), di-substituted amine group (i.e., secondary amine base), or a tri-substituted amine group (i.e., tertiary amine base). Example mono-substituted amine bases include methyl amine, ethyl amine, propyl amine, butyl amine, and the like. Example di-substituted amine bases include dimethylamine, diethylamine, dipropylamine, dibutylamine, pyrrolidine, piperidine, azepane, morpholine, and the like. In various aspects, the tertiary amine has the formula N(R')$_3$, wherein each R' is independently $C_{1-6}$ alkyl, 3-10 member cycloalkyl, 4-10 membered heterocycloalkyl, 1-10 membered heteroaryl, and 5-10 membered aryl, wherein the 3-10 member cycloalkyl, 4-10 membered heterocycloalkyl, 1-10 membered heteroaryl, and 5-10 membered aryl are optionally substituted by 1, 2, 3, 4, 5, or 6 $C_{1-6}$ alkyl groups. Example tertiary amine bases include trimethylamine, triethylamine, tripropylamine, triisopropylamine, tributylamine, tri-tert-butylamine, N,N-dimethylethanamine, N-ethyl-N-methylpropan-2-amine, N-ethyl-N-isopropylpropan-2-amine, morpholine, N-methylmorpholine, and the like. In various aspects, the term "tertiary amine base" refers to a group of formula N(R)$_3$, wherein each R is independently a linear or branched $C_{1-6}$ alkyl group.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons ($C_{3-10}$). Ring-forming carbon atoms of a cycloalkyl group can be optionally substituted by oxo or sulfido (e.g., C(O) or C(S)). Cycloalkyl groups also include cycloalkylidenes. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, and the like. In various aspects, cycloalkyl is cyclopropyl, cyclobutyl, cyclopentyl, cyclohexyl, cyclopentyl, or adamantyl. In various aspects, the cycloalkyl has 6-10 ring-forming carbon atoms. In various aspects, cycloalkyl is cyclohexyl or adamantyl. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., C(O), S(O), C(S), or S(O)$_2$, etc.). The heterocycloalkyl group can be attached through a ring-forming carbon atom or a ring-forming heteroatom. In various aspects, the heterocycloalkyl group contains 0 to 3 double bonds. In various aspects, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In various aspects, the heterocycloalkyl has 4-10, 4-7 or 4-6 ring atoms with 1 or 2 heteroatoms independently selected from nitrogen, oxygen, or sulfur and having one or more oxidized ring members.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In various aspects, aryl groups have from 6 to about 20 carbon atoms, from 6 to about 15 carbon atoms, or from 6 to about 10 carbon atoms. In various aspects, the aryl group is a substituted or unsubstituted phenyl.

As used herein, "heteroaryl" refers to a monocyclic or polycyclic aromatic heterocycle having at least one heteroatom ring member selected from sulfur, oxygen, and nitrogen. In various aspects, the heteroaryl ring has 1, 2, 3, or 4 heteroatom ring members independently selected from nitrogen, sulfur and oxygen. In various aspects, any ring-forming N in a heteroaryl moiety can be an N-oxide. In various aspects, the heteroaryl has 5-10 ring atoms and 1, 2, 3 or 4 heteroatom ring members independently selected from nitrogen, sulfur and oxygen. In various aspects, the heteroaryl has 5-6 ring atoms and 1 or 2 heteroatom ring members independently selected from nitrogen, sulfur and oxygen. In various aspects, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

At certain places, the definitions or aspects refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas an azetidin-3-yl ring is attached at the 3-position.

As used herein, the term "electron withdrawing group" (EWG), employed alone or in combination with other terms, refers to an atom or group of atoms substituted onto a π-system (e.g., substituted onto an aryl or heteroaryl ring) that draws electron density away from the π-system through induction (e.g., withdrawing electron density about a σ-bond) or resonance (e.g., withdrawing electron density about a π-bond or π-system). Example electron withdrawing groups include, but are not limited to, halo groups (e.g., fluoro, chloro, bromo, iodo), nitriles (e.g., —CN), carbonyl groups (e.g., aldehydes, ketones, carboxylic acids, acid chlorides, esters, and the like), nitro groups (e.g., $—NO_2$), haloalkyl groups (e.g., $—CH_2F$, $—CHF_2$, $—CF_3$, and the like), alkenyl groups (e.g., vinyl), alkynyl groups (e.g., ethynyl), sulfonyl groups (e.g., S(O)R, $S(O)_2R$), sulfonate groups (e.g., $—SO_3H$), and sulfonamide groups (e.g., $S(O)N(R)_2$, $S(O)_2N(R)_2$). In various aspects, the electron withdrawing group is selected from the group consisting of halo, $C_{2-}$_alkenyl, $C_{2-}$_alkynyl, $C_{1-3}$ haloalkyl, CN, $NO_2$, $C(═O)OR^{a1}$, $C(═O)R^{b1}$, $C(═O)NR^{c1}R^{d1}$, $C(═O)SR^{e1}$, $—NR^{c1}S(O)R^{e1}$, $—NR^{c1}S(O)_2R^{e1}$, $S(═O)R^{e1}$, $S(═O)_2R^{e1}$, $S(═O)NR^{c1}R^{d1}$, $S(═O)_2NR^{c1}R^{d1}$, and $P(O)(OR^{a1})_2$. In various aspects, the electron withdrawing group is selected from the group consisting of $C(═O)OR^{a1}$, $C(═O)R^{b1}$, $C(═O)NR^{c1}R^{d1}$, $C(═O)SR^{e1}$, $S(═O)R^{e1}$, $S(═O)_2R^{e1}$, $S(═O)NR^{c1}R^{d1}$, and $S(═O)_2NR^{c1}R^{d1}$. In various aspects, the electron withdrawing group is $C(═O)OR^{a1}$. In various aspects, the electron withdrawing group is $C(═O)OR^{a1}$, wherein $R^{a1}$ is $C_{1-6}$ alkyl or ($C_{6-10}$ aryl)-$C_{1-3}$ alkylene. In various aspects, the electron withdrawing group is an ester.

Preparation of the compounds described herein can involve a reaction in the presence of an acid or a base. Example acids can be inorganic or organic acids and include, but are not limited to, strong and weak acids. Example acids include, but are not limited to, hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Example weak acids include, but are not limited to, acetic acid, propionic acid, butanoic acid, benzoic acid, tartaric acid, pentanoic acid, hexanoic acid, heptanoic acid, octanoic acid, nonanoic acid, and decanoic acid. Example bases include, without limitation, lithium hydroxide, sodium hydroxide, potassium hydroxide, lithium carbonate, sodium carbonate, potassium carbonate, sodium bicarbonate, and amine bases. Example strong bases include, but are not limited to, hydroxide, alkoxides, metal amides, metal hydrides, metal dialkylamides and arylamines, wherein; alkoxides include lithium, sodium and potassium salts of methyl, ethyl and t-butyl oxides; metal amides include sodium amide, potassium amide and lithium amide; metal hydrides include sodium hydride, potassium hydride and lithium hydride; and metal dialkylamides include lithium, sodium, and potassium salts of methyl, ethyl, n-propyl, iso-propyl, n-butyl, t-butyl, trimethylsilyl and cyclohexyl substituted amides (e.g., lithium N-isopropylcyclohexylamide).

The following abbreviations may be used herein: AcOH (acetic acid); aq. (aqueous); atm. (atmosphere(s)); $Br_2$ (bromine); Bn (benzyl); calc. (calculated); d (doublet); dd (doublet of doublets); DCM (dichloromethane); DMF (N,N-dimethylformamide); Et (ethyl); $Et_2O$ (diethyl ether); EtOAc (ethyl acetate); EtOH (ethanol); EWG (electron withdrawing group); g (gram(s)); h (hour(s)); $H_2$ (hydrogen gas); HCl (hydrochloric acid/hydrogen chloride); HPLC (high performance liquid chromatography); $H_2SO_4$ (sulfuric acid); Hz (hertz); $I_2$ (iodine); IPA (isopropyl alcohol); J (coupling constant); KOH (potassium hydroxide); $K_3PO_4$ (potassium phosphate); LCMS (liquid chromatography—mass spectrometry); LiICA (lithium N-isopropylcyclohexylamide); m (multiplet); M (molar); MS (Mass spectrometry); Me (methyl); MeCN (acetonitrile); MeOH (methanol); mg (milligram(s)); min. (minutes(s)); mL (milliliter(s)); mmol (millimole(s)); N (normal); $NaBH_3CN$ (sodium cyanoborohydride); NHP (N-heterocyclic phosphine); NHP-Cl (N-heterocyclic phosphine chloride); $Na_2CO_3$ (sodium carbonate); $NaHCO_3$ (sodium bicarbonate); NaOH (sodium hydroxide); $Na_2SO_4$ (sodium sulfate); nM (nanomolar); NMR (nuclear magnetic resonance spectroscopy); $PCl_3$ (trichlorophosphine); PMP (4-methoxyphenyl); RP-HPLC (reverse phase high performance liquid chromatography); t (triplet or tertiary); t-Bu (tert-butyl); TEA (triethylamine); TFA (trifluoroacetic acid); THF (tetrahydrofuran); TLC (thin layer chromatography); μg (microgram(s)); μL (microliter(s)); μM (micromolar); wt % (weight percent).

B. N-Heterocyclic Phosphorodiamidic Acid Reagents

In one aspect, the invention relates to compounds useful as Bronsted acid catalysts. More specifically, the disclosed N-heterocyclic phosphorodiamidic acids (NHPAs) are useful in, for example, promoting phospha-Michael addition reaction of trialkylphosphites to in situ generated ortho-quinone methides (o-QMs) for the construction of diaryl phosphonates. As provided herein, one application of NHPAs in organic synthesis is in the formation of diaryl and arylalkyl phosphonates. Diaryl and arylalkyl phosphonates have demonstrated a broad spectrum of biological activities including, but not limited to, as human prostatic acid phosphatase inhibitors, leukocyte elastase inhibitors, and calcium antagonists. Additionally, diaryl and arylalkyl phosphonates are useful in, for example, the preparation of chemiluminescence materials and flame retardants.

It is contemplated that each disclosed derivative can be optionally further substituted. It is also contemplated that any one or more derivative can be optionally omitted from the invention. It is understood that a disclosed compound can be provided by the disclosed methods. It is also understood that the disclosed compounds can be employed in the disclosed methods of using.

1. Structure

In one aspect, disclosed are compounds having a structure represented by a formula selected from:

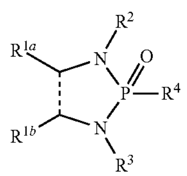

and

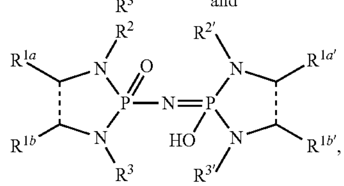

wherein each occurrence of ⋱ is a single covalent bond; wherein each of $R^{1a}$, $R^{1b}$, $R^{1a'}$, and $R^{1b'}$, when present, is independently selected from hydrogen, C1-C4 alkyl, and $Ar^1$; wherein each occurrence of $Ar^1$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; or wherein each of $R^{1a}$ and $R^{1b}$ are optionally covalently bonded together and, together with the intermediate atoms, comprise a 5- to 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; or wherein each of $R^{1a'}$ and $R^{1b'}$, when present, are optionally covalently bonded together and, together with the intermediate atoms, comprise a 5- to 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; and wherein each of $R^2$, $R^3$, $R^{2'}$, and $R^{3'}$, when present, are independently selected from —$Si(R^{20a})(R^{20b})R^{20c}$, $Ar^2$, and —$C(R^{21a})(R^{21b})Ar^2$; wherein each occurrence of $R^{20a}$, $R^{20b}$, and $R^{20c}$, when present, is independently selected from C1-C4 alkyl and phenyl; wherein each occurrence of $R^{21a}$ and $R^{21b}$, when present, is independently selected from hydrogen and C1-C4 alkyl; wherein each occurrence of $Ar^2$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl; or wherein each occurrence of ⋱ is a double covalent bond; wherein each of $R^{1a}$ and $R^2$ are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$; wherein each occurrence of $R^{22a}$ and $R^{22b}$, when present, is independently selected from hydrogen and C1-C4 alkyl; wherein each occurrence of $Ar^3$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; wherein each of $R^{1a'}$ and $R^{2'}$, when present, are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$; wherein each of $R^{1b}$ and $R^3$ are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$; wherein each occurrence of $R^{23a}$ and $R^{23b}$, when present, is independently selected from hydrogen and C1-C4 alkyl; wherein occurrence of $Ar^4$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; and wherein each of $R^{1b'}$ and $R^{3'}$, when present, are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$; wherein $R^4$, when present, is selected from —OH and —$NHR^{24}$; wherein $R^{24}$, when present, is an amine protecting group, provided that when the compound has a structure represented by a formula:

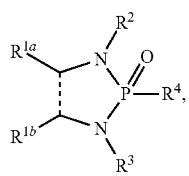

wherein each of $R^{1a}$ and $R^{1b}$ are hydrogen and $R^2$ and $R^3$ are $Ar^2$, then each occurrence of $Ar^2$ is substituted with 1, 2, or 3 groups independently selected from halogen, —$NO_2$, —CN, —OH, —SH, —$NH_2$, C1-C4 haloalkyl, C1-C4 cyanoalkyl, C1-C4 hydroxyalkyl, C1-C4 haloalkoxy, C1-C4 thioalkyl, C1-C4 alkylthiol, C1-C4 aminoalkyl, C1-C4 alkylamino, and (C1-C4)(C1-C4) dialkylamino, or wherein each of $R^{1a}$ and $R^{1b}$ are hydrogen, $R^2$ and $R^3$ are independently —$C(R^{21a})(R^{21b})Ar^2$, and $Ar^2$ is unsubstituted C10 aryl, then each occurrence of $R^{21a}$ is not hydrogen, or wherein each of $R^{1a}$ and $R^{1b}$ are optionally covalently bonded together and, together with the intermediate atoms, comprise an unsubstituted 6-membered cycloalkyl, $R^2$ and $R^3$ are independently —$C(R^{21a})(R^{21b})Ar^2$, and $Ar^2$ is unsubstituted C10 aryl, then each occurrence of $R^{21}$, is not hydrogen, or a salt thereof.

Also disclosed are compounds selected from:

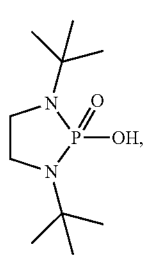

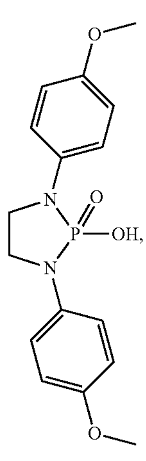

and

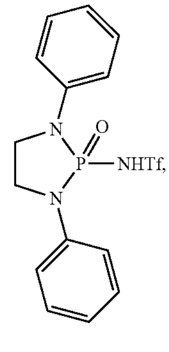

or a salt thereof.

Also disclosed are compounds selected from:

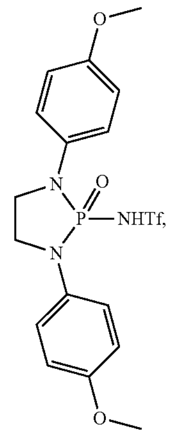

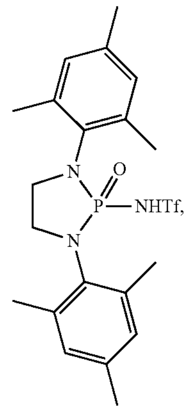

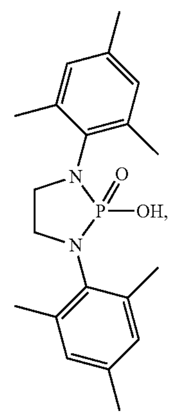

and

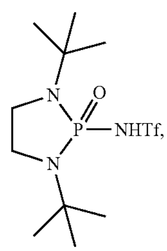

or a salt thereof.

In a further aspect, the compound has a structure represented by a formula:

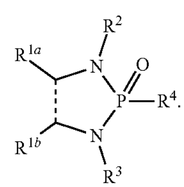

In a further aspect, the compound has a structure represented by a formula:

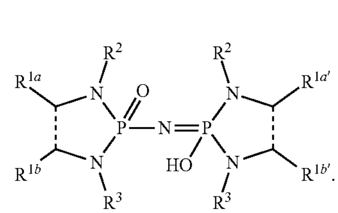

In a further aspect, the compound has a structure represented by a formula:

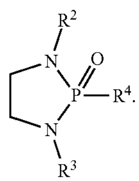

In a further aspect, the compound has a structure represented by a formula:

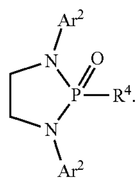

In a further aspect, the compound has a structure represented by a formula:

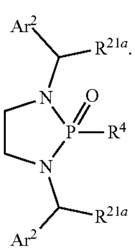

In a further aspect, the compound has a structure represented by a formula:

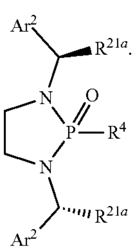

In a further aspect, the compound has a structure represented by a formula:

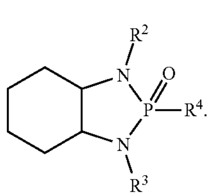

In a further aspect, the compound has a structure represented by a formula:

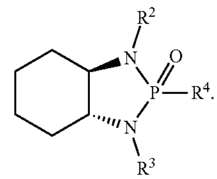

In a further aspect, the compound has a structure represented by a formula:

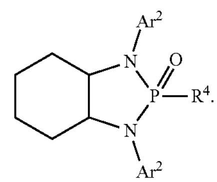

In a further aspect, the compound has a structure represented by a formula:

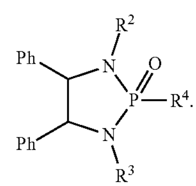

In a further aspect, the compound has a structure represented by a formula:

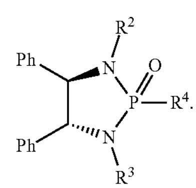

In a further aspect, the compound has a structure represented by a formula:

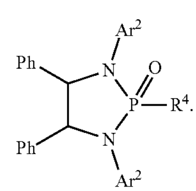

In a further aspect, the compound has a structure represented by a formula:

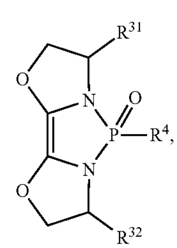

wherein $R^{31}$ is selected from C1-C4 alkyl, $Ar^3$, and —$C(R^{22a})(R^{22b})Ar^3$; and wherein $R^{32}$ is selected from C1-C4 alkyl, $Ar^4$, and —$C(R^{23a})(R^{21b})Ar^4$.

In a further aspect, the compound has a structure represented by a formula:

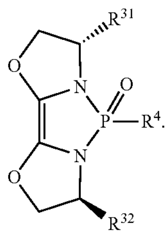

In a further aspect, the compound has a structure represented by a formula selected from:

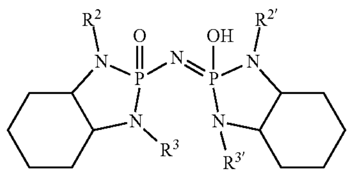

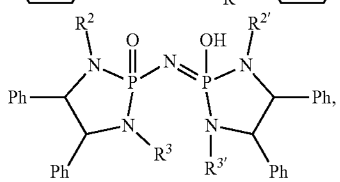

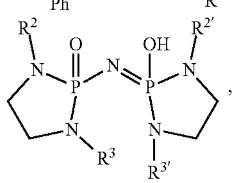

and

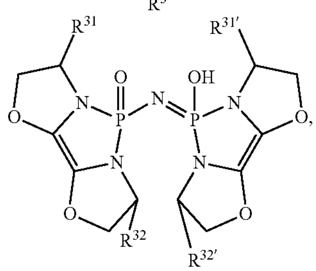

wherein each of $R^{31}$ and $R^{31'}$, when present, is independently selected from C1-C4 alkyl, $Ar^3$, and —$C(R^{22a})(R^{22b})Ar^3$; and wherein each of $R^{32}$ and $R^{32'}$, when present, is independently selected from C1-C4 alkyl, $Ar^4$, and —$C(R^{23a})(R^{23b})Ar^4$.

In a further aspect, the compound has a structure represented by a formula selected from:

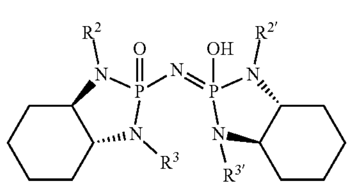

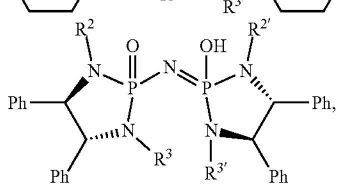

-continued

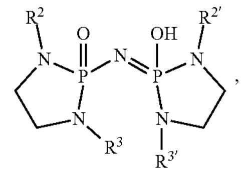

and

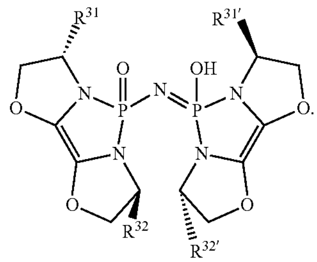

In a further aspect, the compound is selected from:

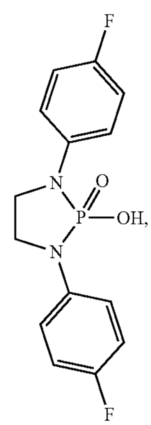

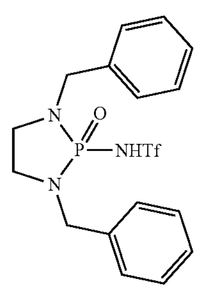

and

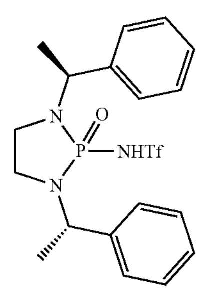

In a further aspect, the compound is selected from:

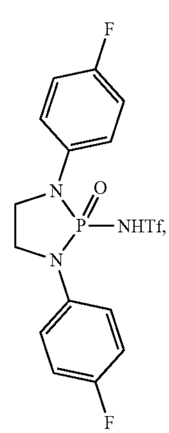

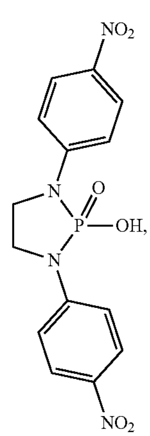

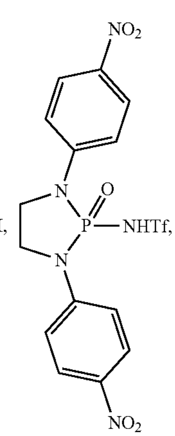

-continued
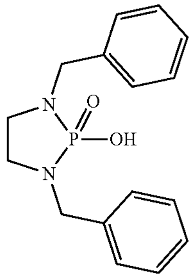,
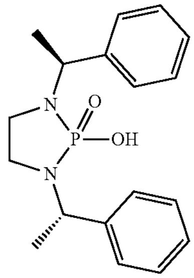,
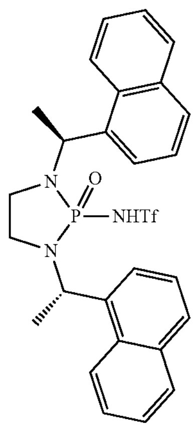,
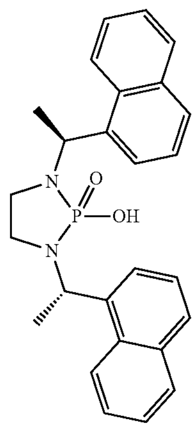,
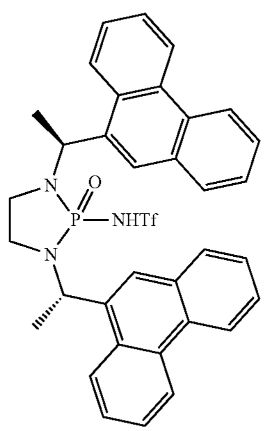,
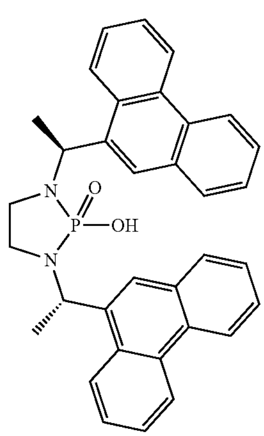,
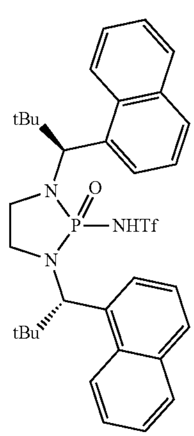,
-continued
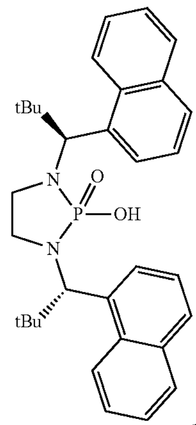
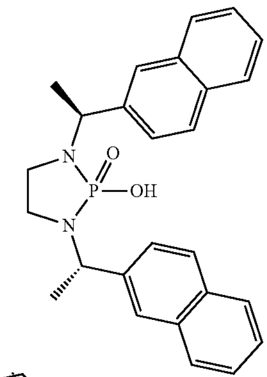, and
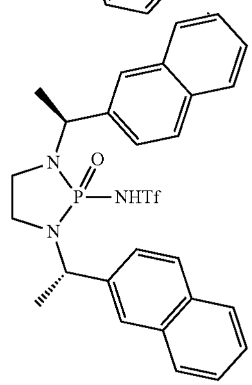.
In a further aspect, the compound is selected from:
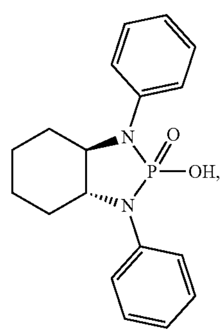
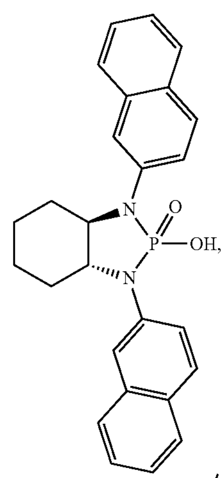
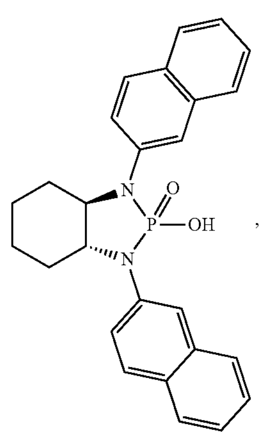,
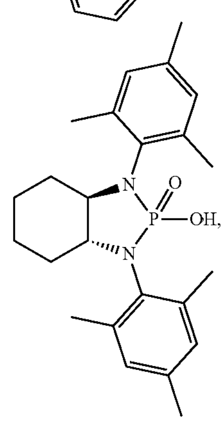

-continued
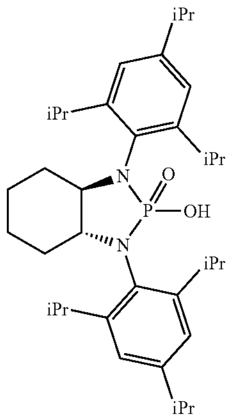
,
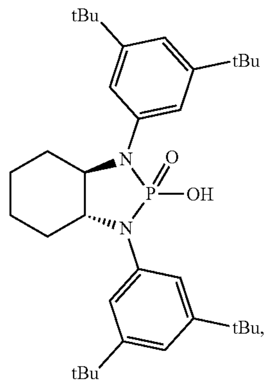
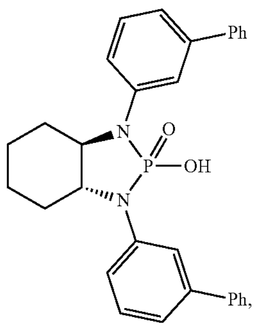
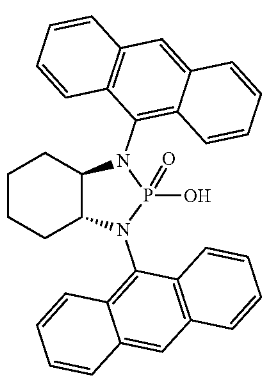
,
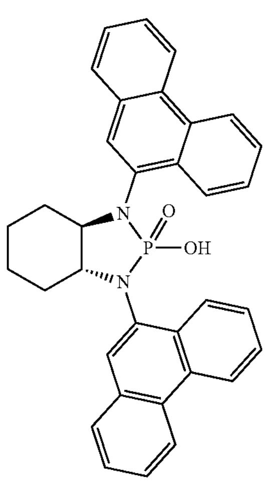
,
-continued
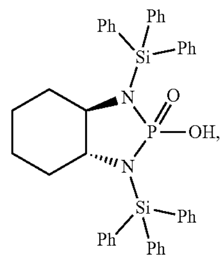
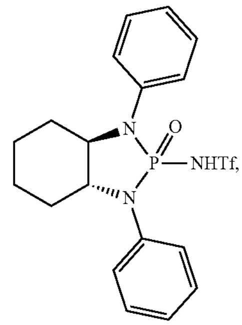
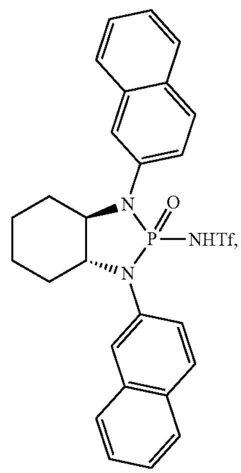
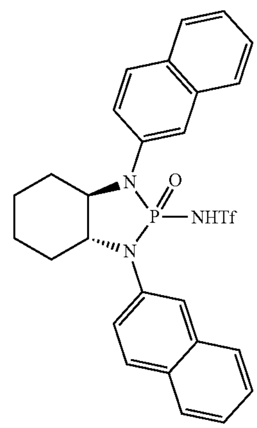
,
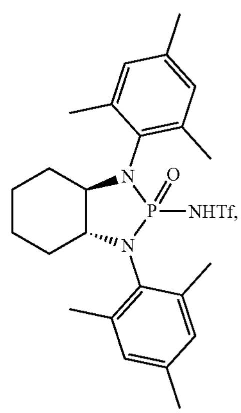
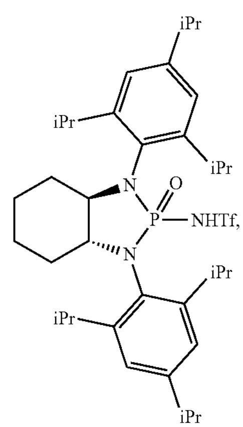
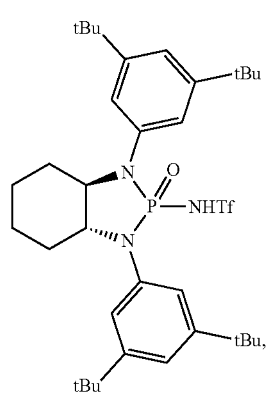

-continued
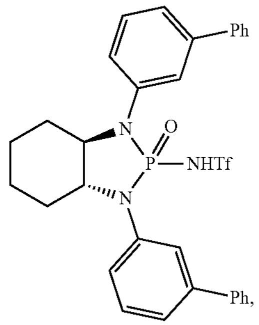
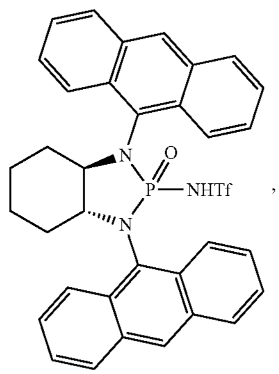
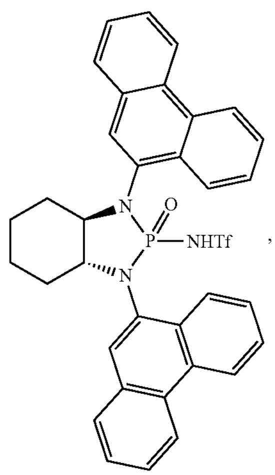
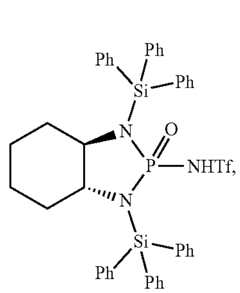
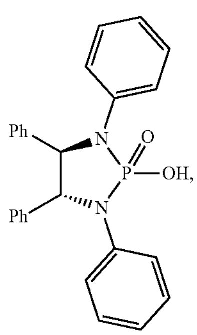
-continued
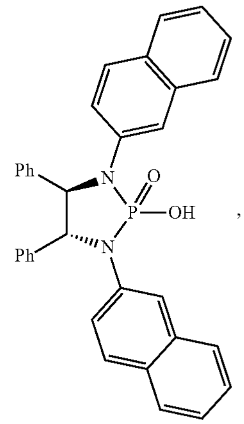
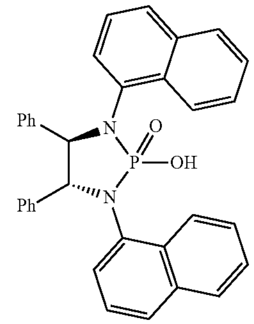
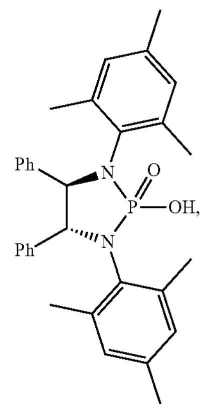
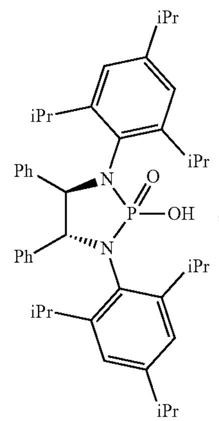
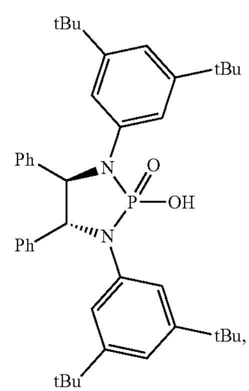
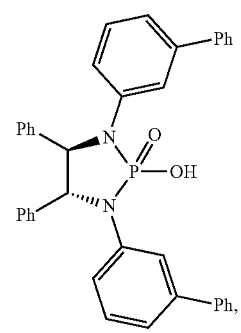
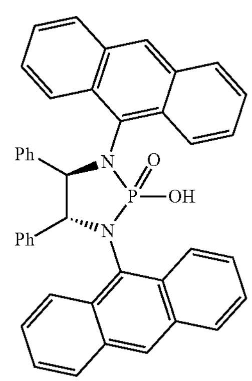

-continued
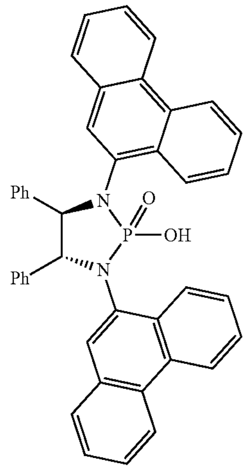
,
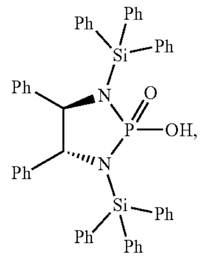
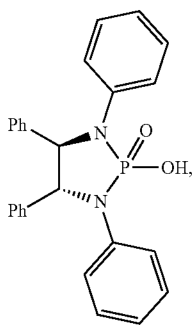
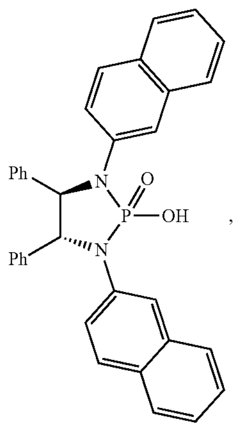
,
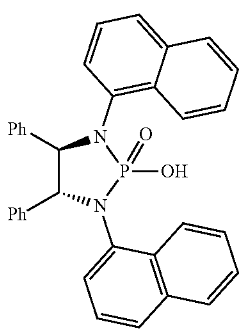
,
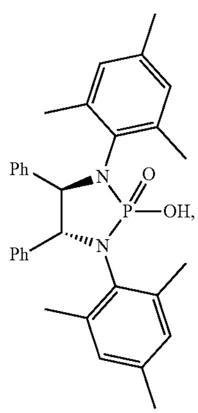
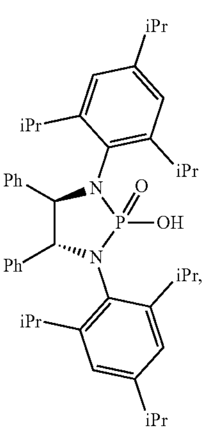
-continued
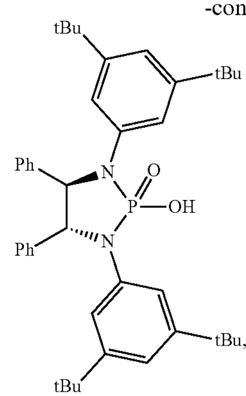
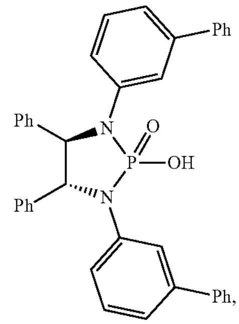
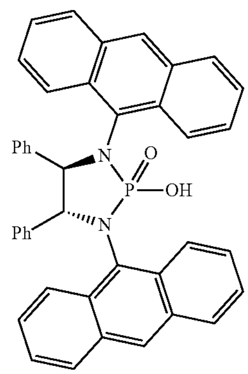
,
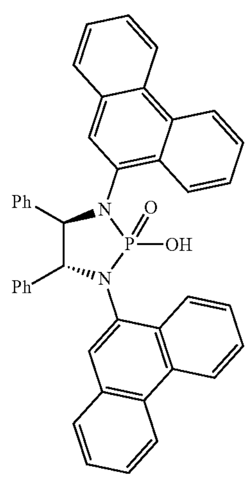
, and
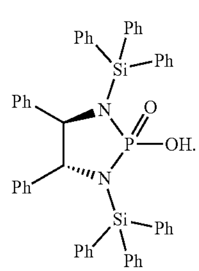

In a further aspect, the compound is selected from:
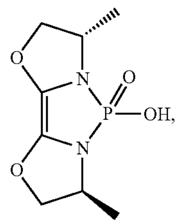
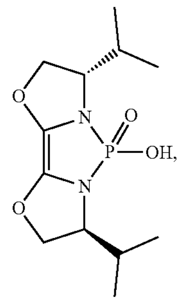
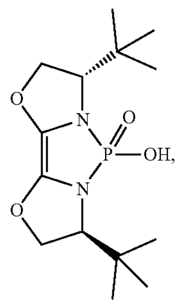
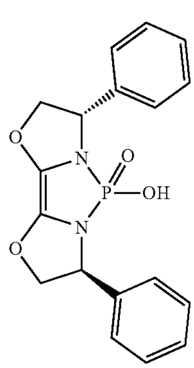
,
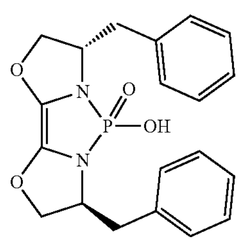
,
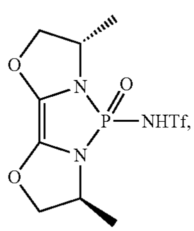
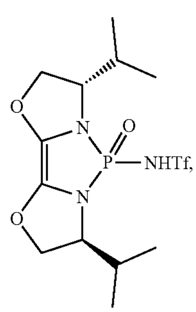
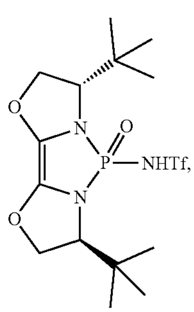
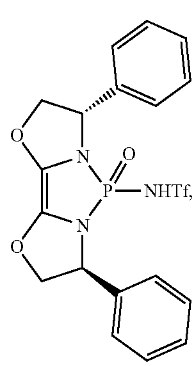
and
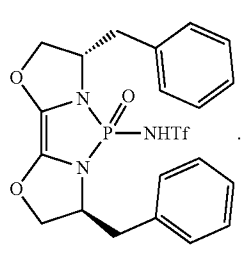
.
In a further aspect, the compound has a structure represented by a formula selected from:
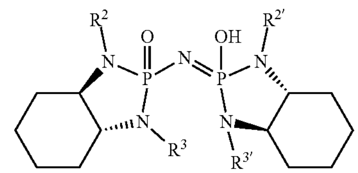
and
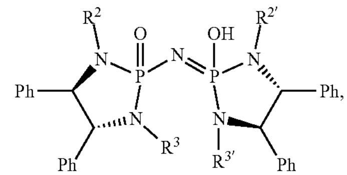
wherein each occurrence of $R^2$, $R^{2'}$, $R^3$, and $R^{3'}$ is simultaneously a structure selected from:
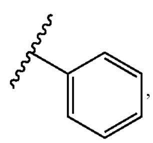
,
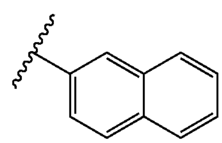
,
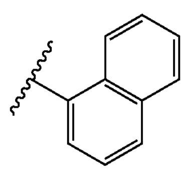
,
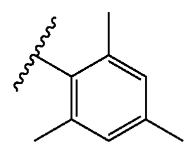
,
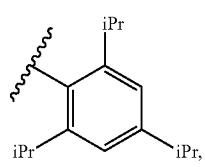
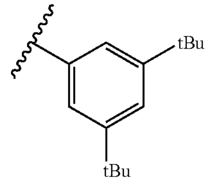
,
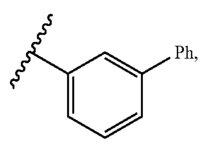
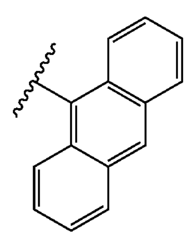
,
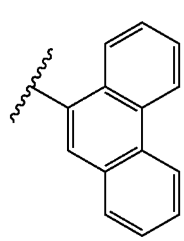
, and
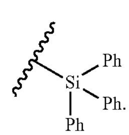

In a further aspect, the compound has a structure represented by a formula:

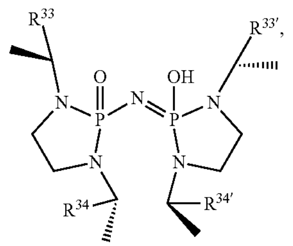

wherein each occurrence of $R^{33}$, $R^{33'}$, $R^{34}$, and $R^{34'}$ is simultaneously a structure selected from:

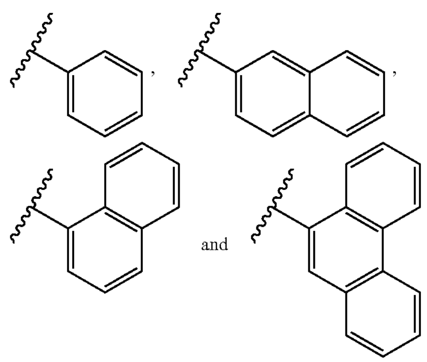

In a further aspect, the compound has a structure represented by a formula:

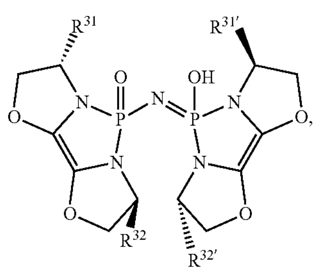

wherein each occurrence of $R^{31}$, $R^{31'}$, $R^{32}$, and $R^{32'}$ is simultaneously selected from methyl, isopropyl, t-butyl, phenyl, and benzyl.

In a further aspect, ⋱ is a single covalent bond. In a still further aspect, ⋱ is a double covalent bond.

a. $R^{1a}$, $R^{1b}$, $R^{1a'}$, and $R^{1b'}$ Groups

In one aspect, each of $R^{1a}$, $R^{1b}$, $R^{1a'}$, and $R^{1b'}$, when present, is independently selected from hydrogen, C1-C4 alkyl, and $Ar^1$. In a further aspect, each of $R^{1a}$, $R^{1b}$, $R^{1a'}$, and $R^{1b'}$, when present, is hydrogen.

In one aspect, each of $R^{1a}$ and $R^{1b}$ are optionally covalently bonded together and, together with the intermediate atoms, comprise a 5- to 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each of $R^{1a}$ and $R^{1b}$ are optionally covalently bonded together and, together with the intermediate atoms, comprise a 5- to 6-membered cycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a}$ and $R^{1b}$ are optionally covalently bonded together and, together with the intermediate atoms, comprise a 5- to 6-membered cycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each of $R^{1a}$ and $R^{1b}$ are optionally covalently bonded together and, together with the intermediate atoms, comprise a 5- to 6-membered cycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each of $R^{1a}$ and $R^{1b}$ are optionally covalently bonded together and, together with the intermediate atoms, comprise an unsubstituted 5- to 6-membered cycloalkyl.

In one aspect, each of $R^{1a'}$ and $R^{1b'}$, when present, are optionally covalently bonded together and, together with the intermediate atoms, comprise a 5- to 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each of $R^{1a'}$ and $R^{1b'}$, when present, are optionally covalently bonded together and, together with the intermediate atoms, comprise a 5- to 6-membered cycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a'}$ and $R^{1b'}$, when present, are optionally covalently bonded together and, together with the intermediate atoms, comprise a 5- to 6-membered cycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each of $R^{1a'}$ and $R^{1b'}$, when present, are optionally covalently bonded together and, together with the intermediate atoms, comprise a 5- to 6-membered cycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each of $R^{1a'}$ and $R^{1b'}$, when present, are optionally covalently bonded together and, together with the intermediate atoms, comprise an unsubstituted 5- to 6-membered cycloalkyl.

In one aspect, each of $R^{1a}$ and $R^2$ are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a further aspect, each of $R^{1a}$ and $R^2$ are optionally covalently bonded together and, together with the intermediate atoms, comprise a 5- or 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a}$ and $R^2$ are optionally covalently bonded together and, together with the intermediate atoms, comprise a 5- or 6-membered heterocycloalkyl substituted with 0 or 1 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a}$ and $R^2$ are optionally covalently bonded together and, together with the intermediate atoms, comprise a 5- or 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a}$ and $R^2$ are optionally covalently bonded together and, together with the intermediate atoms, comprise an unsubstituted 5- or 6-membered heterocycloalkyl.

In one aspect, each of $R^{1a'}$ and $R^{2'}$, when present, are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a further aspect, each of $R^{1a'}$ and $R^{2'}$, when present, are optionally covalently bonded together and, together with the intermediate atoms, comprise a 5- or 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise a 5- or 6-membered heterocycloalkyl substituted with 0 or 1 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a'}$ and $R^{2'}$, when present, are optionally covalently bonded together and, together with the intermediate atoms, comprise a 5- or 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a'}$ and $R^{2'}$, when present, are optionally covalently bonded together and, together with the intermediate atoms, comprise an unsubstituted 5- or 6-membered heterocycloalkyl.

In one aspect, each of $R^{1b}$ and $R^3$ are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a further aspect, each of $R^{1b}$ and $R^3$ are optionally covalently bonded together and, together with the intermediate atoms, comprise a 5- or 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b}$ and $R^3$ are optionally covalently bonded together and, together with the intermediate atoms, comprise a 5- or 6-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In yet a further aspect, each of $R^{1b}$ and $R^3$ are optionally covalently bonded together and, together with the intermediate atoms, comprise a 5- or 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In an even further aspect, each of $R^{1b}$ and $R^3$ are optionally covalently bonded together and, together with the intermediate atoms, comprise an unsubstituted 5- or 6-membered heterocycloalkyl.

In one aspect, each of $R^{1b'}$ and $R^{3'}$, when present, are optionally covalently bonded together and, together with the intermediate atoms, comprise a 5- or 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a further aspect, each of $R^{1b'}$ and $R^{3'}$, when present, are optionally covalently bonded together and, together with the intermediate atoms, comprise a 5- or 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b'}$ and $R^{3'}$, when present, are optionally covalently bonded together and, together with the intermediate atoms, comprise a 5- or 6-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In yet a further aspect, each of $R^{1b'}$ and $R^{3'}$, when present, are optionally covalently bonded together and, together with the intermediate atoms, comprise a 5- or 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In an even further aspect, each of $R^{1b'}$ and $R^{3'}$, when present, are optionally covalently bonded together and, together with the intermediate atoms, comprise an unsubstituted 5- or 6-membered heterocycloalkyl.

In a further aspect, each of $R^{1a}$ and $R^{1b}$ is independently selected from hydrogen, C1-C4 alkyl, and $Ar^1$. In a still further aspect, each of $R^{1a}$ and $R^{1b}$ is independently selected from hydrogen, methyl, ethyl, isopropyl, n-propyl, isobutyl, n-butyl, sec-butyl, t-butyl, and $Ar^1$. In yet a further aspect, each of $R^{1a}$ and $R^{1b}$ is independently selected from hydrogen, methyl, ethyl, isopropyl, n-propyl, and $Ar^1$. In an even further aspect, each of $R^{1a}$ and $R^{1b}$ is independently selected from hydrogen, methyl, ethyl, and $Ar^1$. In a still further aspect, each of $R^{1a}$ and $R^{1b}$ is independently selected from hydrogen, methyl, isopropyl, n-propyl, and $Ar^1$.

In a further aspect, each of $R^{1a}$ and $R^{1b}$ is independently selected from hydrogen and $Ar^1$.

In a further aspect, each of $R^{1a}$ and $R^{1b}$ are the same. In a still further aspect, each of $R^{1a}$ and $R^{1b}$ is $Ar^1$. In yet a further aspect, each of $R^{1a}$ and $R^{1b}$ is phenyl. In an even further aspect, each of $R^{1a}$ and $R^{1b}$ is unsubstituted phenyl. In yet a further aspect, each of $R^{1a}$ and $R^{1b}$ is hydrogen. In a still further aspect, each of $R^{1a}$ and $R^{1b}$ are different.

In a further aspect, each of $R^{1a'}$ and $R^{1b'}$, when present, is independently selected from hydrogen, C1-C4 alkyl, and $Ar^1$. In a still further aspect, each of $R^{1a'}$ and $R^{1b'}$, when present, is independently selected from hydrogen, methyl, ethyl, isopropyl, n-propyl, isobutyl, n-butyl, sec-butyl, t-butyl, and $Ar^1$. In yet a further aspect, each of $R^{1a'}$ and $R^{1b'}$, when present, is independently selected from hydrogen, methyl, ethyl, isopropyl, n-propyl, and $Ar^1$. In an even further aspect, each of $R^{1a'}$ and $R^{1b'}$, when present, is independently selected from hydrogen, methyl, ethyl, and $Ar^1$. In a still further aspect, each of $R^{1a'}$ and $R^{1b'}$, when present, is independently selected from hydrogen, methyl, isopropyl, n-propyl, and $Ar^1$.

In a further aspect, each of $R^{1a'}$ and $R^{1b'}$, when present, is independently selected from hydrogen and $Ar^1$.

In a further aspect, each of $R^{1a'}$ and $R^{1b'}$, when present, are the same. In a still further aspect, each of $R^{1a'}$ and $R^{1b'}$, when present, is $Ar^1$. In yet a further aspect, each of $R^{1a'}$ and $R^{1b'}$, when present, is phenyl. In an even further aspect, each of $R^{1a'}$ and $R^{1b'}$, when present, is unsubstituted phenyl. In yet a further aspect, each of $R^{1a'}$ and $R^{1b'}$, when present, is hydrogen. In an even further aspect, each of $R^{1a'}$ and $R^{1b'}$, when present, are different.

In a further aspect, each of $R^{1a}$ and $R^{1b}$ are optionally covalently bonded together and, together with the intermediate atoms, comprise a 5-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a}$ and $R^{1b}$ are optionally covalently bonded together and, together with the intermediate atoms, comprise a 5-membered cycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each of $R^{1a}$ and $R^{1b}$ are optionally covalently bonded together and, together with the intermediate atoms, comprise a 5-membered cycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each of $R^{1a}$ and $R^{1b}$ are optionally covalently bonded together and, together with the intermediate atoms, comprise a 5-membered cycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a}$ and $R^{1b}$ are optionally covalently bonded together and, together with the intermediate atoms, comprise an unsubstituted 5-membered cycloalkyl.

In a further aspect, each of $R^{1a}$ and $R^{1b}$ are optionally covalently bonded together and, together with the intermediate atoms, comprise a 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a}$ and $R^{1b}$ are optionally covalently bonded together and, together with the intermediate atoms, comprise a 6-membered cycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each of $R^{1a}$ and $R^{1b}$ are optionally covalently bonded together and, together with the intermediate atoms, comprise a 6-membered cycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each of $R^{1a}$ and $R^{1b}$ are optionally covalently bonded together and, together with the intermediate atoms, comprise a 6-membered cycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a}$ and $R^{1b}$ are optionally covalently bonded together and, together with the intermediate atoms, comprise an unsubstituted 6-membered cycloalkyl.

In a further aspect, each of $R^{1a'}$ and $R^{1b'}$, when present, are optionally covalently bonded together and, together with the intermediate atoms, comprise a 5-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a'}$ and $R^{1b'}$, when present, are optionally covalently bonded together and, together with the intermediate atoms, comprise a 5-membered cycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each of $R^{1a'}$ and $R^{1b'}$, when present, are optionally covalently bonded together and, together with the intermediate atoms, comprise a 5-membered cycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each of $R^{1a'}$ and $R^{1b'}$, when present, are optionally covalently bonded together and, together with the intermediate atoms, comprise a 5-membered cycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a'}$ and $R^{1b'}$, when present, are optionally covalently bonded together and, together with the intermediate atoms, comprise an unsubstituted 5-membered cycloalkyl.

In a further aspect, each of $R^{1a'}$ and $R^{1b'}$, when present, are optionally covalently bonded together and, together with the intermediate atoms, comprise a 6-membered cycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a'}$ and $R^{1b'}$, when present, are optionally covalently bonded together and, together with the intermediate atoms, comprise a 6-membered cycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each of $R^{1a'}$ and $R^{1b'}$, when present, are optionally covalently bonded together and, together with the intermediate atoms, comprise a 6-membered cycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each of $R^{1a'}$ and $R^{1b'}$, when present, are optionally covalently bonded together and, together with the intermediate atoms, comprise a 6-membered cycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each of $R^{1a'}$ and $R^{1b'}$, when present, are optionally covalently bonded together and, together with the intermediate atoms, comprise an unsubstituted 6-membered cycloalkyl.

In a further aspect, each of $R^{1a}$ and $R^2$ are optionally covalently bonded together and, together with the intermediate atoms, comprise a 5-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a}$ and $R^2$ are optionally covalently bonded together and, together with the intermediate atoms, comprise a 5-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a}$ and $R^2$ are optionally covalently bonded together and, together with the intermediate atoms, comprise a 5-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a}$ and $R^2$ are optionally covalently bonded together and, together with the intermediate atoms, comprise a 5-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a}$ and $R^2$ are optionally covalently bonded together and, together with the intermediate atoms, comprise an unsubstituted 5-membered heterocycloalkyl.

In a further aspect, each of $R^{1a}$ and $R^2$ are optionally covalently bonded together and, together with the intermediate atoms, comprise an oxazolidinyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a}$ and $R^2$ are optionally covalently bonded together and, together with the intermediate atoms, comprise an oxazolidinyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a}$ and $R^2$ are optionally covalently bonded together and, together with the intermediate atoms, comprise an oxazolidinyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a}$ and $R^2$ are optionally covalently bonded together and, together with the intermediate atoms, comprise an oxazolidinyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a}$ and $R^2$ are optionally covalently bonded together and, together with the intermediate atoms, comprise an unsubstituted oxazolidinyl.

In a further aspect, each of $R^{1a}$ and $R^2$ are optionally covalently bonded together and, together with the intermediate atoms, comprise a 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, AP, and —$C(R^{22a})(R^{22b})Ar^3$. In a still further aspect, each of $R^{1a}$ and $R^2$ are optionally covalently bonded together and, together with the intermediate atoms, comprise a 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a}$ and $R^2$ are optionally covalently bonded together and, together with the intermediate atoms, comprise a 6-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a}$ and $R^2$ are optionally covalently bonded together and, together with the intermediate atoms, comprise a 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a}$ and $R^2$ are optionally covalently bonded together and, together with the intermediate atoms, comprise an unsubstituted 6-membered heterocycloalkyl.

In a further aspect, each of $R^{1a}$ and $R^2$ are optionally covalently bonded together and, together with the intermediate atoms, comprise a 5-membered heterocycloalkyl substituted with 1 group selected from C1-C4 alkyl, $Ar^3$, and —$C(R^{22a})(R^{22b})Ar^3$. In a still further aspect, each of $R^{1a}$ and $R^2$ are optionally covalently bonded together and, together with the intermediate atoms, comprise a 5-membered heterocycloalkyl substituted with 1 group selected from methyl, ethyl, isopropyl, n-propyl, isobutyl, n-butyl, sec-butyl, t-butyl, $Ar^3$, and —$C(R^{22a})(R^{22b})Ar^3$. In yet a further aspect, each of $R^{1a}$ and $R^2$ are optionally covalently bonded together and, together with the intermediate atoms, comprise a 5-membered heterocycloalkyl substituted with 1 group selected from methyl, ethyl, isopropyl, n-propyl, $Ar^3$, and —$C(R^{22a})(R^{22b})Ar^3$. In an even further aspect, each of $R^{1a}$ and $R^2$ are optionally covalently bonded together and, together with the intermediate atoms, comprise a 5-membered heterocycloalkyl substituted with 1 group selected from methyl, ethyl, $Ar^3$, and —$C(R^{22a})(R^{22b})Ar^3$. In a still further aspect, each of $R^{1a}$ and $R^2$ are optionally covalently bonded together and, together with the intermediate atoms, comprise a 5-membered heterocycloalkyl substituted with 1 group selected from methyl, $Ar^3$, and —$C(R^{22a})(R^{22b})Ar^3$.

In a further aspect, each of $R^{1a}$ and $R^2$ are optionally covalently bonded together and, together with the intermediate atoms, comprise an oxazolidinyl substituted with 1 group selected from C1-C4 alkyl, $Ar^3$, and —$C(R^{22a})(R^{22b})Ar^3$. In a still further aspect, each of $R^{1a}$ and $R^2$ are optionally covalently bonded together and, together with the intermediate atoms, comprise an oxazolidinyl substituted with 1 group selected from methyl, ethyl, isopropyl, n-propyl, isobutyl, n-butyl, sec-butyl, t-butyl, $Ar^3$, and —$C(R^{22a})(R^{22b})Ar^3$. In yet a further aspect, each of $R^{1a}$ and $R^2$ are optionally covalently bonded together and, together with the intermediate atoms, comprise an oxazolidinyl substituted with 1 group selected from methyl, ethyl, isopropyl, n-propyl, $Ar^3$, and —$C(R^{22a})(R^{22b})Ar^3$. In an even further aspect, each of $R^{1a}$ and $R^2$ are optionally covalently bonded together and, together with the intermediate atoms, comprise an oxazolidinyl substituted with 1 group selected from methyl, ethyl, $Ar^3$, and —$C(R^{22a})(R^{22b})Ar^3$. In a still further aspect, each of $R^{1a}$ and $R^2$ are optionally covalently bonded together and, together with the intermediate atoms, comprise an oxazolidinyl substituted with 1 group selected from methyl, $Ar^3$, and —$C(R^{22a})(R^{22b})Ar^3$.

In a further aspect, each of $R^{1a}$ and $R^2$ are optionally covalently bonded together and, together with the intermediate atoms, comprise a 6-membered heterocycloalkyl substituted with 1 group selected from C1-C4 alkyl, AP, and —$C(R^{22a})(R^{22b})Ar^3$. In a still further aspect, each of $R^{1a}$ and $R^2$ are optionally covalently bonded together and, together with the intermediate atoms, comprise a 6-membered heterocycloalkyl substituted with 1 group selected from methyl, ethyl, isopropyl, n-propyl, isobutyl, n-butyl, sec-butyl, t-butyl, $Ar^3$, and —$C(R^{22a})(R^{22b})Ar^3$. In yet a further aspect, each of $R^{1a}$ and $R^2$ are optionally covalently bonded together and, together with the intermediate atoms, comprise a 6-membered heterocycloalkyl substituted with 1 group selected from methyl, ethyl, isopropyl, n-propyl, $Ar^3$, and —$C(R^{22a})(R^{22b})Ar^3$. In an even further aspect, each of $R^{1a}$ and $R^2$ are optionally covalently bonded together and, together with the intermediate atoms, comprise a 6-membered heterocycloalkyl substituted with 1 group selected from methyl, ethyl, $Ar^3$, and —$C(R^{22a})(R^{22b})Ar^3$. In a still further aspect, each of $R^{1a}$ and $R^2$ are optionally covalently bonded together and, together with the intermediate atoms, comprise a 6-membered heterocycloalkyl substituted with 1 group selected from methyl, $Ar^3$, and —$C(R^{22a})(R^{22b})Ar^3$.

In a further aspect, each of $R^{1a'}$ and $R^{2'}$, when present, are optionally covalently bonded together and, together with the intermediate atoms, comprise a 5-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise a 5-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a'}$ and $R^{2'}$, when present, are optionally covalently bonded together and, together with the intermediate atoms, comprise a 5-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a'}$ and $R^{2'}$, when present, are optionally covalently bonded together and, together with the intermediate atoms, comprise a 5-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise an unsubstituted 5-membered heterocycloalkyl.

In a further aspect, each of $R^{1a'}$ and $R^{2'}$, when present, are optionally covalently bonded together and, together with the intermediate atoms, comprise an oxazolidinyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise an oxazolidinyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a'}$ and $R^{2'}$, when present, are optionally covalently bonded together and, together with the intermediate atoms, comprise an oxazolidinyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a'}$ and $R^{2'}$, when present, are optionally covalently bonded together and, together with the intermediate atoms, comprise an oxazolidinyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise an unsubstituted oxazolidinyl.

In a further aspect, each of $R^{1a'}$ and $R^{2'}$, when present, are optionally covalently bonded together and, together with the intermediate atoms, comprise a 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise a 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In yet a further aspect, each of $R^{1a'}$ and $R^{2'}$, when present, are optionally covalently bonded together and, together with the intermediate atoms, comprise a 6-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In an even further aspect, each of $R^{1a'}$ and $R^{2'}$, when present, are optionally covalently bonded together and, together with the intermediate atoms, comprise a 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise an unsubstituted 6-membered heterocycloalkyl.

In a further aspect, each of $R^{1a'}$ and $R^{2'}$, when present, are optionally covalently bonded together and, together with the intermediate atoms, comprise a 5-membered heterocycloalkyl substituted with 1 group selected from C1-C4 alkyl, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise a 5-membered heterocycloalkyl substituted with 1 group selected from methyl, ethyl, isopropyl, n-propyl, isobutyl, n-butyl, sec-butyl, t-butyl, $Ar^3$, and —$C(R^{22a})(R^{22b})Ar^3$. In yet a further aspect, each of $R^{1a'}$ and $R^{2'}$, when present, are optionally covalently bonded together and, together with the intermediate atoms, comprise a 5-membered heterocycloalkyl substituted with 1 group selected from methyl, ethyl, isopropyl, n-propyl, $Ar^3$, and —$C(R^{22a})(R^{22b})Ar^3$. In an even further aspect, each of $R^{1a'}$ and $R^{2'}$, when present, are optionally covalently bonded together and, together with the intermediate atoms, comprise a 5-membered heterocycloalkyl substituted with 1 group selected from methyl, ethyl, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise a 5-membered heterocycloalkyl substituted with 1 group selected from methyl, $Ar^3$, and —$C(R^{22a})(R^{22b})Ar^3$.

In a further aspect, each of $R^{1a'}$ and $R^{2'}$, when present, are optionally covalently bonded together and, together with the intermediate atoms, comprise an oxazolidinyl substituted with 1 group selected from C1-C4 alkyl, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise an oxazolidinyl substituted with 1 group selected from methyl, ethyl, isopropyl, n-propyl, isobutyl, n-butyl, sec-butyl, t-butyl, $Ar^3$, and —$C(R^{22a})(R^{22b})Ar^3$. In yet a further aspect, each of $R^{1a'}$ and $R^{2'}$, when present, are optionally covalently bonded together and, together with the intermediate atoms, comprise an oxazolidinyl substituted with 1 group selected from methyl, ethyl, isopropyl, n-propyl, $Ar^3$, and —$C(R^{22a})(R^{22b})Ar^3$. In an even further aspect, each of $R^{1a'}$ and $R^{2'}$, when present, are optionally covalently bonded together and, together with the intermediate atoms, comprise an oxazolidinyl substituted with 1 group selected from methyl, ethyl, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise an oxazolidinyl substituted with 1 group selected from methyl, $Ar^3$, and —$C(R^{22a})(R^{22b})Ar^3$.

In a further aspect, each of $R^{1a'}$ and $R^{2'}$, when present, are optionally covalently bonded together and, together with the intermediate atoms, comprise a 6-membered heterocycloalkyl substituted with 1 group selected from C1-C4 alkyl, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise a 6-membered heterocycloalkyl substituted with 1 group selected from methyl, ethyl, isopropyl, n-propyl, isobutyl, n-butyl, sec-butyl, t-butyl, $Ar^3$, and —$C(R^{22a})(R^{22b})Ar^3$. In yet a further aspect, each of $R^{1a'}$ and $R^{2'}$, when present, are optionally covalently bonded together and, together with the intermediate atoms, comprise a 6-membered heterocycloalkyl substituted with 1 group selected from methyl, ethyl, isopropyl, n-propyl, $Ar^3$, and —$C(R^{22a})(R^{22b})Ar^9$. In an even further aspect, each of $R^{1a'}$ and $R^{2'}$, when present, are optionally covalently bonded together and, together with the intermediate atoms, comprise a 6-membered heterocycloalkyl substituted with 1 group selected from methyl, ethyl, $Ar^3$, and —$C(R^{22a})(R^{22b})Ar^3$. In a still further aspect, each of $R^{1a'}$ and $R^{2'}$, when present, are optionally covalently bonded together and, together with the intermediate atoms, comprise a 6-membered heterocycloalkyl substituted with 1 group selected from methyl, $Ar^3$, and —$C(R^{22a})(R^{22b})Ar^3$.

In a further aspect, each of $R^{1b}$ and $R^3$ are optionally covalently bonded together and, together with the intermediate atoms, comprise a 5-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b}$ and $R^3$ are optionally covalently bonded together and, together with the intermediate atoms, comprise a 5-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In yet a further aspect, each of $R^{1b}$ and $R^3$ are optionally covalently bonded together and, together with the intermediate atoms, comprise a 5-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In an even further aspect, each of $R^{1b}$ and $R^3$ are optionally covalently bonded together and, together with the intermediate atoms, comprise a 5-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b}$ and $R^3$ are optionally covalently bonded together and, together with the intermediate atoms, comprise an unsubstituted 5-membered heterocycloalkyl.

In a further aspect, each of $R^{1b}$ and $R^3$ are optionally covalently bonded together and, together with the intermediate atoms, comprise an oxazolidinyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b}$ and $R^3$ are optionally covalently bonded together and, together with the intermediate atoms, comprise an oxazolidinyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In yet a further aspect, each of $R^{1b}$ and $R^3$ are optionally covalently bonded together and, together with the intermediate atoms, comprise an oxazolidinyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In an even further aspect, each of $R^{1b}$ and $R^3$ are optionally covalently bonded together and, together with the intermediate atoms, comprise an oxazolidinyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b}$ and $R^3$ are optionally covalently bonded together and, together with the intermediate atoms, comprise an unsubstituted oxazolidinyl.

In a further aspect, each of $R^{1b}$ and $R^3$ are optionally covalently bonded together and, together with the intermediate atoms, comprise a 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b}$ and $R^3$ are optionally covalently bonded together and, together with the intermediate atoms, comprise a 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In yet a further aspect, each of $R^{1b}$ and $R^3$ are optionally covalently bonded together and, together with the intermediate atoms, comprise a 6-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In an even further aspect, each of $R^{1b}$ and $R^3$ are optionally covalently bonded together and, together with the intermediate atoms, comprise a 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —$C(R^{23a})(R^{23b})Ar^4$. In a still further aspect, each of $R^{1b}$ and $R^3$ are optionally covalently bonded together and, together with the intermediate atoms, comprise an unsubstituted 6-membered heterocycloalkyl.

In a further aspect, each of $R^{1b}$ and $R^3$ are optionally covalently bonded together and, together with the intermediate atoms, comprise a 5-membered heterocycloalkyl substituted with 1 group selected from C1-C4 alkyl, $Ar^4$, and —$C(R^{23a})(R^{23b})Ar^4$. In a still further aspect, each of $R^{1b}$ and $R^3$ are optionally covalently bonded together and, together with the intermediate atoms, comprise a 5-membered heterocycloalkyl substituted with 1 group selected from methyl, ethyl, n-propyl, isopropyl, n-butyl, isobutyl, sec-butyl, t-butyl, $Ar^4$, and —$C(R^{23a})(R^{23b})Ar^4$. In yet a further aspect, each of $R^{1b}$ and $R^3$ are optionally covalently bonded together and, together with the intermediate atoms, comprise a 5-membered heterocycloalkyl substituted with 1 group selected from methyl, ethyl, n-propyl, isopropyl, $Ar^4$, and —$C(R^{23a})(R^{23b})Ar^4$. In an even further aspect, each of $R^{1b}$ and $R^3$ are optionally covalently bonded together and, together with the intermediate atoms, comprise a 5-membered heterocycloalkyl substituted with 1 group selected from methyl, ethyl, $Ar^4$, and —$C(R^{23a})(R^{23b})Ar^4$. In a still further aspect, each of $R^{1b}$ and $R^3$ are optionally covalently bonded together and, together with the intermediate atoms, comprise a 5-membered heterocycloalkyl substituted with 1 group selected from methyl, $Ar^4$, and —$C(R^{23a})(R^{23b})Ar^4$.

In a further aspect, each of $R^{1b}$ and $R^3$ are optionally covalently bonded together and, together with the intermediate atoms, comprise an oxazolidinyl substituted with 1 group selected from C1-C4 alkyl, $Ar^4$, and —$C(R^{23a})(R^{23b})Ar^4$. In a still further aspect, each of $R^{1b}$ and $R^3$ are optionally covalently bonded together and, together with the intermediate atoms, comprise a oxazolidinyl substituted with 1 group selected from methyl, ethyl, n-propyl, isopropyl, n-butyl, isobutyl, sec-butyl, t-butyl, $Ar^4$, and —$C(R^{23a})(R^{23b})Ar^4$. In yet a further aspect, each of $R^{1b}$ and $R^3$ are optionally covalently bonded together and, together with the intermediate atoms, comprise an oxazolidinyl substituted with 1 group selected from methyl, ethyl, n-propyl, isopropyl, $Ar^4$, and —$C(R^{23a})(R^{23b})Ar^4$. In an even further aspect, each of $R^{1b}$ and $R^3$ are optionally covalently bonded together and, together with the intermediate atoms, comprise an oxazolidinyl substituted with 1 group selected from methyl, ethyl, $Ar^4$, and —$C(R^{23a})(R^{23b})Ar^4$. In a still further aspect, each of $R^{1b}$ and $R^3$ are optionally covalently bonded together and, together with the intermediate atoms, comprise an oxazolidinyl substituted with 1 group selected from methyl, $Ar^4$, and —$C(R^{23a})(R^{23a})Ar^4$.

In a further aspect, each of $R^{1b}$ and $R^3$ are optionally covalently bonded together and, together with the intermediate atoms, comprise a 6-membered heterocycloalkyl substituted with 1 group selected from C1-C4 alkyl, $Ar^4$, and —$C(R^{23a})(R^{23b})Ar^4$. In a still further aspect, each of $R^{1b}$ and $R^3$ are optionally covalently bonded together and, together with the intermediate atoms, comprise a 6-membered heterocycloalkyl substituted with 1 group selected from methyl, ethyl, n-propyl, isopropyl, n-butyl, isobutyl, sec-butyl, t-butyl, $Ar^4$, and —$C(R^{23a})(R^{23b})Ar^4$. In yet a further aspect, each of $R^{1b}$ and $R^3$ are optionally covalently bonded together and, together with the intermediate atoms, comprise a 6-membered heterocycloalkyl substituted with 1 group selected from methyl, ethyl, n-propyl, isopropyl, $Ar^4$, and —C($R^{23a}$)($R^{23b}$)$Ar^4$. In an even further aspect, each of $R^{1b}$ and $R^3$ are optionally covalently bonded together and, together with the intermediate atoms, comprise a 6-membered heterocycloalkyl substituted with 1 group selected from methyl, ethyl, $Ar^4$, and —C($R^{23a}$)($R^{23b}$)$Ar^4$. In a still further aspect, each of $R^{1b}$ and $R^3$ are optionally covalently bonded together and, together with the intermediate atoms, comprise a 6-membered heterocycloalkyl substituted with 1 group selected from methyl, $Ar^4$, and —C($R^{23a}$)($R^{23b}$)$Ar^4$.

In a further aspect, each of $R^{1b}$ and $R^3$, when present, are optionally covalently bonded together and, together with the intermediate atoms, comprise a 5-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In a still further aspect, each of $R^{1b'}$ and $R^{3'}$, when present, are optionally covalently bonded together and, together with the intermediate atoms, comprise a 5-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In yet a further aspect, each of $R^{1b'}$ and $R^{3'}$, when present, are optionally covalently bonded together and, together with the intermediate atoms, comprise a 5-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In an even further aspect, each of $R^{1b'}$ and $R^{3'}$, when present, are optionally covalently bonded together and, together with the intermediate atoms, comprise a 5-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In a still further aspect, each of $R^{1b'}$ and $R^{3'}$, when present, are optionally covalently bonded together and, together with the intermediate atoms, comprise an unsubstituted 5-membered heterocycloalkyl.

In a further aspect, each of $R^{1b'}$ and $R^{3'}$, when present, are optionally covalently bonded together and, together with the intermediate atoms, comprise an oxazolidinyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In a still further aspect, each of $R^{1b'}$ and $R^{3'}$, when present, are optionally covalently bonded together and, together with the intermediate atoms, comprise an oxazolidinyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In yet a further aspect, each of $R^{1b'}$ and $R^{3'}$, when present, are optionally covalently bonded together and, together with the intermediate atoms, comprise an oxazolidinyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In an even further aspect, each of $R^{1b'}$ and $R^{3'}$, when present, are optionally covalently bonded together and, together with the intermediate atoms, comprise an oxazolidinyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In a still further aspect, each of $R^{1b'}$ and $R^{3'}$, when present, are optionally covalently bonded together and, together with the intermediate atoms, comprise an unsubstituted oxazolidinyl.

In a further aspect, each of $R^{1b'}$ and $R^{3'}$, when present, are optionally covalently bonded together and, together with the intermediate atoms, comprise a 6-membered heterocycloalkyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In a still further aspect, each of $R^{1b'}$ and $R^{3'}$, when present, are optionally covalently bonded together and, together with the intermediate atoms, comprise a 6-membered heterocycloalkyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In yet a further aspect, each of $R^{1b'}$ and $R^{3'}$, when present, are optionally covalently bonded together and, together with the intermediate atoms, comprise a 6-membered heterocycloalkyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In an even further aspect, each of $R^{1b'}$ and $R^{3'}$, when present, are optionally covalently bonded together and, together with the intermediate atoms, comprise a 6-membered heterocycloalkyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, $Ar^4$, and —C($R^{23a}$)($R^{23b}$)$Ar^4$. In a still further aspect, each of $R^{1b'}$ and $R^{3'}$, when present, are optionally covalently bonded together and, together with the intermediate atoms, comprise an unsubstituted 6-membered heterocycloalkyl.

In a further aspect, each of $R^{1b'}$ and $R^{3'}$, when present, are optionally covalently bonded together and, together with the intermediate atoms, comprise a 5-membered heterocycloalkyl substituted with 1 group selected from C1-C4 alkyl, $Ar^4$, and —$C(R^{23a})(R^{23b})Ar^4$. In a still further aspect, each of $R^{1b'}$ and $R^{3'}$, when present, are optionally covalently bonded together and, together with the intermediate atoms, comprise a 5-membered heterocycloalkyl substituted with 1 group selected from methyl, ethyl, n-propyl, isopropyl, n-butyl, isobutyl, sec-butyl, t-butyl, $Ar^4$, and —$C(R^{23a})(R^{23b})Ar^4$. In yet a further aspect, each of $R^{1b'}$ and $R^{3'}$, when present, are optionally covalently bonded together and, together with the intermediate atoms, comprise a 5-membered heterocycloalkyl substituted with 1 group selected from methyl, ethyl, n-propyl, isopropyl, $Ar^4$, and —$C(R^{23a})(R^{23b})Ar^4$. In an even further aspect, each of $R^{1b'}$ and $R^{3'}$, when present, are optionally covalently bonded together and, together with the intermediate atoms, comprise a 5-membered heterocycloalkyl substituted with 1 group selected from methyl, ethyl, $Ar^4$, and —$C(R^{23a})(R^{23b})Ar^4$. In a still further aspect, each of $R^{1b'}$ and $R^{3'}$, when present, are optionally covalently bonded together and, together with the intermediate atoms, comprise a 5-membered heterocycloalkyl substituted with 1 group selected from methyl, $Ar^4$, and —$C(R^{23a})(R^{23b})Ar^4$.

In a further aspect, each of $R^{1b'}$ and $R^{3'}$, when present, are optionally covalently bonded together and, together with the intermediate atoms, comprise an oxazolidinyl substituted with 1 group selected from C1-C4 alkyl, $Ar^4$, and —$C(R^{23a})(R^{23b})Ar^4$. In a still further aspect, each of $R^{1b'}$ and $R^{3'}$, when present, are optionally covalently bonded together and, together with the intermediate atoms, comprise a oxazolidinyl substituted with 1 group selected from methyl, ethyl, n-propyl, isopropyl, n-butyl, isobutyl, sec-butyl, t-butyl, $Ar^4$, and —$C(R^{23a})(R^{23b})Ar^4$. In yet a further aspect, each of $R^{1b'}$ and $R^{3'}$, when present, are optionally covalently bonded together and, together with the intermediate atoms, comprise an oxazolidinyl substituted with 1 group selected from methyl, ethyl, n-propyl, isopropyl, $Ar^4$, and —$C(R^{23a})(R^{23b})Ar^4$. In an even further aspect, each of $R^{1b}$ and $R^3$, when present, are optionally covalently bonded together and, together with the intermediate atoms, comprise an oxazolidinyl substituted with 1 group selected from methyl, ethyl, $Ar^4$, and —$C(R^{23a})(R^{23b})Ar^4$. In a still further aspect, each of $R^{1b'}$ and $R^{3'}$, when present, are optionally covalently bonded together and, together with the intermediate atoms, comprise an oxazolidinyl substituted with 1 group selected from methyl, $Ar^4$, and —$C(R^{23a})(R^{23b})Ar^4$.

In a further aspect, each of $R^{1b'}$ and $R^{3'}$, when present, are optionally covalently bonded together and, together with the intermediate atoms, comprise a 6-membered heterocycloalkyl substituted with 1 group selected from C1-C4 alkyl, $Ar^4$, and —$C(R^{23a})(R^{23b})Ar^4$. In a still further aspect, each of $R^{1b}$ and $R^3$, when present, are optionally covalently bonded together and, together with the intermediate atoms, comprise a 6-membered heterocycloalkyl substituted with 1 group selected from methyl, ethyl, n-propyl, isopropyl, n-butyl, isobutyl, sec-butyl, t-butyl, $Ar^4$, and —$C(R^{23a})(R^{23b})Ar^4$. In yet a further aspect, each of $R^{1b'}$ and $R^{3'}$, when present, are optionally covalently bonded together and, together with the intermediate atoms, comprise a 6-membered heterocycloalkyl substituted with 1 group selected from methyl, ethyl, n-propyl, isopropyl, $Ar^4$, and —$C(R^{23a})(R^{23b})Ar^4$. In an even further aspect, each of $R^{1b'}$ and $R^{3'}$, when present, are optionally covalently bonded together and, together with the intermediate atoms, comprise a 6-membered heterocycloalkyl substituted with 1 group selected from methyl, ethyl, $Ar^4$, and —$C(R^{23a})(R^{23b})Ar^4$. In a still further aspect, each of $R^{1b'}$ and $R^{3'}$, when present, are optionally covalently bonded together and, together with the intermediate atoms, comprise a 6-membered heterocycloalkyl substituted with 1 group selected from methyl, $Ar^4$, and —$C(R^{23a})(R^{23b})Ar^4$.

In a further aspect, each of $R^{1a}$, $R^{1b}$, $R^{1a'}$, and $R^{1b'}$, when present, is the same. In a still further aspect, each of $R^{1a}$, $R^{1b}$, $R^{1a'}$, and $R^{1b'}$, when present, is $Ar^1$. In yet a further aspect, each of $R^{1a}$, $R^{1b}$, $R^{1a'}$, and $R^{1b'}$, when present, is phenyl. In an even further aspect, each of $R^{1a}$, $R^{1b}$, $R^{1a'}$, and $R^{1b'}$, when present, is unsubstituted phenyl. In a further aspect, each of $R^{1a}$, $R^{1b}$, $R^{1a'}$, and $R^{1b'}$, when present, is hydrogen. In a still further aspect, each of $R^{1a}$, $R^{1b}$, $R^{1a'}$, and $R^{1b'}$, when present, is different.

b. $R^2$, $R^3$, $R^{2'}$, and $R^{3'}$ Groups

In one aspect, each of $R^2$, $R^3$, $R^{2'}$, and $R^{3'}$, when present, are independently selected from —$Si(R^{20a})(R^{20b})R^{20c}$, $Ar^2$, and —$C(R^{21a})(R^{21b})Ar^2$.

In a further aspect, each of $R^2$ and $R^3$ are independently selected from —$Si(R^{20a})(R^{20b})R^{20c}$, $Ar^2$, and —$C(R^{21a})(R^{21b})Ar^2$.

In a further aspect, each of $R^2$ and $R^3$ are the same. In a still further aspect, each of $R^2$ and $R^3$ are —$Si(R^{20a})(R^{20b})R^{20c}$. In yet a further aspect, each of $R^2$ and $R^3$ are $Ar^2$. In an even further aspect, each of $R^2$ and $R^3$ are —$C(R^{21a})(R^{21b})Ar^2$. In a still further aspect, each of $R^2$ and $R^3$ are different.

In a further aspect, each of $R^2$ and $R^3$ are independently —$Si(R^{20a})(R^{20b})R^{20c}$. In a still further aspect, each of $R^2$ and $R^3$ are —$Si(Ph)_3$.

In a further aspect, each of $R^2$ and $R^3$ are independently selected from $Ar^2$ and —$C(R^{21a})(R^{21})Ar^2$.

In a further aspect, each of $R^2$ and $R^3$ are independently $Ar^2$. In a still further aspect, each of $R^2$ and $R^3$ are phenyl.

In a further aspect, each of $R^2$ and $R^3$ are independently —$C(R^{21a})(R^{21b})Ar^2$. In a still further aspect, each of $R^2$ and $R^3$ are independently —$CH(R^{21b})Ar^2$. In yet a further aspect, each of $R^2$ and $R^3$ are independently —$CH(CH_3)Ar^2$. In an even further aspect, each of $R^2$ and $R^3$ are independently —$CH_2Ar^2$.

In a further aspect, each of $R^{2'}$ and $R^{3'}$, when present, are independently selected from —$Si(R^{20a})(R^{20b})R^{20c}$, $Ar^2$, and —$C(R^{21a})(R^{21b})Ar^2$.

In a further aspect, each of $R^2$ and $R^3$, when present, are the same. In a still further aspect, each of $R^2$ and $R^3$ are —$Si(R^{20a})(R^{20b})R^{20c}$. In yet a further aspect, each of $R^{2'}$ and $R^{3'}$, when present, are $Ar^2$. In an even further aspect, each of $R^{2'}$ and $R^{3'}$, when present, are —$C(R^{21a})(R^{21b})Ar^2$. In a still further aspect, each of $R^{2'}$ and $R^{3'}$, when present, are different.

In a further aspect, each of $R^2$ and $R^{3'}$, when present, are independently —$Si(R^{20a})(R^{20b})R^{20c}$. In a still further aspect, each of $R^{2'}$ and $R^{3'}$, when present, are —$Si(Ph)_3$.

In a further aspect, each of $R^{2'}$ and $R^{3'}$, when present, are independently selected from $Ar^2$ and —$C(R^{21a})(R^{21b})Ar^2$.

In a further aspect, each of $R^{2'}$ and $R^{3'}$, when present, are independently $Ar^2$. In a still further aspect, each of $R^{2'}$ and $R^{3'}$, when present, are phenyl.

In a further aspect, each of $R^2$ and $R^3$, when present, are independently —$C(R^{21a})(R^{21b})Ar^2$. In a still further aspect, each of $R^{2'}$ and $R^{3'}$, when present, are independently —$CH(R^{21b})Ar^2$. In yet a further aspect, each of $R^{2'}$ and $R^{3'}$, when present, are independently —$CH(CH_3)Ar^2$. In an even further aspect, each of $R^{2'}$ and $R^{3'}$, when present, are independently —$CH_2Ar^2$.

In a further aspect, each occurrence of $R^2$, and $R^3$ is independently a structure selected from:

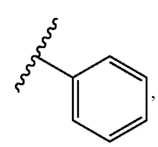,
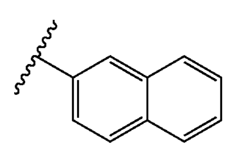,

-continued
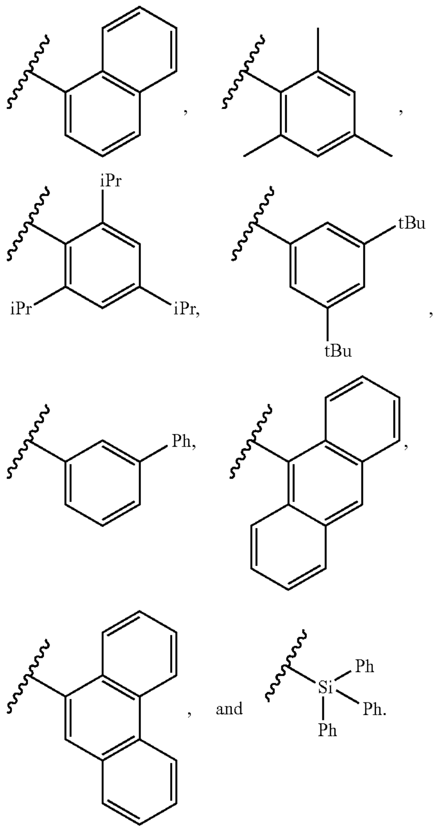
In a further aspect, each occurrence of $R^2$ and $R^3$ is simultaneously a structure selected from:
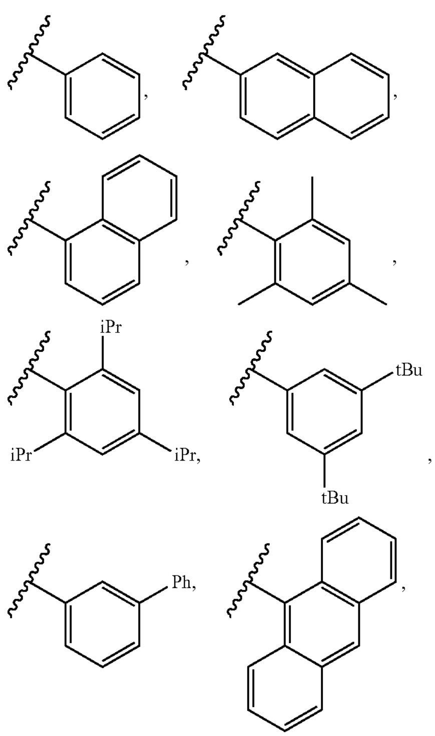
-continued
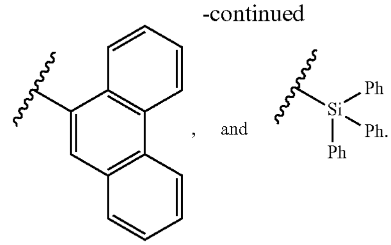
In a further aspect, each occurrence of $R^{2'}$ and $R^{3'}$ is independently a structure selected from:
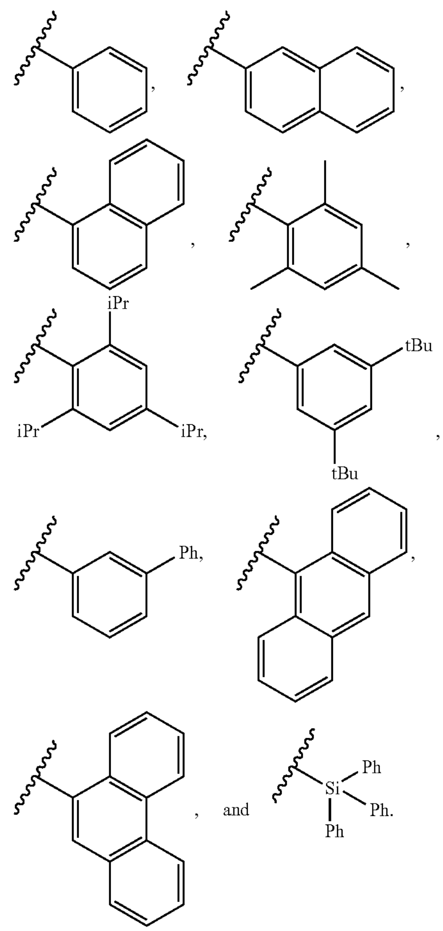
In a further aspect, each occurrence of $R^{2'}$ and $R^{3'}$ is simultaneously a structure selected from:
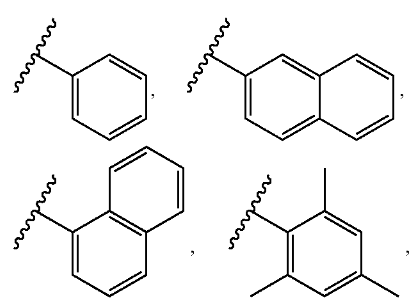

-continued

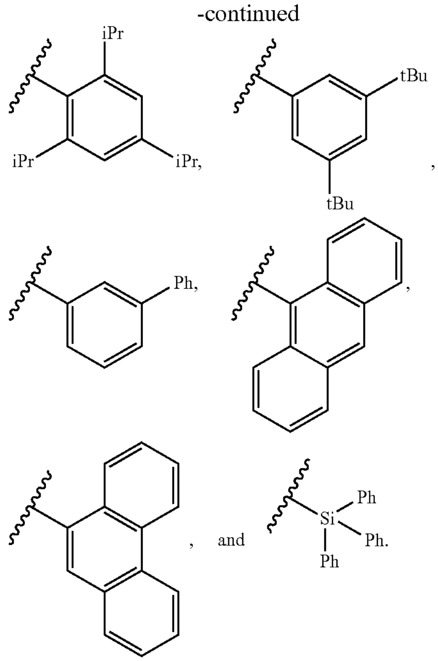

In a further aspect, each occurrence of $R^2$, $R^{2'}$, $R^3$, and $R^{3'}$ is independently a structure selected from:

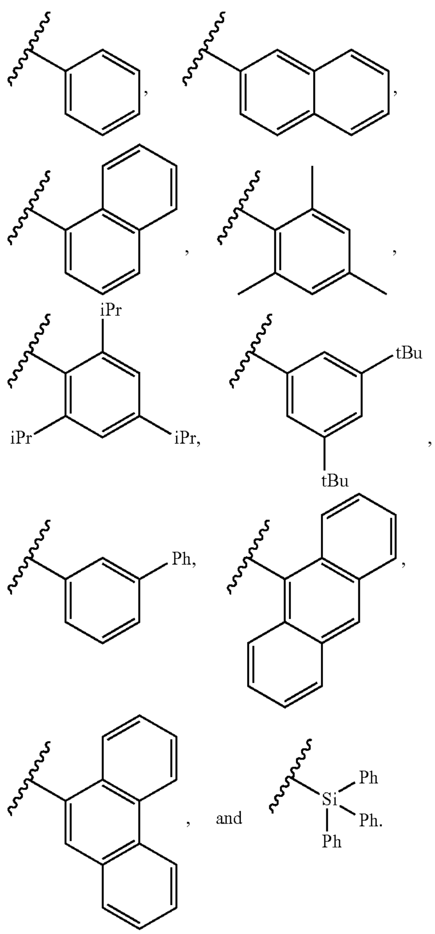

In a further aspect, each occurrence of $R^2$, $R^{2'}$, $R^3$, and $R^{3'}$ is simultaneously a structure selected from:

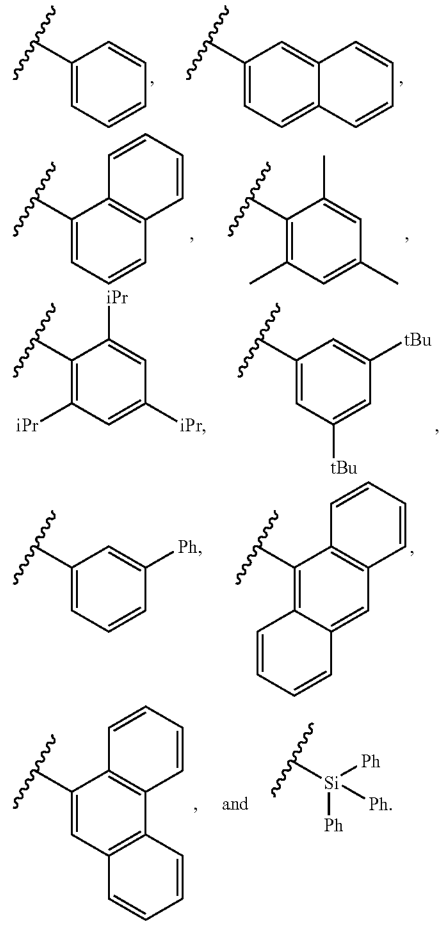

c. $R^4$ Groups

In one aspect, $R^4$, when present, is selected from —OH and —$NHR^{24}$. In a still further aspect, $R^4$, when present, is —OH. In yet a further aspect, $R^4$, when present, is —$NHR^{24}$. In an even further aspect, $R^4$, when present, is —NHTf.

d. $R^{20a}$, $R^{20b}$, and $R^{20c}$ Groups

In one aspect, each occurrence of $R^{20a}$, $R^{20b}$, and $R^{20c}$, when present, is independently selected from C1-C4 alkyl and phenyl.

In a further aspect, each occurrence of $R^{20a}$, $R^{20b}$, and $R^{20c}$, when present, is independently selected from methyl, ethyl, n-propyl, isopropyl, n-butyl, isobutyl, sec-butyl, t-butyl, and phenyl. In a still further aspect, each occurrence of $R^{20a}$, $R^{20b}$, and $R^{20c}$, when present, is independently selected from methyl, ethyl, n-propyl, isopropyl, and phenyl. In yet a further aspect, each occurrence of $R^{20a}$, $R^{20b}$, and $R^{20c}$, when present, is independently selected from methyl, ethyl, and phenyl. In an even further aspect, each occurrence of $R^{20a}$, $R^{20b}$, and $R^{20c}$, when present, is independently selected from ethyl and phenyl. In a still further aspect, each occurrence of $R^{20a}$, $R^{20b}$, and $R^{20c}$, when present, is independently selected from methyl and phenyl.

In a further aspect, each occurrence of $R^{20a}$, $R^{20b}$, and $R^{20c}$, when present, is independently selected from methyl, ethyl, n-propyl, isopropyl, n-butyl, isobutyl, sec-butyl, and t-butyl. In a still further aspect, each occurrence of $R^{20a}$, $R^{20b}$, and $R^{20c}$, when present, is independently selected from methyl, ethyl, n-propyl, and isopropyl. In yet a further aspect, each occurrence of $R^{20a}$, $R^{20b}$, and $R^{20c}$, when present, is independently selected from methyl and ethyl. In an even further aspect, each occurrence of $R^{20a}$, $R^{20b}$, and $R^{20c}$, when present, is ethyl. In a still further aspect, each occurrence of $R^{20a}$, $R^{20b}$, and $R^{20c}$, when present, is methyl.

In a further aspect, each occurrence of $R^{20a}$, $R^{20b}$, and $R^{20c}$, when present, is the same. In a still further aspect, each occurrence of $R^{20a}$, $R^{20b}$, and $R^{20}$, when present, is phenyl. In yet a further aspect, each occurrence of $R^{20a}$, $R^{20b}$, and $R^{20c}$, when present, is different.

e. $R^{21a}$ and $R^{21b}$ Groups

In one aspect, each occurrence of $R^{21a}$ and $R^{21b}$, when present, is independently selected from hydrogen and C1-C4 alkyl. In a further aspect, each occurrence of $R^{21a}$ and $R^{21b}$, when present, is hydrogen.

In a further aspect, each occurrence of $R^{21a}$ and $R^{21b}$, when present, is independently selected from hydrogen, methyl, ethyl, n-propyl, isopropyl, n-butyl, isobutyl, sec-butyl, and t-butyl. In a still further aspect, each occurrence of $R^{21a}$ and $R^{21b}$, when present, is independently selected from hydrogen, methyl, ethyl, n-propyl, and isopropyl. In yet a further aspect, each occurrence of $R^{21a}$ and $R^{21b}$, when present, is independently selected from hydrogen, methyl, and ethyl. In an even further aspect, each occurrence of $R^{21a}$ and $R^{21b}$, when present, is independently selected from hydrogen and ethyl. In a still further aspect, each occurrence of $R^{21a}$ and $R^{21b}$, when present, is independently selected from hydrogen and methyl.

In a further aspect, each occurrence of $R^{21a}$ and $R^{21b}$, when present, is independently selected from methyl, ethyl, n-propyl, isopropyl, n-butyl, isobutyl, sec-butyl, and t-butyl. In a still further aspect, each occurrence of $R^{21a}$ and $R^{21b}$, when present, is independently selected from methyl, ethyl, n-propyl, and isopropyl. In yet a further aspect, each occurrence of $R^{21a}$ and $R^{21b}$, when present, is independently selected from methyl, and ethyl. In an even further aspect, each occurrence of $R^{21a}$ and $R^{21b}$, when present, is ethyl. In a still further aspect, each occurrence of $R^{21a}$ and $R^{21b}$, when present, is methyl.

In a further aspect, each occurrence of $R^{2a}$, when present, is hydrogen and each occurrence of $R^{21b}$, when present, is independently C1-C4 alkyl. In a still further aspect, each occurrence of $R^{21a}$, when present, is hydrogen and each occurrence of $R^{21b}$, when present, is independently selected from methyl, ethyl, n-propyl, isopropyl, n-butyl, isobutyl, sec-butyl, and t-butyl. In yet a further aspect, each occurrence of $R^{21a}$, when present, is hydrogen and each occurrence of $R^{21b}$, when present, is independently selected from methyl, ethyl, n-propyl, and isopropyl. In an even further aspect, each occurrence of $R^{21a}$, when present, is hydrogen and each occurrence of $R^{21b}$, when present, is independently selected from methyl and ethyl. In a still further aspect, each occurrence of $R^{21a}$, when present, is hydrogen and each occurrence of $R^{21b}$, when present, is ethyl. In yet a further aspect, each occurrence of $R^{21a}$, when present, is hydrogen and each occurrence of $R^{21b}$, when present, is t-butyl. In an even further aspect, each occurrence of $R^{21a}$, when present, is hydrogen and each occurrence of $R^{21b}$, when present, is methyl.

In a further aspect, each occurrence of $R^{21a}$, when present, is the same. In a still further aspect, each occurrence of $R^{21a}$, when present, is different.

In a further aspect, each occurrence of $R^{21b}$, when present, is the same. In a still further aspect, each occurrence of $R^{21b}$, when present, is different.

f. $R^{22a}$ and $R^{22b}$ Groups

In one aspect, each occurrence of $R^{22a}$ and $R^{22b}$, when present, is independently selected from hydrogen and C1-C4 alkyl. In a further aspect, each occurrence of $R^{22a}$ and $R^{22b}$, when present, is hydrogen.

In a further aspect, each occurrence of $R^{22a}$ and $R^{22b}$, when present, is independently selected from hydrogen, methyl, ethyl, n-propyl, isopropyl, n-butyl, isobutyl, sec-butyl, and t-butyl. In a still further aspect, each occurrence of $R^{22a}$ and $R^{22b}$, when present, is independently selected from hydrogen, methyl, ethyl, n-propyl, and isopropyl. In yet a further aspect, each occurrence of $R^{22a}$ and $R^{22b}$, when present, is independently selected from hydrogen, methyl, and ethyl. In an even further aspect, each occurrence of $R^{22a}$ and $R^{22b}$, when present, is independently selected from hydrogen and ethyl. In a still further aspect, each occurrence of $R^{22a}$ and $R^{22b}$, when present, is independently selected from hydrogen and methyl.

In a further aspect, each occurrence of $R^{22a}$ and $R^{22b}$, when present, is independently selected from methyl, ethyl, n-propyl, isopropyl, n-butyl, isobutyl, sec-butyl, and t-butyl. In a still further aspect, each occurrence of $R^{22a}$ and $R^{22b}$, when present, is independently selected from methyl, ethyl, n-propyl, and isopropyl. In yet a further aspect, each occurrence of $R^{22a}$ and $R^{22b}$, when present, is independently selected from methyl, and ethyl. In an even further aspect, each occurrence of $R^{22a}$ and $R^{22b}$, when present, is ethyl. In a still further aspect, each occurrence of $R^{22a}$ and $R^{22b}$, when present, is methyl.

In a further aspect, each occurrence of $R^{22a}$, when present, is hydrogen and each occurrence of $R^{22b}$, when present, is independently C1-C4 alkyl. In a still further aspect, each occurrence of $R^{22a}$, when present, is hydrogen and each occurrence of $R^{22b}$, when present, is independently selected from methyl, ethyl, n-propyl, isopropyl, n-butyl, isobutyl, sec-butyl, and t-butyl. In yet a further aspect, each occurrence of $R^{22a}$, when present, is hydrogen and each occurrence of $R^{22b}$, when present, is independently selected from methyl, ethyl, n-propyl, and isopropyl. In an even further aspect, each occurrence of $R^{22b}$, when present, is hydrogen and each occurrence of $R^{22b}$, when present, is independently selected from methyl and ethyl. In a still further aspect, each occurrence of $R^{22a}$, when present, is hydrogen and each occurrence of $R^{22b}$, when present, is ethyl. In yet a further aspect, each occurrence of $R^{22a}$, when present, is hydrogen and each occurrence of $R^{22b}$, when present, is t-butyl. In an even further aspect, each occurrence of $R^{22a}$, when present, is hydrogen and each occurrence of $R^{22b}$, when present, is methyl.

In a further aspect, each occurrence of $R^{22a}$, when present, is the same. In a still further aspect, each occurrence of $R^{22a}$, when present, is different.

In a further aspect, each occurrence of $R^{22b}$, when present, is the same. In a still further aspect, each occurrence of $R^{22b}$, when present, is different.

g. $R^{23a}$ and $R^{23b}$ Groups

In one aspect, each occurrence of $R^{23a}$ and $R^{23b}$, when present, is independently selected from hydrogen and C1-C4 alkyl. In a further aspect, each occurrence of $R^{23a}$ and $R^{23b}$, when present, is hydrogen.

In a further aspect, each occurrence of $R^{23a}$ and $R^{23b}$, when present, is independently selected from hydrogen, methyl, ethyl, n-propyl, isopropyl, n-butyl, isobutyl, sec-butyl, and t-butyl. In a still further aspect, each occurrence of $R^{23a}$ and $R^{23b}$, when present, is independently selected from hydrogen, methyl, ethyl, n-propyl, and isopropyl. In yet a further aspect, each occurrence of $R^{23a}$ and $R^{23b}$, when present, is independently selected from hydrogen, methyl, and ethyl. In an even further aspect, each occurrence of $R^{23a}$ and $R^{23b}$, when present, is independently selected from hydrogen and ethyl. In a still further aspect, each occurrence of $R^{23a}$ and $R^{23b}$, when present, is independently selected from hydrogen and methyl.

In a further aspect, each occurrence of $R^{23a}$ and $R^{23b}$, when present, is independently selected from methyl, ethyl, n-propyl, isopropyl, n-butyl, isobutyl, sec-butyl, and t-butyl. In a still further aspect, each occurrence of $R^{23a}$ and $R^{23b}$, when present, is independently selected from methyl, ethyl, n-propyl, and isopropyl. In yet a further aspect, each occurrence of $R^{23a}$ and $R^{23b}$, when present, is independently selected from methyl, and ethyl. In an even further aspect, each occurrence of $R^{23a}$ and $R^{23b}$, when present, is ethyl. In a still further aspect, each occurrence of $R^{23a}$ and $R^{23b}$, when present, is methyl.

In a further aspect, each occurrence of $R^{23a}$, when present, is hydrogen and each occurrence of $R^{23b}$, when present, is independently C1-C4 alkyl. In a still further aspect, each occurrence of $R^{23a}$, when present, is hydrogen and each occurrence of $R^{23b}$, when present, is independently selected from methyl, ethyl, n-propyl, isopropyl, n-butyl, isobutyl, sec-butyl, and t-butyl. In yet a further aspect, each occurrence of $R^{23a}$, when present, is hydrogen and each occurrence of $R^{23b}$, when present, is independently selected from methyl, ethyl, n-propyl, and isopropyl. In an even further aspect, each occurrence of $R^{23a}$, when present, is hydrogen and each occurrence of $R^{23b}$, when present, is independently selected from methyl and ethyl. In a still further aspect, each occurrence of $R^{23a}$, when present, is hydrogen and each occurrence of $R^{23b}$, when present, is ethyl. In yet a further aspect, each occurrence of $R^{23a}$, when present, is hydrogen and each occurrence of $R^{23b}$, when present, is t-butyl. In an even further aspect, each occurrence of $R^{23a}$, when present, is hydrogen and each occurrence of $R^{23b}$, when present, is methyl.

In a further aspect, each occurrence of $R^{23a}$, when present, is the same. In a still further aspect, each occurrence of $R^{23a}$, when present, is different.

In a further aspect, each occurrence of $R^{23b}$, when present, is the same. In a still further aspect, each occurrence of $R^{23b}$, when present, is different.

h. $R^{24}$ Groups

In one aspect, $R^{24}$, when present, is an amine protecting group. Examples of amine protecting groups include, but are not limited to, carboxybenzyl (Cbz), t-butoxycarbonyl (Boc), 9-fluorenylmethyloxycarbonyl (Fmoc), acetyl, benzoyl (Bz), benzyl (Bn), para-methoxybenzyl (PMB), tosyl (Ts), and triflate (Tf). In a further aspect, $R^{24}$ is triflate.

i. $R^{31}$ and $R^{31'}$ Groups

In one aspect, $R^{31}$ is selected from C1-C4 alkyl, $Ar^3$, and —$C(R^{22a})(R^{22b})Ar^3$.

In one aspect, each of $R^{31}$ and $R^{31'}$, when present, is independently selected from C1-C4 alkyl, $Ar^3$, and —$C(R^{22a})(R^{22b})Ar^3$.

In a further aspect, $R^{31}$ is selected from methyl, ethyl, n-propyl, isopropyl, n-butyl, isobutyl, sec-butyl, t-butyl, $Ar^3$, and —$C(R^{22a})(R^{22b})Ar^3$. In a still further aspect, $R^{31}$ is selected from methyl, ethyl, n-propyl, isopropyl, $Ar^3$, and —$C(R^{22a})(R^{22b})Ar^3$. In yet a further aspect, $R^{31}$ is selected from methyl, ethyl, $Ar^3$, and —$C(R^{22a})(R^{22b})Ar^3$. In an even further aspect, $R^{31}$ is selected from methyl, $Ar^3$, and —$C(R^{22a})(R^{22b})Ar^3$.

In a further aspect, $R^{31}$ is selected from methyl, ethyl, n-propyl, isopropyl, n-butyl, isobutyl, sec-butyl, and t-butyl. In a still further aspect, $R^{31}$ is selected from methyl, ethyl, n-propyl, and isopropyl. In yet a further aspect, $R^{31}$ is selected from methyl and ethyl. In an even further aspect, $R^{31}$ is ethyl. In a still further aspect, $R^{31}$ is methyl.

In a further aspect, $R^{31}$ is selected from $Ar^3$ and —$C(R^{22a})(R^{22b})Ar^3$. In a still further aspect, $R^{31}$ is $Ar^3$. In yet a further aspect, $R^{31}$ is —$C(R^{22a})(R^{22b})Ar^3$.

In a further aspect, each of $R^{31}$ and $R^{31'}$, when present, is independently selected from methyl, ethyl, n-propyl, isopropyl, n-butyl, isobutyl, sec-butyl, t-butyl, $Ar^3$, and —$C(R^{22a})(R^{22b})Ar^3$. In a still further aspect, each of $R^{31}$ and $R^{31'}$, when present, is independently selected from methyl, ethyl, n-propyl, isopropyl, $Ar^3$, and —$C(R^{22a})(R^{22b})Ar^3$. In yet a further aspect, each of $R^{31}$ and $R^{31'}$, when present, is independently selected from methyl, ethyl, $Ar^3$, and —$C(R^{22a})(R^{22b})Ar^3$. In an even further aspect, each of $R^{31}$ and $R^{31'}$, when present, is independently selected from methyl, $Ar^3$, and —$C(R^{22a})(R^{22b})Ar^3$.

In a further aspect, each of $R^{31}$ and $R^{31'}$, when present, is independently selected from methyl, ethyl, n-propyl, isopropyl, n-butyl, isobutyl, sec-butyl, and t-butyl. In a still further aspect, each of $R^{31}$ and $R^{31'}$ when present, is independently selected from methyl, ethyl, n-propyl, and isopropyl. In yet a further aspect, each of $R^{31}$ and $R^{31'}$, when present, is independently selected from methyl and ethyl. In an even further aspect, each of $R^{31}$ and $R^{31'}$, when present, is ethyl. In a still further aspect, each of $R^{31}$ and $R^{31'}$, when present, is methyl.

In a further aspect, each of $R^{31}$ and $R^{31'}$, when present, is independently selected from $Ar^3$ and —$C(R^{22a})(R^{22b})Ar^3$. In a still further aspect, each of $R^{31}$ and $R^{31'}$, when present, is $Ar^3$. In yet a further aspect, each of $R^{31}$ and $R^{31'}$, when present, is —$C(R^{22a})(R^{22b})Ar^3$.

In a further aspect, each of $R^{31}$ and $R^{31'}$, when present, is the same. In a still further aspect, each of $R^{31}$ and $R^{31'}$, when present, is different.

In a further aspect, each occurrence of $R^{31}$, $R^{31'}$, $R^{32}$, and $R^{32'}$ is simultaneously selected from methyl, isopropyl, t-butyl, phenyl, and benzyl. In a still further aspect, each occurrence of $R^{31}$, $R^{31'}$, $R^{32}$, and $R^{32'}$ is independently selected from methyl, isopropyl, t-butyl, phenyl, and benzyl.

In a further aspect, each of $R^{31}$ and $R^{31'}$, when present, are the same and each of $R^{32}$ and $R^{32'}$, when present, are the same. In a still further aspect, each of $R^{31}$, $R^{31'}$, $R^{32}$, and $R^{32'}$ are the same. In yet a further aspect, each of $R^{31}$, $R^{31'}$, $R^{32}$, and $R^{32'}$ are different.

j. $R^{32}$ and $R^{32'}$ Groups

In one aspect, $R^{32}$ is selected from C1-C4 alkyl, $Ar^4$, and —$C(R^{23a})(R^{23b})Ar^4$.

In one aspect, each of $R^{32}$ and $R^{32'}$, when present, is independently selected from C1-C4 alkyl, $Ar^4$, and —$C(R^{23a})(R^{23b})Ar^4$.

In a further aspect, $R^{32}$ is selected from methyl, ethyl, n-propyl, isopropyl, n-butyl, isobutyl, sec-butyl, t-butyl, $Ar^4$, and —$C(R^{23a})(R^{23b})Ar^4$. In a still further aspect, $R^{32}$ is selected from methyl, ethyl, n-propyl, isopropyl, $Ar^4$, and —$C(R^{23a})(R^{23b})Ar^4$. In yet a further aspect, $R^{32}$ is selected from methyl, ethyl, $Ar^4$, and —$C(R^{23a})(R^{23b})Ar^4$. In an even further aspect, $R^{32}$ is selected from methyl, $Ar^4$, and —$C(R^{23a})(R^{23b})Ar^4$.

In a further aspect, $R^{32}$ is selected from methyl, ethyl, n-propyl, isopropyl, n-butyl, isobutyl, sec-butyl, and t-butyl. In a still further aspect, $R^{32}$ is selected from methyl, ethyl, n-propyl, and isopropyl. In yet a further aspect, $R^{32}$ is selected from methyl and ethyl. In an even further aspect, $R^{32}$ is ethyl. In a still further aspect, $R^{32}$ is ethyl.

In a further aspect, $R^{32}$ is selected from $Ar^4$ and —$C(R^{23a})(R^{23b})Ar^4$. In a still further aspect, $R^{32}$ is $Ar^4$. In yet a further aspect, $R^{32}$ is —$C(R^{23a})(R^{23b})Ar^4$.

In a further aspect, each of $R^{32}$ and $R^{32'}$, when present, is independently selected from methyl, ethyl, n-propyl, isopropyl, n-butyl, isobutyl, sec-butyl, t-butyl, $Ar^4$, and —$C(R^{23a})(R^{23b})Ar^4$. In a still further aspect, each of $R^{32}$ and $R^{32'}$, when present, is independently selected from methyl, ethyl, n-propyl, isopropyl, $Ar^4$, and —$C(R^{23a})(R^{23b})Ar^4$. In yet a further aspect, each of $R^{32}$ and $R^{32'}$, when present, is independently selected from methyl, ethyl, $Ar^4$, and —$C(R^{23a})(R^{23b})Ar^4$. In an even further aspect, each of $R^{32}$ and $R^{32'}$, when present, is independently selected from methyl, $Ar^4$, and —$C(R^{23a})(R^{23b})Ar^4$.

In a further aspect, each of $R^{32}$ and $R^{32'}$, when present, is independently selected from methyl, ethyl, n-propyl, isopropyl, n-butyl, isobutyl, sec-butyl, and t-butyl. In a still further aspect, each of $R^{32}$ and $R^{32'}$, when present, is independently selected from methyl, ethyl, n-propyl, and isopropyl. In yet a further aspect, each of $R^{32}$ and $R^{32'}$, when present, is independently selected from methyl and ethyl. In an even further aspect, each of $R^{32}$ and $R^{32'}$, when present, is ethyl. In a still further aspect, each of $R^{32}$ and $R^{32'}$, when present, is ethyl.

In a further aspect, each of $R^{32}$ and $R^{32'}$, when present, is independently selected from $Ar^4$ and —$C(R^{23a})(R^{23b})Ar^4$. In a still further aspect, each of $R^{32}$ and $R^{32'}$, when present, is $Ar^4$. In yet a further aspect, each of $R^{32}$ and $R^{32'}$, when present, is —$C(R^{23a})(R^{23b})Ar^4$.

In a further aspect, each of $R^{32}$ and $R^{32'}$, when present, is the same. In a still further aspect, each of $R^{32}$ and $R^{32'}$, when present, is different.

k. $R^{33}$, $R^{33'}$, $R^{34}$, and $R^{34'}$ Groups

In one aspect, each occurrence of $R^{33}$, $R^{33'}$, $R^{34}$, and $R^{3'}$ is simultaneously a structure selected from:

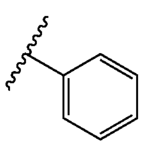,
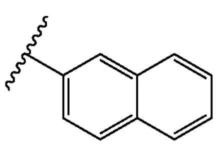,
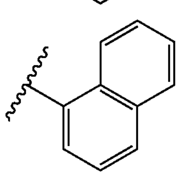 and 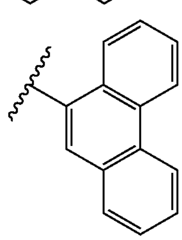.

In a further aspect, each occurrence of $R^{33}$, $R^{33'}$, $R^{34}$, and $R^{34'}$ is independently a structure selected from:

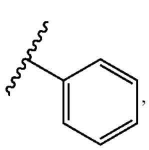,
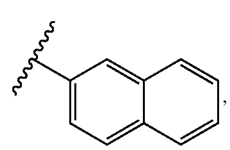,

-continued

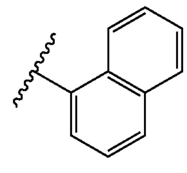, and 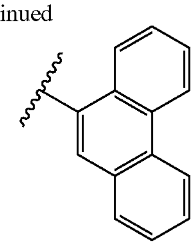.

1. $Ar^1$ Groups

In one aspect, each occurrence of $Ar^1$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each occurrence of $Ar^1$, when present, is independently selected from C6-C14 aryl and 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently selected from C6-C14 aryl and 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^1$, when present, is independently selected from C6-C14 aryl and 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^1$, when present, is independently selected from C6-C14 aryl and 4-10 membered heteroaryl, and is unsubstituted.

In a further aspect, each occurrence of $Ar^1$, when present, is independently 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^1$, when present, is independently 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^1$, when present, is independently 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently 4-10 membered heteroaryl, and is unsubstituted.

In a further aspect, each occurrence of $Ar^1$, when present, is independently 6-membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently 6-membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^1$, when present, is independently 6-membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^1$, when present, is independently 6-membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently 6-membered heteroaryl, and is unsubstituted.

In a further aspect, each occurrence of $Ar^1$, when present, is independently pyridinyl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently pyridinyl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^1$, when present, is independently pyridinyl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^1$, when present, is independently pyridinyl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently pyridinyl, and is unsubstituted.

In a further aspect, each occurrence of $Ar^1$, when present, is independently C6-C14 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently C6-C14 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^1$, when present, is independently C6-C14 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^1$, when present, is independently C6-C14 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently C6-C14 aryl, and is unsubstituted.

In a further aspect, each occurrence of $Ar^1$, when present, is independently C6 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently C6 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^1$, when present, is independently C6 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^1$, when present, is independently C6 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^1$, when present, is independently C6 aryl, and is unsubstituted.

In a further aspect, each occurrence of $Ar^1$, when present, is the same. In a still further aspect, each occurrence of $Ar^1$, when present, is unsubstituted C6 aryl. In yet a further aspect, each occurrence of $Ar^1$, when present, is different.

m. $Ar^2$ Groups

In one aspect, each occurrence of $Ar^2$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a further aspect, each occurrence of $Ar^2$, when present, is independently selected from C6-C14 aryl and 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently selected from C6-C14 aryl and 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently selected from C6-C14 aryl and 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently selected from C6-C14 aryl and 4-10 membered heteroaryl, and is unsubstituted.

In a further aspect, each occurrence of $Ar^2$, when present, is independently 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently 4-10 membered heteroaryl, and is unsubstituted.

In a further aspect, each occurrence of $Ar^2$, when present, is independently 6-membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently 6-membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently 6-membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently 6-membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently 6-membered heteroaryl, and is unsubstituted.

In a further aspect, each occurrence of $Ar^2$, when present, is independently pyridinyl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently pyridinyl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently pyridinyl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently pyridinyl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently pyridinyl, and is unsubstituted.

In a further aspect, each occurrence of $Ar^2$, when present, is independently C6-C14 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C6-C14 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently C6-C14 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently C6-C14 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C6-C14 aryl, and is unsubstituted.

In a further aspect, each occurrence of $Ar^2$, when present, is independently C6 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C6 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently C6 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently C6 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C6 aryl, and is unsubstituted.

In a further aspect, each occurrence of $Ar^2$, when present, is independently C10 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C10 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently C10 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently C10 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C10 aryl, and is unsubstituted.

In a further aspect, each occurrence of $Ar^2$, when present, is independently C14 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C14 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, each occurrence of $Ar^2$, when present, is independently C14 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, each occurrence of $Ar^2$, when present, is independently C14 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, each occurrence of $Ar^2$, when present, is independently C14 aryl, and is unsubstituted.

In a further aspect, each occurrence of $Ar^2$, when present, is independently C6 aryl substituted with 0, 1, 2, or 3 groups independently selected from halogen, —$NO_2$, C1-C4 alkyl, and phenyl. In a still further aspect, each occurrence of $Ar^2$, when present, is independently C6 aryl substituted with 0, 1, or 2 groups independently selected from halogen, —$NO_2$, C1-C4 alkyl, and phenyl. In yet a further aspect, each occurrence of $Ar^2$, when present, is independently C6 aryl substituted with 0 or 1 group selected from halogen, —$NO_2$, C1-C4 alkyl, and phenyl. In an even further aspect, each occurrence of $Ar^2$, when present, is independently C6 aryl monosubstituted with a group selected from halogen, —$NO_2$, C1-C4 alkyl, and phenyl.

In a further aspect, each occurrence of $Ar^2$, when present, is the same. In a still further aspect, each occurrence of $Ar^2$, when present, is different.

n. $Ar^3$ Groups

In one aspect, each occurrence of $Ar^3$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each occurrence of $Ar^3$, when present, is independently selected from C6-C14 aryl and 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently selected from C6-C14 aryl and 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^3$, when present, is independently selected from C6-C14 aryl and 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^3$, when present, is independently selected from C6-C14 aryl and 4-10 membered heteroaryl, and is unsubstituted.

In a further aspect, each occurrence of $Ar^3$, when present, is independently 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^3$, when present, is independently 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^3$, when present, is independently 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently 4-10 membered heteroaryl, and is unsubstituted.

In a further aspect, each occurrence of $Ar^3$, when present, is independently 6-membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently 6-membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^3$, when present, is independently 6-membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^3$, when present, is independently 6-membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently 6-membered heteroaryl, and is unsubstituted.

In a further aspect, each occurrence of $Ar^3$, when present, is independently pyridinyl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently pyridinyl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^3$, when present, is independently pyridinyl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^3$, when present, is independently pyridinyl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently pyridinyl, and is unsubstituted.

In a further aspect, each occurrence of $Ar^3$, when present, is independently C6-C14 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently C6-C14 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^3$, when present, is independently C6-C14 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^3$, when present, is independently C6-C14 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently C6-C14 aryl, and is unsubstituted.

In a further aspect, each occurrence of $Ar^3$, when present, is independently C6 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently C6 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^3$, when present, is independently C6 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^3$, when present, is independently C6 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^3$, when present, is independently C6 aryl, and is unsubstituted.

In a further aspect, each occurrence of $Ar^3$, when present, is the same. In a still further aspect, each occurrence of $Ar^3$, when present, is unsubstituted C6 aryl. In yet a further aspect, each occurrence of $Ar^3$, when present, is different.

o. $Ar^4$ Groups

In one aspect, each occurrence of $Ar^4$, when present, is independently selected from C6-C14 aryl and 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each occurrence of $Ar^4$, when present, is independently selected from C6-C14 aryl and 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently selected from C6-C14 aryl and 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^4$, when present, is independently selected from C6-C14 aryl and 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^4$, when present, is independently selected from C6-C14 aryl and 4-10 membered heteroaryl, and is unsubstituted.

In a further aspect, each occurrence of $Ar^4$, when present, is independently 4-10 membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently 4-10 membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^4$, when present, is independently 4-10 membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^4$, when present, is independently 4-10 membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently 4-10 membered heteroaryl, and is unsubstituted.

In a further aspect, each occurrence of $Ar^4$, when present, is independently 6-membered heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently 6-membered heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^4$, when present, is independently 6-membered heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^4$, when present, is independently 6-membered heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently 6-membered heteroaryl, and is unsubstituted.

In a further aspect, each occurrence of $Ar^4$, when present, is independently pyridinyl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently pyridinyl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^4$, when present, is independently pyridinyl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^4$, when present, is independently pyridinyl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently pyridinyl, and is unsubstituted.

In a further aspect, each occurrence of $Ar^4$, when present, is independently C6-C14 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently C6-C14 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^4$, when present, is independently C6-C14 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^4$, when present, is independently C6-C14 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently C6-C14 aryl, and is unsubstituted.

In a further aspect, each occurrence of $Ar^4$, when present, is independently C6 aryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently C6 aryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, each occurrence of $Ar^4$, when present, is independently C6 aryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, each occurrence of $Ar^4$, when present, is independently C6 aryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, each occurrence of $Ar^4$, when present, is independently C6 aryl, and is unsubstituted.

In a further aspect, each occurrence of $Ar^4$, when present, is the same. In a still further aspect, each occurrence of $Ar^4$, when present, is unsubstituted C6 aryl. In yet a further aspect, each occurrence of $Ar^4$, when present, is different.

2. N-Heterocyclic Phosphorodiamidic Acid Examples

In one aspect, a compound is selected from:

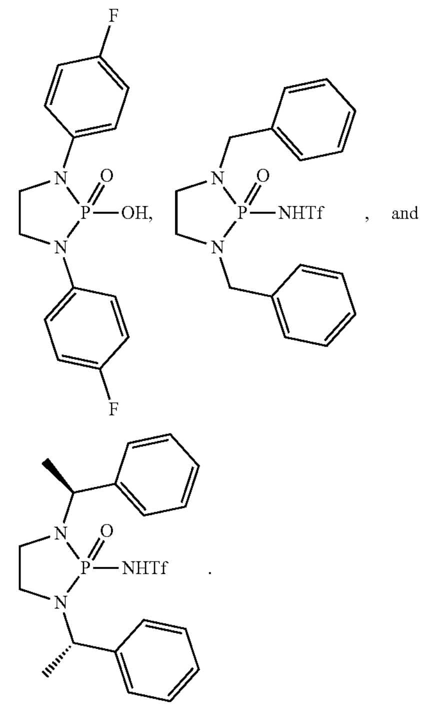

or a salt thereof.

In one aspect, a compound is selected from:

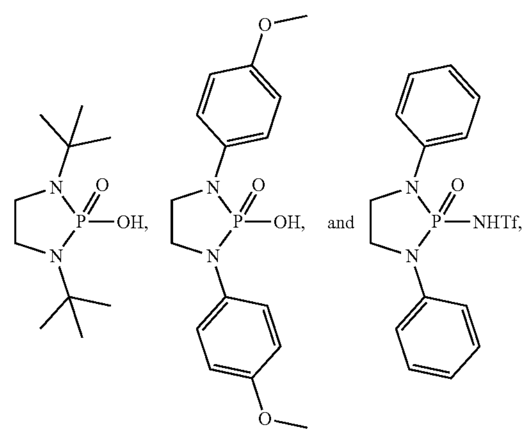

or a salt thereof.

3. Prophetic Compound Examples

The following compound examples are prophetic, and can be prepared using the synthesis methods described herein above and other general methods as needed as would be known to one skilled in the art. It is anticipated that the prophetic compounds would be useful in the generation of ortho-quinone methides leading to the preparation of diaryl and arylalkyl phosphonates, and such utility can be determined using the synthetic methods described herein below.

In one aspect, a compound can be selected from:
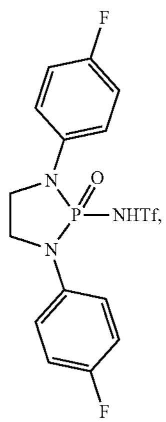
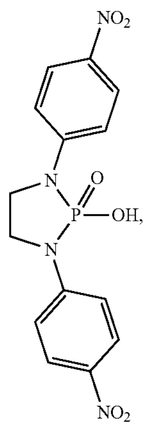
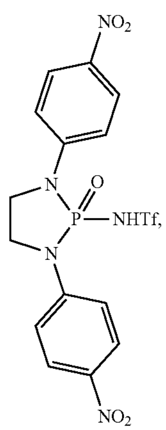
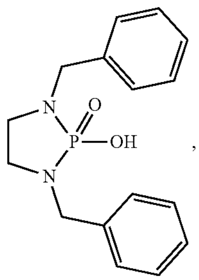
,
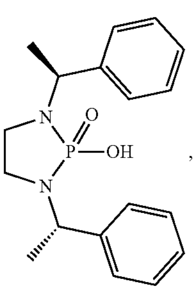
,
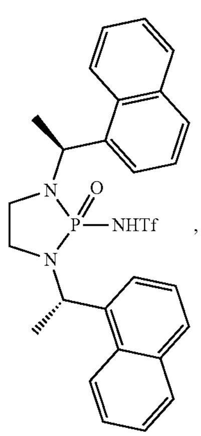
,
-continued
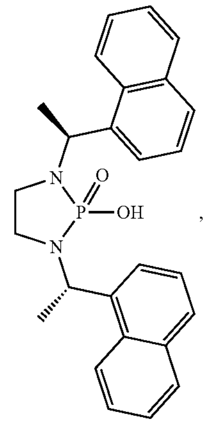
,
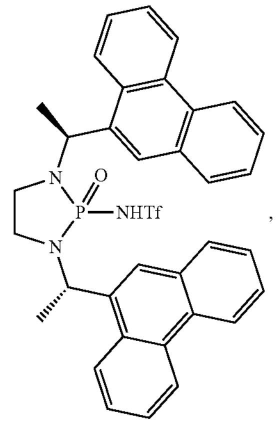
,
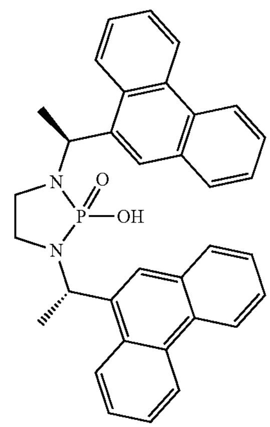
,
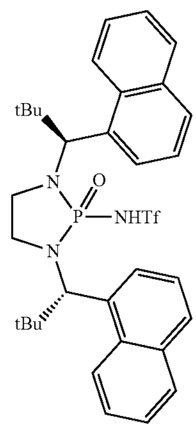
,
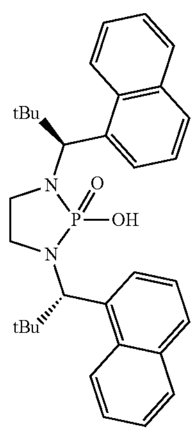
,
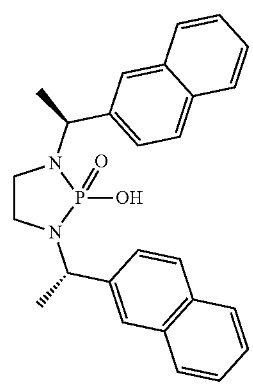
, and
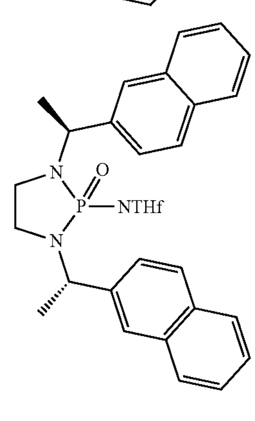
.
or a salt thereof.

In one aspect, a compound can be selected from:
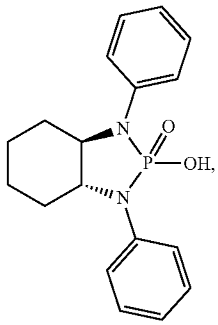
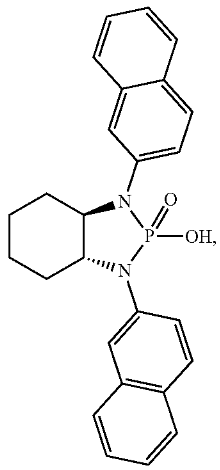
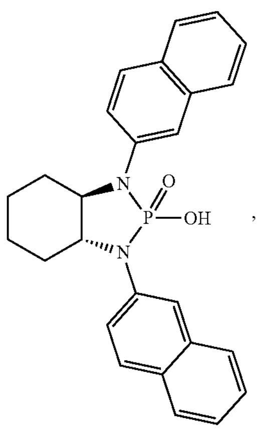
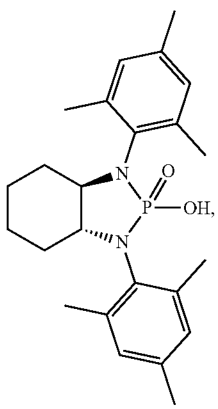
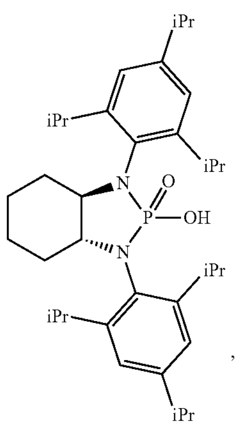
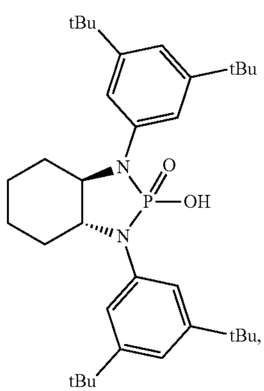
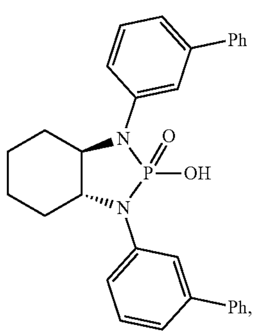
-continued
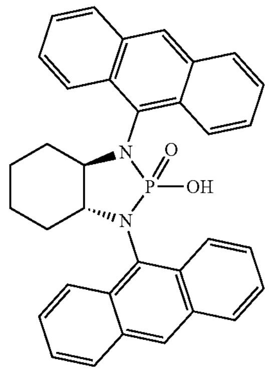
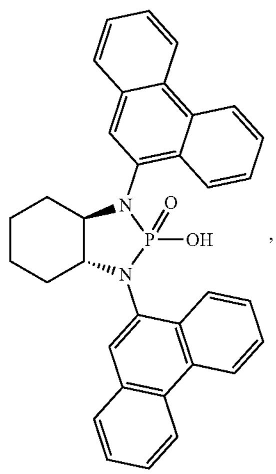
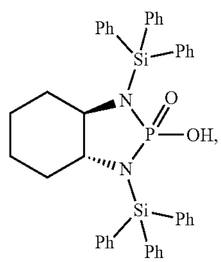
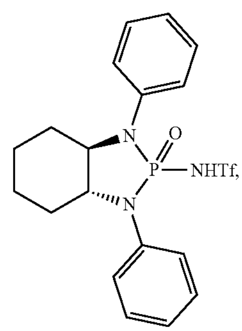
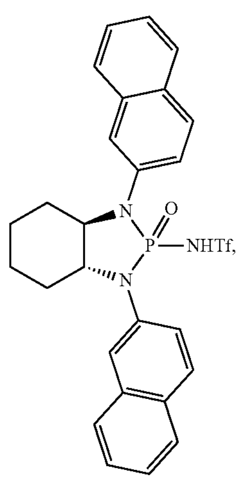
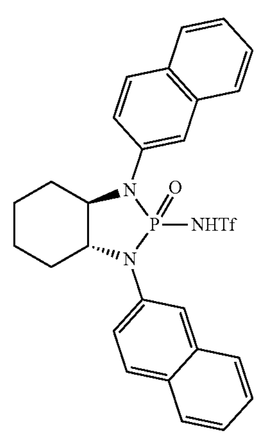

-continued
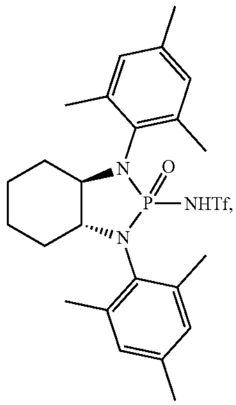
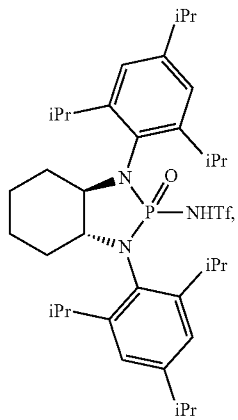
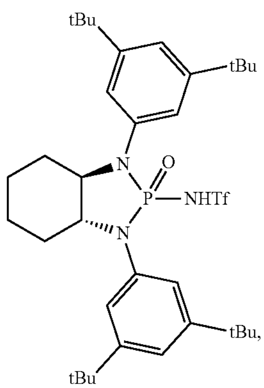
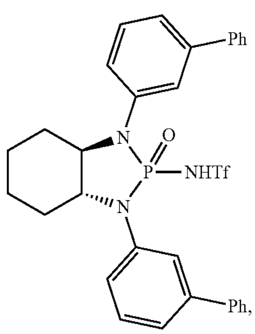
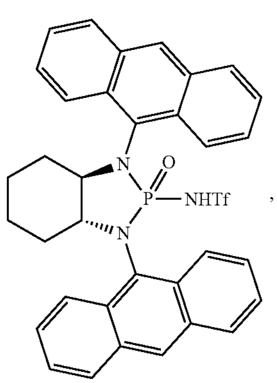
-continued
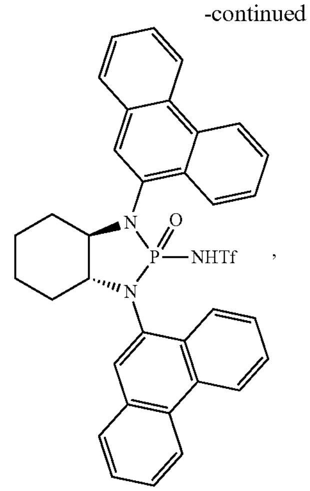
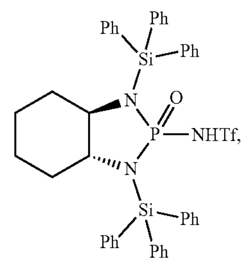
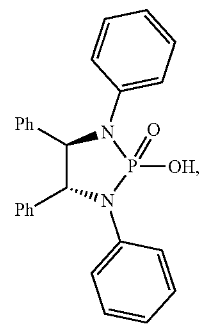
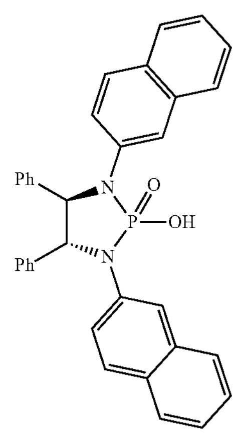
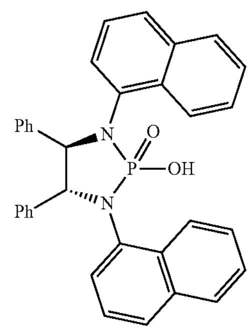
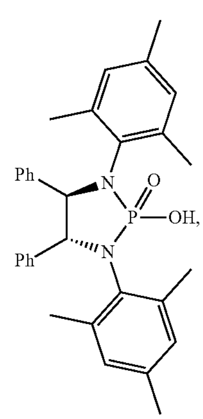
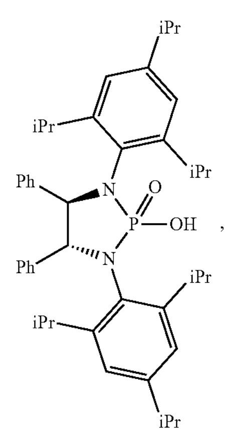

-continued
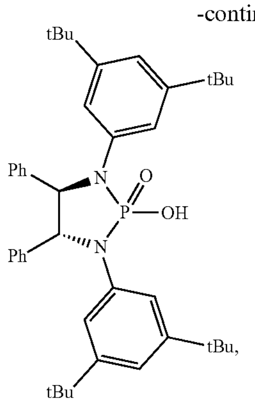
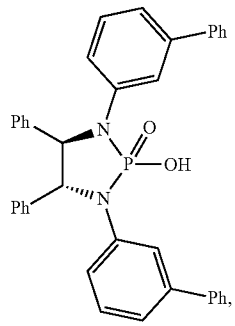
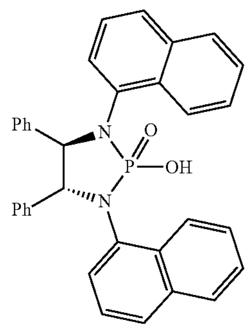
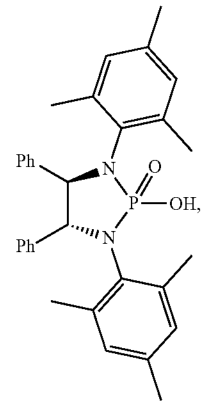
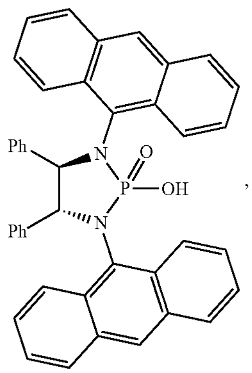
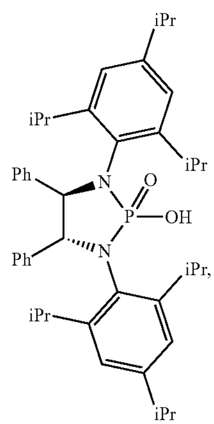
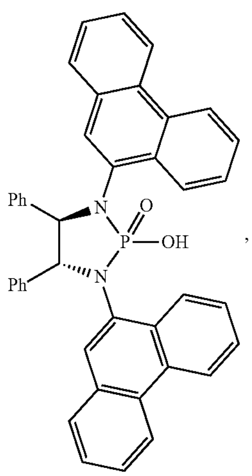
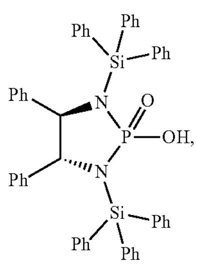
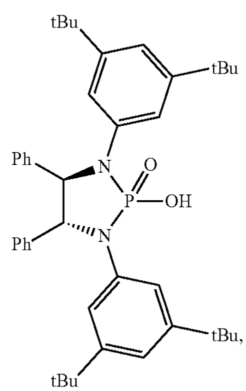
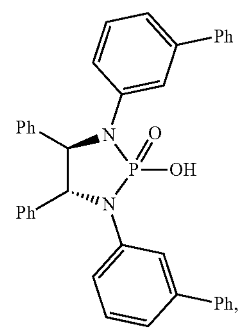
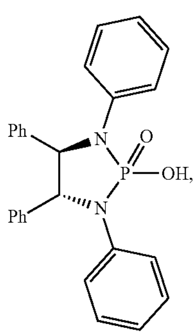
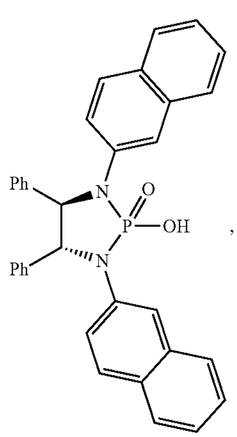
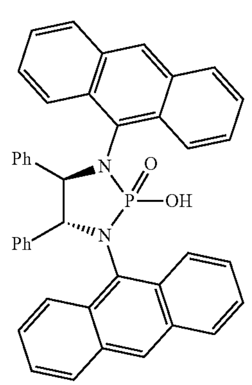

-continued
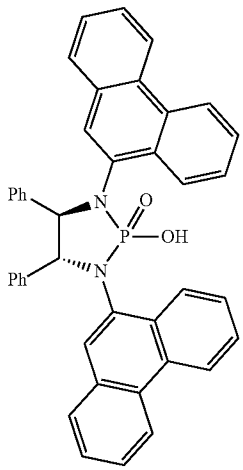
, and
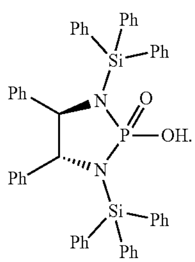
or a salt thereof.
In one aspect, a compound can be selected from:
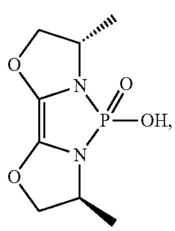
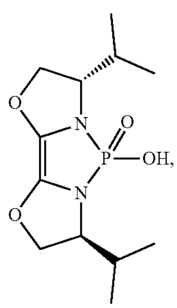
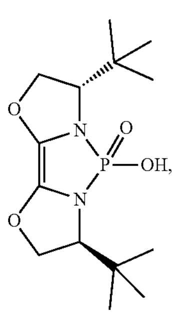
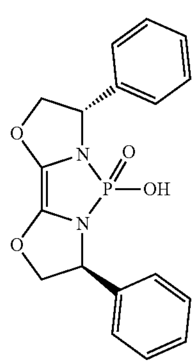
-continued
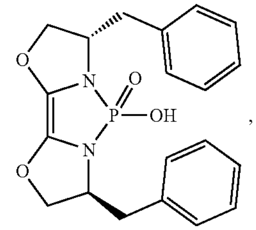
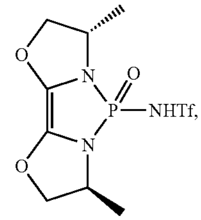
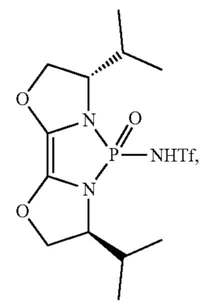
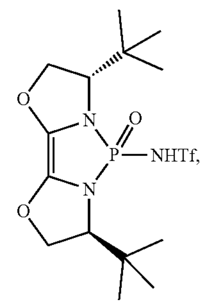
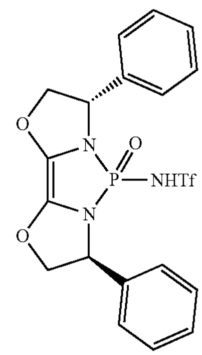
and
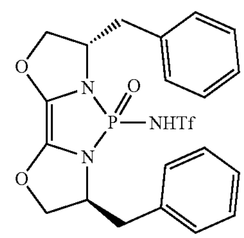
or a salt thereof.
In one aspect, a compound can be selected from:
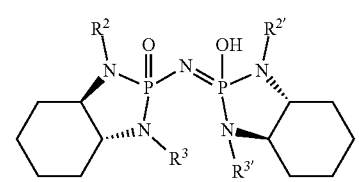
and
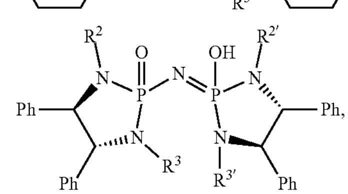
wherein each occurrence of $R^2$, $R^{2'}$, $R^3$, and $R^{3'}$ is simultaneously a structure selected from:
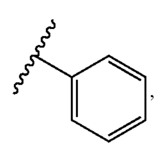
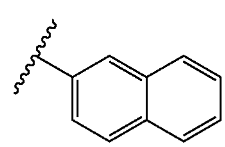

-continued

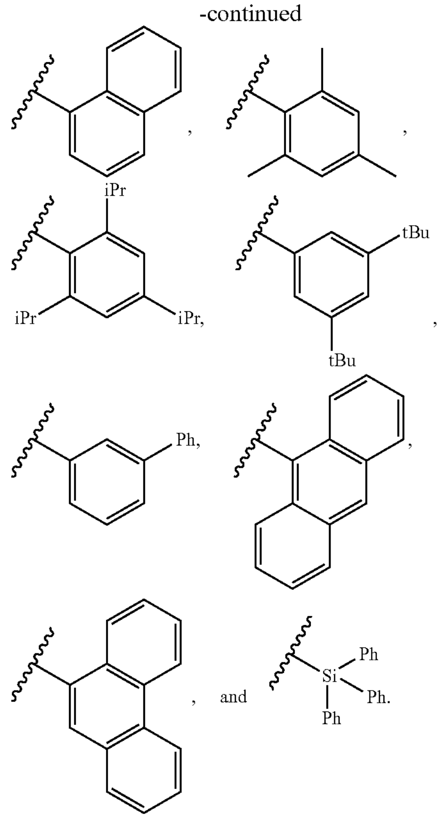

or a salt thereof.

In one aspect, a compound can be selected from:

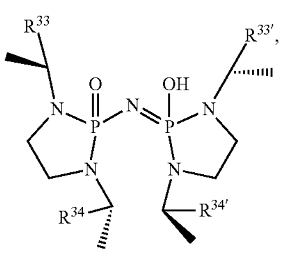

wherein each occurrence of $R^{33}$, $R^{33'}$, $R^{34}$, and $R^{34'}$ is simultaneously a structure selected from:

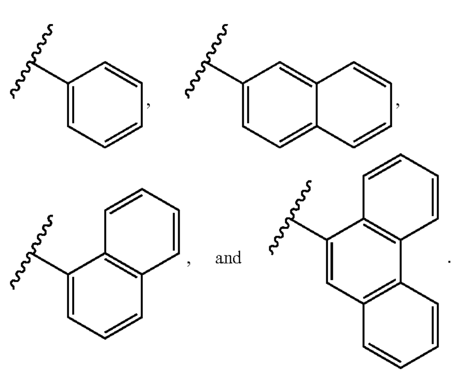

or a salt thereof.

In one aspect, a compound can be selected from:

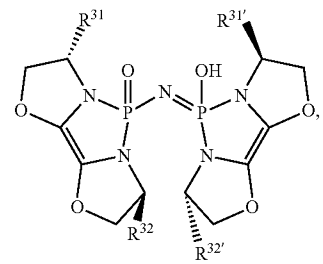

wherein each occurrence of $R^{31}$, $R^{31'}$, $R^{32}$, and $R^{32'}$ is simultaneously selected from methyl, isopropyl, t-butyl, phenyl, and benzyl, or a salt thereof.

In one aspect, a compound can be selected from:

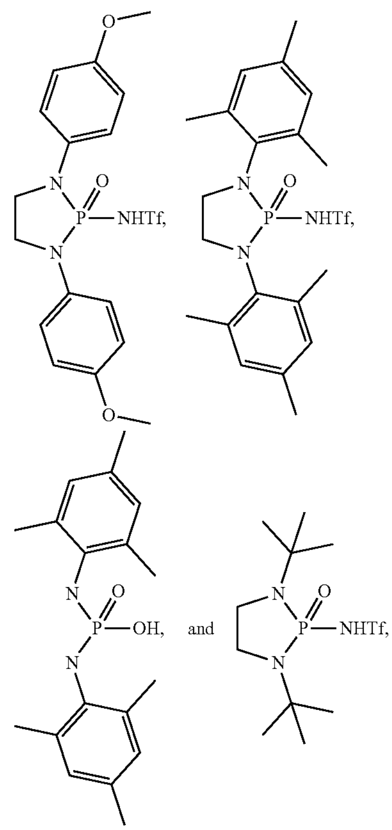

or a salt thereof.

C. Diaryl and Arylalkyl Phosphonates

In one aspect, the invention relates to diaryl and arylalkyl phosphonates useful in, for example, the synthesis of leukocyte elastase inhibitors, potassium channel modulators, chemiluminescence materials, and flame retardants. The use of the disclosed diaryl and arylalkyl phosphonates in the synthesis of other pharmaceutically active compounds is also envisioned.

It is contemplated that each disclosed derivative can be optionally further substituted. It is also contemplated that any one or more derivative can be optionally omitted from the invention. It is understood that a disclosed compound can be provided by the disclosed methods. It is also understood that the disclosed compounds can be employed in the disclosed methods of using.

1. Structure

In one aspect, disclosed are compounds having a structure represented by a formula:

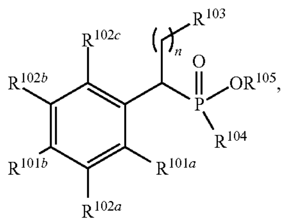

wherein n is selected from 0 and 1; wherein each of $R^{101a}$ and $R^{101b}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino, provided that at least one of $R^{101a}$ and $R^{101b}$ is —OH, —SH, or C1-C4 alkylamino; wherein each of $R^{102a}$, $R^{102b}$, and $R^{102c}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; wherein $R^{103}$ is selected from C4-C8 alkyl and $Ar^{101}$, provided that when $R^{103}$ is C4-C8 alkyl, then either: (a) at least one of $R^{101a}$ and $R^{101b}$ is —SH or C1-C4 alkylamino, or (b) then $R^{101b}$ is —OH; wherein $Ar^{101}$, when present, is selected from C6-C10 aryl and C5-C6 heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl; wherein $R^{104}$ is selected from C1-C4 alkoxy and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; and wherein $R^{105}$ is C1-C4 alkyl, provided that when n is 0, $R^{101a}$ is —OH, $R^{103}$ is C6 aryl, $R^{104}$ is ethoxy, and $R^{105}$ is ethyl, then either: (c) at least two of $R^{101b}$, $R^{102a}$, $R^{102b}$, and $R^{102c}$ are not hydrogen, (d) $R^{103}$ is substituted with 2 or 3 groups, or (e) at least one of $R^{101b}$, $R^{201a}$, $R^{102b}$, and $R^{102c}$ is not hydrogen and $R^{103}$ is substituted with 1, 2, or 3 groups; and provided that when n is 0, $R^{101b}$ is —OH, and $R^{103}$ is C6 aryl or C6 heteroaryl, then either: (f) each of $R^{102a}$ and $R^{102b}$ is hydrogen; or (g) one of $R^{102a}$ and $R^{102b}$ is hydrogen and $R^{104}$ is not the same as —$OR^5$, or a pharmaceutically acceptable salt thereof.

Also disclosed are compounds selected from:

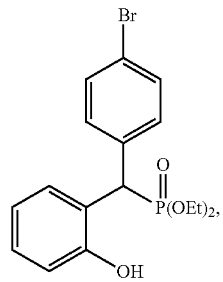
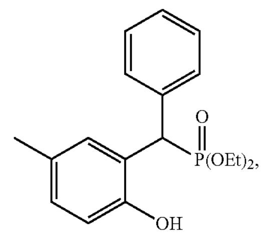
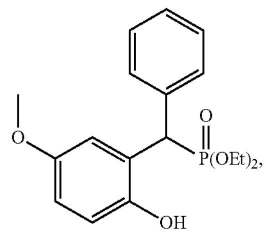
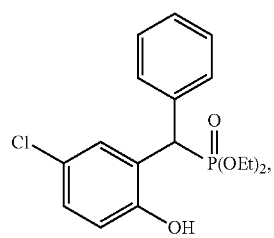
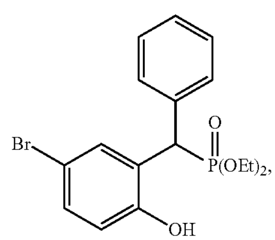
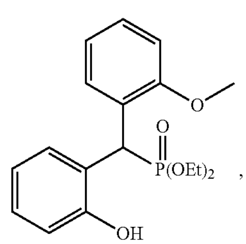
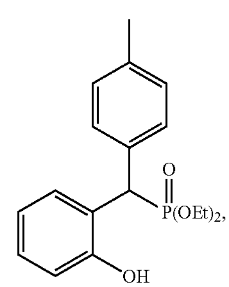
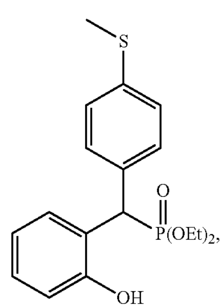
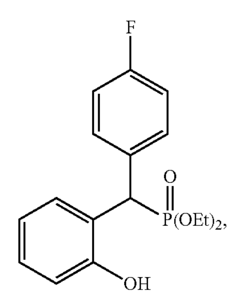

-continued

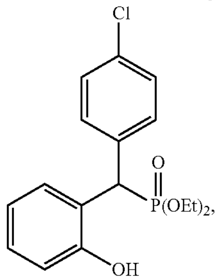

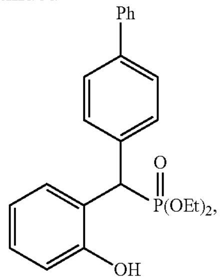

and

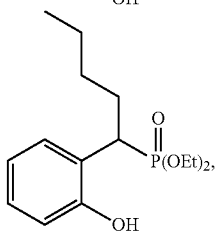

or a pharmaceutically acceptable salt thereof.

In a further aspect, the compound has a structure represented by a formula:

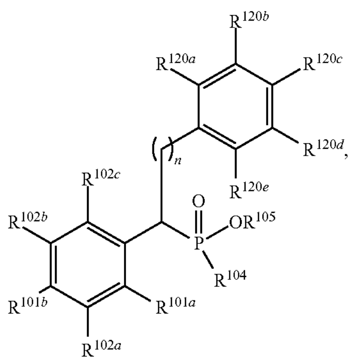

wherein each of $R^{120a}$, $R^{120b}$, $R^{120c}$, $R^{120d}$, and $R^{120e}$ are independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl.

In a further aspect, the compound has a structure represented by a formula:

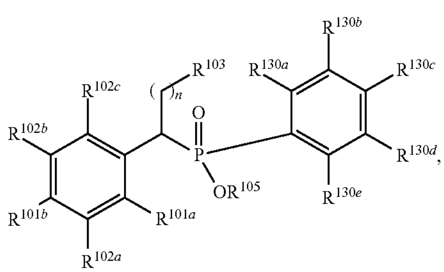

wherein each of $R^{130a}$, $R^{130b}$, $R^{130c}$, $R^{130d}$, and $R^{130e}$ are independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino.

In a further aspect, the compound has a structure represented by a formula selected from:

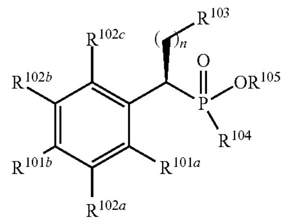

and

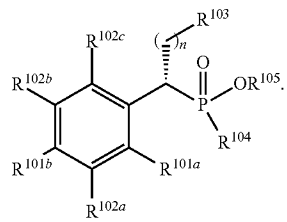

In a further aspect, the compound has a structure represented by a formula selected from:

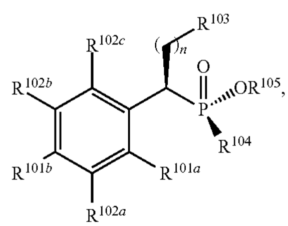

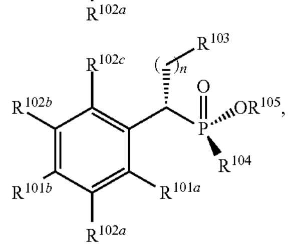

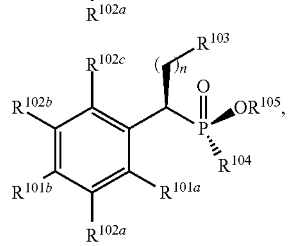

and

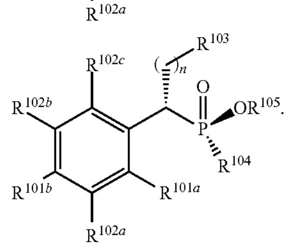

In a further aspect, the compound is selected from:
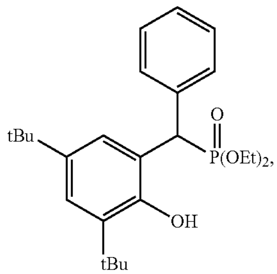
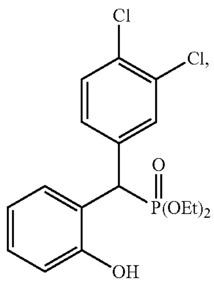
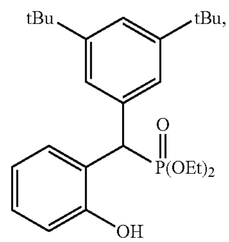
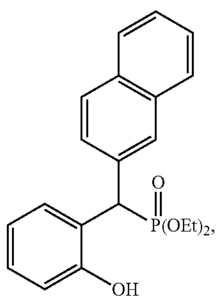
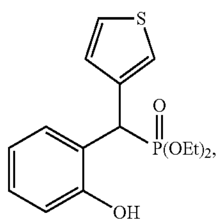
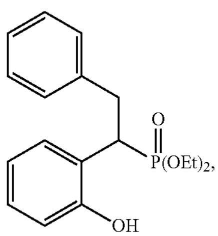
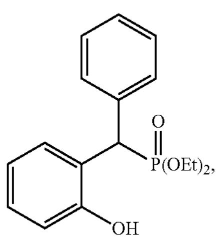
and
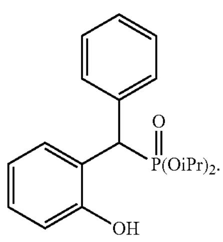
In a further aspect, the compound is selected from:
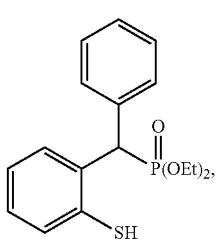
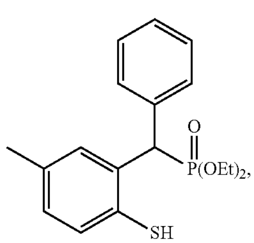
-continued
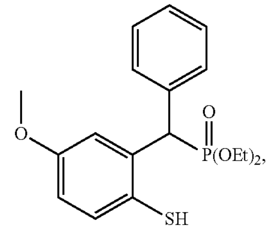
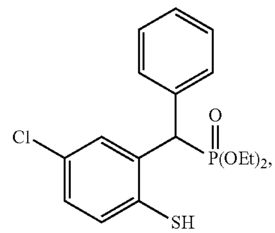
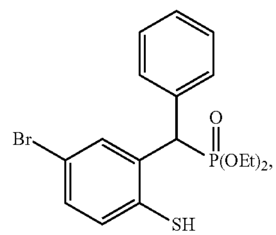
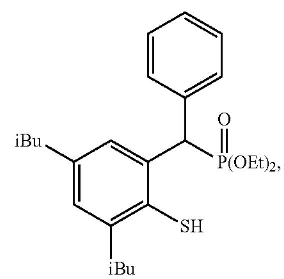
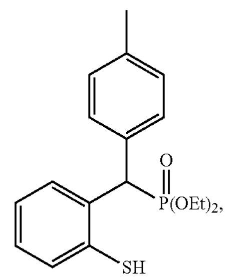
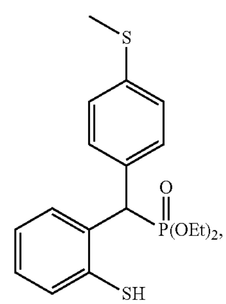
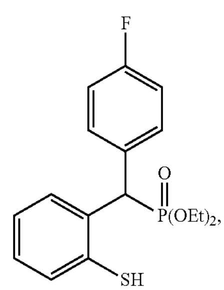
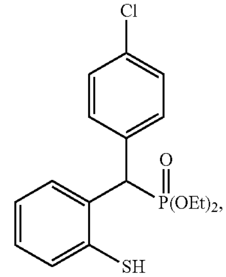
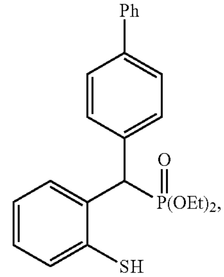

-continued
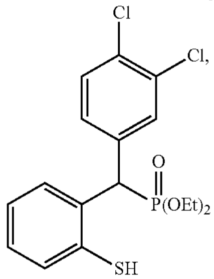
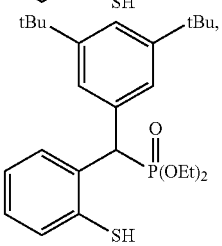
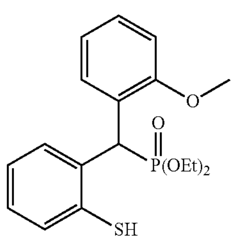
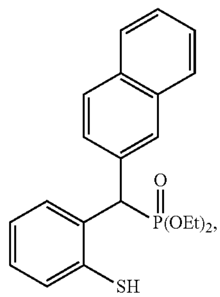
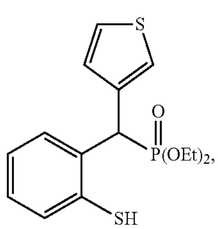
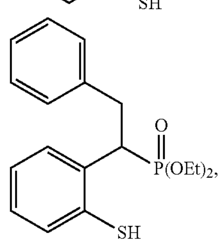
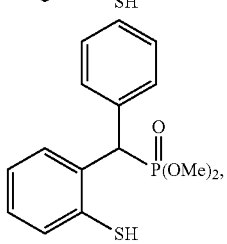
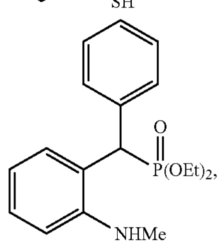
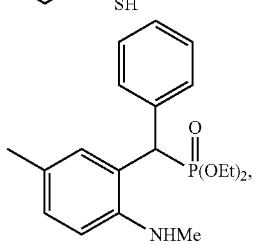
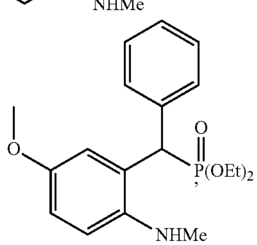
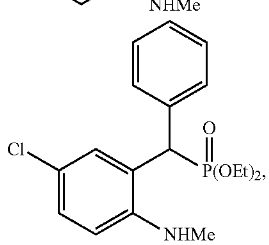
-continued
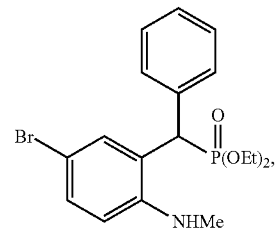
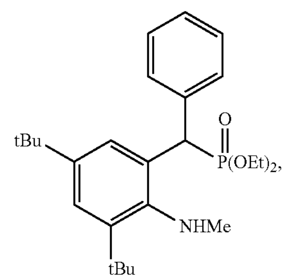
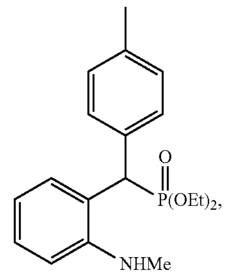
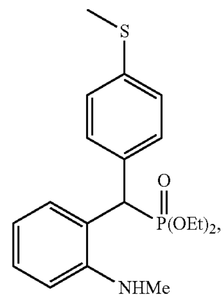
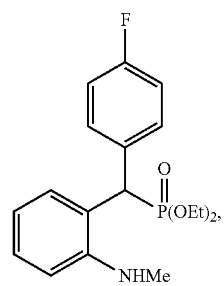
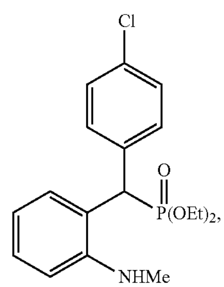
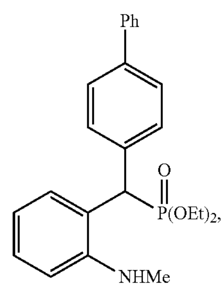
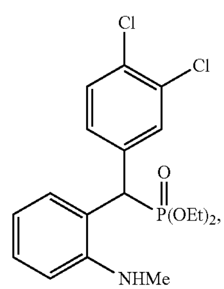
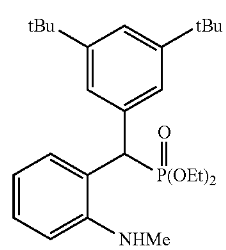
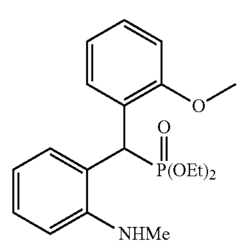
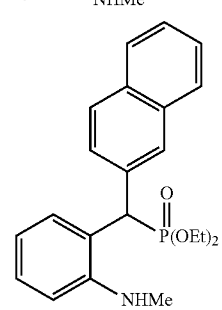

-continued
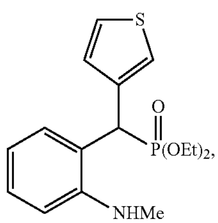
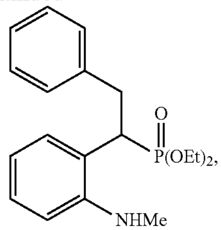
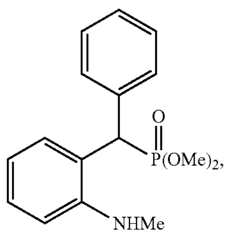
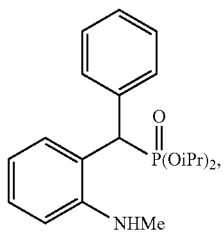
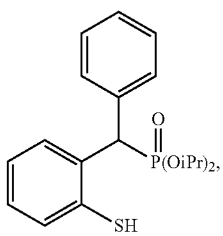
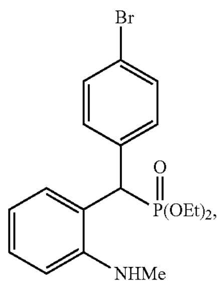
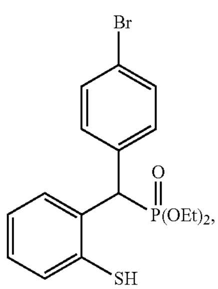
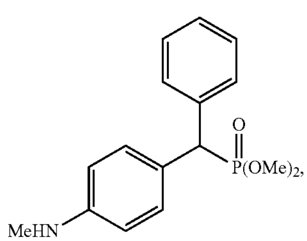
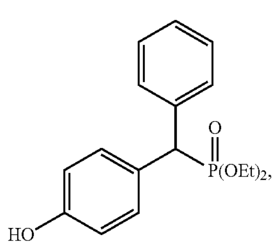
-continued
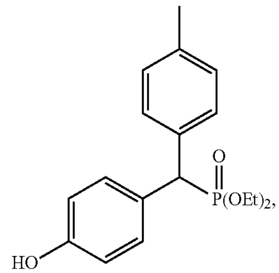
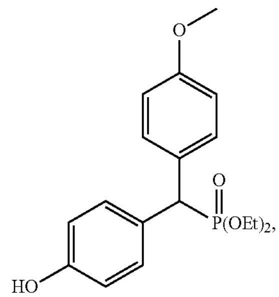
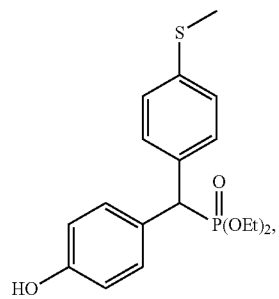
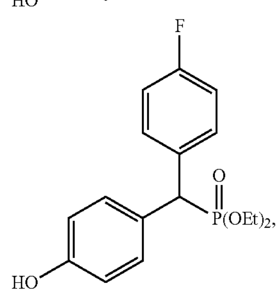
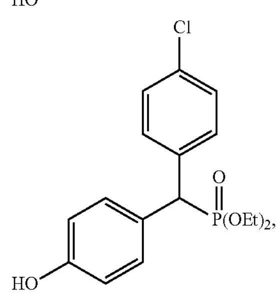
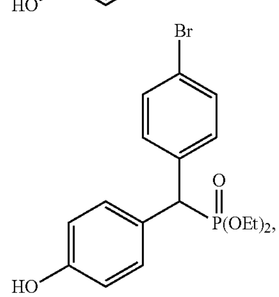

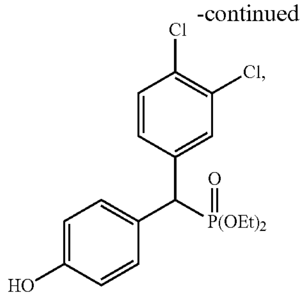
Cl
Cl,
O
P(OEt)2
HO
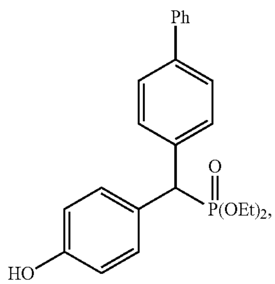
Ph
O
P(OEt)2,
HO
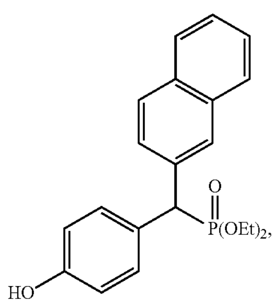
O
P(OEt)2,
HO
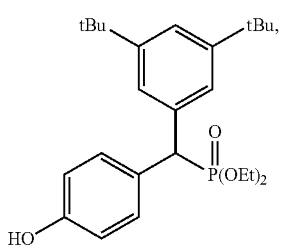
tBu
tBu,
O
P(OEt)2
HO
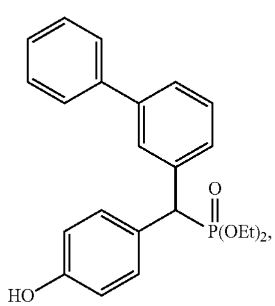
O
P(OEt)2,
HO
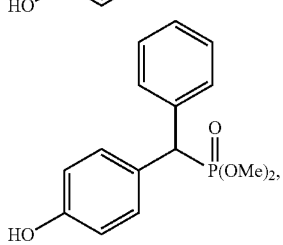
O
P(OMe)2,
HO
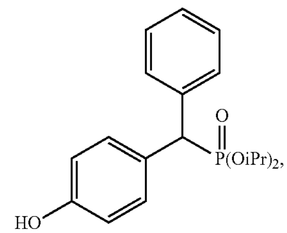
O
P(OiPr)2,
HO
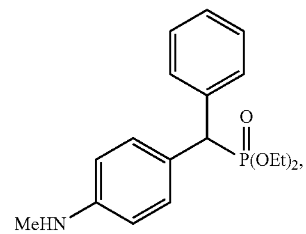
O
P(OEt)2,
MeHN
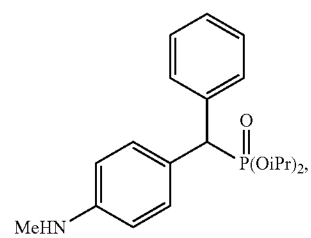
O
P(OiPr)2,
MeHN
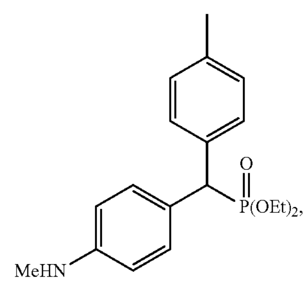
O
P(OEt)2,
MeHN
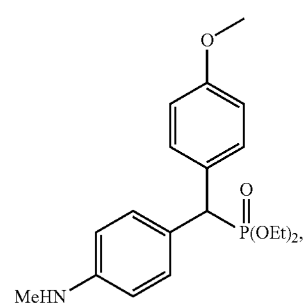
O
O
P(OEt)2,
MeHN
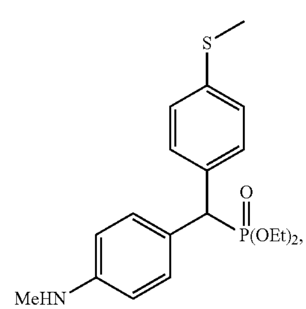
S
O
P(OEt)2,
MeHN -continued
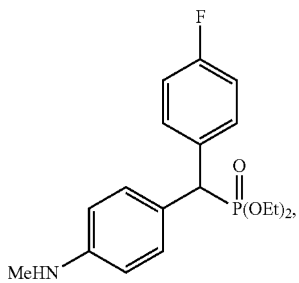
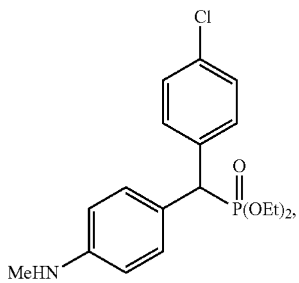
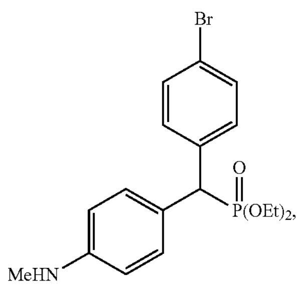
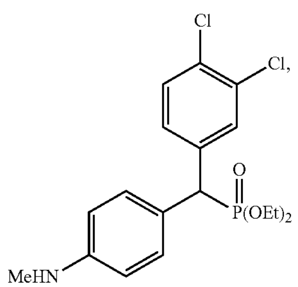
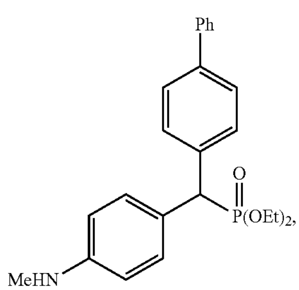
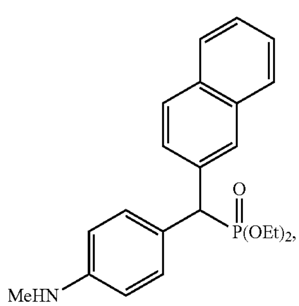
-continued
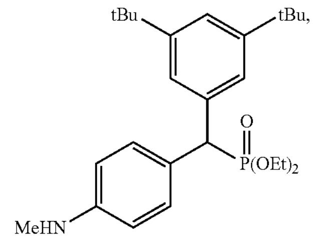 and
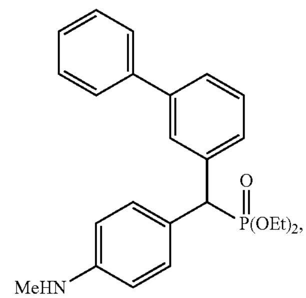
In a further aspect, the compound is selected from:
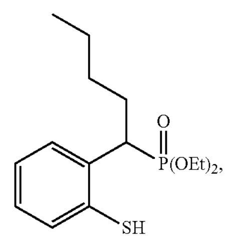
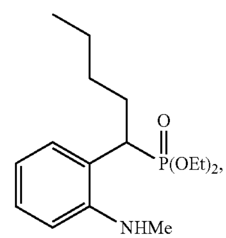
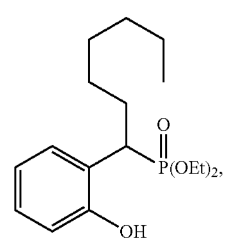
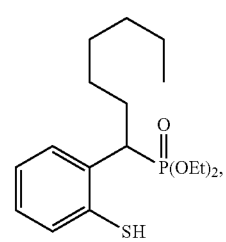
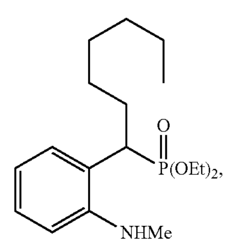
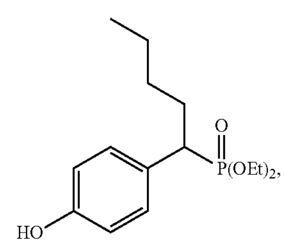
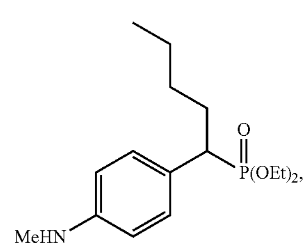

-continued

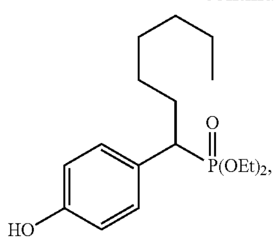

and

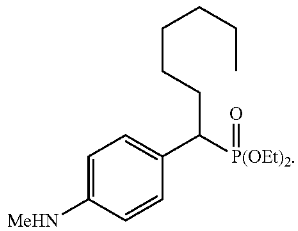

In a further aspect, the compound is selected from:

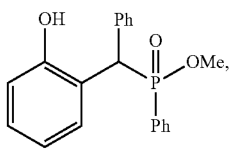

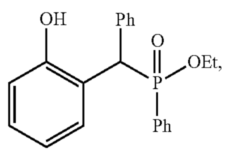

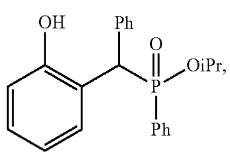

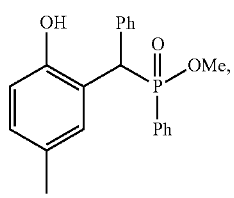

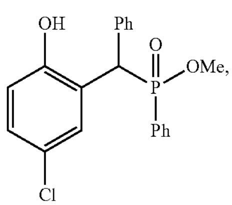

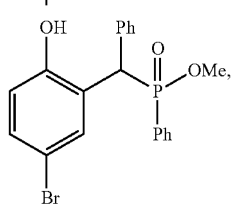

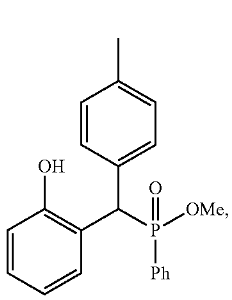

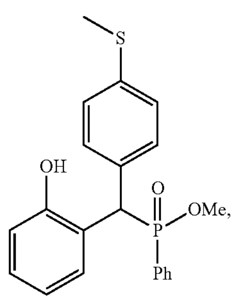

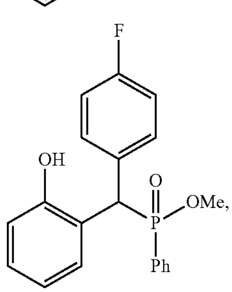

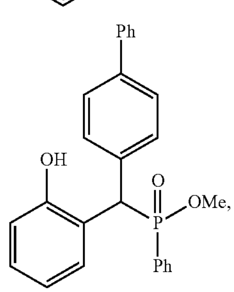

and

-continued

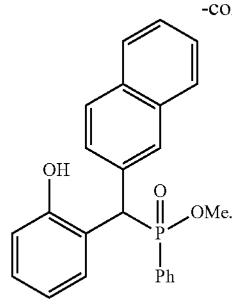

In a further aspect, the compound is selected from:

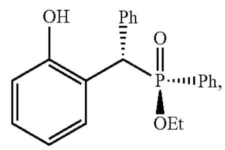

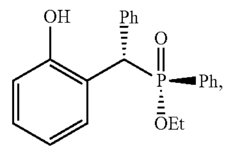

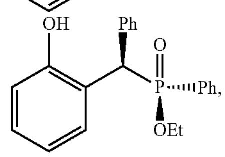

and

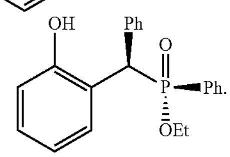

In a further aspect, n is selected from 0 and 1. In a still further aspect, n is 0. In yet a further aspect, n is 1.

In a further aspect, when n is 0, $R^{101a}$ is —OH, $R^{103}$ is C6 aryl, $R^{104}$ is ethoxy, and $R^{105}$ is ethyl then at least two of $R^{101b}$, $R^{102a}$, $R^{102b}$, and $R^{102c}$ are not hydrogen.

In a further aspect, when n is 0, $R^{101a}$ is —OH, $R^{103}$ is C6 aryl, $R^{104}$ is ethoxy, and $R^{105}$ is ethyl then $R^{103}$ is substituted with 2 or 3 groups.

In a further aspect, n is 0, $R^{101a}$ is —OH, $R^{103}$ is C6 aryl, $R^{104}$ is ethoxy, and $R^{105}$ is ethyl then at least one of $R^{101b}$, $R^{201a}$, $R^{102b}$, and $R^{102c}$ is not hydrogen and $R^{103}$ is substituted with 1, 2, or 3 groups.

In a further aspect, when n is 0, $R^{101b}$ is —OH, and $R^{103}$ is C6 aryl or C6 heteroaryl, then each of $R^{102a}$ and $R^{102b}$ is hydrogen.

In a further aspect, when n is 0, $R^{101b}$ is —OH, and $R^{103}$ is C6 aryl or C6 heteroaryl, then one of $R^{102a}$ and $R^{102b}$ is hydrogen and $R^{104}$ is not the same as $—OR^5$.

a. $R^{101a}$ and $R^{101b}$ Groups

In one aspect, each of $R^{101a}$ and $R^{101b}$ is independently selected from hydrogen, halogen, $—NO_2$, —CN, —OH, —SH, $—NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino, provided that at least one of $R^{101a}$ and $R^{101b}$ is —OH, —SH, or C1-C4 alkylamino.

In a further aspect, each of $R^{101a}$ and $R^{101b}$ is independently selected from hydrogen, —F, —Cl, $—NO_2$, —CN, —OH, —SH, $—NH_2$, methyl, ethyl, n-propyl, isopropyl, ethylenyl, propenyl, ethynyl, propynyl, $—CH_2F$, $—CHF_2$, $—CF_3$, $—CH_2CH_2F$, $—CH_2CH_2CH_2F$, $—CH(CH_3)CH_2F$, $—CH_2Cl$, $—CHCl_2$, $—CCl_3$, $—CH_2CH_2Cl$, $—CH_2CH_2CH_2Cl$, $—CH(CH_3)CH_2Cl$, $—CH_2CN$, $—CH_2CH_2CN$, $—CH_2CH_2CH_2CN$, $—CH(CH)CH_2CN$, $—CH_2OH$, $—CH_2CH_2OH$, $—CH_2CH_2CH_2OH$, $—CH(CH_3)CH_2OH$, $—CH_2OCF_3$, $—CH_2CH_2OCF_3$, $—CH_2CH_2CH_2OCF_3$, $—CH(CH_3)CH_2OCF_3$, —$CH_2OCH_3$, —$CH_2CH_2OCH_3$, —$CH_2CH_2CH_2OCH_3$, —$CH(CH_3)CH_2OCH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, and —$N(CH_3)CH_2CH_3$. In a still further aspect, each of $R^{101a}$ and $R^{101b}$ is independently selected from hydrogen, —F, —Cl, —$NO_2$, —CN, —OH, —SH, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$CH_2OCF_3$, —$CH_2CH_2OCF_3$, —$CH_2OCH_3$, —$CH_2CH_2OCH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, and —$N(CH_2CH_3)_2$. In yet a further aspect, each of $R^{101a}$ and $R^{101b}$ is independently selected from hydrogen, —F, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$CH_2CN$, —$CH_2OH$, —$CH_2OCF_3$, —$CH_2OCH_3$, —$SCH_3$, —$SCH_2CH_3$, —$CH_2SH$, —$CH_2NH_2$, —$NHCH_3$, and —$N(CH_3)_2$.

In a further aspect, each of $R^{101a}$ and $R^{101b}$ is independently selected from hydrogen, —OH, —SH, and C1-C4 alkylamino. In a still further aspect, each of $R^{101a}$ and $R^{101b}$ is independently selected from hydrogen, —OH, —SH, —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, each of $R^{101a}$ and $R^{101b}$ is independently selected from hydrogen, —OH, —SH, —$NHCH_3$, —$NHCH_2CH_3$, —$NHCH_2CH_2CH_3$, and —$NHC(CH_3)_2$. In an even further aspect, each of $R^{101a}$ and $R^{101b}$ is independently selected from hydrogen, —OH, —SH, —$NHCH_3$, and —$NHCH_2CH_3$. In a still further aspect, each of $R^{101a}$ and $R^{101b}$ is independently selected from hydrogen, —OH, —SH, and —$NHCH_3$.

In a further aspect, one of $R^{101a}$ and $R^{101b}$ is —OH. In a further aspect, one of $R^{101a}$ and $R^{101b}$ is —SH. In a still further aspect, one of $R^{101a}$ and $R^{101b}$ is C1-C4 alkylamino. In yet a further aspect, one of $R^{101a}$ and $R^{101b}$ is —$NHCH_3$, —$NHCH_2CH_3$, —$NHCH_2CH_2CH_3$, —$NHC(CH_3)_2$, —$NHCH_2CH_2CH_2CH_3$, or —$NHC(CH_3)_3$. In an even further aspect, one of $R^{101a}$ and $R^{101b}$ is —$NHCH_3$, —$NHCH_2CH_3$, —$NHCH_2CH_2CH_3$, or —$NHC(CH_3)_2$. In a still further aspect, one of $R^{101a}$ and $R^{101b}$ is —$NHCH_3$ or —$NHCH_2CH_3$. In yet a further aspect, one of $R^{101a}$ and $R^{101b}$ is —$NHCH_2CH_3$. In an even further aspect, one of $R^{101a}$ and $R^{101b}$ is —$NHCH_3$.

In a further aspect, one of $R^{101a}$ and $R^{101b}$ is hydrogen and one of $R^{101a}$ and $R^{101b}$ is selected from —OH, —SH, and C1-C4 alkylamino. In a still further aspect, one of $R^{101a}$ and $R^{101b}$ is hydrogen and one of $R^{101a}$ and $R^{101b}$ is selected from —OH, —SH, —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, one of $R^{101a}$ and $R^{101b}$ is hydrogen and one of $R^{101a}$ and $R^{101b}$ is selected from —OH, —SH, —$NHCH_3$, —$NHCH_2CH_3$, —$NHCH_2CH_2CH_3$, and —$NHC(CH_3)_2$. In an even further aspect, one of $R^{101a}$ and $R^{101b}$ is hydrogen and one of $R^{101a}$ and $R^{101b}$ is selected from —OH, —SH, —$NHCH_3$, and —$NHCH_2CH_3$. In a still further aspect, one of $R^{101a}$ and $R^{101b}$ is hydrogen and one of $R^{101a}$ and $R^{101b}$ is selected from —OH, —SH, and —$NHCH_3$.

In a further aspect, $R^{101b}$ is hydrogen and $R^{101a}$ is selected from —OH, —SH, and C1-C4 alkylamino. In a still further aspect, $R^{101b}$ is hydrogen and $R^{101a}$ is selected from —OH, —SH, —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, $R^{101b}$ is hydrogen and $R^{101a}$ is selected from —OH, —SH, —$NHCH_3$, —$NHCH_2CH_3$, —$NHCH_2CH_2CH_3$, and —$NHC(CH_3)_2$. In an even further aspect, $R^{101b}$ is hydrogen and $R^{101a}$ is selected from —OH, —SH, —$NHCH_3$, and —$NHCH_2CH_3$. In a still further aspect, $R^{101b}$ is hydrogen and $R^{101a}$ is selected from —OH, —SH, and —$NHCH_3$.

In a further aspect, $R^{101a}$ is hydrogen and $R^{101b}$ is selected from —OH, —SH, and C1-C4 alkylamino. In a still further aspect, $R^{101a}$ is hydrogen and $R^{101b}$ is selected from —OH, —SH, —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, $R^{101a}$ is hydrogen and $R^{101b}$ is selected from —OH, —SH, —$NHCH_3$, —$NHCH_2CH_3$, —$NHCH_2CH_2CH_3$, and —$NHC(CH_3)_2$. In an even further aspect, $R^{101a}$ is hydrogen and $R^{101b}$ is selected from —OH, —SH, —$NHCH_3$, and —$NHCH_2CH_3$. In a still further aspect, $R^{101a}$ is hydrogen and $R^{101b}$ is selected from —OH, —SH, and —$NHCH_3$.

In a further aspect, $R^{101a}$ is selected from —OH, —SH, and C1-C4 alkylamino. In a still further aspect, $R^{101a}$ is selected from —OH, —SH, —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, $R^{101a}$ is selected from —OH, —SH, —$NHCH_3$, —$NHCH_2CH_3$, —$NHCH_2CH_2CH_3$, and —$NHC(CH_3)_2$. In an even further aspect, $R^{101a}$ is selected from —OH, —SH, —$NHCH_3$, and —$NHCH_2CH_3$. In a still further aspect, $R^{101a}$ is selected from —OH, —SH, and —$NHCH_3$.

In a further aspect, $R^{101a}$ is selected from —OH and —SH. In a further aspect, $R^{101a}$ is —OH. In a still further aspect, $R^{101a}$ is —SH.

In a further aspect, $R^{101a}$ is C1-C4 alkylamino. In a still further aspect, $R^{101a}$ is selected from —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, $R^{101a}$ is selected from —$NHCH_3$, —$NHCH_2CH_3$, —$NHCH_2CH_2CH_3$, and —$NHC(CH_3)_2$. In an even further aspect, $R^{101a}$ is selected from —$NHCH_3$ and —$NHCH_2CH_3$. In a still further aspect, $R^{101a}$ is —$NHCH_2CH_3$. In yet a further aspect, $R^{101a}$ is —$NHCH_3$.

In a further aspect, $R^{101b}$ is selected from —OH, —SH, and C1-C4 alkylamino. In a still further aspect, $R^{101b}$ is selected from —OH, —SH, —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, $R^{101b}$ is selected from —OH, —SH, —$NHCH_3$, —$NHCH_2CH_3$, —$NHCH_2CH_2CH_3$, and —$NHC(CH_3)_2$. In an even further aspect, $R^{101b}$ is selected from —OH, —SH, —$NHCH_3$, and —$NHCH_2CH_3$. In a still further aspect, $R^{101b}$ is selected from —OH, —SH, and —$NHCH_3$.

In a further aspect, $R^{101b}$ is selected from —OH and —SH. In a further aspect, $R^{101b}$ is —OH. In a still further aspect, $R^{101b}$ is —SH.

In a further aspect, $R^{101b}$ is C1-C4 alkylamino. In a still further aspect, $R^{101b}$ is selected from —$NHCH_3$, —$NHCH_2CH_3$, —$NHCH_2CH_2CH_3$, —$NHC(CH_3)_2$, —$NHCH_2CH_2CH_2CH_3$, and —$NHC(CH_3)_3$. In yet a further aspect, $R^{101b}$ is selected from —$NHCH_3$, —$NHCH_2CH_3$, —$NHCH_2CH_2CH_3$, and —$NHC(CH_3)_2$. In an even further aspect, $R^{101b}$ is selected from —$NHCH_3$ and —$NHCH_2CH_3$. In a still further aspect, $R^{101b}$ is —$NHCH_2CH_3$. In yet a further aspect, $R^{101b}$ is —$NHCH_3$.

b. $R^{102a}$, $R^{102b}$, and $R^{102c}$ Groups

In one aspect, each of $R^{102a}$, $R^{102b}$, and $R^{102c}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each of $R^{102a}$, $R^{102b}$, and $R^{102c}$ is hydrogen.

In a further aspect, each of $R^{102a}$, $R^{102b}$, and $R^{102c}$ is independently selected from hydrogen, —F, —Br, —Cl, —$NO_2$, —CN, —OH, —SH, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —$CH(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH)_2$, —$N(CH_2CH_3)_2$, and —$N(CH_3)CH_2CH_3$. In a still further aspect, each of $R^{102a}$, $R^{102b}$, and $R^{102c}$ is independently selected from hydrogen, —F, —Br, —Cl, —$NO_2$, —CN, —OH, —SH, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, and —$N(CH_2CH_3)_2$. In yet a further aspect, each of $R^{102a}$, $R^{102b}$, and $R^{102c}$ is independently selected from hydrogen, —F, —Br, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, and —$N(CH_3)_2$.

In various aspects, each of $R^{102a}$, $R^{102b}$, and $R^{102c}$ is independently selected from hydrogen, halogen, —$NO_2$, —CN, —$NH_2$, C1-C4 alkyl, C2-C4 alkenyl, C2-C4 alkynyl, C1-C4 haloalkyl, C1-C4 cyanoalkyl, C1-C4 haloalkoxy, C1-C4 aminoalkyl, C1-C4 alkylamino, and (C1-C4)(C1-C4) dialkylamino. In a further aspect, each of $R^{102a}$, $R^{102b}$, and $R^{102c}$ is independently selected from hydrogen, —F, —Br, —Cl, —$NO_2$, —CN, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —$CH(CH_3)CH_2CN$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, and —$N(CH_3)CH_2CH_3$. In a still further aspect, each of $R^{102a}$, $R^{102b}$, and $R^{102c}$ is independently selected from hydrogen, —F, —Br, —Cl, —$NO_2$, —CN, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2NH_2$, —$CH_2CH_2NH_2$, —$NHCH_3$, —$NHCH_2CH_3$, —$N(CH_3)_2$, and —$N(CH_2CH_3)_2$. In yet a further aspect, each of $R^{102a}$, $R^{102b}$, and $R^{102c}$ is independently selected from hydrogen, —F, —Br, —Cl, —$NO_2$, —CN, —$NH_2$, methyl, —$CH_2F$, —$CHF_2$, —$CF_3$, —$CH_2Cl$, —$CHCl_2$, —$CCl_3$, —$CH_2CN$, —$CH_2NH_2$, —$NHCH_3$, and —$N(CH_3)_2$.

In various aspects, each of $R^{102a}$, $R^{102b}$, and $R^{102c}$ is independently selected from hydrogen, halogen, —OH, —SH, C1-C4 alkyl, C2-C4 alkenyl, C2-C4 alkynyl, C1-C4 haloalkyl, C1-C4 hydroxyalkyl, C1-C4 haloalkoxy, C1-C4 alkoxy, C1-C4 thioalkyl, and C1-C4 alkylthiol. In a further aspect, each of $R^{102a}$, $R^{102b}$, and $R^{102c}$ is independently selected from hydrogen, —F, —Br, —Cl, —OH, —SH, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, and —$CH(CH_3)CH_2SH$. In a still further aspect, each of $R^{102a}$, $R^{102b}$, and $R^{102c}$ is independently selected from hydrogen, —F, —Br, —Cl, —OH, —SH, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, and —$CH_2CH_2SH$. In yet a further aspect, each of $R^{102a}$, $R^{102b}$, and $R^{102c}$ is independently selected from hydrogen, —F, —Br, —Cl, —OH, —SH, methyl, —$CH_2F$, —$CHF_2$, —$CF_3$, —$CH_2Cl$, —$CHCl_2$, —$CCl_3$, —$CH_2CN$, —$CH_2OH$, —$OCF_3$, —$OCH_2F$, —$OCH_3$, —$SCH_3$, —$SCH_2CH_3$, and —$CH_2SH$.

In various aspects, each of $R^{102a}$, $R^{102b}$, and $R^{102c}$ is independently selected from hydrogen, —$NO_2$, —CN, —OH, —SH, —$NH_2$, C1-C4 alkyl, C2-C4 alkenyl, C2-C4 alkynyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each of $R^{102a}$, $R^{102b}$, and $R^{102c}$ is independently selected from hydrogen, —$NO_2$, —CN, —OH, —SH, —$NH_2$, methyl, ethyl, n-propyl, isopropyl, ethylenyl, propenyl, ethynyl, propynyl, —$CH_2CN$, —$CH_2CH_2CN$, —$CH_2CH_2CH_2CN$, —$CH(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, and —$N(CH_3)CH_2CH_3$. In a still further aspect, each of $R^{102a}$, $R^{102b}$, and $R^{102c}$ is independently selected from hydrogen, —$NO_2$, —CN, —OH, —SH, —$NH_2$, methyl, ethyl, ethylenyl, ethynyl, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, and —$N(CH_2CH_3)_2$. In yet a further aspect, each of $R^{102a}$, $R^{102b}$, and $R^{102c}$ is independently selected from hydrogen, —$NO_2$, —CN, —OH, —SH, —$NH_2$, methyl, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, and —$N(CH_3)_2$.

In a further aspect, each of $R^{102a}$, $R^{102b}$, and $R^{102c}$ is independently selected from hydrogen, halogen, C1-C4 alkyl, and C1-C4 alkoxy. In a still further aspect, each of $R^{102a}$, $R^{102b}$, and $R^{102c}$ is independently selected from hydrogen, —F, —Br, —Cl, methyl, ethyl, n-propyl, isopropyl, —$OCH_3$, —$OCH_2CH_3$, —$OCH_2CH_2CH_3$, and —$OCH(CH_3)CH_3$. In yet a further aspect, each of $R^{102a}$, $R^{102b}$, and $R^{102c}$ is independently selected from hydrogen, —F, —C1, methyl, ethyl, —$OCH_3$ and —$OCH_2CH_3$. In an even further aspect, each of $R^{102a}$, $R^{102b}$, and $R^{102c}$ is independently selected from hydrogen, —F, —Br, —Cl, methyl, and —$OCH_3$.

In a further aspect, each of $R^{102a}$, $R^{102b}$, and $R^{102c}$ is independently selected from hydrogen and halogen. In a still further aspect, each of $R^{102a}$, $R^{102b}$, and $R^{102c}$ is independently selected from hydrogen, —F, —Br, and —Cl. In yet a further aspect, each of $R^{102a}$, $R^{102b}$, and $R^{102c}$ is independently selected from hydrogen and —F. In an even further aspect, each of $R^{102a}$, $R^{102b}$, and $R^{102c}$ is independently selected from hydrogen and —Br. In a still further aspect, each of $R^{102a}$, $R^{102b}$, and $R^{102c}$ is independently selected from hydrogen and —Cl.

In a further aspect, each of $R^{102a}$, $R^{102b}$, and $R^{102c}$ is independently selected from hydrogen and C1-C4 alkyl. In a still further aspect, each of $R^{102a}$, $R^{102b}$, and $R^{102c}$ is independently selected from hydrogen, methyl, ethyl, n-propyl, isopropyl, n-butyl, isobutyl, sec-butyl, and tert-butyl. In yet a further aspect, each of $R^{102a}$, $R^{102b}$, and $R^{102c}$ is independently selected from hydrogen, methyl, ethyl, n-propyl, and isopropyl. In a still further aspect, each of $R^{102a}$, $R^{102b}$, and $R^{102c}$ is independently selected from hydrogen, methyl, and ethyl. In yet a further aspect, each of $R^{102a}$, $R^{102b}$, and $R^{102c}$ is independently selected from hydrogen and t-butyl. In an even further aspect, each of $R^{102a}$, $R^{102b}$, and $R^{102c}$ is independently selected from hydrogen and ethyl. In a still further aspect, each of $R^{102a}$, $R^{102b}$, and $R^{102c}$ is independently selected from hydrogen and methyl.

In a further aspect, each of $R^{102a}$, $R^{102b}$, and $R^{102c}$ is independently selected from hydrogen and C1-C4 alkoxy. In a still further aspect, each of $R^{102a}$, $R^{102b}$, and $R^{102c}$ is independently selected from hydrogen, —$OCH_3$, —$OCH_2CH_3$, —$OCH_2CH_2CH_3$, and —$OCH(CH_3)CH_3$. In yet a further aspect, each of $R^{102a}$, $R^{102b}$, and $R^{102c}$ is independently selected from hydrogen, —$OCH_3$, and —$OCH_2CH_3$. In an even further aspect, each of $R^{102a}$, $R^{102b}$, and $R^{102c}$ is independently selected from hydrogen and —$OCH_2CH_3$. In a still further aspect, each of $R^{102a}$, $R^{102b}$, and $R^{102c}$ is independently selected from hydrogen and —$OCH_3$.

In various aspects, $R^{102a}$ is selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, $R^{102a}$ is selected from —F, —Br, —Cl, —$NO_2$, —CN, —OH, —SH, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —$CH(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$CH(CH_3)CH_2OCH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, and —$N(CH_3)CH_2CH_3$. In a still further aspect, $R^{102a}$ is selected from —F, —Br, —Cl, —$NO_2$, —CN, —OH, —SH, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, and —$N(CH_2CH_3)_2$. In yet a further aspect, $R^{102a}$ is selected from —F, —Br, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, and —$N(CH_3)_2$.

In a further aspect, $R^{102a}$ is C1-C4 alkyl. In a still further aspect, $R^{102a}$ is selected from methyl, ethyl, n-propyl, isopropyl, n-butyl, isobutyl, sec-butyl, and tert-butyl. In yet a further aspect, $R^{102a}$ is selected from methyl, ethyl, n-propyl, and isopropyl. In a still further aspect, $R^{102a}$ is selected from methyl, and ethyl. In yet a further aspect, $R^{102a}$ is 1-butyl. In an even further aspect, $R^{102a}$ is ethyl. In a still further aspect, $R^{102a}$ is methyl.

In a further aspect, $R^{102a}$ is not hydrogen.

c. $R^{103}$ Groups

In one aspect, $R^{103}$ is selected from C4-C8 alkyl and $Ar^{101}$, provided that when $R^{103}$ is C4-C8 alkyl, then either (a) at least one of $R^{101a}$ and $R^{101b}$ is —SH or C1-C4 alkylamino, or (b) $R^{101b}$ is —OH.

In a further aspect, when $R^{103}$ is C4-C8 alkyl, then at least one of $R^{101a}$ and $R^{101b}$ is —SH or C1-C4 alkylamino. In a still further aspect, when $R^{103}$ is C4-C8 alkyl, then $R^{101b}$ is —OH.

In a further aspect, $R^{103}$ is selected from C4-C7 alkyl and $Ar^{101}$. In a still further aspect, $R^{103}$ is selected from C4-C6 alkyl and $Ar^{101}$. In yet a further aspect, $R^{103}$ is selected from C4-C5 alkyl and $Ar^{101}$. In an even further aspect, $R^{103}$ is selected from C8 alkyl and $Ar^{101}$. In a still further aspect, $R^{103}$ is selected from C7 alkyl and $Ar^{101}$. In yet a further aspect, $R^{103}$ is selected from C6 alkyl and $Ar^{101}$. In an even further aspect, $R^{103}$ is selected from C5 alkyl and $Ar^{101}$. In a still further aspect, $R^{103}$ is selected from C4 alkyl and $Ar^{101}$.

In a further aspect, $R^{103}$ is C4-C8 alkyl. In a still further aspect, $R^{103}$ is C4-C7 alkyl. In yet a further aspect, $R^{103}$ is C4-C6 alkyl. In an even further aspect, $R^{103}$ is C4-C5 alkyl. In a still further aspect, $R^{103}$ is C8 alkyl. In yet a further aspect, $R^{103}$ is C7 alkyl. In a still further aspect, $R^{103}$ is C6 alkyl. In an even further aspect, $R^{103}$ is C5 alkyl. In a still further aspect, $R^{103}$ is C4 alkyl.

In a further aspect, $R^{103}$ is $Ar^{101}$.

d. $R^{104}$ Groups

In one aspect, $R^{104}$ is selected from C1-C4 alkoxy and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)

(C1-C4) dialkylamino. In a further aspect, $R^{104}$ is selected from C1-C4 alkoxy and phenyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, $R^{104}$ is selected from C1-C4 alkoxy and phenyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, $R^{104}$ is selected from C1-C4 alkoxy and phenyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, $R^{104}$ is selected from C1-C4 alkoxy and unsubstituted phenyl.

In a further aspect, $R^{104}$ is selected from —$OCH_3$, —$OCH_2CH_3$, —$OCH_2CH_2CH_3$, —$OCH(CH_3)CH_3$, and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, $R^{104}$ is selected from —$OCH_3$, —$OCH_2CH_3$, and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, $R^{104}$ is selected from —$OCH_2CH_3$ and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, $R^{104}$ is selected from —$OCH_3$ and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino.

In a further aspect, $R^{104}$ is C1-C4 alkoxy. In a still further aspect, $R^{104}$ is selected from methoxy, ethoxy, n-propoxy, and isopropoxy. In yet a further aspect, $R^{104}$ is selected from methoxy and ethoxy. In an even further aspect, $R^{104}$ is isopropoxy. In a still further aspect, $R^{104}$ is ethoxy. In yet a further aspect, $R^{104}$ is methoxy.

In a further aspect, $R^{104}$ is phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, $R^{104}$ is phenyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In yet a further aspect, $R^{104}$ is phenyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In an even further aspect, $R^{1'}$ is phenyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a still further aspect, $R^{104}$ is unsubstituted phenyl.

In a further aspect, $R^{104}$ and —$OR^{105}$ are the same. In a still further aspect, $R^{104}$ and —$OR^{105}$ are different.

e. $R^{105}$ Groups

In one aspect, $R^{105}$ is C1-C4 alkyl. Ina further aspect, $R^{105}$ is selected from methyl, ethyl, n-propyl, and isopropyl. In a still further aspect, $R^{105}$ is selected from methyl and ethyl. In yet a further aspect, $R^{105}$ is isopropyl. In an even further aspect, $R^{105}$ is ethyl. In a still further aspect, $R^{105}$ is methyl.

f. $R^{120a}$, $R^{120b}$, $R^{120c}$, $R^{120d}$, and $R^{120e}$ Groups

In one aspect, each of $R^{120a}$, $R^{120b}$, $R^{120c}$, $R^{120d}$, and $R^{120e}$ are independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a further aspect, each of $R^{120a}$, $R^{120b}$, $R^{120d}$, and $R^{120e}$ is hydrogen.

In a further aspect, each of $R^{120a}$, $R^{120b}$, $R^{120c}$, $R^{120d}$, and $R^{120e}$ is independently selected from hydrogen, —F, —Br, —Cl, —$NO_2$, —CN, —OH, —SH, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —$CH(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, —$N(CH_3)CH_2CH_3$, and phenyl. In a still further aspect, each of $R^{120a}$, $R^{120b}$, $R^{120c}$, $R^{120d}$, and $R^{120c}$ is independently selected from hydrogen, —F, —Br, —Cl, —$NO_2$, —CN, —OH, —SH, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, —$N(CH_2CH_3)_2$, and phenyl. In yet a further aspect, each of $R^{120a}$, $R^{120b}$, $R^{120c}$, $R^{120d}$, and $R^{120e}$ is independently selected from hydrogen, —F, —Br, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, —$N(CH_3)_2$, and phenyl.

In various aspects, each of $R^{120a}$, $R^{120b}$, $R^{120c}$, $R^{120d}$, and $R^{120e}$ are independently selected from hydrogen, halogen, —$NO_2$, —CN, —$NH_2$, C1-C4 alkyl, C2-C4 alkenyl, C2-C4 alkynyl, C1-C4 haloalkyl, C1-C4 cyanoalkyl, C1-C4 aminoalkyl, C1-C4 alkylamino, (C1-C4)(C1-C4) dialkylamino, and phenyl. In a further aspect, each of $R^{120a}$, $R^{120b}$, $R^{120c}$, $R^{120d}$, and $R^{120e}$ is independently selected from hydrogen, —F, —Br, —Cl, —$NO_2$, —CN, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —$CH(CH_3)CH_2CN$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, —$N(CH_3)CH_2CH_3$, and phenyl. In a still further aspect, each of $R^{120a}$, $R^{120b}$, $R^{120c}$, $R^{120d}$, and $R^{120e}$ is independently selected from hydrogen, —F, —Br, —Cl, —$NO_2$, —CN, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2NH_2$, —$CH_2CH_2NH_2$, —$NHCH_3$, —$NHCH_2CH_3$, —$N(CH_3)_2$, —$N(CH_2CH_3)_2$, and phenyl. In yet a further aspect, each of $R^{120a}$, $R^{120b}$, $R^{120c}$, $R^{120d}$, and $R^{120e}$ is independently selected from hydrogen, —F, —Br, —Cl, —$NO_2$, —CN, —$NH_2$, methyl, —$CH_2F$, —$CHF_2$, —$CF_3$, —$CH_2Cl$, —$CHCl_2$, —$CCl_3$, —$CH_2CN$, —$CH_2NH_2$, —$NHCH_3$, —$N(CH_3)_2$, and phenyl.

In various aspects, each of $R^{120a}$, $R^{120b}$, $R^{120c}$, $R^{120d}$, and $R^{120e}$ are independently selected from hydrogen, halogen, —OH, —SH, C1-C4 alkyl, C2-C4 alkenyl, C2-C4 alkynyl, C1-C4 haloalkyl, C1-C4 hydroxyalkyl, C1-C4 haloalkoxy, C1-C4 alkoxy, C1-C4 thioalkyl, C1-C4 alkylthiol, and phenyl. In a further aspect, each of $R^{120a}$, $R^{120b}$, $R^{120c}$, $R^{120d}$, and $R^{120e}$ is independently selected from hydrogen, —F, —Br, —Cl, —OH, —SH, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, and phenyl. In a still further aspect, each of $R^{120a}$, $R^{120b}$, $R^{120c}$, $R^{120d}$, and $R^{120e}$ is independently selected from hydrogen, —F, —Br, —Cl, —OH, —SH, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, and phenyl. In yet a further aspect, each of $R^{120a}$, $R^{120b}$, $R^{120c}$, $R^{120d}$, and $R^{120e}$ is independently selected from hydrogen, —F, —Br, —Cl, —OH, —SH, methyl, —$CH_2F$, —$CHF_2$, —$CF_3$, —$CH_2Cl$, —$CHCl_2$, —$C_3$, —$CH_2OH$, —$OCF_3$, —$OCH_2F$, —$OCH_3$, —$SCH_3$, —$SCH_2CH_3$, —$CH_2SH$, and phenyl.

In various aspects, each of $R^{120a}$, $R^{120b}$, $R^{120c}$, $R^{120d}$, and $R^{120e}$ are independently selected from hydrogen, —$NO_2$, —CN, —OH, —SH, —$NH_2$, C1-C4 alkyl, C2-C4 alkenyl, C2-C4 alkynyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a further aspect, each of $R^{120a}$, $R^{120b}$, $R^{120c}$, $R^{120d}$, and $R^{120e}$ is independently selected from hydrogen, —Cl, —$NO_2$, —CN, —OH, —SH, —$NH_2$, methyl, ethyl, n-propyl, isopropyl, ethylenyl, propenyl, ethynyl, propynyl, —$CH_2CN$, —$CH_2CH_2CN$, —$CH_2CH_2CH_2CN$, —$CH(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —OCH, —$OCH_2CH$, —$OCH_2CH_2CH$, —OCH(CH)CH, —SCH, —$SCH_2CH_3$, —$SCH_2CH_2CH$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, —$N(CH_3)CH_2CH_3$, and phenyl. In a still further aspect, each of $R^{120a}$, $R^{120b}$, $R^{120c}$, $R^{120d}$, and $R^{120e}$ is independently selected from hydrogen, —Cl, —$NO_2$, —CN, —OH, —SH, —$NH_2$, methyl, ethyl, ethylenyl, ethynyl, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, —$N(CH_2CH_3)_2$, and phenyl. In yet a further aspect, each of $R^{120a}$, $R^{120b}$, $R^{120c}$, $R^{120d}$, and $R^{120e}$ is independently selected from hydrogen, —$NO_2$, —CN, —OH, —SH, —$NH_2$, methyl, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, —$N(CH_3)_2$, and phenyl.

In various aspects, each of $R^{120a}$, $R^{120b}$, $R^{120c}$, $R^{120d}$, and $R^{120e}$ are independently selected from hydrogen, halogen, C1-C4 alkyl, C1-C4 alkoxy, C1-C4 thioalkyl, and phenyl. In a further aspect, each of $R^{120a}$, $R^{120b}$, $R^{120c}$, $R^{120d}$, and $R^{120e}$ is independently selected from hydrogen, —F, —Cl, methyl, ethyl, n-propyl, isopropyl, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, and phenyl. In a still further aspect, each of $R^{120a}$, $R^{120b}$, $R^{120c}$, $R^{120d}$, and $R^{120e}$ is independently selected from hydrogen, —F, —Cl, methyl, ethyl, —$OCH_3$, —$OCH_2CH_3$, —$SCH_3$, —$SCH_2CH_3$, and phenyl. In yet a further aspect, each of $R^{120a}$, $R^{120b}$, $R^{120c}$, $R^{120d}$, and $R^{120e}$ is independently selected from hydrogen, —F, —Cl, methyl, —$OCH_3$, —$SCH_3$, and phenyl.

In a further aspect, each of $R^{120a}$, $R^{120b}$, $R^{120d}$, and $R^{120e}$ is hydrogen.

In various aspects, $R^{120c}$ is selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a further aspect, $R^{120c}$ is selected from —F, —Br, —Cl, —$NO_2$, —CN, —OH, —SH, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —CH $(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, —$N(CH_3)CH_2CH_3$, and phenyl. In a still further aspect, $R^{120c}$ is selected from —F, —Br, —Cl, —$NO_2$, —CN, —OH, —SH, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, —$N(CH_2CH_3)_2$, and phenyl. In yet a further aspect, $R^{120c}$ is selected from —F, —Br, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, —$N(CH_3)_2$, and phenyl.

In various aspects, $R^{120c}$ is selected from halogen, C1-C4 alkyl, C1-C4 alkoxy, C1-C4 thioalkyl, and phenyl. In a further aspect, $R^{120c}$ is selected from —F, —Cl, methyl, ethyl, n-propyl, isopropyl, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, and phenyl. In a still further aspect, $R^{120c}$ is selected from —F, —Cl, methyl, ethyl, —$OCH_3$, —$OCH_2CH_3$, —$SCH_3$, —$SCH_2CH_3$, and phenyl. In yet a further aspect, $R^{120c}$ is selected from —F, —Cl, methyl, —$OCH_3$, —$SCH_3$, and phenyl.

In a further aspect, each of $R^{120a}$, $R^{120c}$, and $R^{120e}$ is hydrogen.

In various aspects, each of $R^{120b}$ and $R^{120d}$ are independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a further aspect, each of $R^{120b}$ and $R^{120d}$ are independently selected from —F, —Br, —Cl, —$NO_2$, —CN, —OH, —SH, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —$CH(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, —$N(CH_3)CH_2CH_3$, and phenyl. In a still further aspect, each of $R^{120b}$ and $R^{120d}$ are independently selected from —F, —Br, —Cl, —$NO_2$, —CN, —OH, —SH, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, —$N(CH_2CH_3)_2$, and phenyl. In yet a further aspect, each of $R^{120b}$ and $R^{120d}$ are independently selected from —F, —Br, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, —$N(CH_3)_2$, and phenyl.

In various aspects, each of $R^{120b}$ and $R^{120d}$ are independently selected from halogen, C1-C4 alkyl, C1-C4 alkoxy, C1-C4 thioalkyl, and phenyl. In a further aspect, each of $R^{120b}$ and $R^{120d}$ are independently selected from —F, —Cl, methyl, ethyl, n-propyl, isopropyl, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, and phenyl. In a still further aspect, each of $R^{120b}$ and $R^{120d}$ are independently selected from —F, —Cl, methyl, ethyl, —$OCH_3$, —$OCH_2CH_3$, —$SCH_3$, —$SCH_2CH_3$, and phenyl. In yet a further aspect, each of $R^{120b}$ and $R^{120d}$ are independently selected from —F, —Cl, methyl, —$OCH_3$, —$SCH_3$, and phenyl.

g. $R^{130a}$, $R^{130b}$, $R^{130c}$, $R^{130d}$, and $R^{130e}$ Groups

In one aspect, each of $R^{130a}$, $R^{130b}$, $R^{130c}$, $R^{130d}$, and $R^{130e}$ are independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino. In a further aspect, each of $R^{130a}$, $R^{130b}$, $R^{130c}$, $R^{130d}$, and $R^{130e}$ are hydrogen.

In a further aspect, each of $R^{130a}$, $R^{130b}$, $R^{130c}$, $R^{130d}$, and $R^{130e}$ are independently selected from hydrogen, —F, —Br, —Cl, —$NO_2$, —CN, —OH, —SH, —$NH_2$, methyl, ethyl, n-propyl, isopropyl, ethylenyl, propenyl, ethynyl, propynyl, —$CH_2F$, —$CHF_2$, —$CF_3$, —$CH_2CH_2F$, —$CH_2CH_2CH_2F$, —$CH(CH_3)CH_2F$, —$CH_2Cl$, —$CHCl_2$, —$CCl_3$, —$CH_2CH_2Cl$, —$CH_2CH_2CH_2Cl$, —$CH(CH_3)CH_2Cl$, —$CH_2CN$, —$CH_2CH_2CN$, —$CH_2CH_2CH_2CN$, —$CH(CH_3)CH_2CN$, —$CH_2OH$, —$CH_2CH_2OH$, —$CH_2CH_2CH_2OH$, —$CH(CH_3)CH_2OH$, —$OCF_3$, —$OCH_2F$, —$OCH_2CH_2F$, —$OCH_2CH_2CH_2F$, —$OCH(CH_3)CH_2F$, —$OCH_3$, —$OCH_2CH_3$, —$OCH_2CH_2CH_3$, —$OCH(CH_3)CH_3$, —$SCH_3$, —$SCH_2CH_3$, —$SCH_2CH_2CH_3$, —$SCH(CH_3)CH_3$, —$CH_2SH$, —$CH_2CH_2SH$, —$CH_2CH_2CH_2SH$, —$CH(CH_3)CH_2SH$, —$CH_2NH_2$, —$CH_2CH_2NH_2$, —$CH_2CH_2CH_2NH_2$, —$CH(CH_3)CH_2NH_2$, —$NHCH_3$, —$NHCH_2CH_3$, —$NHCH_2CH_2CH_3$, —$NHCH(CH_3)CH_3$, —$N(CH_3)_2$, —$N(CH_2CH_3)_2$, and —$N(CH_3)CH_2CH_3$. In a still further aspect, each of $R^{130a}$, $R^{130b}$, $R^{130c}$, $R^{130d}$, and $R^{130e}$ are independently selected from hydrogen, —F, —Br, —Cl, —$NO_2$, —CN, —OH, —SH, —$NH_2$, methyl, ethyl, ethylenyl, ethynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$OCF_3$, —$OCH_2F$, —$OCH_2CH_2F$, —$OCH_3$, —$OCH_2CH_3$, —$SCH_3$, —$SCH_2CH_3$, —$CH_2SH$, —$CH_2CH_2SH$, —$CH_2NH_2$, —$CH_2CH_2NH_2$, —$NHCH_3$, —$NHCH_2CH_3$, —$N(CH_3)_2$, and —$N(CH_2CH_3)_2$. In yet a further aspect, each of $R^{130a}$, $R^{130b}$, $R^{130c}$, $R^{130d}$, and $R^{130e}$ are independently selected from hydrogen, —F, —Br, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$CH_2CN$, —$CH_2OH$, —$OCF_3$, —$OCH_2F$, —$OCH_3$, —$SCH_3$, —$SCH_2CH_3$, —$CH_2SH$, —$CH_2NH_2$, —$NHCH_3$, and —$N(CH_3)_2$.

h. $Ar^{101}$ Groups

In one aspect, $Ar^{101}$, when present, is selected from C6-C10 aryl and C5-C6 heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a further aspect, $Ar^{101}$, when present, is selected from C6-C10 aryl and C5-C6 heteroaryl, and is substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is selected from C6-C10 aryl and C5-C6 heteroaryl, and is substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is selected from C6-C10 aryl and C5-C6 heteroaryl, and is monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is selected from C6-C10 aryl and C5-C6 heteroaryl, and is unsubstituted.

In a further aspect, $Ar^{101}$, when present, is C5-C6 heteroaryl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is C5-C6 heteroaryl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is C5-C6 heteroaryl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is C5-C6 heteroaryl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted C5-C6 heteroaryl.

In a further aspect, $Ar^{101}$, when present, is C5 heteroaryl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is C5 heteroaryl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is C5 heteroaryl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is C5 heteroaryl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted C5 heteroaryl.

In a further aspect, $Ar^{101}$, when present, is thiophenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is thiophenyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is thiophenyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is thiophenyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted thiophenyl.

In a further aspect, $Ar^{101}$, when present, is C6 heteroaryl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is C6 heteroaryl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is C6 heteroaryl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is C6 heteroaryl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted C6 heteroaryl.

In a further aspect, $Ar^{101}$, when present, is pyridinyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is pyridinyl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is pyridinyl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is pyridinyl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted pyridinyl.

In a further aspect, $Ar^{101}$, when present, is C6-C10 aryl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is C6-C10 aryl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is C6-C10 aryl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is C6-C10 aryl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted C6-C10 aryl.

In a further aspect, $Ar^{101}$, when present, is C6 aryl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is C6 aryl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is C6 aryl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is C6 aryl monosubstituted with a group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted C6 aryl.

In a further aspect, $Ar^{101}$, when present, is C10 aryl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is C10 aryl substituted with 0, 1, or 2 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In yet a further aspect, $Ar^{101}$, when present, is C10 aryl substituted with 0 or 1 group selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In an even further aspect, $Ar^{101}$, when present, is C10 aryl monosubstituted with a group selected from halogen, $—NO_2$, —CN, —OH, —SH, $—NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl. In a still further aspect, $Ar^{101}$, when present, is unsubstituted C10 aryl.

2. Diaryl and Arylalkyl Phosphonate Examples

In one aspect, a compound is selected from:

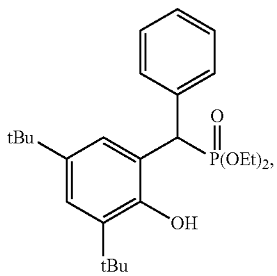

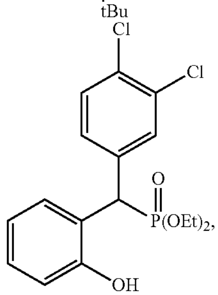

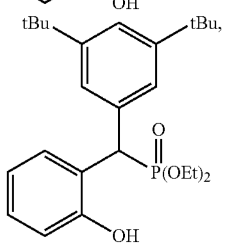

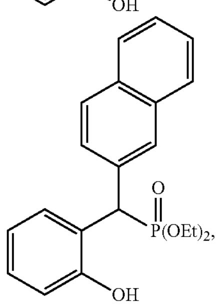

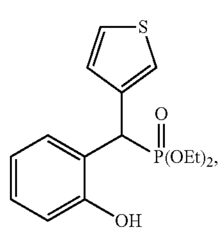

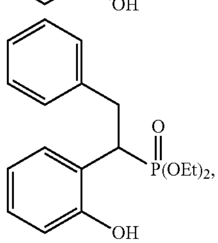

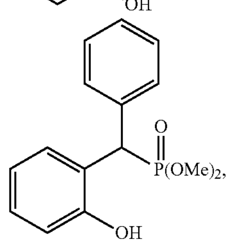

and

-continued

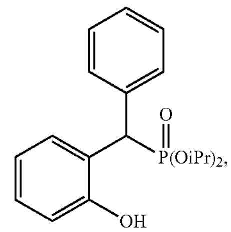

or a salt thereof.

In one aspect, a compound is selected from:

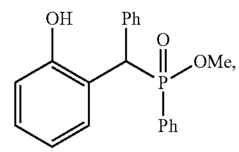

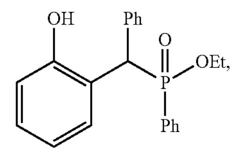

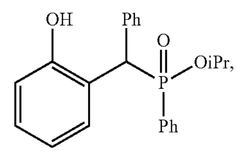

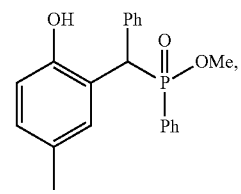

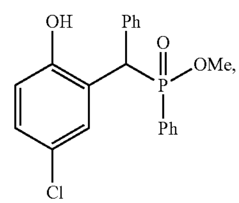

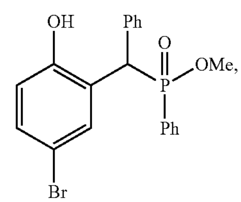

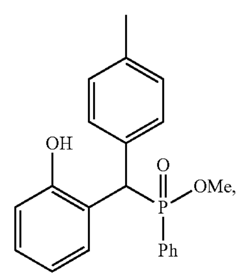

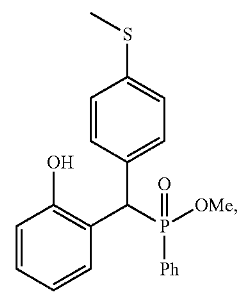

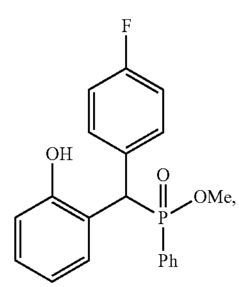

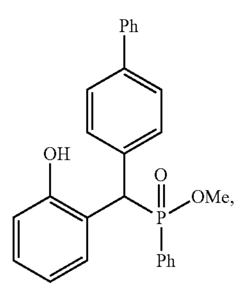

and

-continued
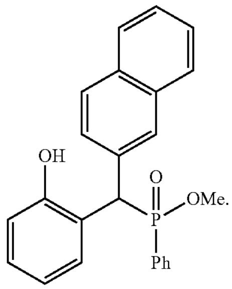
or a salt thereof.
In one aspect, a compound is selected from:
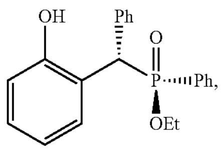
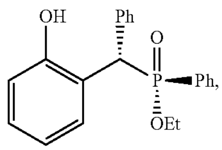
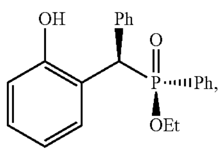
and
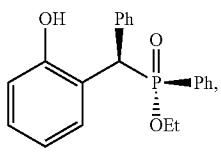
or a salt thereof.
In one aspect, a compound is selected from:
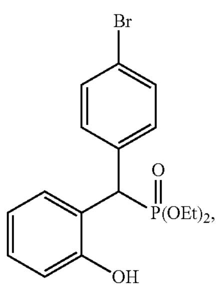
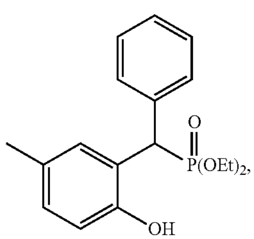
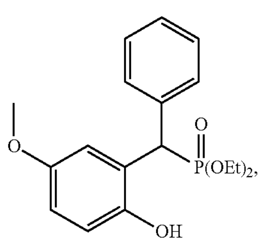
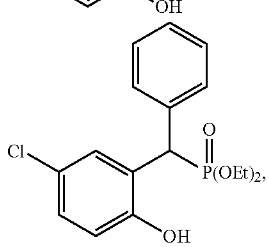
-continued
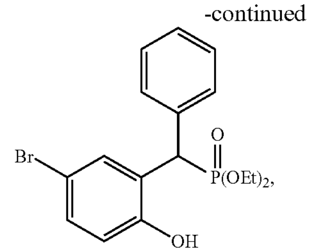
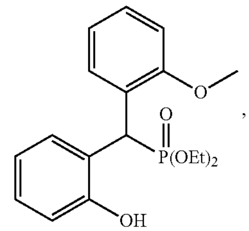
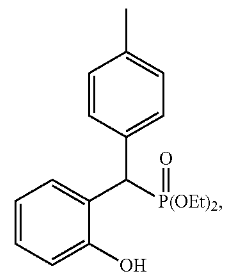
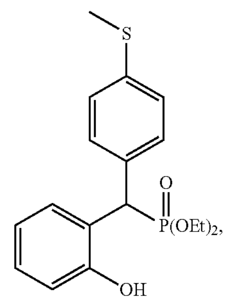
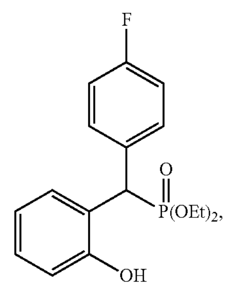
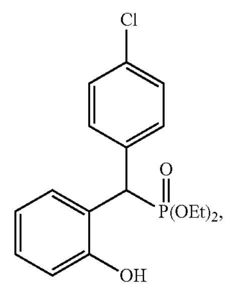
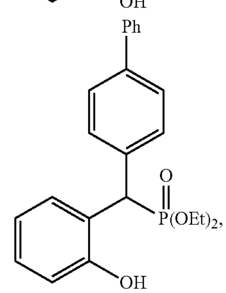
and
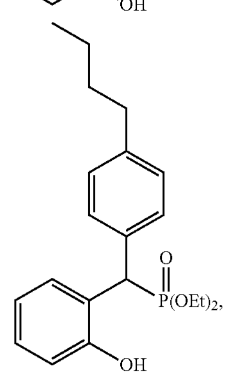
or a salt thereof.

3. Prophetic Diaryl and Arylalkyl Phosphonate Examples
The following compound examples are prophetic, and can be prepared using the synthesis methods described herein above and other general methods as needed as would be known to one skilled in the art. Thus, in one aspect, a compound can be selected from:
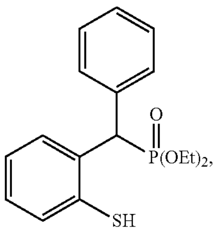
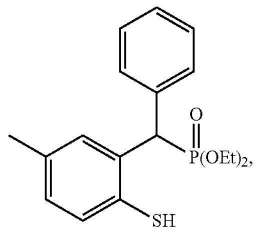
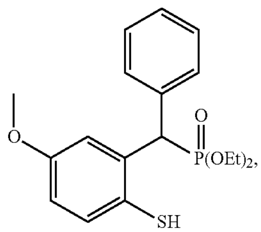
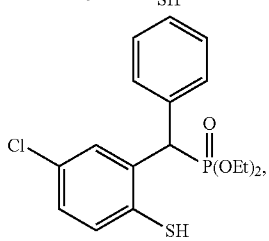
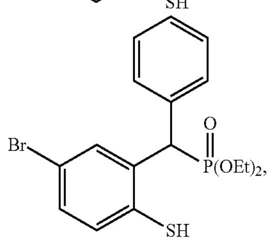
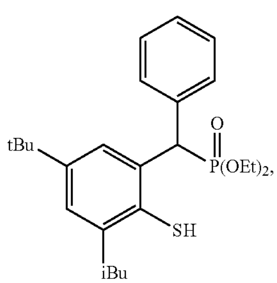
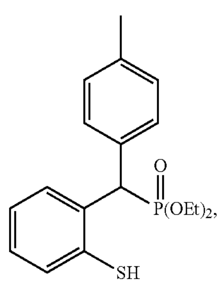
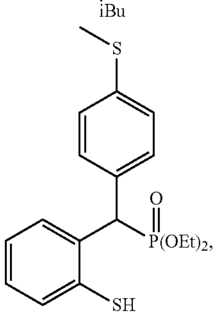
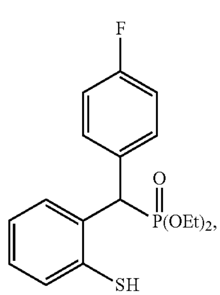
-continued
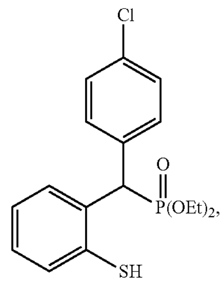
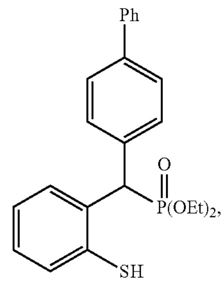
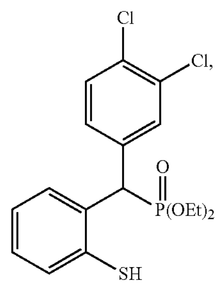
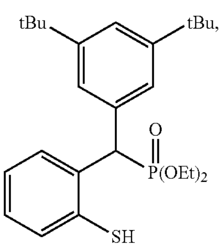
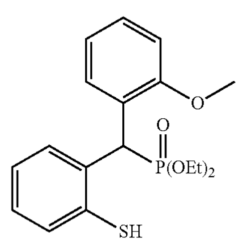
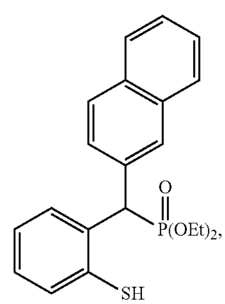
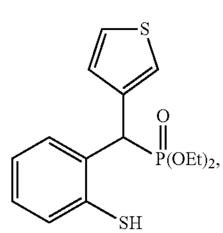
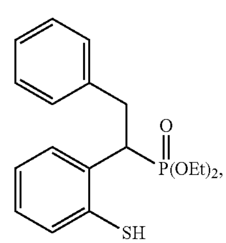
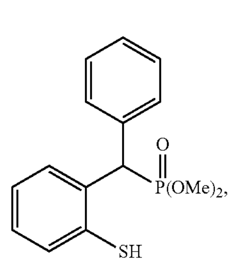
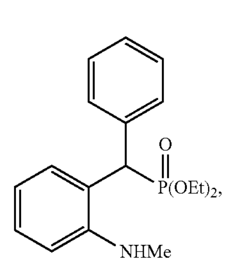

-continued
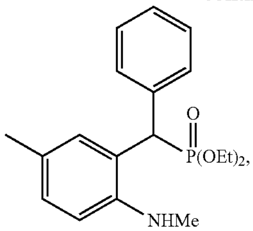
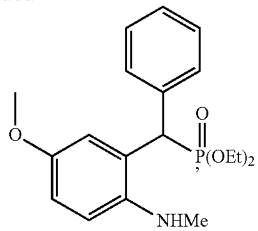
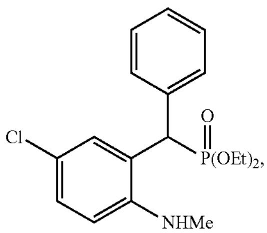
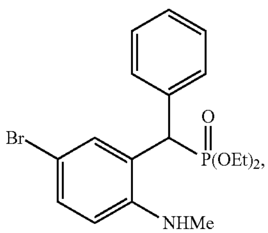
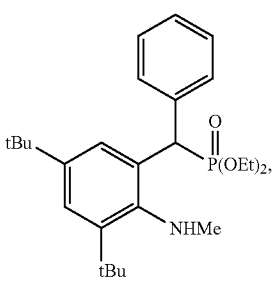
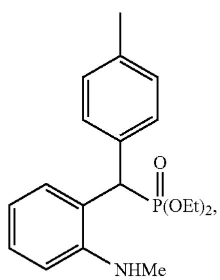
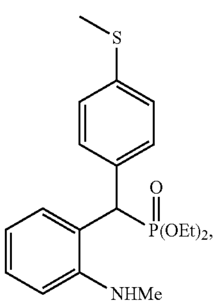
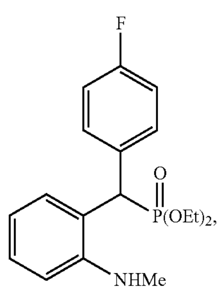
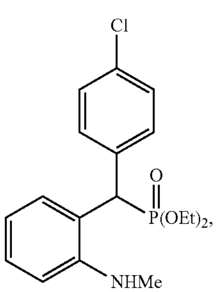
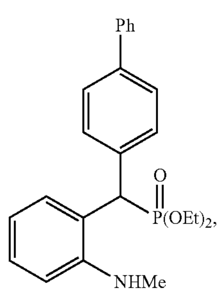
-continued
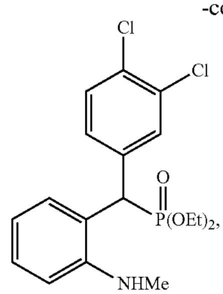
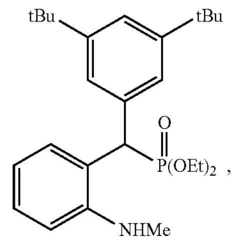
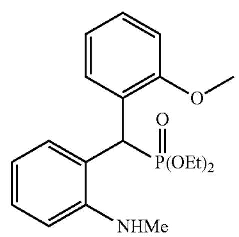
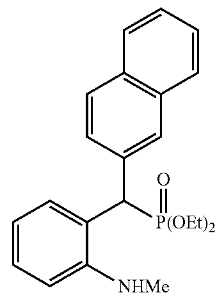
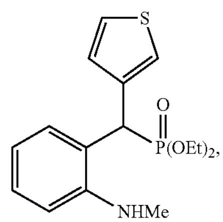
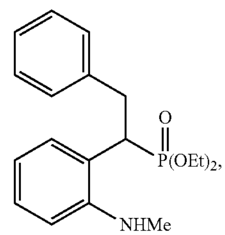
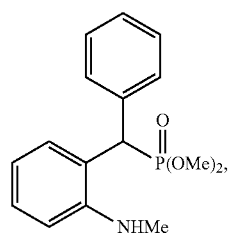
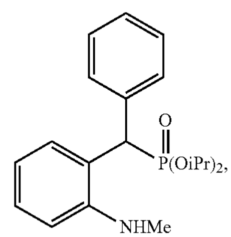
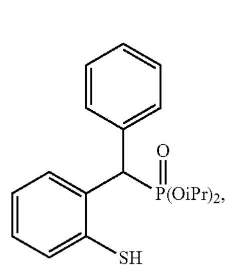
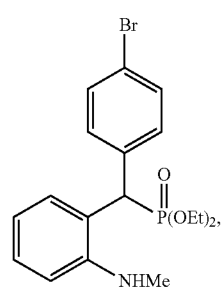
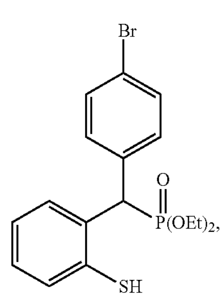

-continued
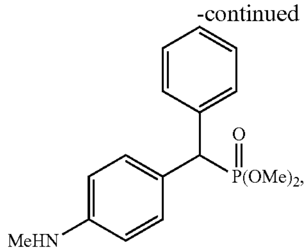
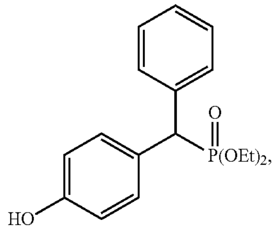
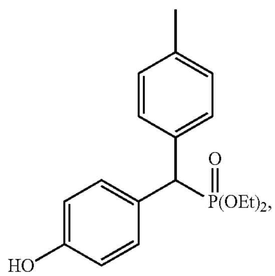
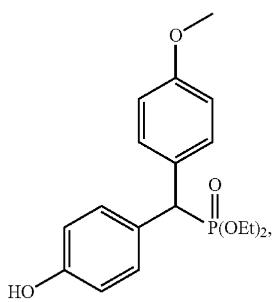
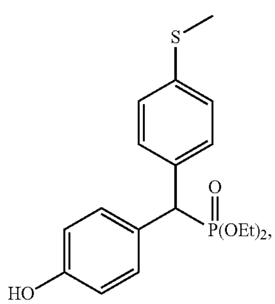
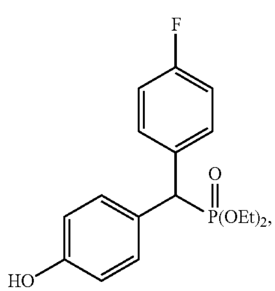
-continued
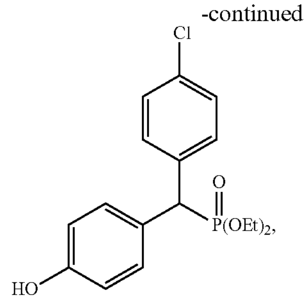
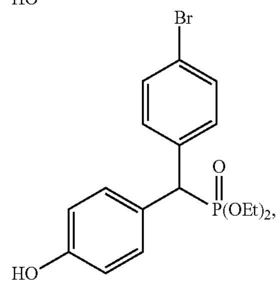
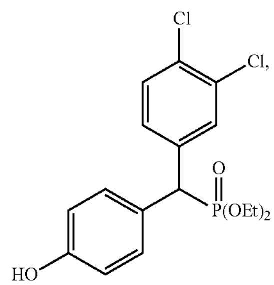
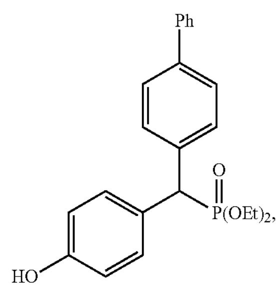
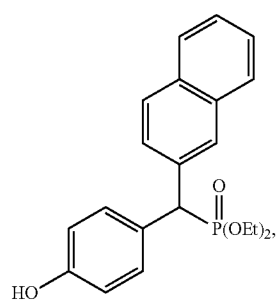
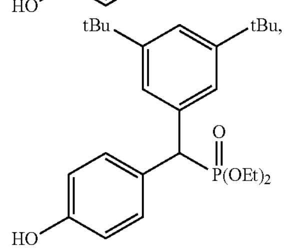

-continued
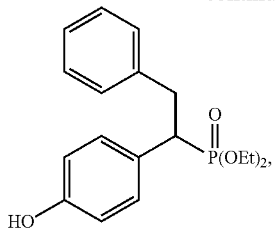
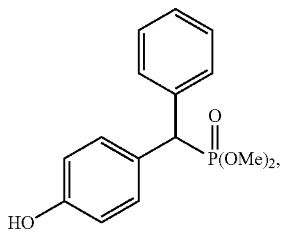
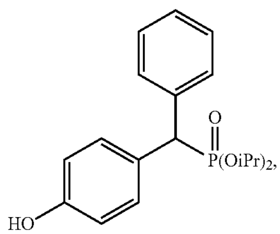
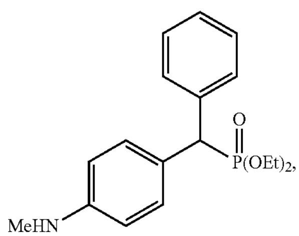
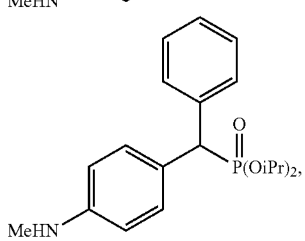
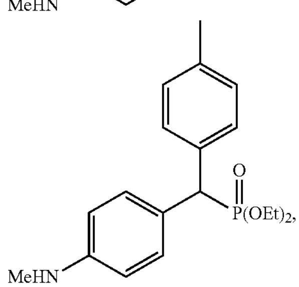
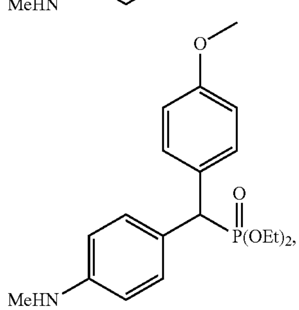
-continued
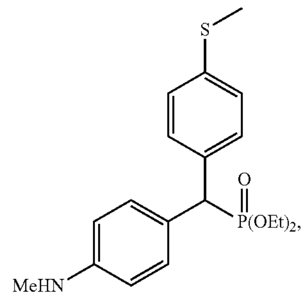
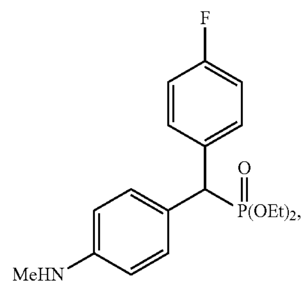
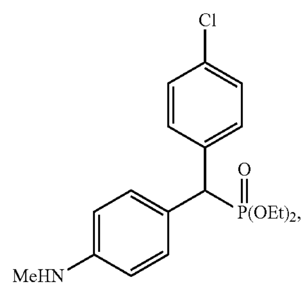
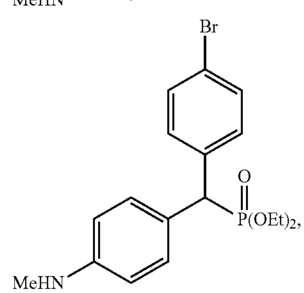
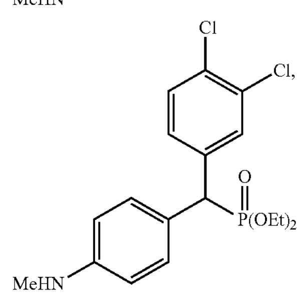
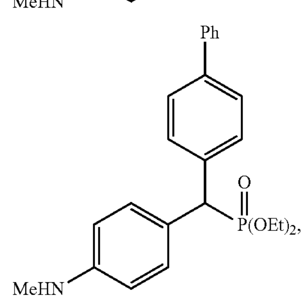

-continued

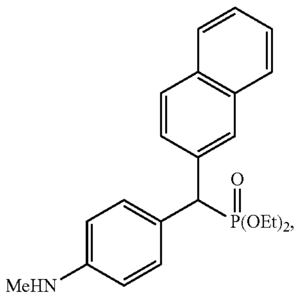

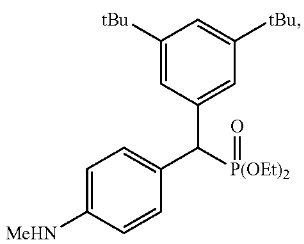

and

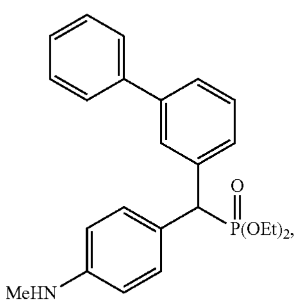

or a salt thereof.

In one aspect, a compound can be selected from:

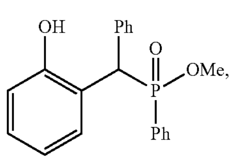

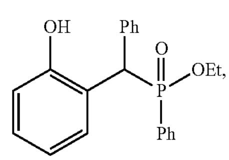

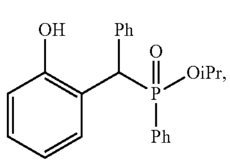

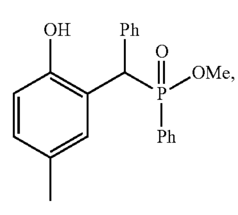

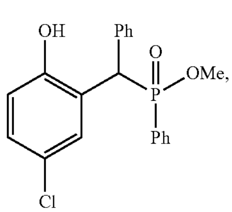

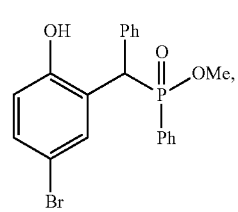

-continued

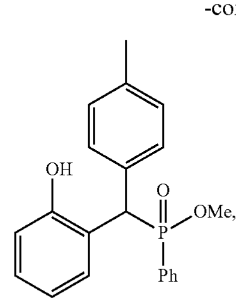

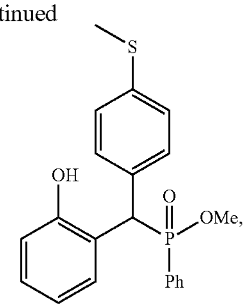

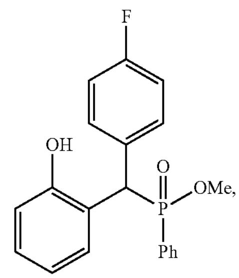

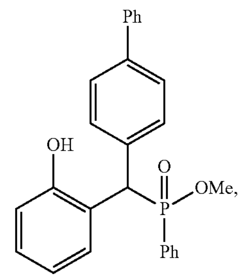

and

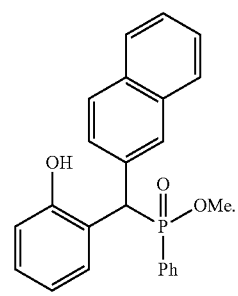

or a salt thereof.

D. Methods of Making N-Heterocyclic Phosphorodiamidic Acids

In one aspect, the invention relates to methods of making N-heterocyclic phosphorodiamidic acids. The N-heterocyclic phosphorodiamidic acids of this invention can be prepared by employing reactions as shown in the following schemes, in addition to other standard manipulations that are known in the literature, exemplified in the experimental sections or clear to one skilled in the art. For clarity, examples having a single substituent are shown where multiple substituents are allowed under the definitions disclosed herein.

1. Route I

In one aspect, substituted N-heterocyclic phosphorodiamidic acids can be prepared as shown below.

SCHEME 1A.

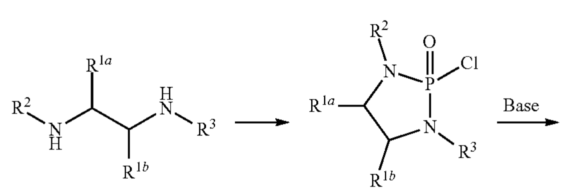

1.1 1.2

-continued

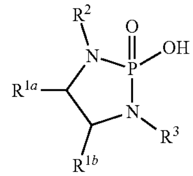

1.3

Compounds are represented in generic form, with substituents as noted in compound descriptions elsewhere herein. A more specific example is set forth below.

SCHEME 1B.

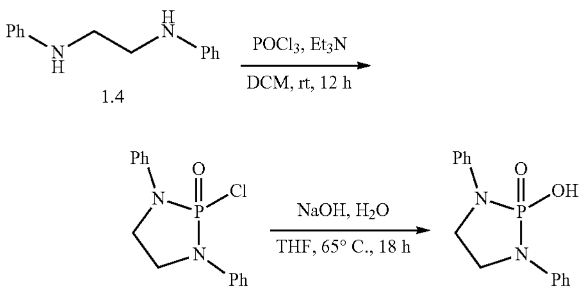

In one aspect, the synthesis of N-heterocyclic phosphorodiamidic acids can begin with an ethylene derivative. Ethylene derivatives are commercially available or readily prepared by one skilled in the art. Thus, compounds of type 1.6, and similar compounds, can be prepared according to reaction Scheme 1B above. Compounds of type 1.5 can be prepared by a cyclization reaction of an appropriate ethylene derivative, e.g., 1.4 as shown above. The cyclization reaction is carried out in the presence of an appropriate phosphorous trihalide, e.g., $POCl_3$ as shown above, and an appropriate base, e.g., triethylamine, in an appropriate solvent, e.g., dichloromethane, for an appropriate period of time, e.g., 12 hours. Compounds of type 1.6 can be prepared by a nucleophilic substitution reaction of an appropriate halide, e.g., 1.5 as shown above, with a basic reagent, e.g., sodium hydroxide as shown above. The nucleophilic substitution is carried out in the presence of an appropriate solvent, e.g., tetrahydrofuran, at an appropriate temperature, e.g., 65° C., for an appropriate period of time, e.g., 18 hours. As can be appreciated by one skilled in the art, the above reaction provides an example of a generalized approach wherein compounds similar in structure to the specific reactants above (compounds similar to compounds of type 1.1 and 1.2), can be substituted in the reaction to provide substituted N-heterocyclic phosphorodiamidic acids similar to Formula 1.3.

2. Route II

In one aspect, substituted N-heterocyclic phosphorodiamidic acids can be prepared as shown below.

SCHEME 2A.

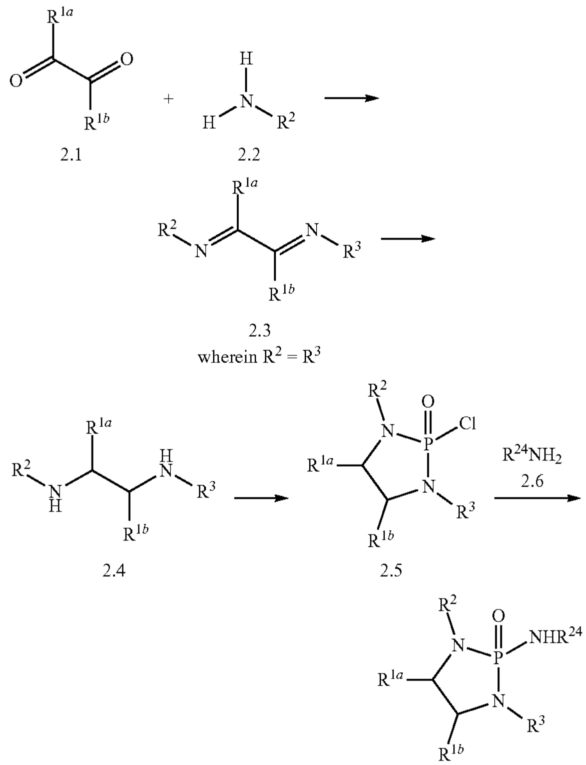

Compounds are represented in generic form, with substituents as noted in compound descriptions elsewhere herein. A more specific example is set forth below.

SCHEME 2B.

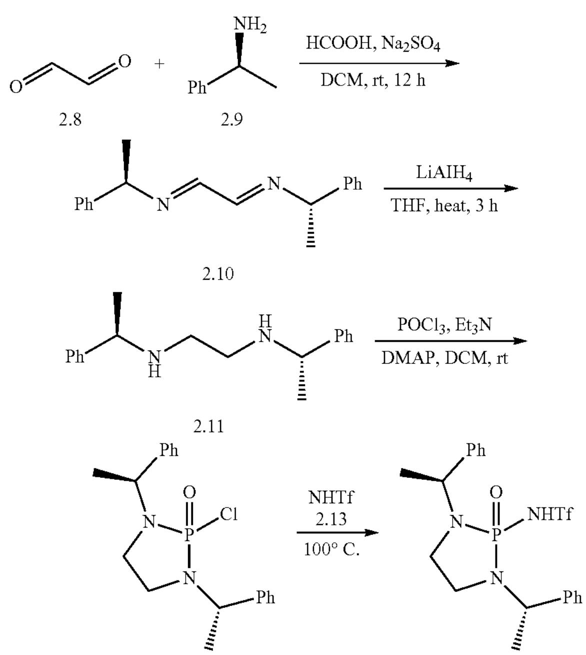

In one aspect, the synthesis of N-heterocyclic phosphorodiamidic acids can begin with an oxalaldehyde derivative and an amine derivative. Oxalaldehyde derivatives and amine derivatives are commercially available or readily prepared by one skilled in the art. Thus, compounds of type 2.14, and similar compounds, can be prepared according to reaction Scheme 2B above. Compounds of type 2.10 can be prepared by imination of an appropriate amine derivative, e.g., 2.9 as shown above, with an appropriate oxalaldehyde derivative, e.g., 2.8 as shown above. The imination is carried out in the presence of an appropriate acid, e.g., formic acid, and an appropriate base, e.g., sodium sulphate, in an appropriate solvent, e.g., dichloromethane, for an appropriate amount of time, e.g., 12 hours. Compounds of type 2.11 can be prepared by reduction of an appropriate imine, e.g., 2.10 as shown above. The reduction is carried out in the presence of an appropriate reducing agent, e.g., lithium aluminium hydride, in an appropriate solvent, e.g., tetrahydrofuran, for an appropriate period of time, e.g., 3 hours. Compounds of type 2.12 can be prepared by cyclization of an appropriate diamine, e.g., 2.10 as shown above. The cyclization is carried out in the presence of an appropriate phosphorous trihalide, e.g., $POCl_3$ as shown above, an appropriate base, e.g., triethylamine, and an appropriate activating agent, e.g., 4-dimethylaminopyridine. Compounds of type 2.14 can be prepared by nucleophilic substitution of an appropriate halide, e.g., 2.12 as shown above, with an appropriate amine, e.g., 2.13 as shown above. The nucleophilic substitution is carried out at an appropriate temperature, e.g., 100° C. As can be appreciated by one skilled in the art, the above reaction provides an example of a generalized approach wherein compounds similar in structure to the specific reactants above (compounds similar to compounds of type 2.1, 2.2, 2.3, 24, 2.5, and 2.6), can be substituted in the reaction to provide substituted N-heterocyclic phosphorodiamidic acids similar to Formula 2.7.

3. Route III

In one aspect, substituted N-heterocyclic phosphorodiamidic acids can be prepared as shown below.

SCHEME 3A.

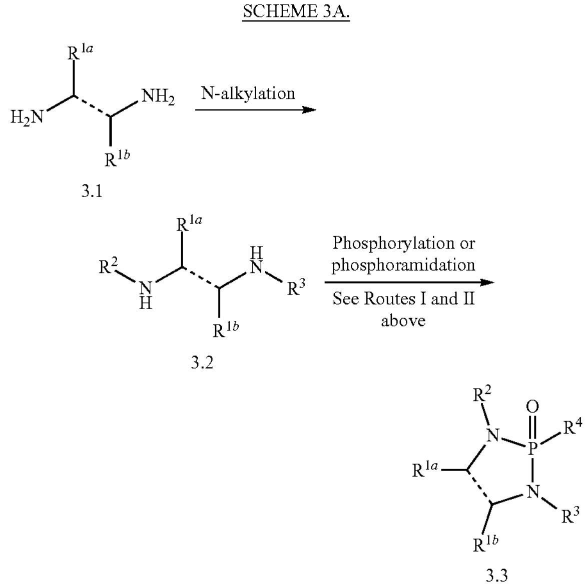

SCHEME 3B.

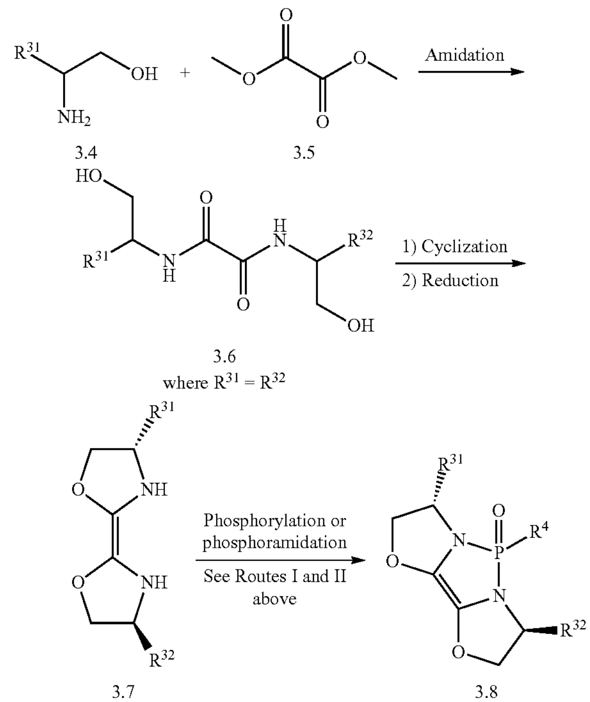

SCHEME 3C.

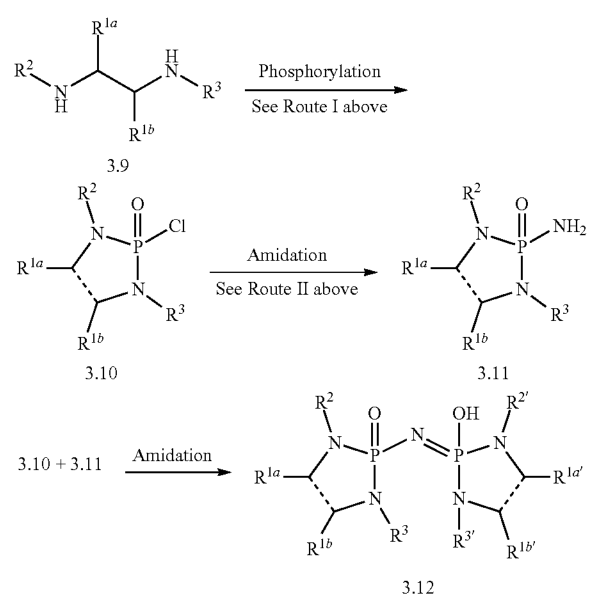

Compounds are represented in generic form, with substituents as noted in compound descriptions elsewhere herein.

E. Methods of Making Diaryl and Arylalkyl Phosphonates

Organophosphonate compounds and their derivatives have shown a wide range of applications in medicinal chemistry (Mucha et al. (2011) *J. Med. Chem.* 54: 5955-5980; McGrath et al. (2013) *Nat Rev Micro* 11: 412-419; Horsman and Zechel (2017) *Chem. Rev.* 117: 5704-5783), agrochenmistry (Nowack, B. (2003) *Water Res.* 37: 2533-2546; Duke and Powles (2008) *Pest Manage. Sci.* 64: 319-325), and organic synthesis (Martin and Buchwald (2008)*Acc. Chem. Res.* 41: 1461-1473). In particular, diaryl phosphonates exhibit a broad spectrum of significant biological activities such as human prostatic acid phosphatase inhibition (Schwender et al. (1996) *Bioorg. Med Chem. Lett.* 6: 311-314), leukocyte elastase inhibition (Durette and MacCoss (1992) U.S. Pat. No. 5,104,862), and calcium antagonistic activity (Younes et al. (1993) *Eur. J. Med. Chem.* 28: 943-948). They are also used for the preparation of chemiluminescence materials (Motoyoshiya et al. (2003) *J. Org. Chem.* 68: 5950-5955) and flame retardants (Harada et al. (2014) E.P. Patent No. EP2681281 A1). In addition, they serve as versatile building blocks for the synthesis of vinyl-based functional compounds such as fluorescent materials (Chiang et al. (2005) *Org. Lett.* 7: 3717-3720) and OLED emitters (Mao et al. (2009)*Mater. Chem.* Phys. 115: 378-384).

Although Michaelis-Arbuzov reaction represents a classic method for diaryl phosphonate synthesis, this procedure is limited to alkyl halide substrates and elevated reaction temperatures (Demmer et al. (2011) *Chem. Rev.* 111: 7981-8006; Bhattacharya and Thyagarajan (1981) *Chem. Rev.* 81: 415-430; Michaelis and Kaehne (1898) *Ber. Dtsch. Chem. Ges.* 31: 1048-1055; Arbuzov, A. (1906) *J. Russ. Phys. Chem. Soc* 38: 687). To overcome these limitations, much effort has been devoted to develop new synthetic methods for constructing diaryl phosphonates. For example, the Chakravarty group reported $FeCl_3$-mediated Friedel-Crafts-type arylation of α-hydroxy phosphonates with various arenes, which requires a stoichiometric amount of $FeCl_3$ (Pallikonda and Chakravarty (2013) *Eur. J. Org. Chem.* 2013: 944-951). On the other hand, Walsh and co-workers disclosed Pd-catalyzed deprotonative cross-coupling reaction of benzyl phosphonates with aryl halides (Montel et al. (2014) *Org. Lett.* 16: 1446-1449). This protocol, however, is restricted to only benzyl diisopropyl phosphonate substrate due to the use of nucleophilic base. Recently, the 1,6-hydrophosphonylation of para-quinone methides (p-QMs) for the construction of diaryl phosphonates under metal-free conditions was disclosed (Arde and Vijaya Anand (2016) *Org. Biomol. Chem.* 14: 5550-5554; Molleti and Kang (2017) *Org. Lett.* 19: 958-961). Nonetheless, for the facile synthesis and inherent instability of p-QMs (Saleh and Tashtoush (1998) *Tetrahedron* 54: 14157-14177), a di-tert-butyl group on p-QM derivatives is necessary, which may decrease the synthetic value of the product with extra steps for removal of the protecting group. Considering the prevalent applications in many different fields, the development of an efficient, mild synthetic protocol for diaryl phosphonates under metal-free conditions is highly desirable.

While the p-QMs have been extensively used in the phospha-Michael reaction (Arde and Vijaya Anand (2016) *Org. Biomol. Chem.* 14: 5550-5554; Molleti and Kang (2017) *Org. Lett.* 19: 958-961), ortho-quinone methides (o-QMs), isomeric p-QM counterparts, have remained underexplored Michael acceptors. Since the pioneering work by Fries and Kann in 1907 (Fries and Kann (1097) *Liebigs Ann. Chem.* 353: 335-356), o-QMs have been regarded as highly versatile synthetic intermediates in organic synthesis (Wang and Sun (2015) *Synthesis* 47: 3629-3644; Van De Water and Pettus (2002) *Tetrahedron* 58: 5367-5405; Amouri and Le Bras (2002) *Acc. Chem. Res.* 35: 501-510; Bai et al. (2014) *Acc. Chem. Res.* 47: 3655-3664). They have been utilized in various synthetic transformations such as [4+n] cycloaddition reaction (Wang et al. (2017) *Org. Lett.* 19: 4126-4129; Wang and Sun (2017) *Org. Lett.* 19: 2334-2337; Jaworski and Scheidt (2016)*J. Org. Chem.* 81: 10145-10153; Deng et al. (2017) *J. Org. Chem.* 32: 5433-5440; Jiang et al. (2017) *Adv. Synth. Catal.* 359: 1-7; Mei et al. (2017) *Chem. Commun.* 53: 2768-2771; Rodriguez et al. (2016) *Org. Lett.* 18: 4514-4517; Izquierdo et al. (2013) *J. Am. Chem. Soc.* 135: 10634-10637; Lv et al. (2013) *Angew. Chem., Int. Ed.* 52: 8607-8610; Wang et al. (2017) *J. Org. Chem.* 82: 1790-1795), Michael addition reaction (Jaworski and Scheidt (2016) *J. Org. Chem.* 81: 10145-10153), 6π-electrocyclization (Song et al. (2017) *Chem. Commun.* 53: 6021-6024; Zeng et al. (2014) *Chem. Sci.* 5: 2277-2281; Carbone et al. (2012) *J. Org. Chem.* 77: 9179-9189; George et al. (2010) *Org. Lett.* 12: 3532-3535; Malerich et al. (2005) *J Am. Chem. Soc.* 127: 6276-6283) and others (Van De Water et al. (2002) *Tetrahedron* 58: 5367-5405; Bai et al. (2014) *Acc. Chem. Res.* 47: 3655-3664). Among the synthetic transformations, Michael addition reaction of o-QMs or aza-o-QMs with different nucleophiles, including carbon, nitrogen (Osipov et al. (2017) *Synthesis* 49: 2286-2296; Veldhuyzen et al. (2001) *J. Am. Chem. Soc.* 123: 11126-11132), sulfur and oxygen nucleophiles (Lai et al. (2015) *Org. Lett.* 17: 6058-6061; Lai and Sun (2016) *Synlett* 27: 555-558; Chatupheeraphat et al. (2016) *Angew. Chem., Int. Ed.* 55: 4803-4807; Guo et al. (2015) *Angew. Chem., Int. Ed.* 54: 4522-4526), has become an efficient synthetic strategy for the direct synthesis of diverse ortho-hydroxybenzyl or 2-aminobenzyl compounds.

Despite the successful application of carbon and various heteroatom nucleophiles (Izquierdo et al. (2013) *J. Am. Chem. Soc.* 135: 10634-10637; Lv et al. (2013) *Angew. Chem., Int. Ed.* 52: 8607-8610; Lewis et al. (2015) *Org. Lett.* 17: 2278-2281; Huang and Hayashi (2015) *J. Am. Chem. Soc.* 137: 7556-7559; Luan and Schaus (2012) *J. Am. Chem. Soc.* 134: 19965-19968; El-Sepelgy et al. (2014) *Angew. Chem., Int. Ed.* 53: 7923-7927; Hsiao et al. (2014) *Angew. Chem., Int. Ed.* 53: 13258-13263; Saha et al. (2015) *Chem. Commun.* 51: 1461-1464; Zhao et al. (2015) *Angew. Chem., Int. Ed.* 54: 1910-1913; Grayson and Goodman (2015) *J. Org. Chem.* 80: 2056-2061; Mattson and Scheidt (2007) *J. Am. Chem. Soc.* 129: 4508-4509), phospha-Michael reaction of trialkylphosphites with o-QMs has remained dormant since its discovery, due to the challenge of the in-situ transformation of P(III) to P(V) (Ibrahem et al. (2008) *Adv. Synth. Catal.* 350: 1875-1884; Maerten et al. (2007). *J. Org. Chem.* 72: 8893-8903). This oxidation process is an utmost important step to establish a catalytic cycle and typically requires extra nucleophilic additives (Ibrahem et al. (2008) *Adv. Synth. Catal.* 350: 1875-1884; Maerten et al. (2007)*J. Org. Chem.* 72: 8893-8903), which can make the reaction more complex. In this regard, in situ generation of the advantageous nucleophiles for the transformation of P(III) to P(V) would be an ideal strategy.

With the continued efforts to develop NHP-derived catalysts, N-heterocyclic phosphorodiamidic acids (NHPAs) were synthesized and their exceptional catalytic activity in phospha-Michael reactions discovered. Herein, the NHPA-catalyzed phospha-Michael addition reaction of o-QMs with trialkylphosphites and dialkyl phenylphosphonites for the synthesis of diaryl phosphonates and phosphinates, respectively, is disclosed. Without wishing to be bound by theory, this transformation demonstrates the first diastereoselective phospha-Michael addition reaction of dialkyl phenylphosphites to o-QMs (FIG. 1).

Thus, in one aspect, the disclosed NHPAs are useful in making diaryl and arylalkyl phosphonates as further disclosed herein. The diaryl and arylalkyl phosphonates of this invention can be prepared by employing reactions as shown in the following schemes, in addition to other standard manipulations that are known in the literature, exemplified in the experimental sections or clear to one skilled in the art. For clarity, examples having a single substituent are shown where multiple substituents are allowed under the definitions disclosed herein.

1. Route I

In one aspect, quinone methides can be prepared as shown below.

SCHEME 4A.

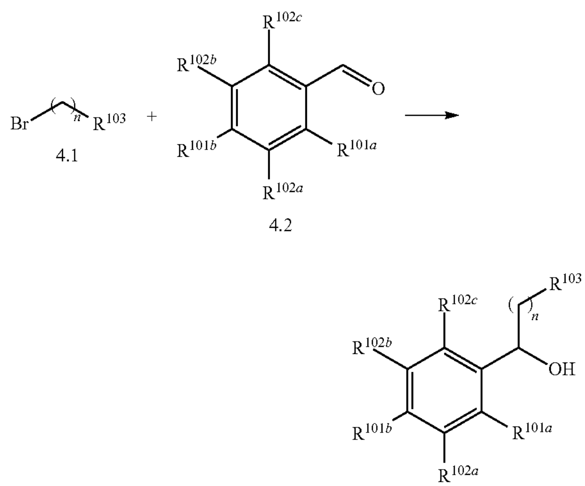
4.1 4.2 4.3

Compounds are represented in generic form, with substituents as noted in compound descriptions elsewhere herein. A more specific example is set forth below.

SCHEME 4B.

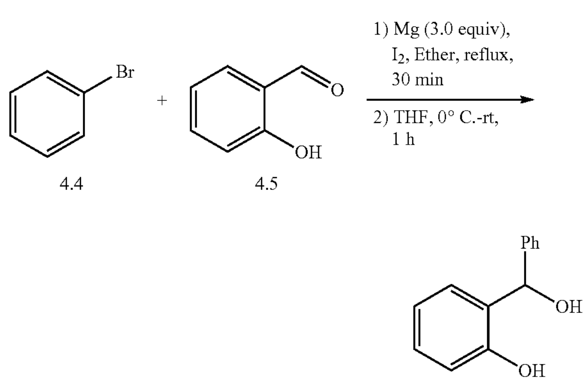

4.4 4.5 4.6

In one aspect, the synthesis of quinone methides can begin with a benzaldehyde derivative and an alkyl or aryl halide. Benzaldehyde derivatives and alkyl or aryl halides are commercially available or readily prepared by one skilled in the art. Thus, compounds of type 4.6 and similar compounds can be prepared according to reaction Scheme 4B above. Compounds of type 4.6 can be prepared by a Grignard reaction of an appropriate benzaldehyde derivative, e.g., 4.5 as shown above, and an appropriate alkyl or aryl halide, e.g., 4.4 as shown above. The Grignard reaction is carried out in the presence of magnesium metal and an appropriate activating agent, e.g., iodide, in an appropriate solvent, e.g., ether, for an appropriate period of time, e.g., 30 minutes, followed by addition of an appropriate solvent, e.g., tetrahydrofuran, for an appropriate period of time, e.g., 1 hour. As can be appreciated by one skilled in the art, the above reaction provides an example of a generalized approach wherein compounds similar in structure to the specific reactants above (compounds similar to compounds of type 4.1 and 4.2), can be substituted in the reaction to provide substituted quinone methides similar to Formula 4.3.

2. Route II

In one aspect, diaryl and arylalkyl phosphonates can be prepared as shown below.

SCHEME 5A.

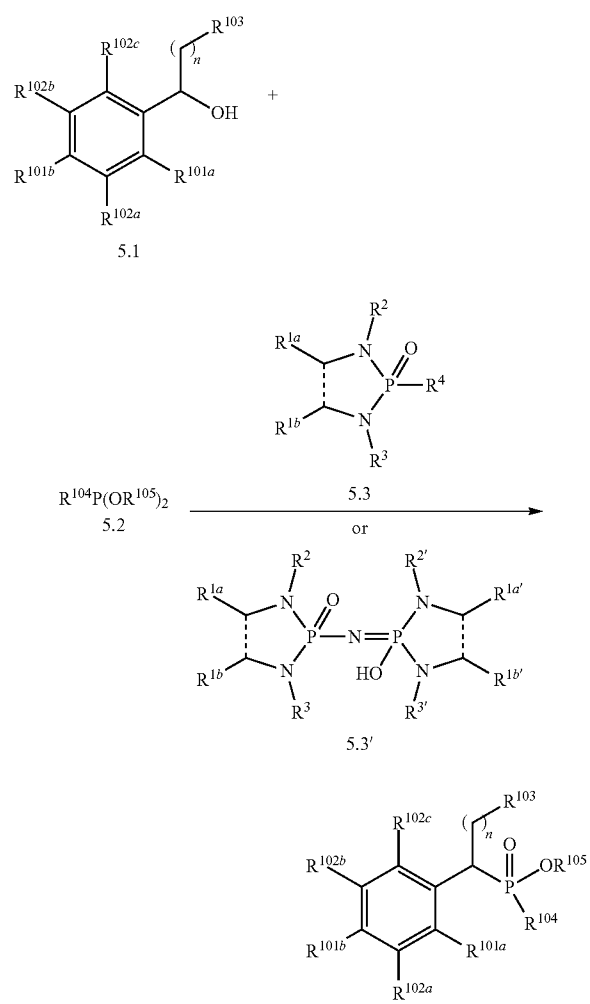

5.1 5.2 5.3 5.3′ 5.4

Compounds are represented in generic form, with substituents as noted in compound descriptions elsewhere herein. A more specific example is set forth below.

SCHEME 5B.

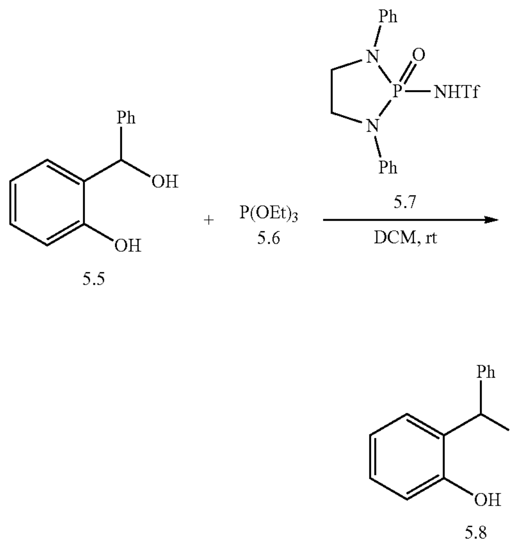

In one aspect, the synthesis of diaryl and arylalkyl phosphonates can begin with a quinone methide derivative. Quinone methide derivatives are commercially available or readily prepared by one skilled in the art. Thus, compounds of type 5.8, and similar compounds, can be prepared according to reaction Scheme 5B above. Compounds of type 5.8 can be prepared by a phospha-Michael addition reaction of an appropriate quinone methide derivative, e.g., 5.5 as shown above, and an appropriate trialkyl phosphite or appropriate dialkylphenyl phosphite, e.g., 5.6 as shown above. Appropriate trialkyl phosphites and appropriate dialkylphenyl phosphites are commercially available or readily prepared by one skilled in the art. The phospha-Michael addition reaction is carried out in the presence of an appropriate N-heterocyclic phosphorodiamidic acid as disclosed herein, e.g., 5.7 as shown above, in an appropriate solvent, e.g., dichloromethane. As can be appreciated by one skilled in the art, the above reaction provides an example of a generalized approach wherein compounds similar in structure to the specific reactants above (compounds similar to compounds of type 5.1, 5.2, 5.3, and 5.3'), can be substituted in the reaction to provide substituted diaryl and arylalkyl phosphonates similar to Formula 5.4.

F. Additional Exemplary Methods of Using N-Heterocyclic Phosphorodiamidic Acids Without wishing to be bound by theory, the disclosed NHPAs are useful in the synthesis of a variety of building blocks of pharmaceuticals and biologically significant small molecules. Thus, in various aspects, the disclosed NHPAs are useful in synthetic reactions including, but not limited to, the dimerization of quinone methides, the fluorination of quinone methides, the tandem cyclization of quinone methides, and nucleophilic substitution reactions.

1. Route I

In one aspect, substituted N-heterocyclic phosphorodiamidic acids can be used to catalyze the dimerization of quinone methides as shown below.

SCHEME 6A.

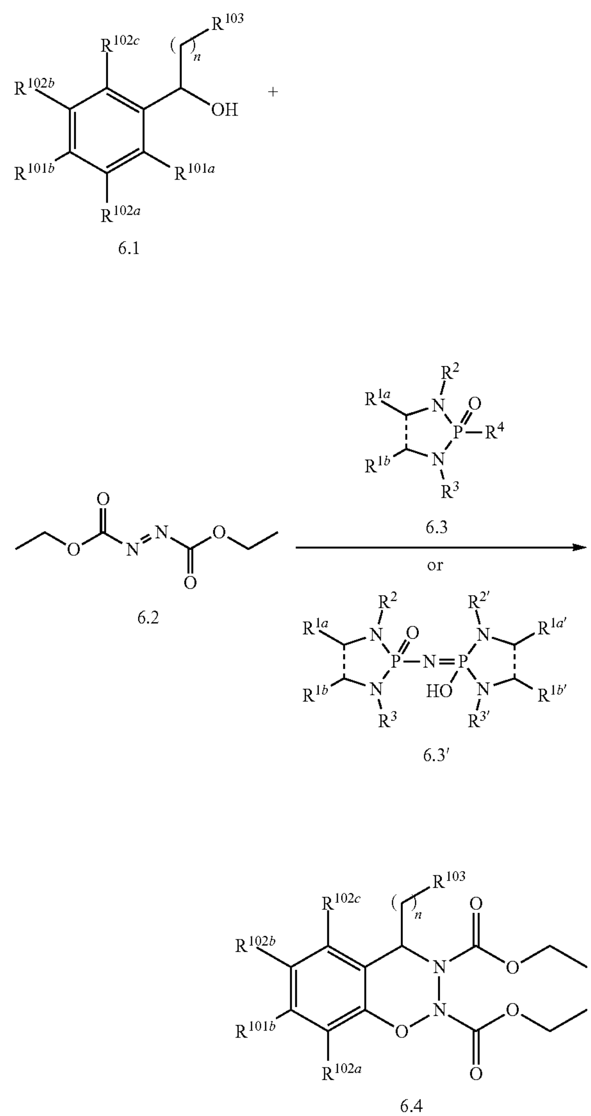

Compounds are represented in generic form, with substituents as noted in compound descriptions elsewhere herein. A more specific example is set forth below.

SCHEME 6B.

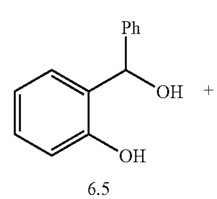

-continued

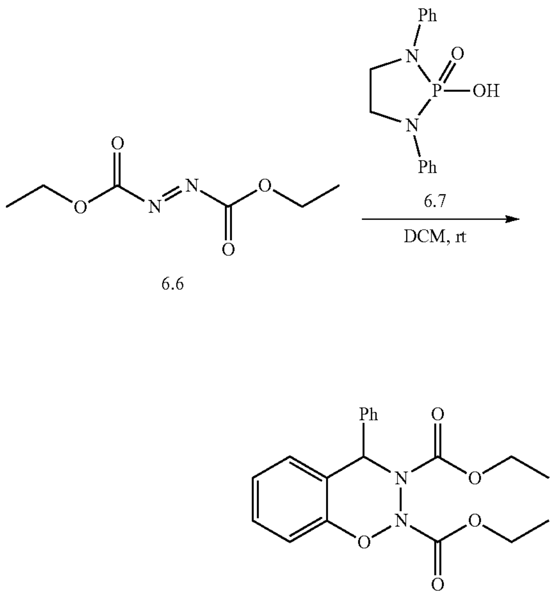

6.6

6.8

In one aspect, compounds of type 6.8, and similar compounds, can be prepared according to reaction Scheme 6B above. Compounds of type 6.8 can be prepared by dimerization of an appropriate quinone methide, e.g., 6.5 as shown above. Appropriate quinone methide derivatives are commercially available or readily prepared by one skilled in the art. The dimerization is carried out in the presence of an appropriate dicarbamate, e.g., 6.6 as shown above, and an appropriate N-heterocyclic phosphorodiamidic acid as disclosed herein, e.g., 6.7 as shown above. As can be appreciated by one skilled in the art, the above reaction provides an example of a generalized approach wherein compounds similar in structure to the specific reactants above (compounds similar to compounds of type 6.1, 6.2, 6.3, and 6.3'), can be substituted in the reaction to provide substituted dimerized quinone methides similar to Formula 6.4.

2. Route II

In one aspect, substituted N-heterocyclic phosphorodiamidic acids can be used to catalyze a nucleophilic substitution reaction as shown below.

SCHEME 7A.

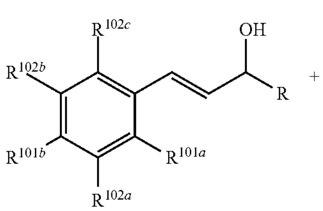

7.1

-continued

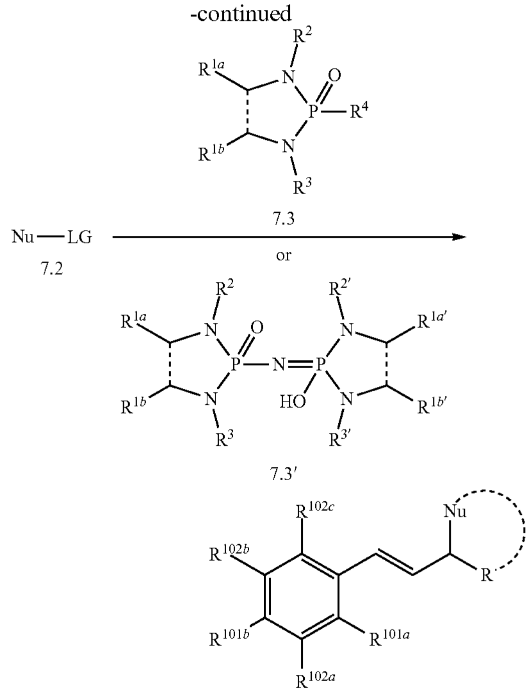

7.4

Compounds are represented in generic form, with substituents as noted in compound descriptions elsewhere herein and wherein R is alkyl, for example, a C1-C4 alkyl, Nu is a nucleophile, and LG is a leaving group. A more specific example is set forth below.

SCHEME 7B.

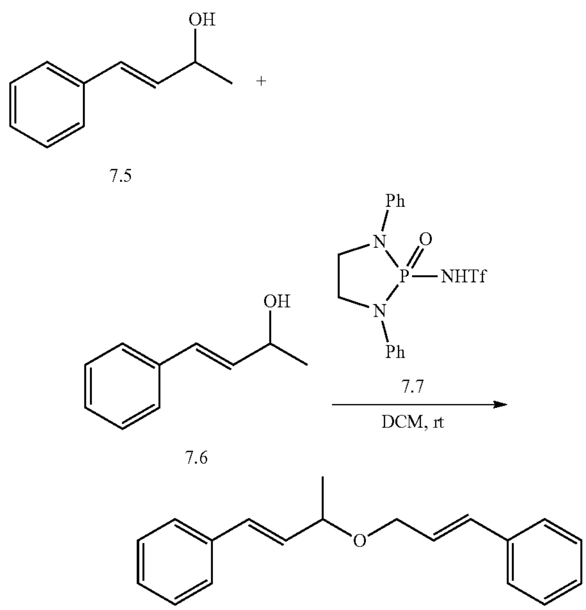

7.8

In one aspect, compounds of type 7.8, and similar compounds, can be prepared according to reaction Scheme 7B above. Compounds of type 7.8 can be prepared by nucleophilic substitution of an appropriate allyl alcohol, e.g., 7.5 as shown above. Appropriate allyl alcohols are commercially available or readily prepared by one skilled in the art. The nucleophilic substitution is carried out in the presence of an appropriate nucleophile, e.g., 7.6 as shown above, and an appropriate N-heterocyclic phosphorodiamidic acid as disclosed herein, e.g., 7.7 as shown above. As can be appreciated by one skilled in the art, the above reaction provides an example of a generalized approach wherein compounds similar in structure to the specific reactants above (compounds similar to compounds of type 7.1, 7.2, and 7.3), can be substituted in the reaction to provide substituted aryl derivatives similar to Formula 7.4.

Examples of aryl derivatives that can be prepared using a disclosed NHPA catalyst include, but are not limited to:

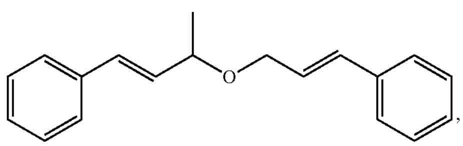

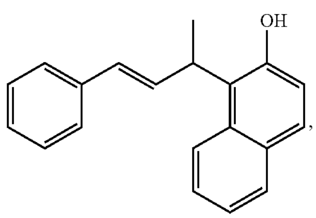

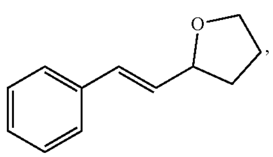

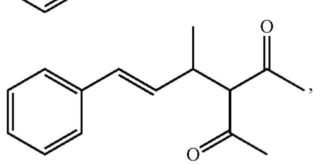

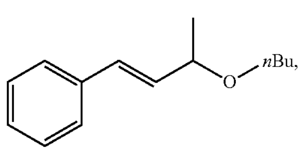

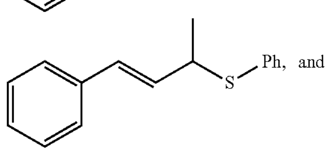

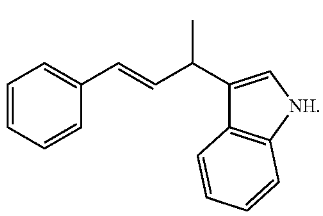

Thus, in one aspect, exemplary aryl derivatives that can be prepared using a disclosed NHPA catalyst can be selected from

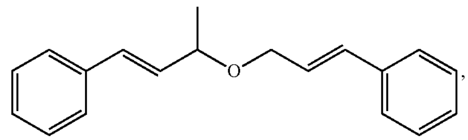

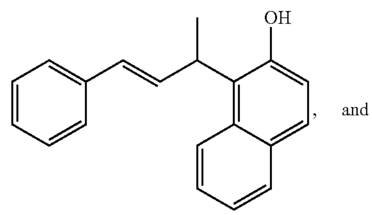

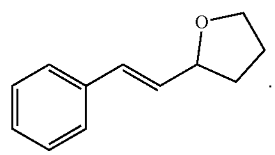

In a further aspect, exemplary aryl derivatives that can be prepared using a disclosed NHPA catalyst can be selected from

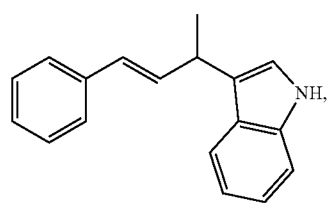

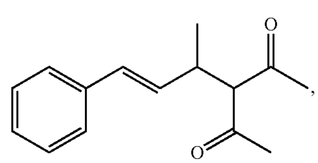

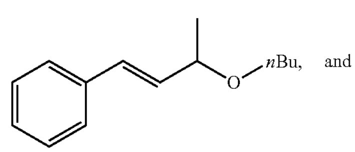

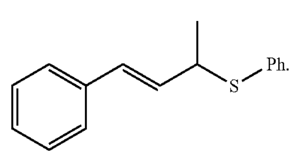

3. Route III

In one aspect, substituted N-heterocyclic phosphorodiamidic acids can be prepared as shown below.

Scheme 8A.
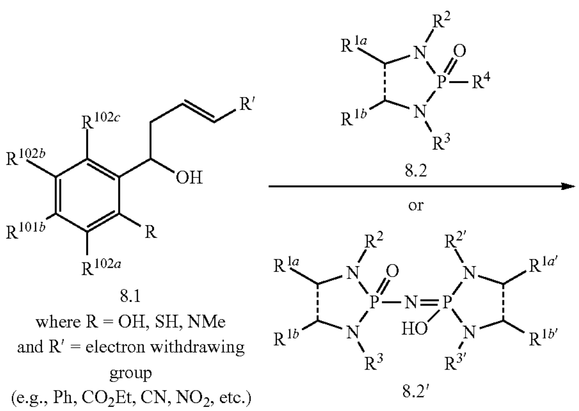
8.1
where R = OH, SH, NMe
and R′ = electron withdrawing group
(e.g., Ph, $CO_2Et$, CN, $NO_2$, etc.)
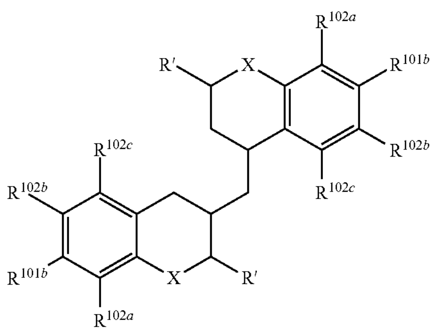
8.3
where X = O, S, NMe
Scheme 8B.
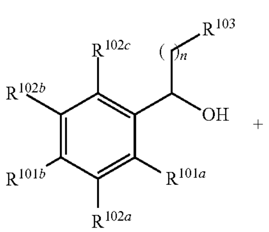
8.4
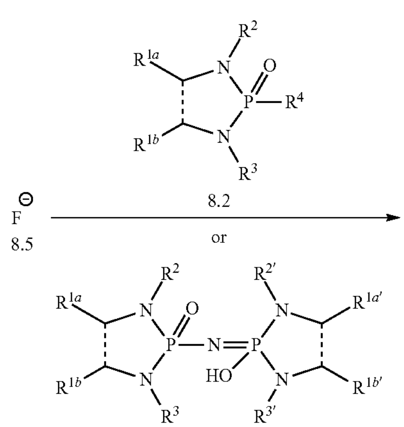
-continued
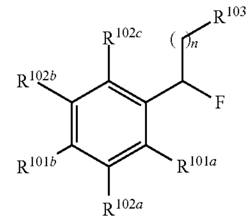
8.6
Scheme 8C.
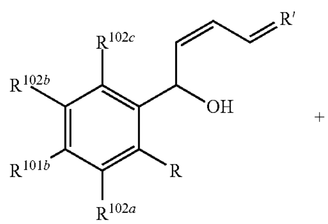
8.7
where R = OH, SH, or NMe
and R′, R″, and R‴ = electron withdrawing group
(e.g., Ph, $CO_2Et$, CN, $NO_2$, etc.)
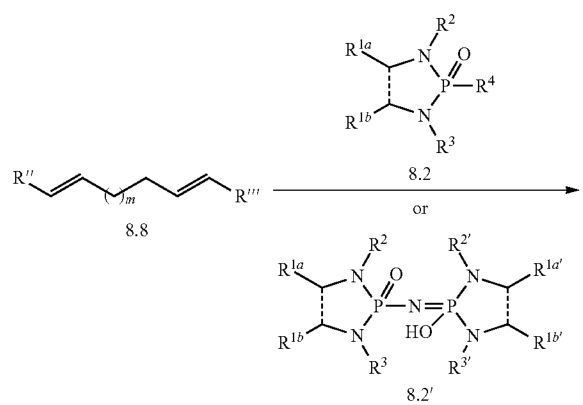
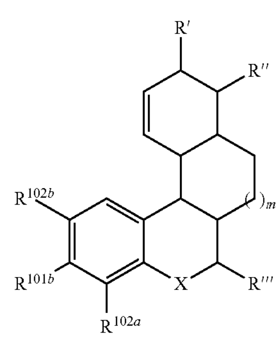
8.9
where X = O, S, NMe
Compounds are represented in generic form, with substituents as noted in compound descriptions elsewhere herein.

G. Examples

The following examples are put forth so as to provide those of ordinary skill in the art with a complete disclosure and description of how the compounds, and/or methods disclosed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The Examples are provided herein to illustrate the invention, and should not be construed as limiting the invention in any way. Examples are provided herein to illustrate the invention and should not be construed as limiting the invention in any way.

1. Chemistry Experimental a. General Experimental

All reactions were carried out under atmospheric conditions in oven-dried glassware with magnetic stirring bar. Dry solvents (THF, toluene, and DCM) were obtained by solvent purification system under argon. All commercially available reagents were used as received without further purification. Purification of reaction products was carried out by flash column chromatography using silica gel 60 (230-400 mesh). Analytical thin layer chromatography was performed on 0.25 mm aluminum-backed silica gel 60-F plates. Visualization was accompanied with UV light and $KMnO_4$ solution. Concentration under reduced pressure refers to the removal of volatiles using a rotary evaporator attached to a dry diaphragm pump (10-15 mm Hg) followed by pumping to a constant weight with an oil pump (<300 mTorr). Infrared (IR) spectra were recorded on an IR spectrometer with KBr wafers or a film on KBr plate. High-resolution mass spectra (HRMS) were recorded on LCMS-IT-TOF mass spectrometer using ESI (electrospray ionization). $^{1}H$ NMR spectra were recorded in $CDCl_3$ on 400 MHz NMR spectrometer. The $^{1}H$ chemical shifts are referenced to residual solvent signals at δ 7.26 ($CHCl_3$) or δ 0.00 (TMS). $^{1}H$ NMR coupling constants (J) are reported in Hertz (Hz) and multiplicities are indicated as follows: s (singlet), bs (broad singlet), d (doublet), t (triplet), m (multiplet), dd (doublet of doublet), dt (doublet of triplet). $^{13}C$ NMR spectra were proton decoupled and recorded in $CDCl_3$ on 100.5 MHz NMR spectrometer. The $^{13}C$ chemical shifts are referenced to solvent signals at δ 77.16 ($CDCl_3$). $^{31}P$ NMR spectra were proton decoupled and recorded in $CDCl_3$ on 162 MHz NMR spectrometer. $^{31}P$ chemical shifts are reported relative to 85% $H_3PO_4$ (0.00 ppm) as an external standard.

b. General Procedure for the Synthesis of N-Heterocyclic Phosphorodiamidic Acids (NHPAs)

A rapid access to target catalysts with high tunability of electronic and steric properties is exceedingly important to facilitate the discovery of new synthetic transformations. In order to develop highly tunable Bronsted acid catalysts, readily available ethylene diamines were used to synthesize the NHPA. The synthesis of N-phosphonyl chloride with various substituents proceeded smoothly with ethylene diamines and $POCl_3$ in the presence of $Et_3N$. The hydrolysis reaction of the N-phosphonyl chloride with NaOH provided the target NHPA (Scheme 9). Without wishing to be bound by theory, this modular synthesis enables fast approach to sterically and electronically diverse NHPAs such as, for example, NHPAs having Ph, 4-MeOPh, 4-FPh, and tert-butyl substituents on the nitrogen atom. Notably, the NHPA with alkyl substituents on the nitrogen atom is less stable than that with aryl groups, which can be due, for example, to the destabilization of the NHPA.

Scheme 9.

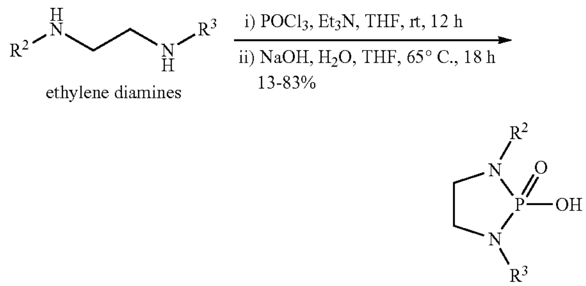

To a solution of $N^1,N^2$-diphenylethane-1,2-diamine (1.02 g, 5.0 mmol) in anhydrous THF (20 mL) were added $Et_3N$ (1.36 mL, 10 mmol), and $POCl_3$ (511 μL, 5.5 mmol) at 0° C. After stirring for 24 h at room temperature, a 15 N NaOH solution (0.7 mL) were added. The mixture was refluxed for 12 h at 65° C. (oil bath). After stirring for 12 h at 65° C., the reaction mixture was cooled down to room temperature and then concentrated under reduced pressure. The resulting mixture was dissolved in $H_2O$ (10 mL), and the $H_2O$ solution was washed with DCM (3×5 mL) and then neutralized with 3 N HCl to give a white precipitate. The white precipitate was filtered to give the pure 2-hydroxy-1,3-diphenyl-1,3,2-diazaphospholidine 2-oxide (NHPA1) as a white solid: 581 mg, 53% yield.

i. 2-Hydroxy-1,3-diphenyl-1,3,2-diazaphospholidine 2-oxide (NHPA1)

NHPA1

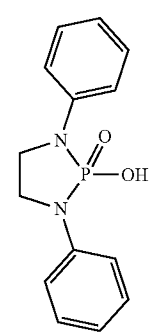

mp 235° C. (decomposed); $R_f$=0.1 ($\nu_{DCM}/\nu_{MeOH}$=95:5); IR ν(KBr, $cm^{-1}$) 3414, 3059, 2958, 2904, 1600, 1500, 1288, 1176, 1126, 964, 748; $^{1}H$ NMR (400 MHz, d-DMSO) δ 7.33 (t, J=8.4 Hz, 4H), 7.19 (d, J=7.6 Hz, 4H), 6.95 (t, J=7.2 Hz, 2H), 3.69 (d, J=8.4 Hz, 4H); $^{13}C$ NMR (100.5 MHz, d-DMSO) δ 142.3 (d, J=6.7 Hz), 129.5, 121.1, 116.0 (d, J=4.5 Hz), 41.8 (d, J=12.6 Hz); $^{31}P$ NMR (162 MHz, d-DMSO): δ 23.82 ppm; HRMS (ESI): m/z calcd. for $C_{14}H_{15}N_2O_2P$ ([M−H]$^-$): 273.0798. Found: 273.0798.

ii. 2-Hydroxy-1,3-bis(4-methoxyphenyl)-1,3,2-diazaphospholidine 2-oxide (NHPA2)

NHPA2

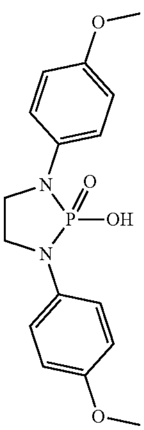

206 mg, 15% yield; white solid; mp 217° C. (decomposed); $R_f$=0.1 ($\nu_{DCM}/\nu_{MeOH}$=95:5); IR ν(KBr, $cm^{-1}$) 3414, 2951, 2908, 1620, 1512, 1246, 1180, 1033, 972, 817; $^1H$ NMR (400 MHz, d-DMSO) δ 7.09 (d, J=8.8 Hz, 4H), 6.89 (d, J=8.8 Hz, 4H), 3.69 (s, 6H), 3.59 (d, J=8.84 Hz, 4H); $^{13}C$ NMR (100.5 MHz, d-DMSO) δ 154.2, 135.8 (d, J=6.0 Hz), 117.4 (d, J=4.5 Hz), 114.9, 55.7, 42.3 (d, J=12.6 Hz); $^{31}P$ NMR (162 MHz, d-DMSO): δ 23.81 ppm; HRMS (ESI): m/z calcd. for $C_{16}H_{19}N_2O_4P$ ($[M-H]^-$): 333.1010. Found: 333.1008.

iii. 1,3-Bis(4-fluorophenyl)-2-hydroxy-1,3,2-diazaphospholidine 2-oxide (NHPA3)

NHPA3

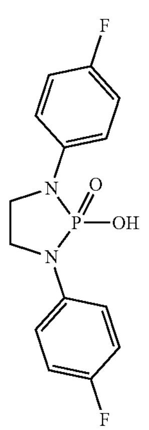

1.02 g, 83% yield; white solid; mp 241° C. (decomposed); $R_f$=0.1 ($\nu_{DCM}/\nu_{MeOH}$=95:5); IR ν(KBr, $cm^{-1}$) 3066, 2955, 2893, 1620, 1508, 1276, 1230, 1184, 972, 817; $^1H$ NMR (400 MHz, d-DMSO) δ 7.09 (d, J=8.8 Hz, 4H), 6.89 (d, J=8.8 Hz, 4H), 3.69 (s, 6H), 3.59 (d, J=8.84 Hz, 4H); $^{13}C$ NMR (100.5 MHz, d-DMSO) δ 157.4 (d, J=235.9 Hz), 138.7 (dd, J=7.4, 2.2 Hz), 117.5 (dd, J=7.4, 4.4 Hz), 116.1 (d, J=22.3 Hz), 42.2 (d, J=11.9 Hz); $^{31}P$ NMR (162 MHz, d-DMSO): δ 23.80 ppm; HRMS (ESI): m/z calcd. for $C_{14}H_{13}N_2O_2F_2P$ ($[M-H]^-$): 309.0610. Found: 309.0620.

iv. 1,3-Di-tert-butyl-2-hydroxy-1,3,2-diazaphospholidine 2-oxide (NHPA4)

NHPA4

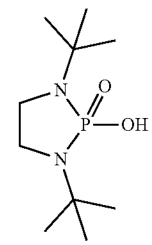

168 mg, 15% yield; white solid; mp 131-132° C.; $R_f$=0.1 ($\nu_{DCM}/\nu_{MeOH}$=95:5); IR ν(KBr, $cm^{-1}$) 3448, 2974, 2870, 1639, 1377, 1226, 1126, 1060, 952; $^1H$ NMR (400 MHz, $CDCl_3$) δ 11.37 (br, 1H), 3.11 (d, J=10.0 Hz, 4H), 1.34 (s, 9H); $^{13}C$ NMR (100.5 MHz, $CDCl_3$) δ 52.9 (d, J=3.7 Hz), 39.8 (d, J=4.2 Hz), 28.3 (d, J=3.8 Hz); $^{31}P$ NMR (162 MHz, $CDCl_3$): δ 28.5 ppm; HRMS (ESI): m/z calcd. for $C_{10}H_{23}N_2O_2P$ ($[M-H]^-$): 233.1424. Found: 233.1432.

v. 1,1,1-Trifluoro-N-(2-oxido-1,3-diphenyl-1,3,2-diazaphospholidin-2-yl)methanesulfonamide (Cat. A2)

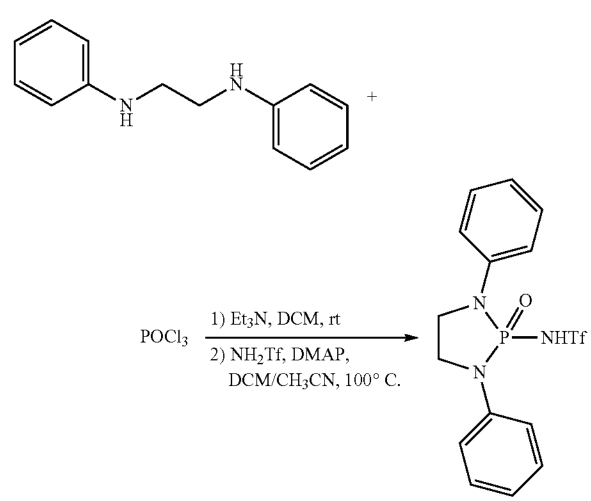

cat. A2

To a solution of $N^1,N^2$-diphenylethane-1,2-diamine (211 mg, 1.0 mmol) in anhydrous CH2Cl2 (10 mL) were added Et3N (0.56 mL, 4.0 mmol), and $POCl_3$ (100 μL, 1.1 mmol) at 0° C. After stirring for 24 h at room temperature, anhydrous $CH_3CN$ (15 mL), DMAP (122 mg, 1.0 mmol) and $TfNH_2$ (149 mg, 1.0 mmol) were added. The mixture was refluxed for 12 h at 100° C. (oil bath) and cooled to r.t. $H_2O$ (5 mL) and $CH_2Cl_2$ (10 mL) were added and the mixture washed successively with saturated $NaHCO_3$ (10 mL), 6 N HCl (2×5 mL), dried over anhydrous $Na_2SO_4$, and concentrated. The residue was washed with small amount of $CH_2Cl_2$ to give pure product (A2) as a white solid: 213 mg, 53%; $^1H$ NMR (400 MHz, $CDCl_3$) δ 7.32-7.27 (m, 8H), 7.16-7.10 (m, 2H), 4.09-4.03 (m, 2H), 3.88-3.81 (m, 2H);

$^{13}C$ NMR (100 MHz, $CDCl_3$) δ 139.3, 129.6, 123.4, 117.5 (d, J=5.2 Hz), 42.6 (d, J=4.9 Hz); $^{19}F$ NMR (376 MHz, $CDCl_3$) δ −77.98.

c. Dimerization of Quinone Methides Via NHPAs

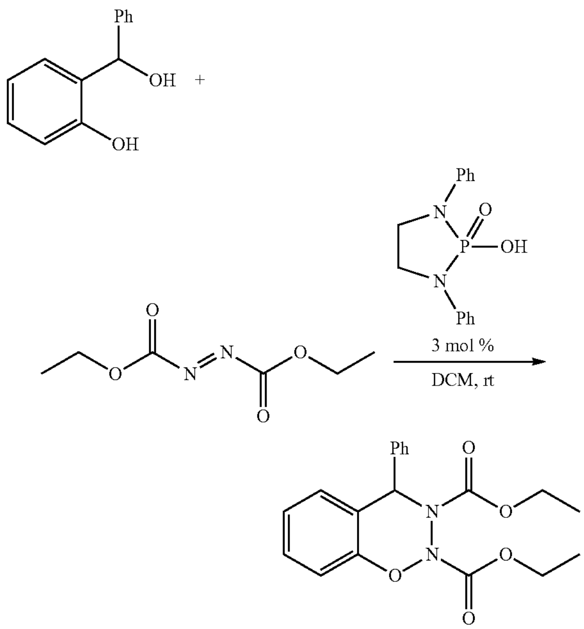

A dry 2 dram Vial was charged with cat. A1 (0.8 mg, 0.003 mmol), 2-(hydroxy(phenyl) methyl)phenol (19.9 mg, 0.1 mmol), (E)-diethyl diazene-1,2-dicarboxylate (14.5 μL, 0.1 mmol) and anhydrous $CH_2Cl_2$ (0.5 mL). The resulting mixture was stirred for 24 h at room temperature. After stirring for 24 h, the volatiles were removed under reduced pressure. The residue was subjected to column chromatography on silica gel to give corresponding product diethyl 4-phenyl-2H-benzo[e][1,2,3]oxadiazine-2,3(4H)-dicarboxylate: 20.5 mg, 58%; $^1H$ NMR (400 MHz, $CDCl_3$) δ 7.37-7.26 (m, 6H), 7.20-7.14 (m, 1H), 7.08-7.04 (m, 1H), 6.98-6.02 (m, 1H), 6.80 (d, J=8.0 Hz, 1H), 4.20-4.10 (m, 4H), 1.25-1.16 (m, 6H); $^{13}C$ NMR (100 MHz, $CDCl_3$) δ 171.3, 154.3, 141.7, 133.6, 128.6, 128.0, 127.3, 126.7, 117.2, 63.0, 62.3, 14.4, 14.2.

d. Nucleophilic Substitution Using NHPAs i. Synthesis of ((1E,1'E)-oxybis(but-1-ene-3,1-diyl)) dibenzene

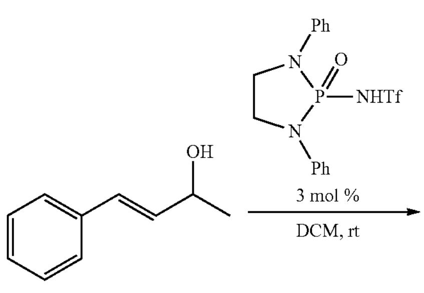

-continued

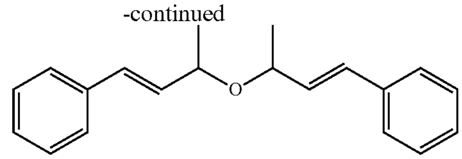

A dry 2 dram Vial was charged with cat. A2 (2.4 mg, 0.003 mmol), (E)-4-phenylbut-3-en-2-ol (29.6 mg, 0.2 mmol) and anhydrous $CH_2Cl_2$ (1.0 mL). The resulting mixture was stirred for 24 h at room temperature. After stirring for 24 h, the volatiles were removed under reduced pressure. The residue was subjected to column chromatography on silica gel to give corresponding product ((1E,1'E)-oxybis(but-1-ene-3,1-diyl))dibenzene: 17.8 mg, 64%; $^1H$ NMR (400 MHz, $CDCl_3$) δ 7.45-7.19 (m, 10H), 6.56-6.46 (m, 2H), 6.23-6.07 (m, 2H), 4.27-4.13 (m, 2H), 1.37-1.28 (m, 6H); $^{13}C$ NMR (100 MHz, $CDCl_3$) δ 136.9, 136.7, 132.6, 132.1, 131.0, 130.2, 128.6, 128.5, 127.6, 127.5, 126.5, 126.4, 73.4, 73.2, 22.3, 21.3.

ii. Synthesis of (E)-1-(4-phenylbut-3-en-2-yl)naphthalen-2-ol

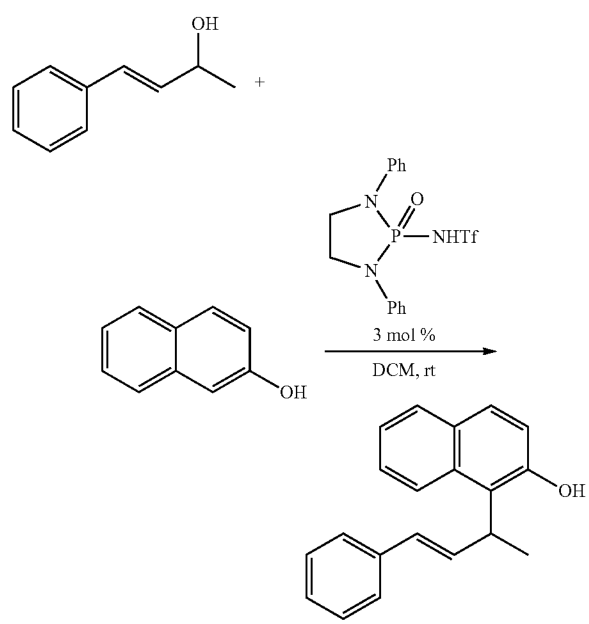

A dry 2 dram Vial was charged with cat. A2 (2.4 mg, 0.003 mmol), (E)-4-phenylbut-3-en-2-ol (29.6 mg, 0.2 mmol), naphthalen-2-ol (29.2 mg, 0.2 mmol) and anhydrous $CH_2Cl_2$ (1.0 mL). The resulting mixture was stirred for 24 h at room temperature. After stirring for 24 h, the volatiles were removed under reduced pressure. The residue was subjected to column chromatography on silica gel to give corresponding product (E)-1-(4-phenylbut-3-en-2-yl)naphthalen-2-ol: 49.4 mg, 90%; $^1H$ NMR (400 MHz, $CDCl_1$) δ 8.04 (d, J=8.8 Hz, 1H), 7.79 (d, J=8.4 Hz, 1H), 7.67 (dd, J=8.8, 1.2 Hz, 1H), 7.51-7.44 (m, 1H), 7.40-7.26 (m, 5H), 7.25-7.19 (m, 1H), 7.06 (dd, J=9.2, 2.4 Hz, 1H), 6.75 (t, J=2.0 Hz, 2H), 4.64-4.61 (m, 1H), 1.62 (t, J=2.0 Hz, 3H); $^{13}C$ NMR (100 MHz, $CDCl_3$) δ 152.3, 136.6, 133.6, 132.5, 130.6, 129.7, 128.9, 128.8, 128.7, 127.7, 126.6, 126.4, 123.1, 122.4, 121.2, 119.3, 33.5, 17.3.

iii. Synthesis of (E)-2-styryltetrahydrofuran

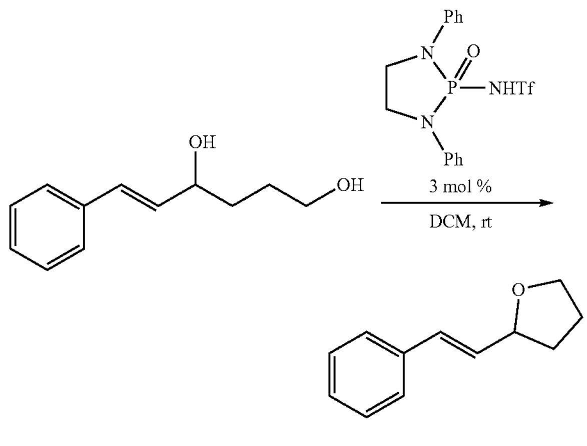

A dry 2 dram Vial was charged with cat. A2 (2.4 mg, 0.003 mmol), (E)-6-phenylhex-5-ene-1,4-diol (20.7 mg, 0.1 mmol) and anhydrous $CH_2Cl_2$ (0.5 mL). The resulting mixture was stirred for 24 h at room temperature. After stirring for 24 h, the volatiles were removed under reduced pressure. The residue was subjected to column chromatography on silica gel to give corresponding product (E)-2-styryltetrahydrofuran: 15.3 mg, 88%; $^1$H NMR (400 MHz, $CDCl_3$) δ 7.39 (d, J=7.3 Hz, 2H), 7.36-7.29 (m, 2H), 7.25-7.20 (m, 1H), 6.60 (d, J=15.8 Hz, 1H), 6.22 (dd, J=6.6, 15.8 Hz, 1H), 4.54-4.46 (m, 1H), 4.07-3.95 (m, 1H), 3.91-3.82 (m, 1H), 2.18-2.11 (m, 1H), 2.04-1.92 (m, 2H), 1.77-1.69 (m, 1H); $^{13}$C NMR (100 MHz, $CDCl_3$) δ 137.0, 130.7, 130.7, 128.7, 127.7, 126.7, 79.9, 68.4, 32.6, 26.1.

e. General Procedure for the Synthesis of 2-Hydroxy (Phenyl)Methyl)Phenol 1

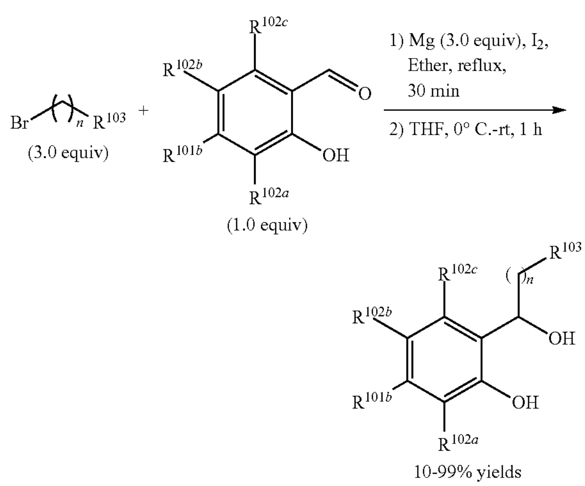

2-((3,4-Dichlorophenyl)(hydroxy)methyl)phenol (11 as example): To a suspension of magnesium (245 mg, 10 mmol) and a crystal of iodine in anhydrous $Et_2O$ (5 mL) was added dropwise a solution of bromobenzene (1.3 mL, 10 mmol) in anhydrous $Et_2O$ (3 mL). The reaction mixture was refluxed for 30 min and then it was cooled down to 0° C. A solution of salicylaldehyde (0.35 mL, 3.3 mmol) in THF (3 mL) was added dropwise to the reaction mixture over 15 min at 0° C. and the reaction mixture was stirred for additional 1 h. After stirring for 1 h, saturated $NH_4C1$ was added dropwise to the reaction mixture at 0° C. and then the resulting solution was extracted with $Et_2O$ (3×10 mL). The combined organic layers were dried over anhydrous sodium sulfate, filtered and concentrated under reduced pressure. The residue was purified by flash column chromatograph on silica gel eluting with Hexane/EtOAc (6/1, v/v) to afford 11 as a white solid (832 mg, 94%).

i. 2-((3,4-Dichlorophenyl)(hydroxy)methyl)phenol (1l)

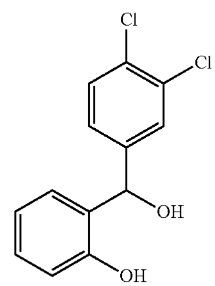

11

832 mg, 94%; white solid; mp 88-89° C.; $R_f$=0.25 ($\nu_{Hexane}/\nu_{EtOAc}$=3:1), $\nu_{Hexane}/\nu_{EtOAc}$ (6/1) for column; IR ν(KBr, $cm^{-1}$) 3448, 1635, 1465, 1381, 1219, 1126, 1022, 756; $^1$H NMR (400 MHz, $CDCl_3$) δ 7.47 (d, J=2.4 Hz, 1H), 7.39 (d, J=8.4 Hz, 1H), 7.23-7.15 (m, 2H), 6.96-6.91 (m, 1H), 6.89-6.83 (m, 2H), 5.91 (s, 1H), 3.20 (br, 1H); $^{13}$C NMR (100.5 MHz, $CDCl_3$) δ 154.8, 142.1, 132.7, 132.0, 130.5, 129.8, 128.6, 128.1, 126.3, 125.9, 120.4, 117.3, 75.0; HRMS (ESI): m/z calcd. for $C_{13}H_{10}O_2Cl_2$ ([M−H]$^-$): 266.9985. Found: 266.9977.

ii. 2-((3,5-Di-tert-butylphenyl)(hydroxy)methyl) phenol (1m)

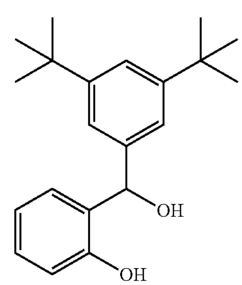

1m 237 mg (starting from 1.0 mmol salicylaldehyde), 76%; white solid; mp 78-79° C.; $R_f$=0.3 ($\nu_{Hexane}/\nu_{EtOAc}$=3:1), $\nu_{Hexane}/\nu_{EtOAc}$ (6/1) for column; IR ν(KBr, $cm^{-1}$) 3421, 2962, 2866, 1604, 1458, 1361, 1246, 1018, 752; $^1$H NMR (400 MHz, $CDCl_3$) δ 8.12 (s, 1H), 7.40 (t, J=2.0 Hz, 1H), 7.24 (d, J=2.0 Hz, 2H), 7.19-7.14 (m, 1H), 6.90 (d, J=8.4 Hz, 1H), 6.80-6.77 (m, 2H), 6.01 (d, J=2.4 Hz, 1H), 2.86 (d, J=2.8 Hz, 1H), 1.31 (s, 18H); $^{13}$C NMR (100.5 MHz, $CDCl_3$) δ 155.8, 151.3, 140.9, 129.2, 128.3, 126.7, 122.4, 121.2, 119.8, 117.1, 77.8, 34.9, 31.4; HRMS (ESI): m/z calcd. for $C_{21}H_{23}O_2$ ([M−H]$^-$): 311.2017. Found: 311.2007.

f. General Procedure for the Synthesis of Diaryl Phosphonates 3

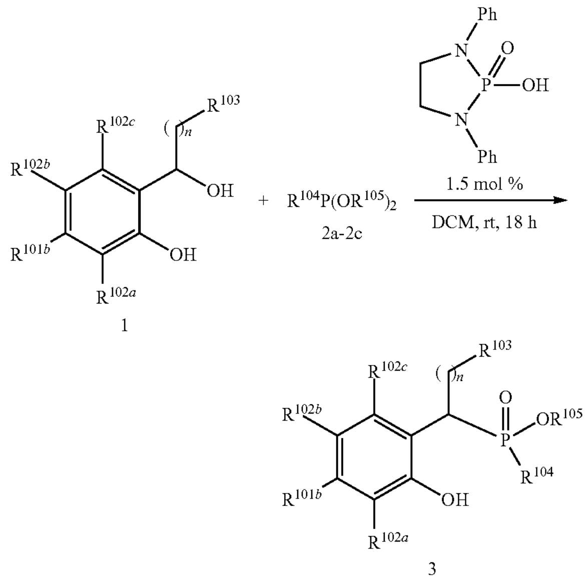

Diethyl ((2-hydroxyphenyl)(phenyl)methyl)phosphonate (3a as example): A mixture of alcohol 1a (20.1 mg, 0.1 mmol), triethyl phosphite 2a (17.6 μL, 0.1 mmol), NHPA1 (0.4 mg, 0.015 mmol) and DCM (0.5 mL) in a 2-dram vial with a PTFE cap was stirred for 18 h at rt. After stirring for 18 h at rt, the reaction mixture was concentrated under reduced pressure. The residue was purified by flash column chromatography ($\nu_{Hexane}/\nu_{EtOAc}$=2:1 as eluent) on silica gel to give the corresponding product 3a.

i. Diethyl ((2-hydroxyphenyl)(phenyl)methyl)phosphonate (3a)

3a

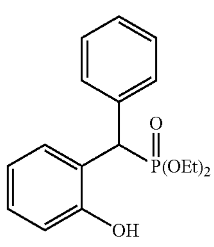

29.3 mg, 91%; white solid; mp 125-126° C.; $R_f$=0.15 ($\nu_{Hexane}/\nu_{EtOAc}$=2:1), $\nu_{Hexane}/\nu_{EtOAc}$ (2/1) for column; IR ν(KBr, $cm^{-1}$) 3414, 3147, 2982, 2901, 1597, 1458, 1199, 1026, 976, 756; $^{1}$H NMR (400 MHz, $CDCl_3$) δ 9.03 (s, 1H), 7.50 (d, J=8.4 Hz, 2H), 7.33 (t, J=6.8 Hz, 2H), 7.30-7.24 (m, 1H), 7.16 (t, J=8.0 Hz, 1H), 7.07 (d, J=7.6 Hz, 1H), 6.99 (d, J=8.0 Hz, 1H), 6.83 (td, J=7.6, 0.8 Hz, 1H), 4.70 (d, J=26.8 Hz, 1H), 4.14-3.78 (m, 4H), 1.30-1.10 (m, 6H); $^{13}$C NMR (100.5 MHz, $CDCl_3$) δ 155.1 (d, J=6.0 Hz), 135.3 (d, J=5.2 Hz), 131.0 (d, J=8.2 Hz), 129.7 (d, J=8.1 Hz), 129.0 (d, J=3.0 Hz), 128.6, 127.3 (d, J=1.4 Hz), 123.3 (d, J=6.0 Hz), 120.9 (d, J=8.6 Hz), 119.5 (d, J=2.2 Hz), 63.9 (d, J=7.5 Hz), 63.3 (d, J=6.7 Hz), 47.6 (d, J=135.5 Hz), 16.2 (d, J=6.0 Hz), 16.1 (d, J=5.9 Hz); $^{31}$P NMR (162 MHz, $CDCl_3$): δ 31.72 ppm; HRMS (ESI): m/z calcd. for $C_{17}H_{21}O_4P$ ($[M-H]^-$): 319.1105. Found: 319.1113.

ii. Diethyl ((2-hydroxy-5-methylphenyl)(phenyl)methyl)phosphonate (3b)

3b

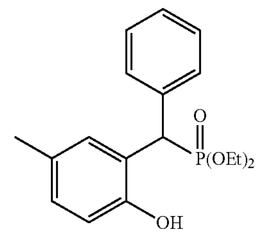

33.2 mg, 99%; white solid; mp 127-129° C.; $R_f$=0.15 ($\nu_{Hexane}/\nu_{EtOAc}$=2:1), $\nu_{Hexane}/\nu_{EtOAc}$ (2/1) for column; IR ν(KBr, $cm^{-1}$) 3414, 3182, 2985, 1612, 1512, 1276, 1219, 1053, 1022, 972, 694; $^{1}$H NMR (400 MHz, $CDCl_3$) δ 8.86 (s, 1H), 7.50 (d, J=6.8 Hz, 2H), 7.33 (t, J=7.2 Hz, 2H), 7.29-7.23 (m, 1H), 7.00 (t, J=8.0 Hz, 1H), 6.89 (d, J=3.6 Hz, 2H), 4.64 (d, J=26.8 Hz, 1H), 4.15-3.77 (m, 4H), 2.19 (s, 3H), 1.19-1.10 (m, 6H); $^{13}$C NMR (100.5 MHz, $CDCl_3$) δ 152.8 (d, J=5.9 Hz), 135.5 (d, J=5.2 Hz), 131.5 (d, J=8.2 Hz), 130.0, 129.7 (d, J=2.2 Hz), 129.6 (d, J=3.0 Hz), 128.6, 127.3 (d, J=1.5 Hz), 122.8 (d, J=5.2 Hz), 119.3 (d, J=2.2 Hz), 63.8 (d, J=6.7 Hz), 63.3 (d, J=7.4 Hz), 47.9 (d, =J 135.5 Hz), 20.5, 16.1 (d, J=6.0 Hz), 16.0 (d, J=5.9 Hz); $^{31}$P NMR (162 MHz, $CDCl_3$): δ 31.74 ppm; HRMS (ESI): m/z calcd. for $C_{18}H_{23}O_4P$ ($[M+H]^+$): 335.1407. Found: 335.1411.

iii. Diethyl ((2-hydroxy-5-methoxyphenyl)(phenyl)methyl)phosphonate (3c)

3c

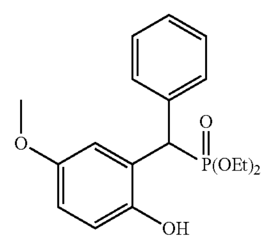

33.3 mg, 95%; colorless oil; $R_f$=0.1 ($\nu_{Hexane}/\nu_{EtOAc}$=2:1), $\nu_{Hexane}/\nu_{EtOAc}$ (2/1) for column; IR ν(KBr, $cm^{-1}$) 3414, 3178, 2982, 1597, 1508, 1435, 1207, 1026, 972, 698; $^{1}$H NMR (400 MHz, $CDCl_3$) δ 8.54 (br, 1H), 7.53-7.48 (m, 2H), 7.33 (t, J=8.4 Hz, 2H), 7.29-7.24 (m, 1H), 6.92 (d, J=8.8 Hz, 1H), 6.74-6.67 (m, 2H), 4.73 (d, J=26.4 Hz, 1H), 4.12-3.80 (m, 4H), 3.68 (s, 3H), 1.19-1.11 (m, 6H); $^{13}$C NMR (100.5 MHz, $CDCl_3$) δ 153.6 (d, J=1.4 Hz), 148.8 (d, J=5.9 Hz), 135.2 (d, J=4.5 Hz), 129.7 (d, J=8.2 Hz), 128.7, 127.4 (d, J=1.5 Hz), 124.3 (d, J=5.9 Hz), 119.9 (d, J=2.2 Hz), 116.3 (d, J=8.2 Hz), 113.8 (d, J=3.0 Hz), 63.9 (d, J=7.5 Hz), 63.2 (d, J=6.7 Hz), 55.6, 47.1 (d, J=136.2 Hz), 16.2 (d, J=5.9 Hz), 16.1 (d, J=6.0 Hz); $^{31}$P NMR (162 MHz, $CDCl_3$): δ 31.07 ppm; HRMS (ESI): m/z calcd. for $C_{18}H_{23}O_5P$ ($[M+H]^+$): 351.1356. Found: 351.1354.

iv. Diethyl ((5-chloro-2-hydroxyphenyl)(phenyl) methyl)phosphonate (3d)

3d

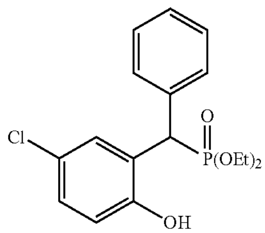

31.9 mg, 90%; white solid; nip 129-130° C.; $R_f$=0.15 ($\nu_{Hexane}$/$\nu_{EtOAc}$=2:1), $\nu_{Hexane}$/$\nu_{EtOAc}$ (2/1) for column; IR ν(KBr, $cm^{-1}$) 3414, 3128, 2985, 1620, 1496, 1423, 1219, 1195, 1049, 1022, 979, 698; $^1$H NMR (400 MHz, $CDCl_3$) δ 9.18 (s, 1H), 7.50 (d, J=7.2 Hz, 2H), 7.33 (t, J=7.6 Hz, 2H), 7.30-7.24 (m, 1H), 7.18 (d, J=1.6 Hz, 1H), 7.09-7.04 (m, 1H), 6.85 (d, J=7.6 Hz, 1H), 4.77 (d, J=26.4 Hz, 1H), 4.13-3.82 (m, 4H), 1.20-1.12 (m, 6H); $^{13}$C NMR (100.5 MHz, $CDCl_3$) δ 153.7 (d, J=5.9 Hz), 135.0 (d, J=5.2 Hz), 130.2 (d, J=8.2 Hz), 129.7 (d, J=8.2 Hz), 128.7, 128.6 (d, J=2.2 Hz), 127.5 (d, J=2.2 Hz), 125.1, 124.9 (d, J=5.9 Hz), 119.8 (d, J=1.5 Hz), 64.0 (d, J=7.4 Hz), 63.3 (d, J=7.5 Hz), 46.1 (d, J=136.9 Hz), 16.2 (d, J=6.0 Hz), 16.1 (d, J=5.2 Hz); $^{31}$P NMR (162 MHz, $CDCl_3$): δ 30.76 ppm; HRMS (ESI): m/z calcd. for $C_{17}H_{20}O_4PCl$ ($[M+H]^+$): 355.0860. Found: 355.0853.

v. Diethyl ((5-bromo-2-hydroxyphenyl)(phenyl) methyl)phosphonate (3e)

3e

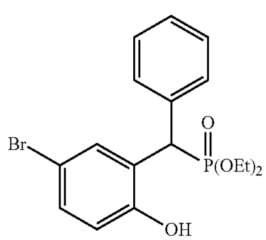

36.6 mg, 92%; white solid; nip 141-142° C.; $R_f$=0.15 ($\nu_{Hexane}$/$\nu_{EtOAc}$=2:1), $\nu_{Hexane}$/$\nu_{EtOAc}$ (2/1) for column; IR ν(KBr, $cm^{-1}$) 3410, 3147, 2985, 1600, 1496, 1419, 1219, 1199, 1049, 1022, 976, 698; $^1$H NMR (400 MHz, $CDCl_3$) δ 9.26 (br, 1H), 7.51-7.42 (m, 2H), 7.38-7.20 (m, 5H), 6.84-6.81 (m, 1H), 4.71 (dd, J=26.4, 5.4 Hz, 1H), 4.15-3.82 (m, 4H), 1.22-1.13 (m, 6H); $^{13}$C NMR (100.5 MHz, $CDCl_3$) δ 154.4 (d, J=6.0 Hz), 134.9 (d, J=4.5 Hz), 133.2 (d, J=8.2 Hz), 131.7 (d, J=3.0 Hz), 129.6 (d, J=8.2 Hz), 128.8, 127.6 (d, J=2.3 Hz), 125.5 (d, J=5.2 Hz), 120.8 (d, J=2.2 Hz), 112.4, 64.0 (d, J=7.4 Hz), 63.3 (d, J=7.4 Hz), 46.8 (d, J=136.2 Hz), 16.2 (d, J=6.0 Hz), 16.1 (d, J=5.9 Hz); $^{31}$P NMR (162 MHz, $CDCl_3$): δ 30.71 ppm; HRMS (EST): m/z calcd. for $C_{17}H_{20}O_4PBr$ ($[M+H]^+$): 399.0355; Found: 399.0353.

vi. Diethyl ((3,5-Di-tert-butyl-2-hydroxyphenyl) (phenyl)methyl) phosphonate (3f)

3f

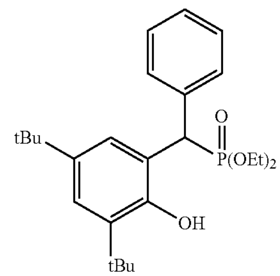

11.0 mg, 25%; colorless oil; $R_f$=0.3 ($\nu_{Hexane}$/$\nu_{EtOAc}$=3:1), $\nu_{Hexane}$/$\nu_{EtOAc}$ (4/1) for column; IR ν(KBr, $cm^{-1}$) 3414, 2958, 1620, 1477, 1269, 1234, 1201, 1033, 964, 698; $^1$H NMR (400 MHz, $CDCl_3$) δ 8.70 (s, 1H), 7.51 (d, J=7.2 Hz, 2H), 7.35 (t, J=7.6 Hz, 2H), 7.28 (1, J=6.8 Hz, 1H), 7.22 (d, J=1.6 Hz, 1H), 6.85 (d, J=2.4 Hz, 1H), 4.80 (d, J=26.0 Hz, 1H), 4.10-3.75 (m, 4H), 1.44 (d, J=1.2 Hz, 9H), 1.18 (d, J=2.0 Hz, 9H), 1.17-1.07 (m, 6H); $^{13}$C NMR (100.5 MHz, $CDCl_3$) δ 151.6 (d, J=5.2 Hz), 142.4, 139.4, 135.5 (d, J=4.4 Hz), 130.0 (d, J=9.0 Hz), 128.5, 127.1 (d, J=8.5 Hz), 125.4 (d, J=6.7 Hz), 123.6 (d, J=6.7 Hz), 123.2 (d, J=3.0 Hz), 63.9 (d, J=8.2 Hz), 63.1 (d, J=6.7 Hz), 47.7 (d, J=134.7 Hz), 35.3, 34.3, 31.5, 29.9, 16.2 (d, J=6.0 Hz), 16.0 (d, J=5.9 Hz); $^{31}$P NMR (162 MHz, $CDCl_3$): δ 32.27 ppm; HRMS (ESI): m/z calcd. for $C_{25}H_{37}O_4P$ ($[M+H]^+$): 433.2502. Found: 433.2505.

vii. Diethyl ((2-hydroxyphenyl)(p-tolyl)methyl)phosphonate (3g)

3g

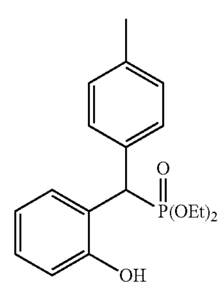

31.4 mg, 94%; white solid; mp 127-128° C.; $R_f$=0.15 ($\nu_{Hexane}$/$\sigma_{EtOAc}$=2:1), $\nu_{Hexane}$/$\nu_{EtOAc}$ (2/1) for column; IR ν(KBr, $cm^{-1}$) 3414, 3136, 2982, 1600, 1458, 1199, 1053, 1026, 964, 756; $^1$H NMR (400 MHz, $CDCl_3$) δ 9.00 (s, 1H), 7.38 (d, J=8.4 Hz, 2H), 7.17-7.07 (m, 4H), 6.97 (d, J=8.0 Hz, 1H), 6.82 (t, J=7.6 Hz, 1H), 4.69 (d, J=26.8 Hz, 1H), 4.15-3.79 (m, 4H), 2.32 (s, 3H), 1.20-1.10 (m, 6H); $^{13}$C NMR (100.5 MHz, $CDCl_3$) δ 155.0 (d, J=5.2 Hz), 140.0, 132.3 (d, J=5.2 Hz), 130.9 (d, J=8.2 Hz), 129.5 (d, J=8.2 Hz), 129.3, 128.9 (d, J=3.0 Hz), 123.5 (d, J=5.9 Hz), 120.8, 119.3 (d, J=2.2 Hz), 63.8 (d, J=7.4 Hz), 63.1 (d, J=6.7 Hz), 47.0 (d, J=136.2 Hz), 21.0, 16.2 (d, J=5.2 Hz), 16.0 (d, J=5.3

Hz); $^{31}$P NMR (162 MHz, $CDCl_3$): δ 31.85 ppm; HRMS (ESI): m/z calcd. for $C_{18}H_{23}O_4P$ ([M−H]$^-$): 333.1261. Found: 333.1263.

viii. Diethyl ((2-hydroxyphenyl)(4-(methylthio)phenyl)methyl)phosphonate (3h)

3h

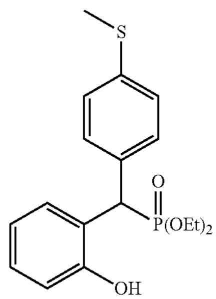

32.9 mg, 90%; white solid; mp 134-135° C.; $R_f$=0.15 ($\nu_{Hexane}/\nu_{EtOAc}$=2:1), $\nu_{Hexane}/\nu_{EtOAc}$ (2/1) for column; IR ν(KBr, cm$^{-1}$) 3414, 3151, 2982, 1597, 1492, 1458, 1199, 1060, 1018, 976, 759; $^1$H NMR (400 MHz, $CDCl_3$) δ 8.88 (s, 1H), 7.42 (d, J=8.0 Hz, 2H), 7.23-7.16 (m, 3H), 7.13 (t, J=6.8 Hz, 1H), 6.94 (d, J=8.0 Hz, 1H), 6.83 (t, J=7.6 Hz, 1H), 4.75 (dd, J=26.4, 2.0 Hz, 1H), 4.14-3.82 (m, 4H), 2.44 (d, J=2.4 Hz, 3H), 1.20-1.10 (m, 6H); $^{13}$C NMR (100.5 MHz, $CDCl_3$) δ 154.9 (d, J=6.7 Hz), 137.5, 132.3 (d, J=5.5 Hz), 130.8 (d, J=8.2 Hz), 130.1 (d, J=8.2 Hz), 128.9 (d, J=2.3 Hz), 126.6, 123.2 (d, J=5.9 Hz), 120.7, 118.7, 63.7 (d, J=6.6 Hz), 63.3 (d, J=6.7 Hz), 45.9 (d, J=136.2 Hz), 16.2 (d, J=6.0 Hz), 16.1 (d, J=5.9 Hz), 15.7; $^{31}$P NMR (162 MHz, $CDCl_3$): δ 31.36 ppm; HRMS (ESI): m/z calcd. for $C_{18}H_{23}O_4PS$ ([M+H]$^+$): 367.1127. Found: 367.1127.

ix. Diethyl ((4-fluorophenyl)(2-hydroxyphenyl) methyl)phosphonate (3i)

3i

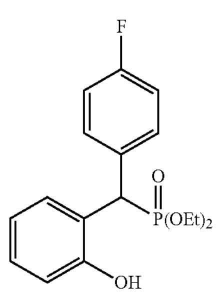

30.4 mg, 90%; white solid; nip 143-145° C.; $R_f$=0.15 ($\nu_{Hexane}/\nu_{EtOAc}$=2:1), $\nu_{Hexane}/\nu_{EtOAc}$ (2/1) for column; IR ν(KBr, cm$^{-1}$) 3410, 3163, 2982, 1600, 1508, 1454, 1219, 1199, 1053, 1026, 976, 759; $^1$H NMR (400 MHz, $CDCl_3$) δ 8.89 (br, 1H), 7.51-7.44 (m, 2H), 7.19-7.08 (m, 2H), 7.05-6.95 (m, 3H), 6.84 (t, J=7.6 Hz, 1H), 4.71 (d, J=26.8 Hz, 1H), 4.14-3.97 (m, 2H), 3.97-3.83 (m, 2H), 1.20-1.10 (m, 6H); $^{13}$C NMR (100.5 MHz, $CDCl_3$) δ 162.0 (d, J=244.9 Hz), 155.0 (d, J=6.0 Hz), 131.3 (d, J=8.1 Hz), 131.2, 130.9 (d, J=8.2 Hz), 129.1 (d, J=2.3 Hz), 123.1 (d, J=6.0 Hz), 120.9, 119.3 (d, J=2.2 Hz), 115.5 (d, J=21.6 Hz), 63.8 (d, J=7.4 Hz), 63.3 (d, J=7.4 Hz), 46.5 (d, J=136.9 Hz), 16.2 (d, J=5.2 Hz), 16.1 (d, J=5.9 Hz); $^{31}$P NMR (162 MHz, $CDCl_3$): δ 31.07 ppm; HRMS (ESI): m/z calcd. for $C_{17}H_{20}O_4FP$ ([M−H]$^-$): 337.1010. Found: 337.1016.

x. Diethyl ((4-chlorophenyl)(2-hydroxyphenyl) methyl)phosphonate (3j)

3j

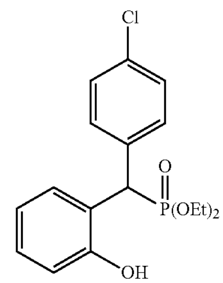

32.9 mg, 93%; white solid; nip 143-145° C.; $R_f$=0.15 ($\nu_{Hexane}/\nu_{EtOAc}$=2:1), $\nu_{Hexane}/\nu_{EtOAc}$ (2/1) for column; IR ν(KBr, cm$^{-1}$) 3414, 3128, 2982, 1604, 1489, 1458, 1215, 1195, 1026, 976, 763; $^1$H NMR (400 MHz, $CDCl_3$) δ 8.81 (s, 1H), 7.44 (d, J=8.4 Hz, 2H), 7.29 (d, J=8.4 Hz, 2H), 7.18-7.12 (m, 2H), 6.95 (d, J=8.4 Hz, 1H), 6.84 (t, J=7.2 Hz, 1H), 4.73 (d, J=26.8 Hz, 1H), 4.15-3.97 (m, 2H), 3.97-3.82 (m, 2H), 1.18 (t, J=7.2 Hz, 3H), 1.13 (t, J=7.2 Hz, 3H); $^{13}$C NMR (100.5 MHz, $CDCl_3$) δ 154.9 (d, J=5.9 Hz), 134.1 (d, J=4.5 Hz), 133.2 (d, J=2.2 Hz), 131.0 (d, J=7.5 Hz), 130.8 (d, J=7.5 Hz), 129.2 (d, J=2.2 Hz), 128.7, 122.8 (d, J=5.2 Hz), 120.9, 119.0 (d, J=1.5 Hz), 63.8 (d, J=7.4 Hz), 63.4 (d, J=6.7 Hz), 46.3 (d, J=136.9 Hz), 16.2 (d, J=5.9 Hz), 16.1 (d, J=6.0 Hz); $^{31}$P NMR (162 MHz, $CDCl_3$): δ 30.90 ppm; HRMS (ESI): m/z calcd. for $C_{17}H_{20}O_4PCl$ ([M+H]$^+$): 355.0860; Found: 355.0860.

xi. Diethyl([1,1'-biphenyl]-4-yl(2-hydroxyphenyl) methyl)phosphonate (3k)

3k

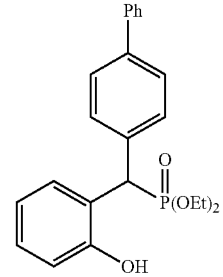

33.6 mg, 85%; white solid; mp 176-177° C.; $R_f$=0.15 ($\nu_{DCM}/\nu_{EtOAc}$=9:1), $\nu_{DCM}/\nu_{EtOAc}$ (10/1) for column; IR ν(KBr, cm$^{-1}$) 3414, 3097, 2985, 1600, 1485, 1458, 1215, 1195, 1049, 1018, 972, 752; $^1$H NMR (400 MHz, $CDCl_3$) δ 7.60-7.56 (m, 6H), 7.46-7.40 (m, 2H), 7.34 (tt, J=7.6, 1.2 Hz, 1H), 7.21-7.15 (m, 1H), 7.10 (dt, J=8.0, 1.2 Hz, 1H), 7.02 (dd, J=8.4, 1.2 Hz, 1H), 6.85 (tt, J=7.2, 1.2 Hz, 1H), 4.72 (d, J=26.8 Hz, 1H), 4.14-4.00 (m, 2H), 4.00-3.84 (m, 2H), 1.23-1.16 (m, 6H); $^{13}$C NMR (100.5 MHz, $CDCl_3$) δ 155.2

(d, J=5.3 Hz), 140.5, 140.1, 134.3, 131.2, 131.0, 130.0 (d, J=7.4 Hz), 129.2 (d, J=2.2 Hz), 128.8, 127.3 (d, J=3.7 Hz), 127.0, 123.2 (d, J=5.9 Hz), 121.0, 119.7 (d, J=1.5 Hz), 63.9 (d, J=7.5 Hz), 63.4 (d, J=6.7 Hz), 47.7 (d, J=135.4 Hz), 16.2 (d, J=6.0 Hz), 16.1 (d, J=5.2 Hz); $^{31}$P NMR (162 MHz, $CDCl_3$): δ 31.67 ppm; HRMS (ESI): m/z calcd. for $C_{23}H_{25}O_4P$ ($[M+H]^+$): 397.1563. Found: 397.1572.

xii. Diethyl ((3,4-dichlorophenyl)(2-hydroxyphenyl) methyl)phosphonate (3l)

3l

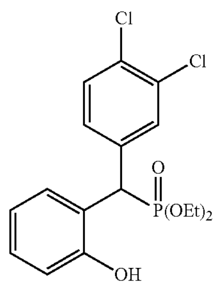

36.2 mg, 93%; white solid; mp 135-136° C.; $R_f$=0.25 ($v_{Hexane}/v_{EtOAc}$=2:1), $v_{Hexane}/v_{EtOAc}$ (2/1) for column; IR ν(KBr, $cm^{-1}$) 3414, 3144, 2985, 1597, 1485, 1458, 1384, 1219, 1195, 1030, 976, 752; $^{1}$H NMR (400 MHz, $CDCl_3$) δ 8.66 (br, 1H), 7.58 (d, J=0.8 Hz, 1H), 7.37 (d, J=1.2 Hz, 2H), 7.27-7.21 (m, 1H), 7.18-7.12 (m, 1H), 6.93 (d, J=8.4 Hz, 1H), 6.85 (t, J=7.2 Hz, 1H), 4.77 (d, J=26.4 Hz, 1H), 4.14-3.98 (m, 2H), 3.98-3.86 (m, 2H), 1.20 (t, J=7.2 Hz, 3H), 1.14 (t, J=7.2 Hz, 3H); $^{13}$C NMR (100.5 MHz, $CDCl_3$) δ 154.8 (d, J=6.7 Hz), 136.1 (d, J=4.5 Hz), 132.4, 131.6 (d, J=8.2 Hz), 131.4 (d, J=2.9 Hz), 130.6 (d, J=7.5 Hz), 130.4, 129.3 (d, J=2.2 Hz), 129.0 (d, J=7.5 Hz), 122.2 (d, J=5.2 Hz), 120.8, 118.5 (d, J=1.4 Hz), 63.7 (d, J=7.4 Hz), 63.6 (d, J=7.4 Hz), 45.1 (d, J=138.4 Hz), 16.2 (d, J=6.0 Hz), 16.1 (d, J=6.0 Hz); $^{31}$P NMR (162 MHz, $CDCl_3$): δ 29.88 ppm; HRMS (ESI): m/z calcd. for $C_{17}H_{19}O_4PCl_2$ ($[M+H]^+$): 389.0471. Found: 389.0468.

xiii. Diethyl ((3,5-di-tert-butylphenyl)(2-hydroxyphenyl)methyl)phosphonate (3m)

3m

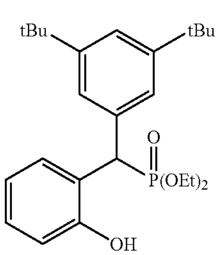

38.0 mg, 88%; white solid; mp 137-138° C.; $R_f$=0.2 ($v_{Hexane}/v_{EtOAc}$=3:1), $v_{Hexane}/v_{EtOAc}$ (3/1) for column; IR ν(KBr, $cm^{-1}$) 3414, 3167, 2962, 1597, 1485, 1458, 1195, 1053, 1026, 972, 756; $^{1}$H NMR (400 MHz, $CDCl_3$) δ 9.19 (d, J=2.8 Hz, 1H), 7.36-7.29 (m, 3H), 7.18-7.11 (m, 1H), 7.06 (d, J=7.6 Hz, 1H), 7.00 (dd, J=8.0, 1.2 Hz, 1H), 6.84-6.78 (m, 1H), 4.68 (dd, J=26.8, 2.4 Hz, 1H), 4.07-3.73 (m, 4H), 1.30 (d, J=2.4 Hz, 18H), 1.16-1.06 (m, 6H); $^{13}$C NMR (100.5 MHz, $CDCl_3$) δ 155.3 (d, J=5.2 Hz), 150.8, 134.0 (d, J=5.2 Hz), 131.0 (d, J=8.2 Hz), 128.9 (d, J=3.0 Hz), 124.2 (d, J=8.2 Hz), 123.5 (d, J=5.9 Hz), 121.1 (d, J=7.8 Hz), 120.8, 119.6 (d, J=2.2 Hz), 63.8 (d, J=7.4 Hz), 63.2 (d, J=7.4 Hz), 48.4 (d, J=134.8 Hz), 34.8, 31.4, 16.2 (d, J=6.0 Hz), 16.1 (d, J=5.3 Hz); $^{31}$P NMR (162 MHz, $CDCl_3$): δ 32.05 ppm; HRMS (ESI): m/z calcd. for $C_{25}H_{37}O_4P$ ($[M+H]^+$): 433.2502; Found: 433.2505.

xiv. Diethyl ((2-hydroxyphenyl)(2-methoxyphenyl) methyl)phosphonate (3n)

3n

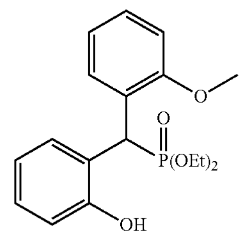

22.3 mg, 64%; white solid; mp 144-145° C.; $R_f$=0.15 ($v_{Hexane}/v_{EtOAc}$=2:1), $v_{Hexane}/v_{EtOAc}$ (2/1) for column; IR ν(KBr, $cm^{-1}$) 3414, 3144, 2985, 1600, 1492, 1458, 1249, 1195, 1030, 968, 756; $^{1}$H NMR (400 MHz, $CDCl_3$) δ 9.00 (s, 1H), 7.89 (d, J=7.6 Hz, 1H), 7.29-7.23 (m, 1H), 7.17-7.10 (m, 2H), 7.03-6.96 (m, 2H), 6.87 (d, J=8.4 Hz, 1H), 6.80 (td, J=7.2, 0.4 Hz, 1H), 5.30 (d, J=26.4 Hz, 1H), 4.08-3.75 (m, 4H), 3.80 (s, 3H), 1.16-1.06 (m, 6H); $^{13}$C NMR (100.5 MHz, $CDCl_3$) δ 156.4 (d, J=10.4 Hz), 155.3 (d, J=5.9 Hz), 130.7 (d, J=4.5 Hz), 130.6, 128.7 (d, J=3.0 Hz), 128.6 (d, J=1.5 Hz), 124.0 (d, J=3.0 Hz), 123.3 (d, J=5.2 Hz), 120.7 (d, J=1.5 Hz), 120.6 (d, J=1.5 Hz), 119.3 (d, J=2.2 Hz), 110.9, 63.8 (d, J=7.4 Hz), 63.0 (d, J=6.7 Hz), 55.7, 38.3 (d, J=138.5 Hz), 16.1 (d, J=6.0 Hz), 16.0 (d, J=5.9 Hz); $^{31}$P NMR (162 MHz, $CDCl_3$): δ 32.55 ppm; HRMS (ESI): m/z calcd. for $C_{18}H_{23}O_5P$ ($[M+H]^+$): 351.1356. Found: 351.1350.

xv. Diethyl ((2-hydroxyphenyl)(naphthalen-2-yl) methyl)phosphonate (3o)

3o

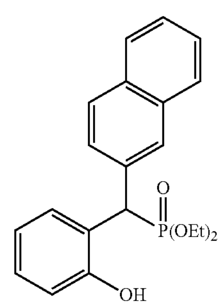

27.8 mg, 75%; white solid; mp 166-168° C.; $R_f$=0.15 ($v_{Hexane}/v_{EtOAc}$=2:1), $v_{Hexane}/v_{EtOAc}$ (2/1) for column; IR ν(KBr, $cm^{-1}$) 3414, 3147, 2982, 1597, 1458, 1222, 1195, 1053, 1022, 976, 752; $^{1}$H NMR (400 MHz, $CDCl_3$) δ 9.05 (s, 1H), 8.00 (s, 1H), 7.85-7.79 (m, 3H), 7.59 (dd, J=8.8, 0.8 Hz, 1H), 7.50-7.44 (m, 2H), 7.20-7.14 (m, 1H), 7.09 (dd, J=7.6, 1.2 Hz, 1H), 7.02 (d, J=8.0 Hz, 1H), 6.82 (t, J=7.6 Hz, 1H), 4.87 (d, J=26.8 Hz, 1H), 4.14-3.80 (m, 4H), 1.20-1.11 (m, 6H); $^{13}C$ NMR (100.5 MHz, $CDCl_3$) δ 155.1 (d, J=5.2 Hz), 133.4, 132.8 (d, J=4.4 Hz), 132.5 (d, J=1.5 Hz), 131.1 (d, J=7.4 Hz), 129.1 (d, J=2.2 Hz), 128.6 (d, J=8.9 Hz), 128.3, 128.0, 127.7 (d, J=8.1 Hz), 127.5, 126.1 (d, J=8.2 Hz), 123.4 (d, J=6.0 Hz), 121.0, 119.6 (d, J=2.2 Hz), 64.0 (d, J=7.4 Hz), 63.3 (d, J=7.5 Hz), 47.9 (d, J=135.5 Hz), 16.2 (d, J=5.2 Hz), 16.1 (d, J=5.2 Hz); $^{31}P$ NMR (162 MHz, $CDCl_3$): δ 31.64 ppm; HRMS (ESI): m/z calcd. for $C_{21}H_{23}O_4P$ ($[M+H]^+$): 371.1407. Found: 371.1394.

xvi. Diethyl ((2-hydroxyphenyl)(thiophen-3-yl) methyl)phosphonate (3p)

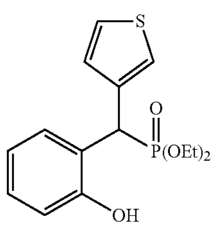

3p 25.4 mg, 78%; white solid; mp 180-181° C.; $R_f$=0.15 ($\nu_{Hexane}/\nu_{EtOAc}$=2:1), $\nu_{Hexane}/\nu_{EtOAc}$ (2/1) for column; IR ν(KBr, $cm^{-1}$) 3414, 3140, 2985, 1604, 1458, 1195, 1053, 1026, 979, 756; $^{1}H$ NMR (400 MHz, $CDCl_3$) δ 9.03 (br, 1H), 7.30 (dt, J=5.2, 0.8 Hz, 1H), 7.26 (s, 1H), 7.21-7.16 (m, 2H), 7.00 (dd, J=8.4, 1.2 Hz, 1H), 6.96 (dd, J=5.6, 1.2 Hz, 1H), 6.86 (t, J=7.6 Hz, 1H), 5.22 (d, J=27.2 Hz, 1H), 4.16-3.84 (m, 4H), 1.21-1.15 (m, 6H); $^{13}C$ NMR (100.5 MHz, $CDCl_3$) δ 155.0 (d, J=4.5 Hz), 132.1 (d, J=6.7 Hz), 131.0 (d, J=8.2 Hz), 129.5 (d, J=2.2 Hz), 129.2 (d, J=1.4 Hz), 126.1 (d, J=2.3 Hz), 122.1, 121.0, 119.8 (d, J=2.3 Hz), 112.0 (d, J=2.6 Hz), 64.3 (d, J=7.5 Hz), 63.8 (d, J=6.7 Hz), 42.9 (d, J=141.7 Hz), 16.2 (d, J=6.0 Hz), 16.1 (d, J=5.9 Hz); $^{31}P$ NMR (162 MHz, $CDCl_3$): δ 29.26 ppm; HRMS (ESI): m/z calcd. for $C_{15}H_{19}O_4PS$ ($[M+H]^+$): 327.0814. Found: 327.0810.

xvii. Diethyl (1-(2-hydroxyphenyl)pentyl)phosphonate (3q)

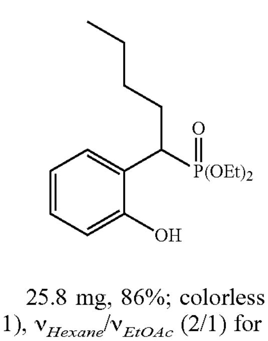

3q 25.8 mg, 86%; colorless oil; $R_f$=0.15 ($\nu_{Hexane}/\nu_{EtOAc}$=2:1), $\nu_{Hexane}/\nu_{EtOAc}$ (2/1) for column; IR ν(KBr, $cm^{-1}$) 3410, 3182, 2958, 1600, 1458, 1222, 1199, 1057, 1030, 968, 752; $^{1}H$ NMR (400 MHz, $CDCl_3$) δ 8.78 (s, 1H), 7.21-7.14 (m, 1H), 7.03 (dd, J=7.6, 1.2 Hz, 1H), 6.96 (d, J=8.0 Hz, 1H), 6.86 (td, J=7.6, 0.8 Hz, 1H), 4.16-4.06 (m, 2H), 4.03-3.92 (m, 1H), 3.84-3.73 (m, 1H), 3.17-3.04 (m, 1H), 2.24-2.10 (m, 1H), 2.01-1.08 (m, 1H), 1.40-1.07 (m, 10H), 0.84 (t, J=6.8 Hz, 3H); $^{13}C$ NMR (100.5 MHz, $CDCl_3$) δ 155.7 (d, J=5.2 Hz), 131.3, 128.8 (d, J=3.0 Hz), 122.1 (d, J=8.0 Hz), 120.6, 119.5 (d, J=3.0 Hz), 63.3 (d, J=6.7 Hz), 62.6 (d, J=7.4 Hz), 29.9 (d, J=4.1 Hz), 26.3 (d, J=3.0 Hz), 22.2, 16.4 (d, J=5.9 Hz), 16.1 (d, J=5.3 Hz), 13.8; $^{31}P$ NMR (162 MHz, $CDCl_3$): δ 35.76 ppm; HRMS (ESI): m/z calcd. for $C_{15}H_{25}O_4P$ ($[M+H]^+$): 301.1563. Found: 301.1569.

xviii. Diethyl(1-(2-hydroxyphenyl)-2-phenylethyl) phosphonate (3r)

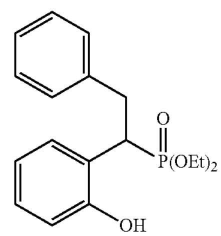

3r 26.0 mg, 78%; colorless oil; $R_f$=0.2 ($\nu_{Hexane}/\nu_{EtOAc}$=2:1), $\nu_{Hexane}/\nu_{EtOAc}$ (2/1) for column; IR ν(KBr, $cm^{-1}$) 3410, 3167, 2982, 1600, 1458, 1222, 1199, 1057, 1030, 968, 752; $^{1}H$ NMR (400 MHz, $CDCl_3$) δ 8.93 (br, 1H), 7.17-7.07 (m, 4H), 7.00 (d, J=7.2 Hz, 2H), 6.95 (d, J=8.0 Hz, 1H), 6.75 (d, J=7.6 Hz, 1H), 6.70 (t, J=7.2 Hz, 1H), 4.18-4.09 (m, 2H), 4.02-3.90 (m, 1H), 3.78-3.66 (m, 1H), 3.47-3.28 (m, 3H), 1.34 (t, J=7.2 Hz, 3H), 1.06 (t, J=7.2 Hz, 3H); $^{13}C$ NMR (100.5 MHz, $CDCl_3$) δ 155.7 (d, J=5.2 Hz), 138.9 (d, J=5.9 Hz), 131.7 (d, J=8.2 Hz), 129.0 (d, J=3.0 Hz), 128.8, 128.1, 126.2, 121.6 (d, J=5.9 Hz), 120.6, 119.5 (d, J=3.0 Hz), 63.6 (d, J=6.7 Hz), 62.7 (d, =7.4 Hz), 33.1 (d, J=2.2 Hz), 16.3 (d, J=6.0 Hz), 16.1 (d, J=5.2 Hz); $^{31}P$ NMR (162 MHz, $CDCl_3$): δ 34.64 ppm; HRMS (ESI): m/z calcd. for $C_{18}H_{23}O_4P$ ($[M+H]^+$): 333.1261. Found: 333.1254.

xix. Diethyl 2-hydroxybenzylphosphonate (3s)

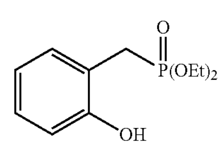

3s 22.0 mg, 91%; colorless oil; $R_f$=0.15 ($\nu_{Hexane}/\nu_{EtOAc}$=2:1), $\nu_{Hexane}/\nu_{EtOAc}$ (2/1) for column; IR ν(KBr, $cm^{-1}$) 3410, 3182, 2985, 1597, 1458, 1265, 1219, 1053, 1026, 968, 756; $^{1}H$ NMR (400 MHz, $CDCl_3$) δ 8.57 (br, 1H), 7.16 (tt, J=7.6, 2.0 Hz, 1H), 7.06 (dt, J=7.6, 1.6 Hz, 1H), 6.97 (d, J=8.4 Hz, 1H), 6.86 (t, J=7.6 Hz, 1H), 4.14-3.96 (m, 4H), 3.19 (d, J=20.8 Hz, 2H), 1.25 (t, J=6.8 Hz, 6H); $^{13}C$ NMR (100.5 MHz, $CDCl_3$) δ 155.6, 131.3 (d, J=8.2 Hz), 128.9 (d, J=3.7 Hz), 120.8 (d, J=3.0 Hz), 118.9 (d, J=3.0 Hz), 118.6 (d, J=8.9 Hz), 63.0 (d, J=7.4 Hz), 29.9 (d, J=137.7 Hz), 16.3 (d, J=6.0 Hz); $^{31}P$ NMR (162 MHz, $CDCl_3$): δ 32.74 ppm; HRMS (ESI): m/z calcd. for $C_{11}H_{17}O_4P$ ($[M-H]^-$): 243.0792. Found: 243.0791.

xx. Dimethyl ((2-hydroxyphenyl)(phenyl)methyl)phosphonate (3u)

3u

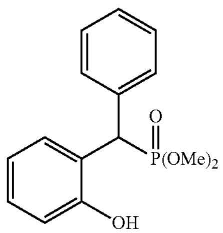

29.1 mg, 99%; white solid; mp 162-163° C.; $R_f$=0.15 ($v_{Hexane}/v_{EtOAc}$=1:1), $v_{Hexane}/v_{EtOAc}$ (1/1) for column; IR v(KBr, $cm^{-1}$) 3414, 3136, 2955, 1600, 1492, 1458, 1219, 1195, 1037, 1026, 833, 763; $^1$H NMR (400 MHz, $CDCl_3$) δ 7.52-7.47 (m, 2H), 7.35 (t, J=7.2 Hz, 2H), 7.31-7.27 (m, 1H), 7.21-7.15 (m, 1H), 7.08 (dt, J=7.6, 1.6 Hz, 1H), 7.00 (d, J=7.6 Hz, 1H), 6.85 (t, J=7.6 Hz, 1H), 4.72 (d, J=26.8 Hz, 1H), 3.64 (d, J=10.8 Hz, 3H), 3.59 (d, J=10.8 Hz, 3H); $^{13}$C NMR (100.5 MHz, $CDCl_3$) δ 155.0 (d, J=5.2 Hz), 135.0, 131.1 (d, J=8.2 Hz), 129.6 (d, J=8.2 Hz), 129.2 (d, J=2.3 Hz), 128.8, 127.5 (d, J=1.4 Hz), 123.0 (d, J=6.0 Hz), 121.1, 119.6 (d, J=2.2 Hz), 54.4 (d, J=7.5 Hz), 53.6 (d, J=7.4 Hz), 47.2 (d, J=135.4 Hz); $^{31}$P NMR (162 MHz, $CDCl_3$): δ 33.87 ppm; HRMS (ESI): m/z calcd. for $C_{15}H_{17}O_4P$ ($[M-H]^-$): 291.0792. Found: 291.0792.

xxi. Diisopropyl ((2-hydroxyphenyl)(phenyl)methyl)phosphonate (3v)

3v

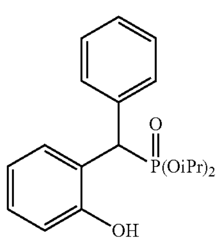

32.7 mg, 94%; white solid; nip 172-173° C.; $R_f$=0.5 ($v_{Hexane}/v_{EtOAc}$=11), $v_{Hexane}/v_{EtOAc}$ (1/1) for column; IR v(KBr, $cm^{-1}$) 3414, 3128, 2982, 1600, 1458, 1211, 1192, 1014, 995, 756; $^1$H NMR (400 MHz, $CDCl_3$) δ 9.28 (s, 1H), 7.50 (dd, J=8.0, 1.2 Hz, 2H), 7.32 (t, J=7.2 Hz, 2H), 7.28-7.23 (m, 1H), 7.15 (t, J=8.0 Hz, 1H), 7.05 (d, J=7.6 Hz, 1H), 6.99 (d, J=8.4 Hz, 1H), 6.81 (td, J=7.6, 1.2 Hz, 1H), 4.65 (d, J=26.8 Hz, 1H), 4.65-4.45 (m, 2H), 1.30 (d, J=6.4 Hz, 3H), 1.22 (d, J=6.4 Hz, 3H), 0.97 (t, J=6.4 Hz, 6H); $^{13}$C NMR (100.5 MHz, $CDCl_3$) δ 155.2 (d, J=6.0 Hz), 135.7 (d, J=4.5 Hz), 131.1 (d, J=8.2 Hz), 129.8 (d, J=8.2 Hz), 128.9 (d, J=3.0 Hz), 128.5, 127.2 (d, J=2.2 Hz), 123.6 (d, J=6.0 Hz), 120.7 (d, J=1.5 Hz), 119.4 (d, J=3.0 Hz), 72.8 (d, J=7.4 Hz), 72.2 (d, J=7.4 Hz), 48.4 (d, J=136.9 Hz), 24.2 (d, J=3.0 Hz), 24.0 (d, J=3.0 Hz), 23.2 (d, J=5.2 Hz), 23.1 (d, J=5.2 Hz); $^{31}$P NMR (162 MHz, $CDCl_3$): δ 30.07 ppm; HRMS (ESI): m/z calcd. for $C_{19}H_{25}O_4P$ ($[M-H]^-$): 347.1418. Found: 347.1420.

g. General Procedure for the Synthesis of Mixed Phosphinates 4

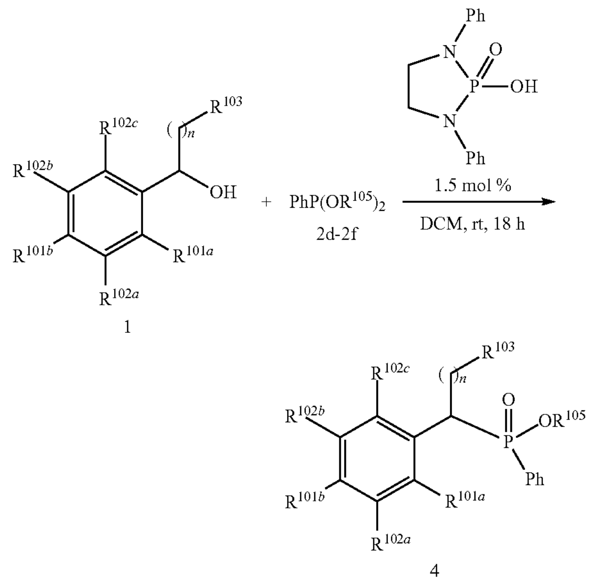

Methyl ((2-hydroxyphenyl)(phenyl)methyl)(phenyl) phosphinate (4a as example): A mixture of alcohol 1 (20.2 mg, 0.1 mmol), dimethyl phenylphosphonite 2d (173 mg, 0.1 mmol), NHPA1 (0.4 mg, 0.015 mmol) and DCM (0.5 mL) in a 2-dram vial with a PTFE cap was stirred for 18 h at rt. After stirring for 18 h, the reaction mixture was concentrated under reduced pressure. The residue was purified by flash column chromatography ($v_{DCM}/v_{EtOAc}$=9:1 as eluent) on silica gel to give the product 4a.

i. Methyl ((2-hydroxyphenyl)(phenyl)methyl)(phenyl)phosphinate (4a)

4a

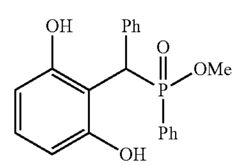

28.7 mg, 85% with dr=4:1; white solid; mp 212-213° C.; $R_f$=0.3 ($v_{DCM}/v_{EtOAc}$=9:1), $v_{DCM}/v_{EtOAc}$ (9/1) for column; IR v(KBr, $cm^{-1}$) 3410, 3163, 2951, 1597, 1454, 1188, 1033, 752; $^1$H NMR (400 MHz, d-DMSO) (peaks of the major isomer) δ 9.66 (s, 1H), 7.91 (dd, J=7.6, 1.2 Hz, 1H), 7.60-7.49 (m, 3H), 7.46-7.39 (m, 2H), 7.30-7.24 (m, 2H), 7.16-7.04 (m, 4H), 6.87-6.78 (m, 2H), 5.10 (d, J=17.2 Hz, 1H), 3.41 (d, J=10.8 Hz, 3H); $^{13}$C NMR (100.5 MHz, d-DMSO) (peaks of the major isomer) δ 155.1 (d, J=8.2 Hz), 137.2, 132.7, 132.2 (d, J=8.9 Hz), 130.9, 130.3 (d, J=5.2 Hz), 130.0 (d, J=6.7 Hz), 128.8 (d, J=11.9 Hz), 128.5, 128.4, 127.0, 124.3 (d, J=5.2 Hz), 119.4, 115.7, 51.8 (d, J=6.7 Hz), 44.1 (d, J=96.7 Hz); $^{31}$P NMR (162 MHz, d-DMSO): S 40.95 ppm; HRMS (ESI): m/z calcd. for $C_{20}H_{19}O_3P$ ($[M+H]^+$): 339.1145. Found: 339.1140.

ii. Ethyl ((2-hydroxyphenyl)(phenyl)methyl)(phenyl)phosphinate (4b)

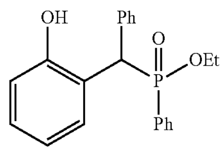

4b 29.5 mg, 84% with dr=3:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3410, 3063, 2978, 1593, 1454, 1180, 1030, 960, 756; $^1$H NMR (400 MHz, d-DMSO) (peaks of the major isomer) δ 9.62 (s, 1H), 7.72-7.88 (m, 1H), 7.57-7.44 (m, 3H), 7.41-7.34 (m, 2H), 7.27-7.23 (m, 2H), 7.14-7.02 (m, 4H), 6.84-6.76 (m, 2H), 5.05 (d, J=17.2 Hz, 1H), 3.82-3.64 (m, 2H), 1.00 (t, J=7.2 Hz, 3H); $^{13}$C NMR (100.5 MHz, d-DMSO) (peaks of the major isomer) δ 155.2 (d, J=8.2 Hz), 137.3 (d, J=4.5 Hz), 132.5 (d, J=3.0 Hz), 132.0 (d, J=8.9 Hz), 130.7, 130.3 (d, J=5.2 Hz), 130.0 (d, J=7.5 Hz), 128.7 (d, J=12.6 Hz), 128.5, 128.3, 127.0, 124.4 (d, J=6.0 Hz), 119.3, 115.7, 61.2 (d, J=6.7 Hz), 44.5 (d, J=96.0 Hz), 16.7 (d, J=5.2 Hz); $^{31}$P NMR (162 MHz, d-DMSO): δ 39.18 ppm; HRMS (ESI): m/z calcd. for $C_{21}H_{21}O_3P$ ($[M+H]^+$): 353.1301. Found: 353.1293.

iii. Isopropyl ((2-hydroxyphenyl)(phenyl)methyl)(phenyl)phosphinate (4c)

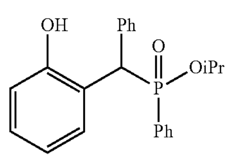

4c 29.6 mg, 81% with dr=4:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3410, 3063, 2978, 1597, 1454, 1384, 1180, 983, 756; $^1$H NMR (400 MHz, d-DMSO) (peaks of the major isomer) δ 9.61 (s, 1H), 7.98-7.93 (m, 1H), 7.58-7.46 (m, 3H), 7.42-7.36 (m, 2H), 7.28-7.24 (m, 2H), 7.16-7.04 (m, 4H), 6.86-6.78 (m, 2H), 5.02 (d, J=16.8 Hz, 1H), 4.39-4.30 (m, 1H), 1.04 (d, J=6.0 Hz, 3H), 1.00 (d, J=6.4 Hz, 3H); $^{13}$C NMR (100.5 MHz, d-DMSO) (peaks of the major isomer) δ 155.2 (d, J=8.2 Hz), 137.3, 132.8, 132.4, 131.9 (d, J=9.7 Hz), 130.3 (d, =5.2 Hz), 130.0 (d, J=7.4 Hz), 128.6 (d, J=11.9 Hz), 128.4, 128.3, 126.9, 124.5 (d, J=6.0 Hz), 119.2, 115.7, 69.8 (d, J=6.7 Hz), 44.8 (d, J=96.8 Hz), 24.2 (d, J=4.5 Hz), 24.0 (d, J=3.7 Hz); $^{31}$P NMR (162 MHz, d-DMSO): δ 38.09 ppm; HRMS (ESI): m/z calcd. for $C_{22}H_{23}O_3P$ ($[M+H]^+$): 367.1458; Found: 367.1466.

iv. Methyl ((2-hydroxy-5-methylphenyl(phenyl)methyl)(phenyl)phosphinate (4d)

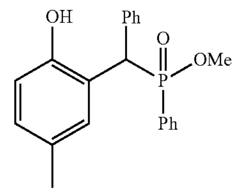

4d 28.5 mg, 80% with dr=4:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3414, 3144, 2951, 1608, 1512, 1438, 1184, 1037, 821, 694; $^1$H NMR (400 MHz, d-DMSO) (peaks of the major isomer) δ 9.42 (s, 1H), 7.66 (s, 1H), 7.58-7.42 (m, 3H), 7.42-7.34 (m, 2H), 7.32-7.20 (m, 2H), 7.13-7.00 (m, 3H), 6.84 (d, J=7.2 Hz, 1H), 6.67 (d, J=8.0 Hz, 1H), 5.06 (d, J=17.2 Hz, 1H), 3.37 (d, J=10.8 Hz, 3H), 2.19 (s, 3H); $^{13}$C NMR (100.5 MHz d-DMSO) (peaks of the major isomer) δ 152.8 (d, J=8.1 Hz), 137.3, 132.6, 132.2 (d, J=9.7 Hz), 131.0, 130.7 (d, J=5.2 Hz), 130.0 (d, J=6.7 Hz), 128.8 (d, J=11.9 Hz), 128.5, 127.7, 127.0 (d, J=1.5 Hz), 124.0 (d, J=5.9 Hz), 119.4, 115.7, 51.8 (d, J=7.5 Hz), 44.1 (d, J=97.5 Hz), 20.9 (d, J=9.7 Hz); $^{31}$P NMR (162 MHz, d-DMSO): δ 40.82 ppm; HRMS (ESI): m/z calcd. for $C_{21}H_{21}O_3P$ ($[M+H]^+$): 353.1301; Found: 353.1308.

v. Methyl ((5-chloro-2-hydroxyphenyl)(phenyl)methyl)(phenyl)phosphinate (4e)

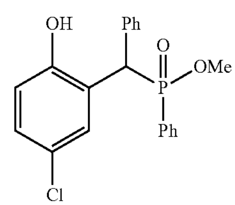

4e 28.3 mg, 76% with dr=4:1; white solid; mp 217-218° C.; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3410, 3063, 1593, 1512, 1496, 1423, 1188, 1030, 814, 694; $^1$H NMR (400 MHz, d-DMSO) (peaks of the major isomer) δ 10.06 (s, 1H), 7.96-7.91 (m, 1H), 7.64-7.50 (m, 3H), 7.48-7.40 (m, 2H), 7.30-7.23 (m, 2H), 7.20-7.07 (m, 4H), 6.85 (d, J=8.4 Hz, 1H), 5.07 (dd, J=16.4, 2.0 Hz, 1H), 3.44 (dt, J=11.2, 2.4 Hz, 3H); $^{13}$C NMR (100.5 MHz, d-DMSO) (peaks of the major isomer) δ 154.2 (d, J=8.2 Hz), 136.6, 132.9, 132.2 (d, J=9.7 Hz), 131.3, 129.8 (d, J=7.4 Hz), 129.6 (d, J=4.4 Hz), 129.1, 128.9 (d, J=11.8 Hz), 128.7, 127.3, 126.4 (d, J=5.9 Hz), 122.7, 117.3, 51.9 (d, J=7.2 Hz), 43.8 (d, J=96.5 Hz); $^{31}$P NMR (162 MHz, d-DMSO): δ 40.75 ppm; HRMS (ESI): m/z calcd. for $C_{20}H_{11}O_3PCl$ ($[M+H]^+$): 373.0755. Found: 373.0742.

vi. Methyl ((5-bromo-2-hydroxyphenyl)(phenyl)methyl)(phenyl)phosphinate (4f)

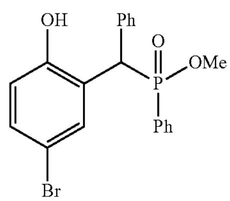
4f 30.8 mg, 74% with dr=4:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3414, 3082, 2951, 1593, 1492, 1419, 1276, 1184, 1030, 817, 694; $^{1}H$ NMR (400 MHz, d-DMSO) (peaks of the major isomer) δ 10.05 (s, 1H), 8.02-7.98 (m, 1H), 7.58-7.45 (m, 3H), 7.44-7.36 (m, 2H), 7.24-7.18 (m, 2H), 7.14-7.02 (m, 4H), 6.76 (d, J=8.4 Hz, 1H), 5.02 (d, J=17.2 Hz, 1H), 3.40 (d, J=10.8 Hz, 3H); $^{13}C$ NMR (100.5 MHz, d-DMSO) (peaks of the major isomer) δ 154.6 (d, J=8.2 Hz), 136.6, 132.9, 132.4 (d, J=5.2 Hz), 132.2 (d, J=8.9 Hz), 131.0, 129.8 (d, J=7.5 Hz), 129.1, 128.9 (d, J=11.9 Hz), 128.7, 127.3, 127.0 (d, J=5.9 Hz), 117.9, 110.4, 52.0 (d, J=6.7 Hz), 43.7 (d, J=96.8 Hz); $^{31}P$ NMR (162 MHz, d-DMSO): δ 40.74 ppm; HRMS (ESI): m/z calcd. for $C_{20}H_{18}O_3PBr$ ($[M+H]^+$): 417.0250. Found: 417.0247.

vii. Methyl ((2-hydroxyphenyl)(p-tolyl)methyl)(phenyl)phosphinate (4g)

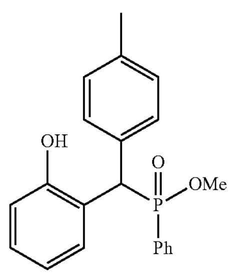
4g 29.5 mg, 84% with dr=4:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3410, 3136, 2951, 1593, 1492, 1454, 1188, 1030, 748; $^{1}H$ NMR (400 MHz, d-DMSO) (peaks of the major isomer) δ 9.60 (s, 1H), 7.83 (d, J=8.0 Hz, 1H), 7.58-7.51 (m, 2H), 7.51-7.45 (m, 1H), 7.43-7.33 (m, 2H), 7.13 (d, J=6.4 Hz, 2H), 7.02 (d, J=7.2 Hz, 1H), 6.90 (d, J=8.0 Hz, 2H), 6.77 (d, J=7.6 Hz, 2H), 5.04 (d, J=16.8 Hz, 1H), 3.35 (d, J=10.8 Hz, 3H), 2.11 (s, 3H); $^{13}C$ NMR (100.5 MHz, d-DMSO) (peaks of the major isomer) δ 155.0 (d, J=8.2 Hz), 136.0, 134.2, 132.6, 132.2 (d, J=8.9 Hz), 130.3 (d, J=5.2 Hz), 130.1 (d, J=5.9 Hz), 129.8 (d, J=6.7 Hz), 129.1, 128.8 (d, J=11.9 Hz), 128.3, 124.5 (d, J=5.2 Hz), 119.3, 115.7, 51.7 (d, J=6.7 Hz), 43.5 (d, J=96.7 Hz), 20.9; $^{31}P$ NMR (162 MHz, d-DMSO): δ 40.79 ppm; HRMS (ESI): m/z calcd. for $C_{21}H_{21}O_3P$ ($[M+H]^+$): 353.1301. Found: 353.1297.

viii. Methyl ((2-hydroxyphenyl)(4-(methylthio)phenyl)methyl)(phenyl)phosphinate (4h)

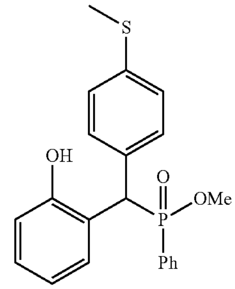
4h 31.5 mg, 82% with dr=4:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3414, 3074, 2951, 1593, 1458, 1238, 1180, 1030, 752; $^{1}H$ NMR (400 MHz, d-DMSO) (peaks of the major isomer) δ 9.67 (s, 1H), 7.87 (d, J=6.8 Hz, 1H), 7.60-7.56 (m, 3H), 7.42-7.34 (m, 3H), 7.21 (d, J=6.8 Hz, 2H), 7.03 (d, J=7.6 Hz, 2H), 6.82-6.74 (m, 2H), 5.07 (d, J=17.2 Hz, 1H), 3.40 (d, J=10.4 Hz, 3H), 2.35 (s, 3H); $^{13}C$ NMR (100.5 MHz, d-DMSO) (peaks of the major isomer) δ 155.1 (d, J=8.2 Hz), 136.8 (d, J=3.0 Hz), 133.8, 132.7, 132.2 (d, =J 8.9 Hz), 130.3 (d, =J 5.2 Hz), 130.9, 130.4 (d, J=6.7 Hz), 128.9 (d, J=11.9 Hz), 128.4, 126.0, 124.4 (d, J=5.2 Hz), 119.4, 115.8, 51.8 (d, J=7.5 Hz), 43.4 (d, J=97.5 Hz), 14.9; $^{31}P$ NMR (162 MHz, d-DMSO): δ 40.56 ppm; HRMS (ESI): m/z calcd. for $C_{21}H_{21}O_3PS$ ($[M+H]^+$): 385.1022. Found: 385.1013.

ix. Methyl ((4-fluorophenyl)(2-hydroxyphenyl)methyl)(phenyl)phosphinate (4i)

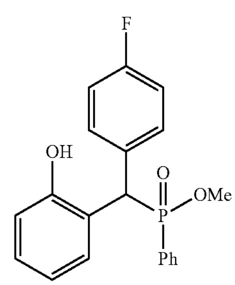
4i 28.8 mg, 81% with dr=4:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3414, 3147, 2951, 1604, 1508, 1458, 1226, 1188, 1033, 810, 748; $^{1}H$ NMR (400 MHz, d-DMSO) (peaks of the major isomer) δ 9.65 (s, 1H), 7.87 (d, J=7.6 Hz, 1H), 7.44-7.43 (m, 3H), 7.41-7.36 (m, 3H), 7.24-7.18 (m, 2H), 6.94 (t, J=8.8 Hz, 2H), 6.83-6.76 (m, 2H), 5.05 (dd, J=17.2, 2.8 Hz, 1H), 3.38 (dd, J=10.8, 3.2 Hz, 3H); $^{13}C$ NMR (100.5 MHz, d-DMSO) (peaks of the major isomer) δ 161.3 (d, J=241.8 Hz), 155.1 (d, J=8.2 Hz), 133.4, 132.8, 132.2 (d, J=9.6 Hz), 131.8 (d, J=7.4 Hz), 130.7, 130.1 (d, J=5.2 Hz), 128.9 (d, J=11.9 Hz), 128.5, 124.2 (d, J=5.2 Hz), 119.5, 115.8, 115.3 (d, J=20.8 Hz), 51.9 (d, J=6.7 Hz), 43.3 (d, J=96.8 Hz); $^{31}P$ NMR (162 MHz, d-DMSO): δ 40.77 ppm; HRMS (ESI): m/z calcd. for $C_{20}H_{18}O_3FP$ ($[M+H]^+$): 357.1050. Found: 357.1051.

x. Methyl([1,1'-biphenyl]-4-yl(2-hydroxyphenyl) methyl)(phenyl)phosphinate (4j)

4j

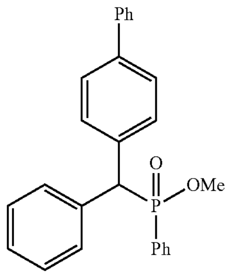

28.6 mg, 69% with dr=4:1; white solid; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3414, 3070, 2951, 1593, 1458, 1184, 1014, 759; $^1H$ NMR (400 MHz, d-DMSO) (peaks of the major isomer) δ 9.70 (br, 1H), 7.97-7.92 (m, 1H), 7.66-7.59 (m, 3H), 7.58-7.53 (m, 2H), 7.48-7.35 (m, 8H), 7.35-28 (m, 1H), 7.09 (t, J=8.0 Hz, 1H), 6.89-6.81 (m, 2H), 5.17 (d, J=17.2 Hz, 1H), 3.43 (d, J=10.8 Hz, 3H); $^{13}C$ NMR (100.5 MHz, d-DMSO) (peaks of the major isomer) δ 155.1 (d, J=8.2 Hz), 139.9, 138.7, 136.5 (d, J=1.5 Hz), 132.8, 132.2 (d, J=8.9 Hz), 130.9, 130.5 (d, J=6.7 Hz), 129.7, 129.3, 128.9 (d, J=11.9 Hz), 128.4, 127.7, 126.9, 126.8 (d, J=1.5 Hz), 124.3 (d, J=6.0 Hz), 119.4, 115.8, 51.8 (d, J=6.7 Hz), 43.7 (d, J=97.5 Hz); $^{31}P$ NMR (162 MHz, d-DMSO): δ 40.54 ppm; HRMS (ESI): m/z calcd. for $C_{26}H_{23}O_3P$ ($[M+H]^+$): 415.1458. Found: 415.1458.

xi. Methyl ((2-hydroxyphenyl)(naphthalen-2-yl) methyl)(phenyl)phosphinate (4k)

4k

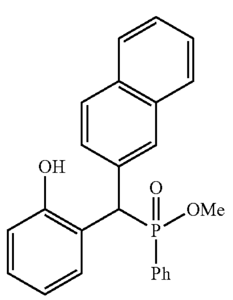

22.5 mg, 58% with dr=99:1; white solid; mp 208-209° C.; $R_f$=0.3 ($\nu_{DCM}/\nu_{EtOAc}$=9:1), $\nu_{DCM}/\nu_{EtOAc}$ (9/1) for column; IR ν(KBr, $cm^{-1}$) 3410, 3086, 2978, 1593, 1458, 1180, 1030, 810, 748; $^1H$ NMR (400 MHz, d-DMSO) (peaks of the major isomer) δ 9.72 (br, 1H), 8.00 (d, J=7.6 Hz, 1H), 7.80-7.66 (m, 4H), 7.64-7.56 (m, 2H), 7.52-7.34 (m, 6H), 7.09 (t, J=7.2 Hz, 1H), 6.89-6.80 (m, 2H), 5.29 (d, J=17.2 Hz, 1H), 3.44 (dt, J=10.8, 4.0 Hz, 3H); $^{13}C$ NMR (100.5 MHz, d-DMSO) (peaks of the major isomer) δ 155.2 (d, J=8.2 Hz), 134.9, 133.0 (d, J=1.5 Hz), 132.7, 132.2 (d, J=8.9 Hz), 132.0, 130.9, 130.4 (d, J=4.5 Hz), 129.7, 128.9 (d, J=11.9 Hz), 128.6, 128.5 (d, J=5.9 Hz), 128.1 (d, J=6.0 Hz), 128.0 (d, J=5.3 Hz), 127.8, 126.6, 126.3, 124.2 (d, J=6.0 Hz), 119.5, 115.8, 51.9 (d, J=6.7 Hz), 44.2 (d, J=96.8 Hz); $^{31}P$ NMR (162 MHz, d-DMSO): δ 40.57 ppm; HRMS (ESI): m/z calcd. for $C_{24}H_{21}O_3P$ ($[M+H]^+$): 389.1301. Found: 389.1297.

h. Purification of Diastereomers by Flash Column Chromatography

Figure 2A:
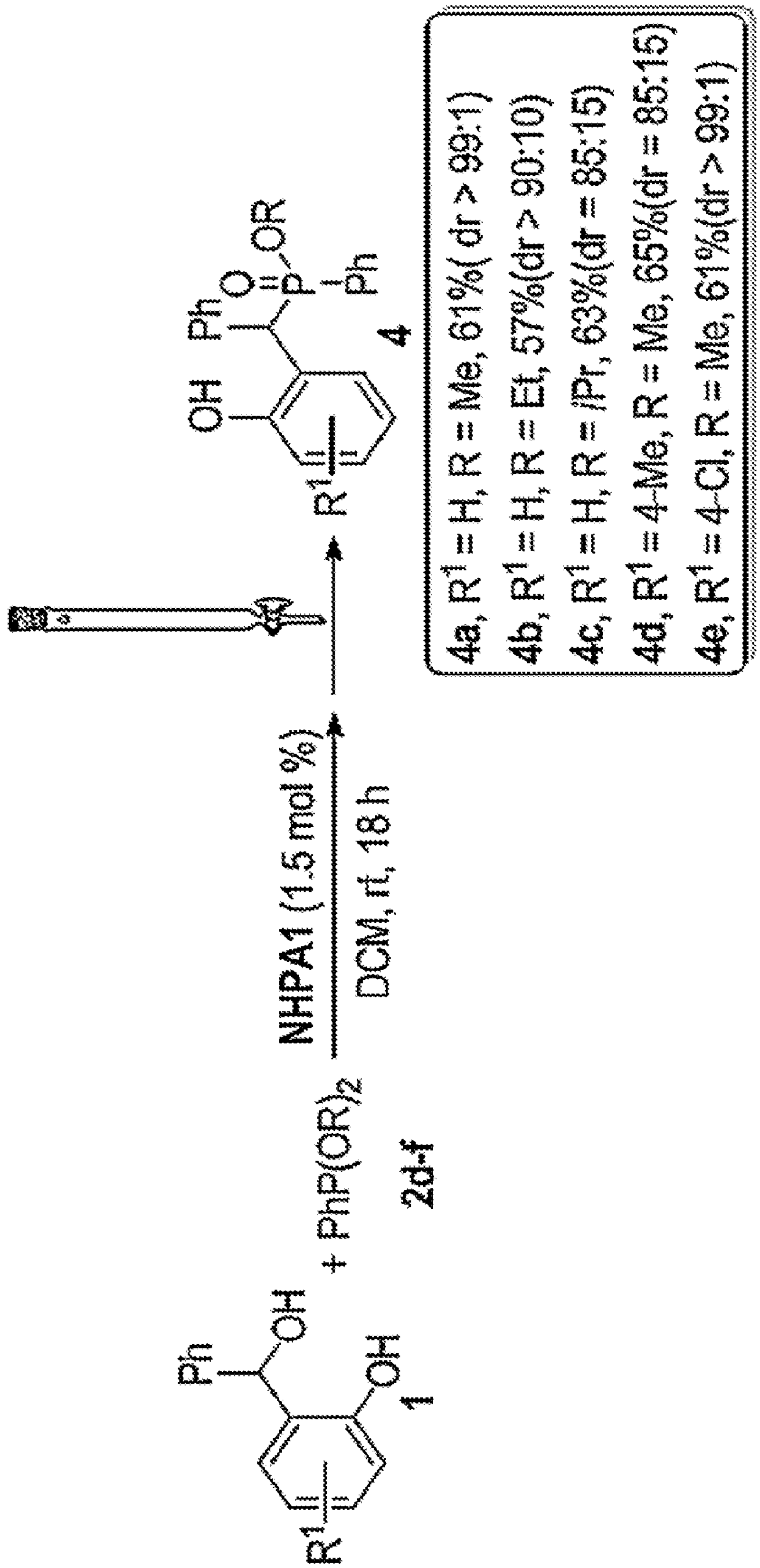
FIG. 2A shows a representative schematic illustrating the purification of diastereomers by flash column chromatography.
Figure 2B:
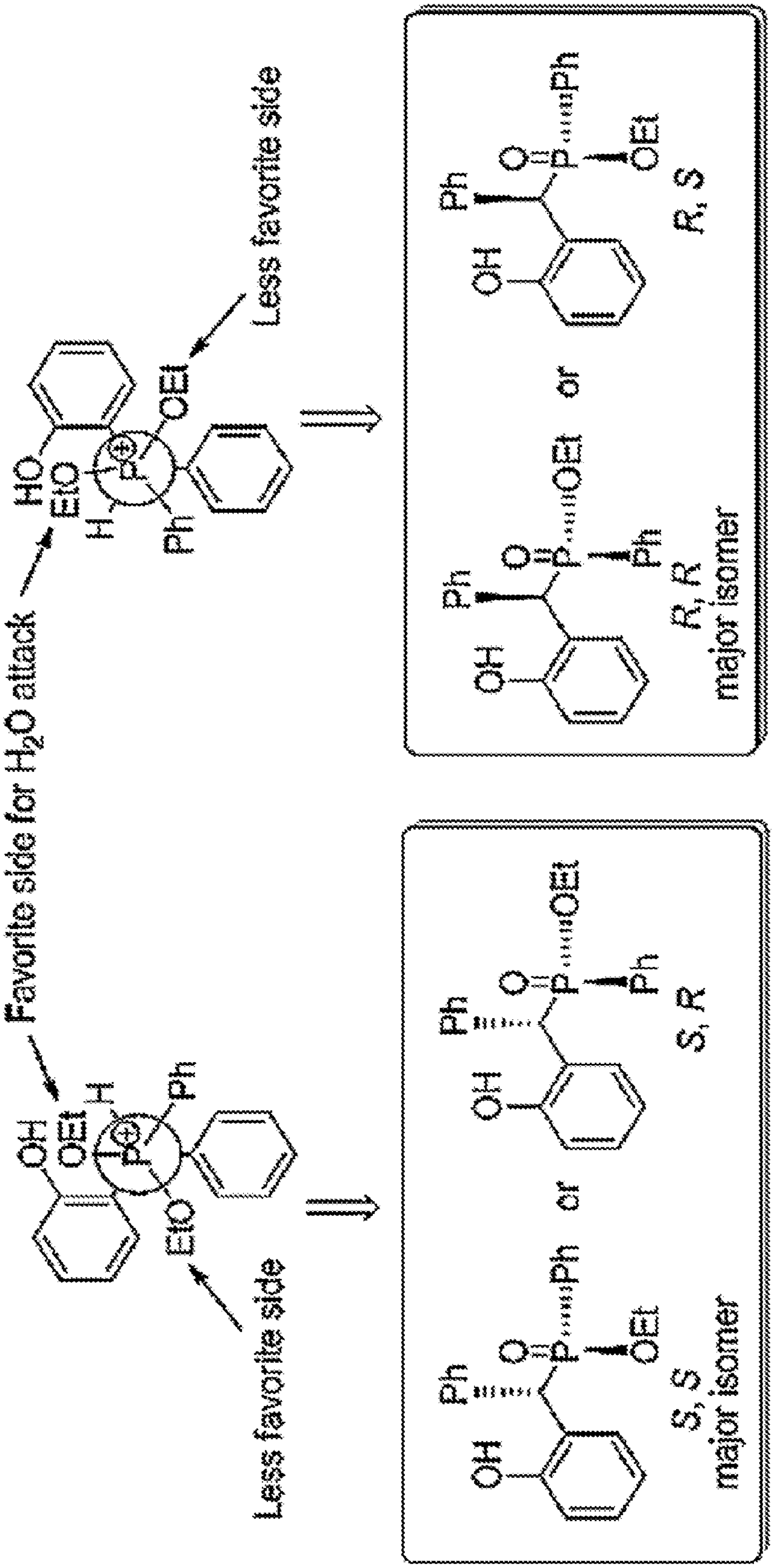
FIG. 2B shows a representative Newman projection of a phosphonium intermediate and the proposed diastereoselectivity.
Figure 4A:
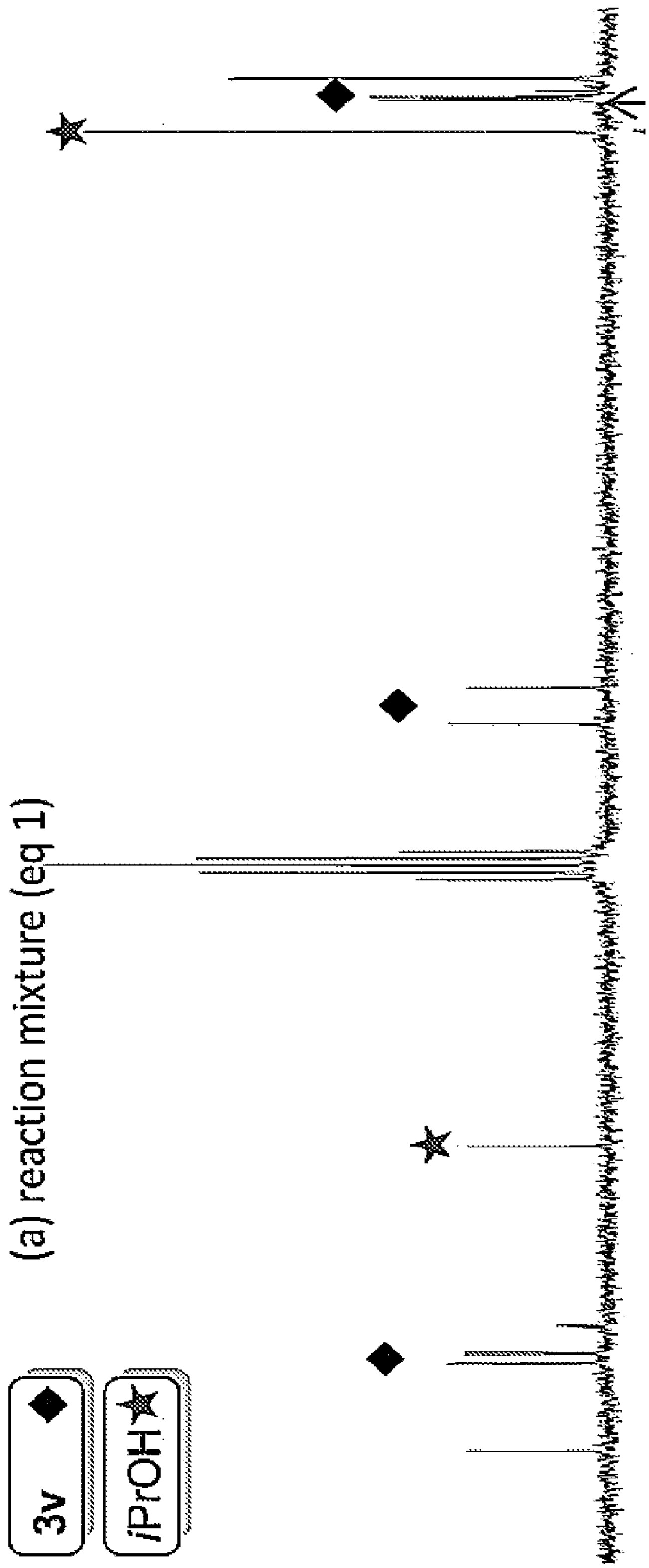
FIG. 4A and FIG. 4B show representative data from an in situ $^{13}$C NMR study of a crude reaction mixture. Specifically.

With the successful separation of diastereomers by flash column chromatography of 4k, we tried to develop a practical column purification method for the efficient separation of diastereomers described in FIG. 2A and FIG. 2B. We first used an eluent ($\nu_{EtOAc}/\nu_{Hexane}$=3:1) to separate the minor isomer, and then switched to a second eluent system ($\nu_{DCM}/\nu_{EtOAc}$=9:1) to isolate the major isomer. This gradient column system allows the separation of the major diastereoisomers from the mixtures. For examples, phosphinate 4a was isolated in 61% yield with 99:1 dr value by the gradient column (FIG. 2A, 4a). A pure diastereoisomer 4e was also obtained in 61% yield (FIG. 2A, 4e).

i. Mechanism Study

Nucleophilic additives are usually required in phospha-Michael reaction with trialkylphosphites for the transformation of P(III) to P(V) (Ibrahem et al. (2008) *Adv. Synth. Catal.* 350: 1875-1884; Maerten et al. (2007) *J. Org. Chem.* 72: 8893-8903). In contrast, NHPA-catalyzed phospha-Michael reaction of o-QM with $P(OEt)_3$ generates the target Michael adducts without the nucleophile additives. Without wishing to be bound by theory, it was theorized that the in situ generated water molecule, by dehydration of the o-hydroxybenzyl alcohols, can act as an internal nucleophile to transform P(III) to P(V). To test this hypothesis, control experiments with drying agents such as molecular sieves and $MgSO_4$ were performed, and reduced product yields (66-78%) of 3a by NMR were observed (Table 1, entries 2-4). Without wishing to be bound by theory, these outcomes strongly suggest that the water molecule plays an important role in the reaction process.

TABLE 1

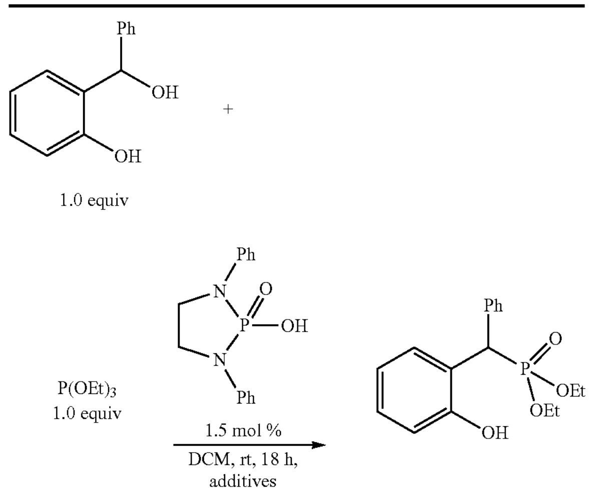

| Entry | Additive | Yield |
|---|---|---|
| 1 | None | 99 |
| 2 | 4 Å MS | 66 |
| 3 | 5 Å MS | 78 |
| 4 | $MgSO_4$ | 72 |

j. In Situ NMR Study

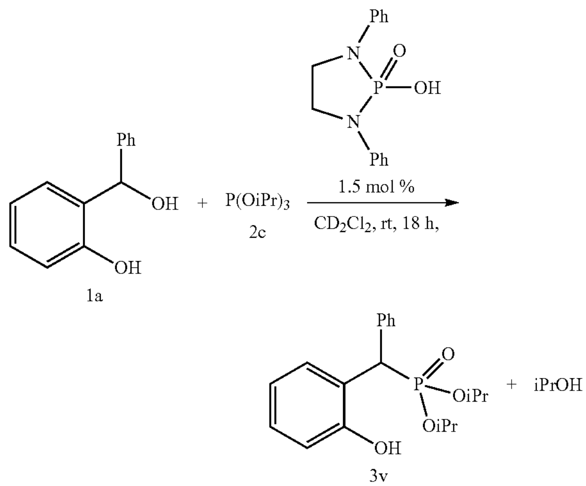

Figure 3A:
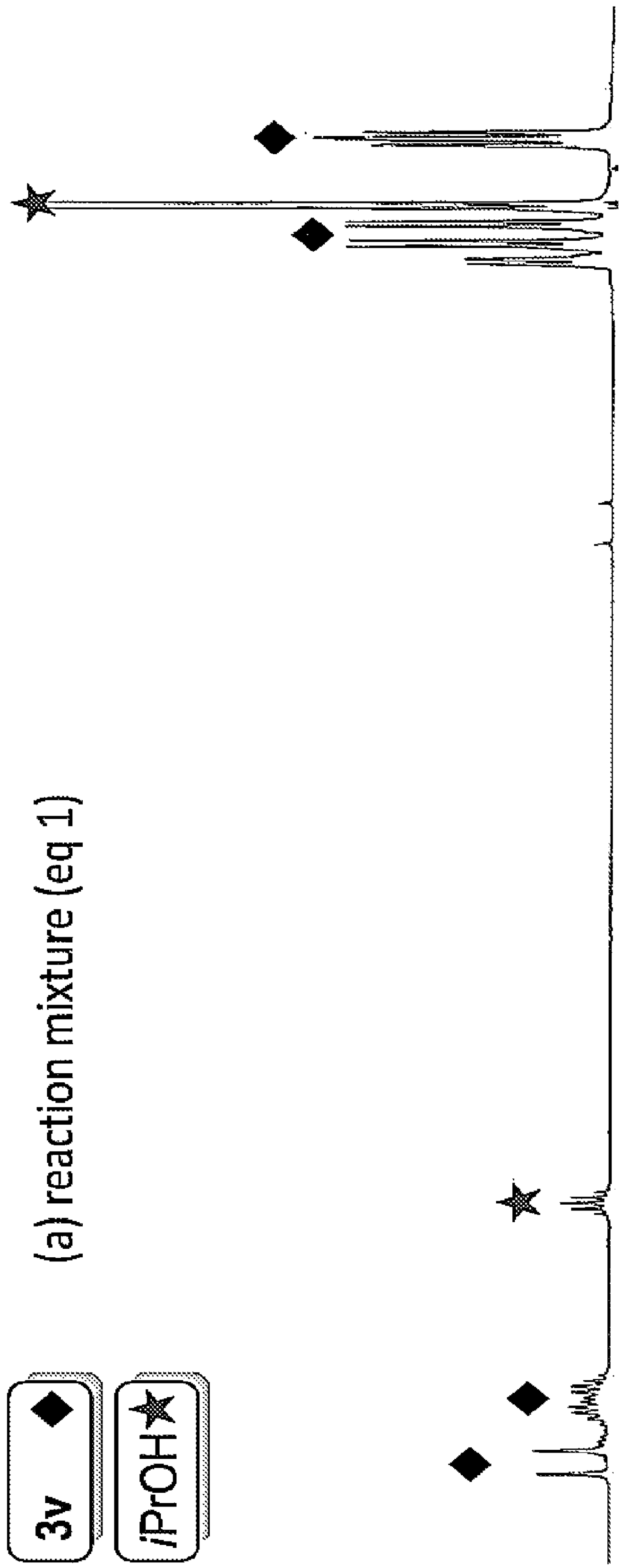
FIG. 3A and FIG. 3B show representative data from an in situ $^{1}$H NMR study of a crude reaction mixture. Specifically.
Figure 3B:
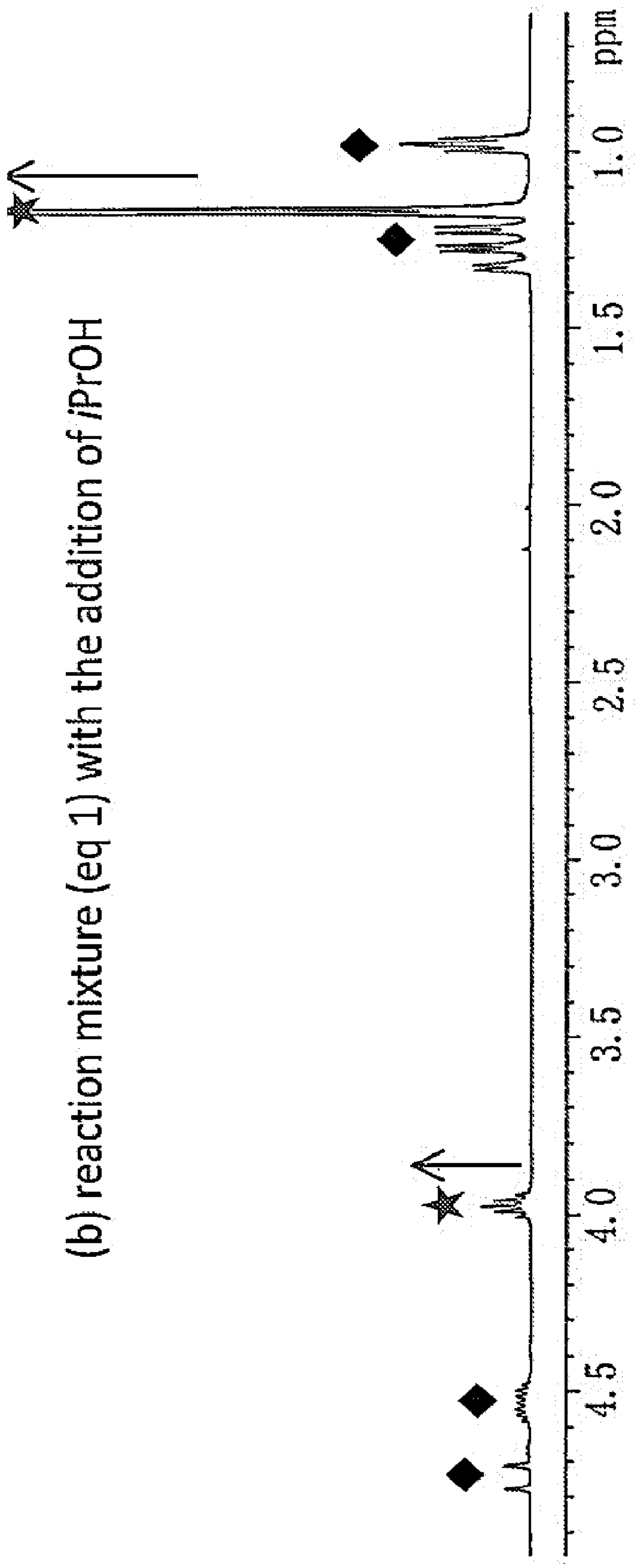
Figure 4B:
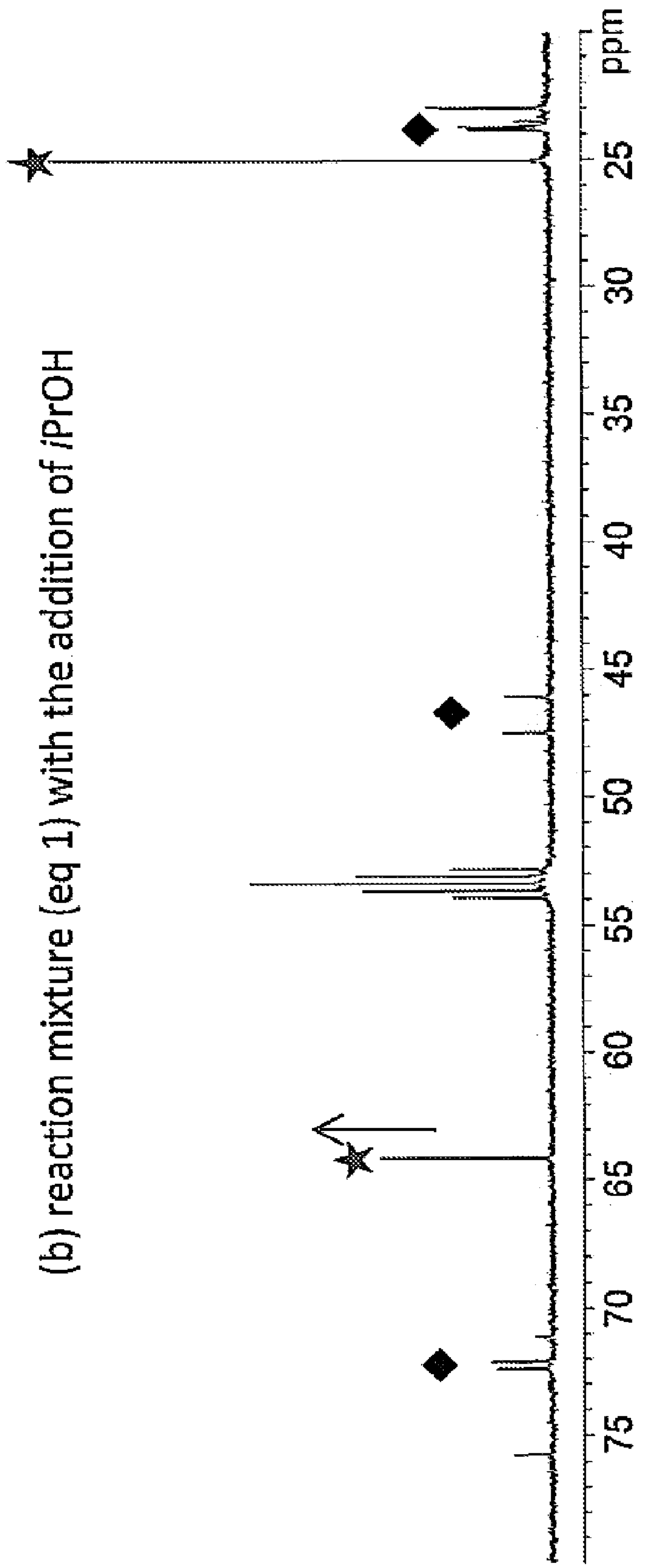

An in-situ NMR study of this phospha-Michael reaction of o-hydroxybenzyl alcohol 1a with $P(OiPr)_3$ 2c was conducted in $CD_2Cl_2$ solvent. The $^1H$ NMR spectra are provided in FIG. 3A and FIG. 3B and the $^{13}C$ NMR spectra are provided in FIG. 4A and FIG. 4B. This NMR study also supports that the $H_2O$ molecule serves as an internal nucleophile to generate the target phosphonate product 3v (FIG. 3A and FIG. 4A, marked with diamond) and iPrOH (FIG. 3A and FIG. 4A, marked with star). We also observed that both $^1H$ NMR and $^{13}C$ NMR peaks corresponding to the iPrOH increased by adding additional iPrOH to the crude reaction mixture (FIG. 3B and FIG. 4B).

k. Large-Scale Synthesis of 3a

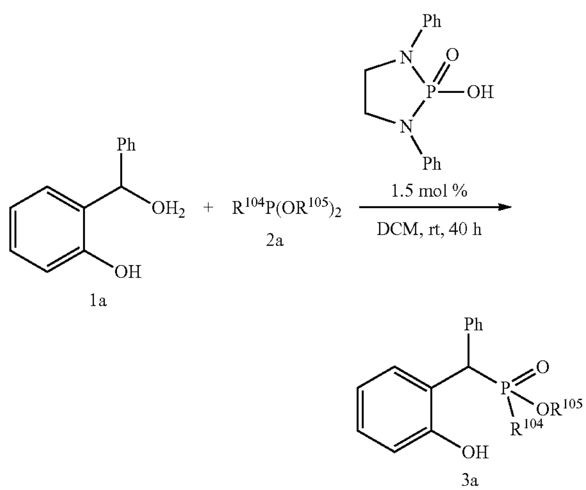

A mixture of alcohol 1a (1.0 g, 5.0 mmol), triethyl phosphite 2a (0.88 mL, 0.1 mmol), NHPA1 (20 mg, 0.015 mmol) and DCM (25 mL) in a 50-mL flask was stirred for 40 h at rt. After stirring for 40 h at rt, the reaction mixture was concentrated under reduced pressure. The residue was purified by flash column chromatography ($\nu_{Hexane}/\nu_{EtOAc}$=2:1 to $\nu_{DCM}/\nu_{EtOAc}$=10:1 as eluent) on silica gel to give the corresponding product 3a (1.44 g, 90%).

l. Synthetic Manipulation of Phospha-Michael Adduct 3a

Figure 7:
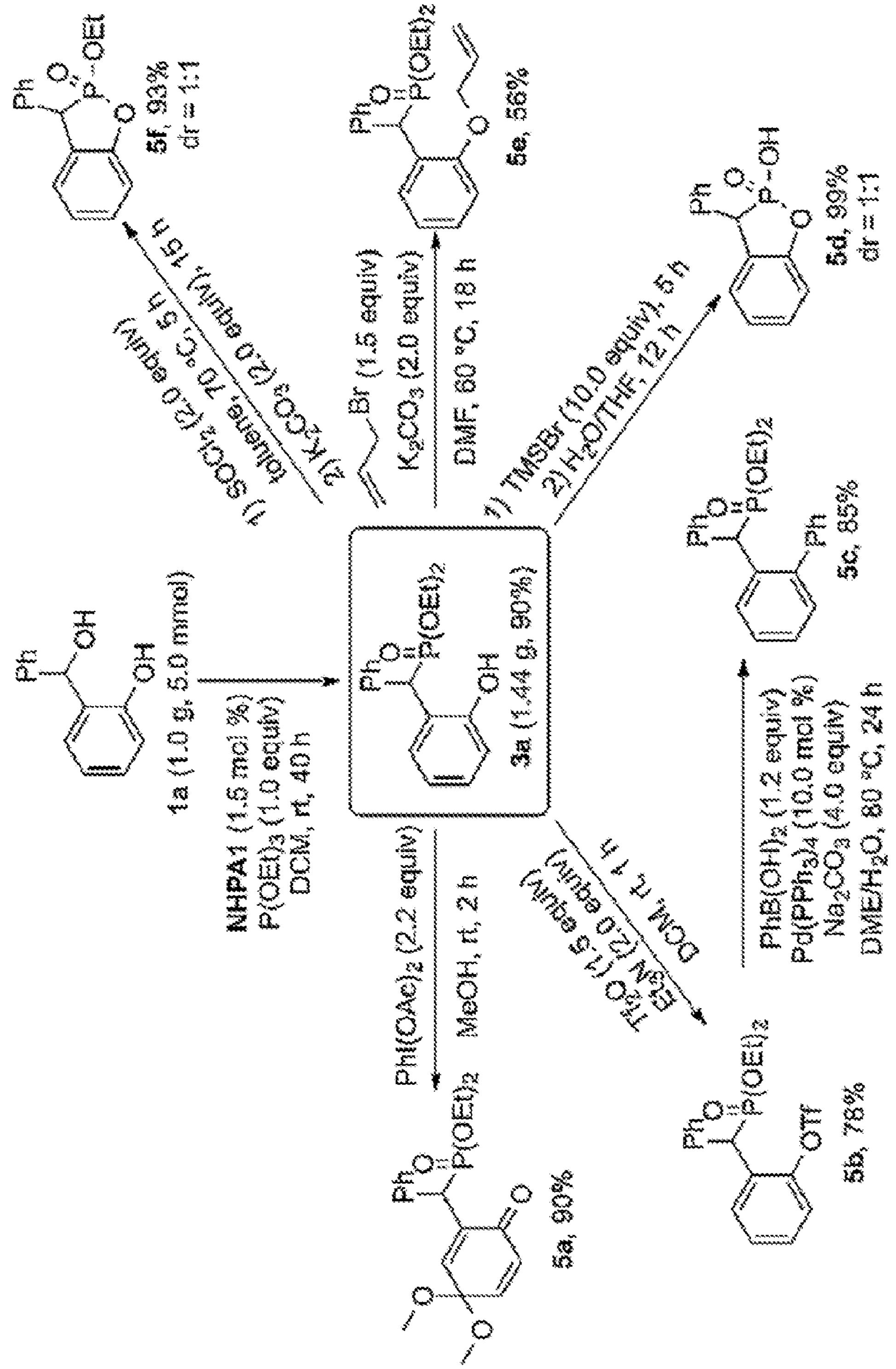
FIG. 7 shows a representative schematic illustrating the synthetic utility of diaryl phosphonate adducts.

A representative schematic illustrating the synthetic utility of diaryl phosphonate adducts is shown in FIG. 7.

i. Diethyl ((3,3-dimethoxy-6-oxocyclohexa-1,4-dien-1-yl)(phenyl)methyl)phosphonate (5a)

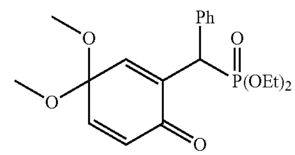

5a

To a solution of 3a (48.3 mg, 0.15 mmol) in MeOH (3.0 mL) was added $PhI(OAc)_2$ (108 mg, 0.22 mmol) at 0° C. After stirring for 2 h, volatiles were removed under reduced pressure. The residue was purified by flash column chromatography ($\nu_{Hexane}/\nu_{EtOAc}$=1.5/1) on silica gel to give 5a (34.4 mg, 90%); colorless oil; $R_f$=0.2 ($\nu_{Hexane}/\nu_{EtOAc}$=1:1); IR ν(KBr, $cm^{-1}$) 3418, 2982, 2908, 2831, 1678, 1647, 1238, 1122, 1053, 1030, 968; $^1H$ NMR (400 MHz, $CDCl_3$) δ 7.62-7.56 (m, 1H), 7.51-7.44 (m, 2H), 7.34-7.24 (m, 3H), 6.78 (dt, J=10.0, 3.6 Hz, 1H), 6.27 (dd, J=10.4, 2.8 Hz, 1H), 4.82 (dd, J=23.2, 2.8 Hz, 1H), 4.15-4.02 (m, 2H), 3.97-3.86 (m, 1H), 3.80-3.68 (m, 1H), 3.43 (d, J=3.6 Hz, 3H), 3.34 (d, J=4.0 Hz, 3H), 1.26 (td, J=7.2, 3.2 Hz, 3H), 1.07 (td, J=7.2, 3.2 Hz, 3H); $^{13}C$ NMR (100.5 MHz, $CDCl_3$) δ 183.0 (d, J=10.5 Hz), 143.4, 142.1 (d, J=6.7 Hz), 136.4 (d, J=2.3 Hz), 134.7 (d, J=5.9 Hz), 129.5 (d, J=7.4 Hz), 129.4, 128.6 (d, J=1.5 Hz), 127.4 (d, J=2.3 Hz), 93.0 (d, J=1.5 Hz), 63.1 (d, J=7.5 Hz), 62.3 (d, J=7.5 Hz), 50.5 (d, J=6.4 Hz), 40.3 (d, J=141.4 Hz), 16.3 (d, J=5.9 Hz), 16.1 (d, J=6.0 Hz); $^{31}P$ NMR (162 MHz, $CDCl_3$): δ 27.92 ppm; HRMS (ESI): m/z calcd. for $C_{19}H_{25}O_6P$ ($[M+H]^+$): 381.1462. Found: 381.1454.

ii. 2-((Diethoxyphosphoryl)(phenyl)methyl)phenyl trifluoromethanesulfonate (5b)

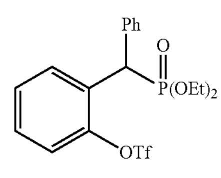

5b

To a solution of 3a (48.2 mg, 0.15 mmol) and $Et_3N$ (42 μL, 0.3 mmol) in DCM (1.0 mL) was added $Tf_2O$ (38 μL, 0.225 mmol) at 0° C. After stirring for 1 h, volatiles were removed under reduced pressure. The residue was purified by flash column chromatography ($\nu_{Hexane}/\nu_{EtOAc}/\nu_{DCM}$=4/1/1) on silica gel to give 5b (52.9 mg, 78%); yellow oil; $R_f$=0.3 ($\nu_{Hexane}/\nu_{EtOAc}$=1:1); IR ν(KBr, $cm^{-1}$) 3418, 2985, 2874, 1620, 1419, 1249, 1215, 1141, 1053, 1026, 968, 898; $^1H$ NMR (400 MHz, $CDCl_3$) δ 8.16 (dt, J=8.0, 2.0 Hz, 1H), 7.56-7.53 (m, 2H), 7.40 (td, J=7.2, 1.2 Hz, 1H), 7.37-7.23 (m, 5H), 4.83 (d, J=25.2 Hz, 1H), 4.06-3.76 (m, 4H), 1.17-1.08 (m, 6H); $^{13}C$ NMR (100.5 MHz, $CDCl_3$) δ 147.4 (d, J=11.1 Hz), 134.9 (d, J=5.9 Hz), 131.7 (d, J=5.2 Hz), 130.3 (d, J=3.8 Hz), 129.6 (d, J=7.4 Hz), 129.0 (d, J=2.3

Hz), 128.7 (d, J=1.5 Hz), 128.4 (d, J=2.3 Hz), 127.6 (d, J=2.3 Hz), 121.3, 118.5 (q, J=318.5 Hz), 63.2 (d, J=7.4 Hz), 62.7 (d, J=6.7 Hz), 43.2 (d, J=140.7 Hz), 16.1 (d, J=4.4 Hz), 16.0 (d, J=3.7 Hz); $^{19}$F NMR (376 MHz, $CDCl_3$): δ −73.99 ppm; $^{31}$P NMR (162 MHz, $CDCl_3$): δ 26.50 ppm; HRMS (ESI): m/z calcd. for $C_{18}H_{20}O_6F_3PS$ ($[M+H]^+$): 453.0743. Found: 453.0743.

iii. Diethyl ([1,1'-biphenyl]-2-yl(phenyl)methyl) phosphonate (5c)

5c

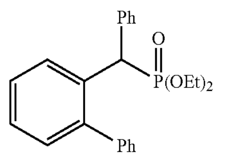

To a solution of 5b (51.4 mg, 0.11 mmol), $PhB(OH)_2$ (16.4 mg, 0.13 mmol), $Na_2CO_3$ (47.2 mg, 0.44 mmol), $H_2O$ (0.2 mL) in DME (1.0 mL) was added $Pd(PPh_3)_4$ (25.3 mg, 0.022 mmol). The reaction mixture was refluxed for 24 h under nitrogen atmosphere. After refluxing for 24 h, the reaction mixture was cooled down to room temperature and diluted with $H_2O$. The aqueous phase was extracted with EtOAc (3×10 mL). The combined organic layers were washed with brine and dried over $Na_2SO_4$. The $Na_2SO_4$ was filtered off and the solvent was evaporated under reduced pressure. The residue was purified by flash column chromatography on silica gel ($\nu_{Hexane}/\nu_{EtOAc}$=4:1) to afford the product Sc (35.5 mg, 85%); yellow oil; $R_f$=0.3 ($\nu_{Hexane}/\nu_{EtOAc}$=1:1); IR ν(KBr, $cm^{-1}$) 3421, 3059, 2982, 2870, 1492, 1477, 1246, 1053, 1026, 964, 752; $^1$H NMR (400 MHz, $CDCl_3$) δ 8.18 (dt, J=8.0, 1.2 Hz, 1H), 7.43-7.36 (m, 4H), 7.32-7.27 (m, 3H), 7.26-7.15 (m, 6H), 4.62 (d, J=25.6 Hz, 1H), 4.00-3.66 (m, 4H), 1.09 (t, J=6.8 Hz, 3H), 1.03 (t, J=6.8 Hz, 3H); $^{13}$C NMR (100.5 MHz, $CDCl_3$) δ 142.7 (d, J=11.1 Hz), 141.1, 136.9 (d, J=5.2 Hz), 134.3 (d, J=3.8 Hz), 130.3, 129.7 (d, J=4.4 Hz), 129.4, 129.3, 128.4 (d, J=1.5 Hz), 128.1, 127.6 (d, J=2.2 Hz), 127.2, 126.9, 126.8, 62.6 (d, J=7.4 Hz), 62.5 (d, J=6.7 Hz), 46.6 (d, J=137.7 Hz), 16.2 (d, J=6.7 Hz), 16.1 (d, J=6.0 Hz); $^{31}$P NMR (162 MHz, $CDCl_3$): δ 29.15 ppm; HRMS (ESI): m/z calcd. for $C_{23}H_{25}O_3P$ ($[M+H]^+$): 381.1614. Found: 381.1612.

iv. 2-Hydroxy-3-phenyl-2,3-dihydrobenzo[d][1,2] oxaphosphole 2-oxide (5d)

5d

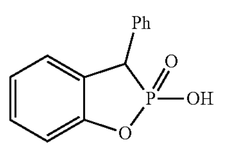

A solution of 3a (31.8 mg, 0.1 mmol) and TMSBr (130 μL, 1.0 mmol) was stirred for 5 h at rt. After stirring for 5 h, a mixture of $H_2O$/THF (1.0 mL, $\nu_{H2O}/\nu_{THF}$=1:1) was added to the reaction mixture and the reaction mixture was stirred for 15 h. After stirring for 15 h, volatiles were removed under reduced pressure to give 5d (25.1 mg, 99%); colorless oil; $R_f$=0.2 ($\nu_{DCM}/\nu_{MeOH}$=95:5); IR ν(KBr, $cm^{-1}$) 3522, 3414, 1597, 1496, 1450, 1130, 1030, 956, 756; $^1$H NMR (400 MHz, $CD_3OD$) δ 7.73-7.69 (m, 1H), 7.51-7.48 (m, 2H), 7.29-7.22 (m, 2H), 7.21-7.15 (m, 1H), 7.09-7.03 (m, 1H), 6.85-6.77 (m, 2H), 5.05 (d, J=24.8 Hz, 1H); $^{13}$C NMR (100.5 MHz, $CD_3OD$) δ 156.2 (d, J=9.7 Hz), 156.1 (d, J=10.5 Hz), 139.4 (d, J=5.2 Hz), 138.9 (d, J=5.2 Hz), 131.2 (d, J=6.0 Hz), 131.1 (d, J=5.9 Hz), 130.9 (d, J=7.4 Hz), 130.8 (d, J=6.7 Hz), 129.3 (d, J=1.5 Hz), 129.2 (d, J=1.5 Hz), 129.1 129.0, 127.8 (d, J=2.3 Hz), 127.6 (d, J=2.3 Hz), 125.8 (d, J=3.7 Hz), 125.2 (d, J=3.7 Hz), 120.4 (d, J=1.5 Hz), 120.4 (d, J=1.5 Hz), 116.4, 116.3, 44.9 (d, J=137.7 Hz), 43.3 (d, J=139.1 Hz); $^{31}$P NMR (162 MHz, $CDCl_3$): δ 25.10, 24.97 ppm; HRMS (ESI): m/z calcd. for $C_{13}H_{11}O_3P$ ($[M-H]^-$): 245.0373. Found: 245.0372.

v. Diethyl ((2-(allyloxy)phenyl)(phenyl)methyl) phosphonate (5e)

5e

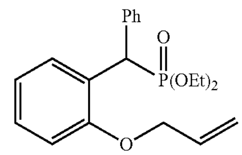

To a solution of 3a (31.9 mg, 0.1 mmol) and $K_2CO_3$ (27.6, 0.2 mmol) in DMF (1.0 mL) was added 3-bromoprop-1-ene (13 μL, 0.15 mmol). The reaction mixture was stirred for 12 h at 60° C. After stirring for 12 h, volatiles were removed under reduced pressure. The residue was purified by flash column chromatography ($\nu_{Hexane}/\nu_{EtOAc}$=2/1) on silica gel to give 5e (20.2 mg, 56%); colorless oil; $R_f$=0.38 ($\nu_{Hexane}/\nu_{EtOAc}$=1:1); IR ν(KBr, $cm^{-1}$) 3421, 2982, 2870, 1600, 1492, 1454, 1246, 1053, 1026, 964, 756; $^1$H NMR (400 MHz, $CDCl_3$) δ 7.98 (dt, J=8.0, 1.6 Hz, 1H), 7.55-7.50 (m, 2H), 7.30-7.24 (m, 2H), 7.22-7.16 (m, 2H), 6.98 (td, J=8.0, 1.2 Hz, 1H), 6.82 (d, J=8.4 Hz, 1H), 6.06-5.95 (m, 1H), 5.38-5.36 (m, 1H), 5.28-5.23 (m, 1H), 5.15 (d, J=24.8 Hz, 1H), 4.56-4.44 (m, 2H), 4.05-3.76 (m, 4H), 1.15-1.08 (m, 6H); $^{13}$C NMR (100.5 MHz, $CDCl_3$) δ 155.6 (d, J=10.4 Hz), 137.0 (d, J=5.2 Hz), 133.2, 130.2 (d, J=5.2 Hz), 129.7 (d, J=7.5 Hz), 128.3 (d, J=1.5 Hz), 128.1 (d, J=2.2 Hz), 126.8 (d, J=2.2 Hz), 126.0, 120.9 (d, J=2.2 Hz), 117.2, 112.0, 69.1, 62.4 (d, J=6.6 Hz), 41.9 (d, J=139.9 Hz), 16.2 (d, J=6.0 Hz); $^{31}$P NMR (162 MHz, $CDCl_3$): δ 29.40 ppm; HRMS (ESI): m/z calcd. for $C_{20}H_{25}O_4P$ ($[M+H]^+$): 361.1563. Found: 361.1574.

vi. 2-Ethoxy-3-phenyl-2,3-dihydrobenzo[d][1,2] oxaphosphole 2-oxide (5f)

5f

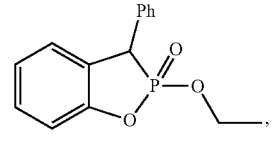

dr = 1:1

To a solution of 3a (48.0 mg, 0.15 mmol) in toluene (0.5 mL) was added $SOCl_2$ (22 μL, 0.3 mmol). The reaction mixture was stirred for 5 h at 70° C. After stirring for 5 h, $K_2CO_3$ (41.9 mg, 0.3 mmol) was added to the reaction mixture and the mixture was stirred for 15 h. After stirring for 15 h, the reaction mixture was cooled down to room temperature and diluted with $H_2O$. The aqueous phase was extracted with DCM (3×10 mL). The combined organic layers were washed with brine and dried over $Na_2SO_4$. The $Na_2SO_4$ was filtered off and the solvent was evaporated under reduced pressure to give 5f (38.2 mg, 93%); colorless oil; $R_f$=0.32 ($\nu_{Hexane}/\nu_{EtOAc}$=2:1); IR ν(KBr, $cm^{-1}$) 3522, 2920, 1593, 1500, 1456, 1130, 1030, 956, 756; $^1H$ NMR (400 MHz, $CDCl_3$) δ 7.38-7.22 (m, 10H), 7.19-7.09 (m, 2H), 7.12-7.03 (m, 6H), 4.65 (d, J=21.2 Hz, 1H), 4.42 (d, J=19.2 Hz, 1H), 4.38-4.28 (m, 2H), 4.06-3.93 (m, 1H), 3.77-3.66 (m, 1H), 1.40 (t, J=6.4 Hz, 3H), 0.96 (td, J=7.2, 0.4 Hz, 3H); $^{13}C$ NMR (100.5 MHz, $CDCl_3$) δ 153.0 (d, J=11.2 Hz), 152.7 (d, J=11.7 Hz), 134.5 (d, J=6.7 Hz), 133.8 (d, J=8.9 Hz), 129.5, 129.4, 129.1 (d, J=5.9 Hz), 129.0 (d, J=2.2 Hz), 128.9 (d, J=4.5 Hz), 128.8, 127.8 (d, J=3.8 Hz), 127.7, 127.6 (d, J=3.7 Hz), 127.5, 127.3, 127.2 (d, J=3.0 Hz), 127.1 (d, J=3.0 Hz), 123.8 (d, J=5.9 Hz), 113.4 (d, J=6.7 Hz), 113.3 (d, J=7.4 Hz), 64.4 (d, J=6.7 Hz), 63.7 (d, J=7.5 Hz), 43.9 (d, J=116.8 Hz), 43.1 (d, J=119.8 Hz), 16.5 (d, J=5.2 Hz), 15.8 (d, J=5.9 Hz); $^{31}P$ NMR (162 MHz, $CDCl_3$): δ 31.92, 31.55 ppm; HRMS (ESI): m/z calcd. for $C_{15}H_{15}O_3P$ ([M+H]$^+$): 275.0832. Found: 275.0831.

2. Optimization of Reaction Conditions

With the NHPAs in hand, the potential of NHPAs as organocatalysts in phospha-Michael reaction of 2-(hydroxy(phenyl)methyl)phenol 1a with triethylphosphite 2a was employed to screen the optimal reaction conditions (Table 2). Briefly, an equal amount (0.1 mmol) of 1a and 2a was treated with 10 mol % of NHPA1 in DCM at rt for 18 hours. The desired diaryl phosphonate 3a was obtained in 99% yield by NMR and 92% isolated yield (Table 2, entry 1). Although other Bronsted acids provided moderate to excellent yields by NMR, they were inferior to the NHPA1 (Table 2, entries 2-7). To further optimize the reaction conditions, experiments with low catalyst loadings were carried out in which a quantitative yield of the target product by NMR was still obtained with 1.5 mol % catalyst (Table 2, entries 8-9). Further modification of the NHPA with electron-donating groups on the nitrogen atom (entry 10 and entry 12) decreased the catalytic activity whereas that of electron-deficient groups maintained the excellent catalytic reactivity (entry 9 and entry 11). Without wishing to be bound by theory, these outcomes strongly support that the $pK_a$ of NHPAs can be systemically modified. Known Brønsted acids NHPA5 and BPA were also tested, but were inferior to NHPA1 (entry 9 versus entries 13-14). Among the solvents screened, DCM is superior to other solvents such as ether, toluene, $CH_3CN$, THF, $CHCl_3$, and EtOH (Table 2, entries 15-20). Notably, when EtOH was used as a solvent, only 26% yield of 3a by NMR was observed along with 72% recovered starting material without the potential oxa-Michael adduct (Lai et al. (2015) *Org. Lett.* 17: 6058-6061).

TABLE 2

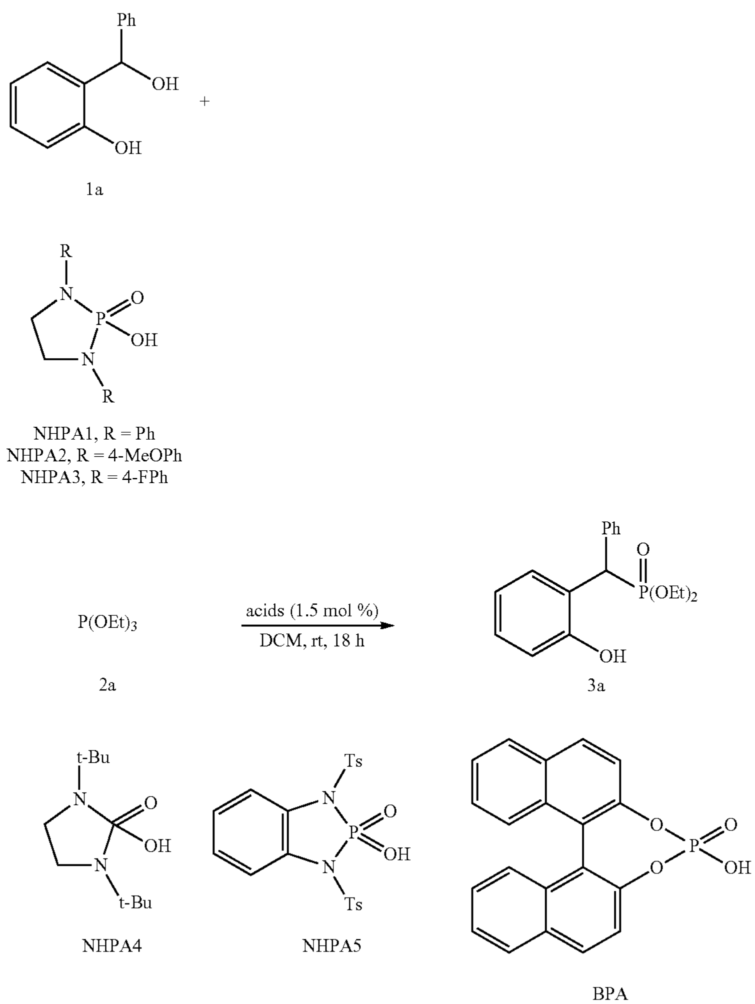

TABLE 2-continued

| Entry | acids (x mol %) | solvent | yield (%)[b] |
|---|---|---|---|
| 1 | NHPA1 (10.0) | DCM | >99(92)[c] |
| 2 | $CH_3COOH$ (10.0) | DCM | 69 |
| 3 | $CF_3COOH$ (10.0) | DCM | 94 |
| 4 | 4-$NO_2$PhCOOH (10.0) | DCM | 98 |
| 5 | TfOH (10.0) | DCM | 78 |
| 6 | Conc. HCl (10.0) | DCM | NR |
| 7 | TsOH (10.0) | DCM | 69 |
| 8 | NHPA1 (3.0) | DCM | >99(91)[c] |
| 9 | NHPA1 (1.5) | DCM | >99(91)[c] |
| 10 | NHPA2 (1.5) | DCM | 63 |
| 11 | NHPA3 (1.5) | DCM | >99(90)[c] |
| 12 | NHPA4 (1.5) | DCM | 90 |
| 13 | NHPA5 (1.5) | DCM | 69 |
| 14 | BPA (1.5) | DCM | 65 |
| 15 | NHPA1 (1.5) | ether | 65 |
| 16 | NHPA1 (1.5) | toluene | 93 |
| 17 | NHPA1 (1.5) | $CH_3CN$ | 80 |
| 18 | NHPA1 (1.5) | THF | 59 |
| 19 | NHPA1 (1.5) | $CHCl_3$ | 16 |
| 20 | NHPA1 (1.5) | EtOH | 27 |

[a]Reaction condition: 1a (0.1 mmol), acids (x mol %) and $P(OEt)_3$ 2a (0.1 mmol) in solvent (0.5 mL) for 18 h; NR = No Reaction

[b]Yield was determined by $^1H$ NMR on the crude reaction mixture using 1,3,5-trimethylbenzene as an internal standard.

[c]Isolated yield.

3. Scope of the Phospha-Michael Reaction

Figure 5:
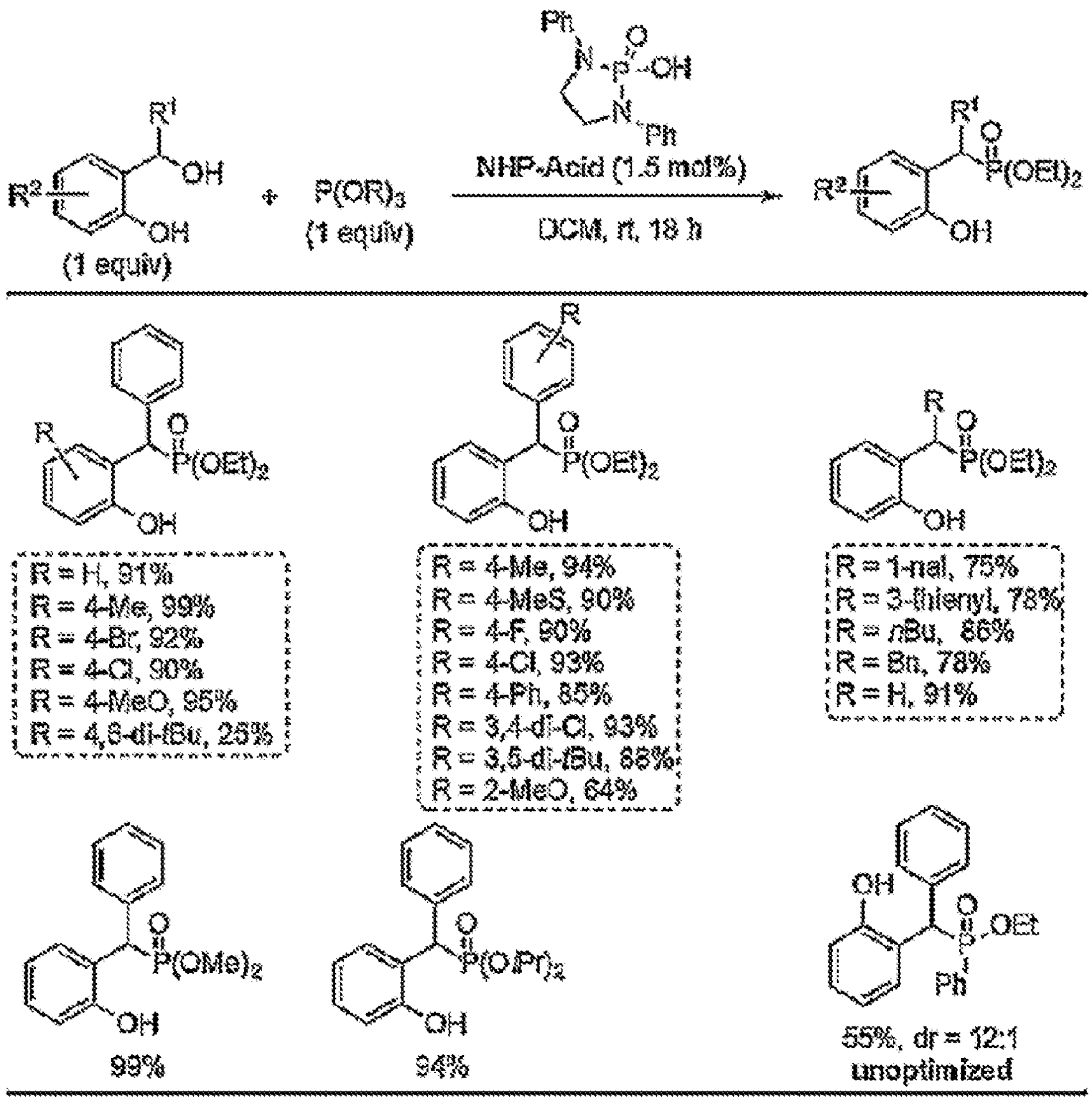
FIG. 5 shows representative data illustrating the scope of the phospha-Michael reaction as disclosed herein.

Having established the optimized reaction conditions (Table 2, entry 9), the scope of the reaction was investigated as described in FIG. 5. The electronic effects of the substrates on this transformation are negligible whereas the steric effects significantly influence the product yields in this phospha-Michael reaction. For example, the reaction tolerates both electron-donating groups (Me 1b and MeO 1c) and electron-deficient groups (Cl 1d and Br 1e) on the benzene ring, providing excellent product yields (FIG. 5, 3b-e). In addition, a variety of para-substituted benzene rings with electron-donating groups (4-Me 1g and 4-MeS 1h) or electron-withdrawing groups (F 1i, Cl 1j, and 4-Ph 1k) were well tolerated, and provided the corresponding products in high to excellent yields (FIG. 5, 3g-k). In contrast, ortho-substituted substrates if (4,6-di-tert-Bu) and in (2-MeO) provided the target products in 25% and 64% yields, respectively (FIG. 5, 3f, 3n). A polycyclic aromatic compound 1o also proved to be a suitable substrate, producing 1-naphthyl phosphonate 3o in 75% yield. A heteroaromatic substrate 1p also succeeded in providing the desired adduct 3p in 78% yield.

The scope of alkyl, aryl-mixed substrates was also explored. For example, 1q and 1r with aliphatic substituents were also suitable substrates for this reaction to provide the alkyl-substituted benzyl phosphonates 3q, 3r in 78% and 86% yields, respectively. Saligenol 1s was smoothly converted to benzyl phosphonate 3s with 91% product yield. In an effort to challenge the synthesis of tetra-substituted diaryl phosphonates, diaryl methyl tertiary benzyl alcohol it was treated with 2a and NHPA catalyst under the standard reaction conditions. Unfortunately, no target product was observed (FIG. 5, 3t). Without wishing to be bound by theory, this can be due to the steric hindrance. Finally, different alkylphosphites such as $P(OMe)_3$ 2b and $P(OiPr)_3$ 2c were evaluated, and they also afforded the corresponding diaryl phosphonates 3u, 3v in 99% and 94% yields, respectively.

4. Diastereoselective Synthesis of Diaryl Phosphinates

As an important corollary to the development of efficient synthetic strategies for the NHPA-catalyzed phospha-Michael reaction using o-QMs, a new synthetic route to P-stereogenic phosphonate moieties was envisioned. This synthetic method involves phospha-Michael reaction of o-QMs with dialkyl phenylphosphonites and sequential nucleophilic substitution to form P-chiral phosphinates. In this phosphonate chemistry field, the Montchamp group has pioneered a metal-catalyzed hydrophosphinylation of hypophosphites for the synthesis of a variety of phosphonates over the decades (Belabassi et al. (2011) *J. Organomet. Chem.* 696: 106-111; Deprele and Montchamp (2004) *Org. Lett.* 6: 3805-3808; Deprele and Montchamp (2002) *J. Am. Chem. Soc.* 124: 9386-9387; Bravo-Altamirano et al. (2008)*J. Org. Chem.* 73: 2292-2301; Deal et al. (2011) *Org. Lett.* 13: 3270-3273; Coudray and Montchamp (2008) *Eur. J. Org. Chem.* 2008: 4101-4103; Coudray et al. (2008) *Org. Lett.* 10: 1123-1126; Petit et al. (2011) *Adv. Synth. Catal.* 353: 1883-1888; Bravo-Altamirano et al. (2010) *Org. Biomol. Chem.* 8: 5541-5551; Abrunhosa-Thomas et al. (2007)*J. Org. Chem.* 72: 2851-2856). Recently, a copper-catalyzed Michaelis-Arbuzov reaction was reported by Taillefer and co-workers as an alternative to the use of expensive and toxic transition metals (Ballester et al. (2014) *ChemCatChem* 6; 1549-1552). Despite the various synthetic methods for the synthesis of phosphonates, a metal-free, organocatalytic protocol useful for the synthesis of biologically active phosphonates (Mucha et al. (2011) *J. Med. Chem.* 54: 5955-5980; Peck et al. (2012)*Methods Enzymol.* 516: 101-123) has remained underdeveloped.

Having the early success in phosphonylation of o-QMs with trialkyl phosphites, the reactivity of dialkyl phenylphosphonites under the same reaction conditions was explored (Table 3). This reaction allows a regio- and diastereoselective transformation, providing only 1,4-addition products with good diastereoselectivity (4:1 dr). First, the scope of phosphonite nucleophiles was investigated. When dimethyl phenylphosphonite 2d was employed, the target phosphinate product 4a was isolated in 85% yield with 4:1 dr value (Table 3, entry 1). Other nucleophiles such as ethyl and isopropyl phosphonites 2e, 2f also provided the desired phosphinate products 4b, 4c in 83% and 84% yields with 3:1 and 4:1 dr values, respectively (Table 3, entries 2-3). Next, the scope of Michael acceptors with various substituents was examined (4-Me 1b, 4-Cl 1d, 4-Br 1e, 4-Me 1g, 4-MeS 1h, 4-F 1i, 4-Ph 1j) and they all yielded the corresponding products in good yields (Table 3, entries 4-10). Without wishing to be bound by theory, these data suggest negligible electronic effects on reactivity. Finally, a solubility-based purification of diastereomers was successfully demonstrated. Purification via flash column chromatography of a crude mixture of 2-naphthyl phosphinate (4k) with 4:1 dr allowed the isolation of the major diastereomer in 58% yield with 99:1 dr (Table 3, entry 11). With the demonstration of an efficient column purification of the diastereomers, different phosphinate products 4a-e were further examined by performing a second column chromatography. In general, these attempts were all successful in isolating the major diastereomers. This flash column chromatography was particularly useful for the purification of diastereomers 4a, 4e, providing excellent selectivity (dr >99:1).

TABLE 3

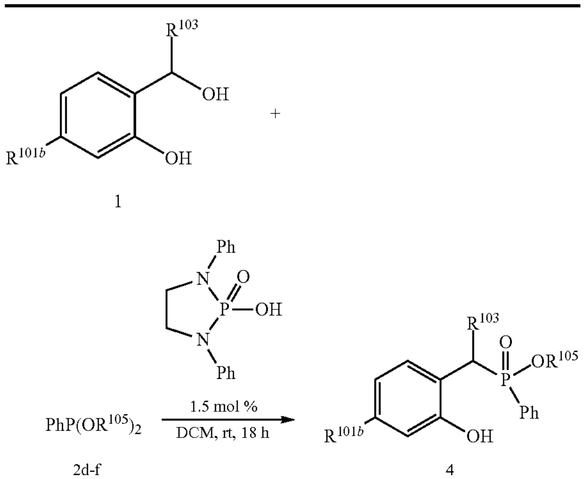

| Entry | $R^{105}$ | $R^{101b}$ | $R^{103}$ | Product | Yield (%)[b] (dr)[c] |
|---|---|---|---|---|---|
| 1 | Me | H | Ph | 4a | 85 (4:1) |
| 2 | Et | H | Ph | 4b | 84 (3:1) |
| 3 | iPr | H | Ph | 4c | 83 (4:1) |
| 4 | Me | Me | Ph | 4d | 80 (4:1) |
| 5 | Me | Cl | Ph | 4e | 76 (4:1) |
| 6 | Me | Br | Ph | 4f | 74 (4:1) |
| 7 | Me | H | 4-MePh | 4g | 84 (4:1) |
| 8 | Me | H | 4-MeSPh | 4h | 82 (4:1) |
| 9 | Me | H | 4-FPh | 4i | 81 (4:1) |
| 10 | Me | H | 4-PhPh | 4j | 69 (4:1) |
| 11 | Me | H | 2-NAP | 4k | 58 (4:1) (dr > 99:1)[d] |

[a]Reaction condition: 1 (0.1 mmol), 2 (0.1 mmol) and NHPA1 (1.5 mol %) in DCM (0.5 mL) at rt for 18 h.
[b]Isolated yield.
[c]dr value of the isolated product by flash column chromatography on a silica column.

5. Proposed Mechanism

Figure 6:
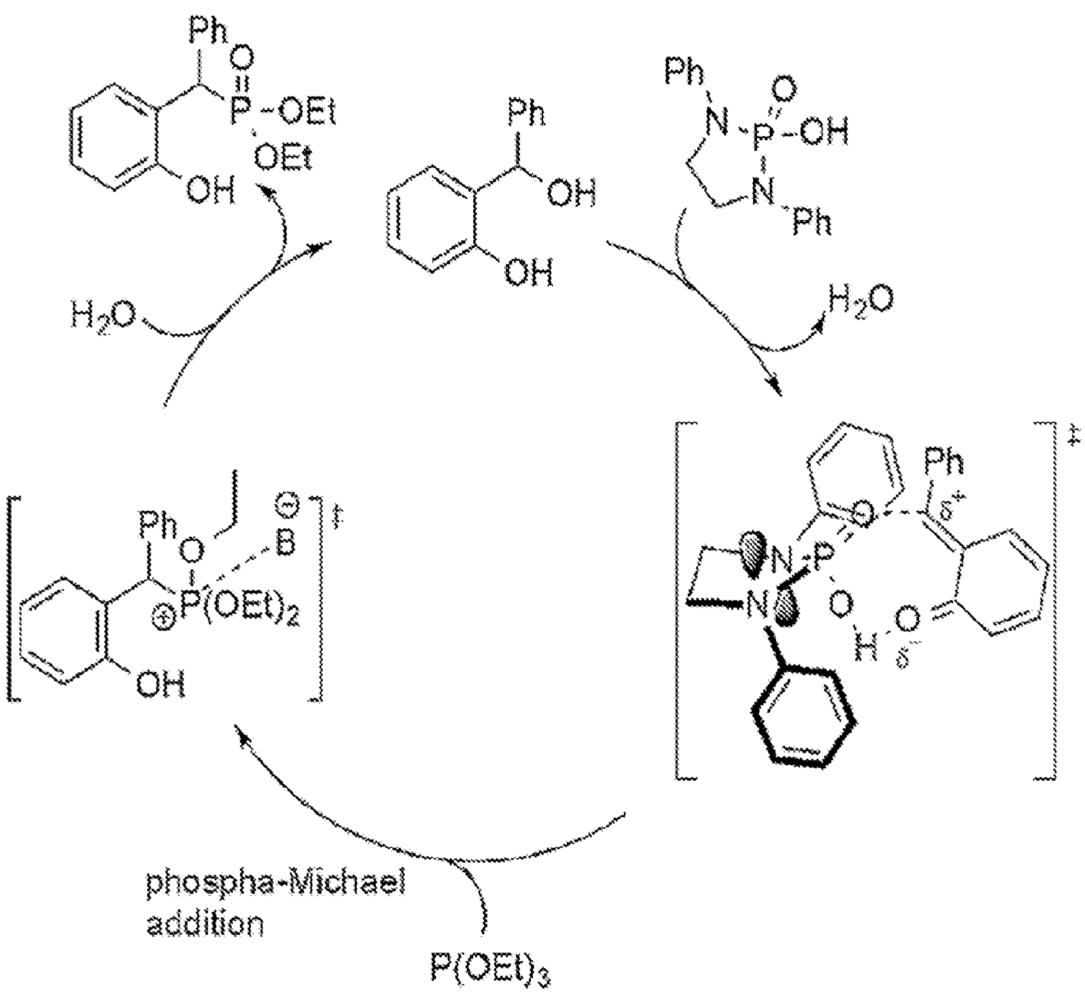
FIG. 6 shows a representative proposed mechanism of the phospha-Michael reaction as disclosed herein.

To gain insights into the catalytic cycle of this transformation, a plausible mechanism was proposed on the basis of the results from the control experiments (FIG. 6). The NHPA-catalyzed dehydration of o-hydroxybenzyl alcohol 1a responses for the generation of o-QM intermediate A, which is activated by hydrogen bond with the NHPA1. The following phospha-Michael addition reaction with $P(OEt)_3$ 2a generates a phosphonium intermediate B, which then is attacked by $H_2O$ nucleophile to produce the diarylphosphonate product 3a and EtOH.

6. Synthetic Utility of Diaryl Phosphonates

To demonstrate the synthetic utility of the versatile diaryl phosphonate adducts, a large-scale experiment with 1a (1.0 g, 5.0 mmol) was tested. This experiment afforded the target Michael adduct 3a (1.44 g) in 90% yield (FIG. 7). Next, synthetic transformation of 3a was explored. The phenol group on 1a was readily oxidized to γ-ketophosphonate 5a with $PhI(OAc)_2$. The conversion of the phenolic hydroxyl group 3a to the corresponding aryl triflate 5b in presence of $Tf_2O$ and $Et_3N$ proceeded smoothly and the sequential Suzuki cross-coupling reaction of Sb with $PhB(OH_2)$ delivered the target product 5c in 85% yield. McKenna reaction conditions (McKenna et al. (1977) *Tetrahedron Lett.* 18: 155-158) for dealkylation of the ethylphosphonate 3a provided only cyclic phosphonate 5d as a potential halogen-free flame retardant (Harada et al. (2014) E.P. Patent No. EP 2681281 A1). The treatment of 3a with allyl bromide under basic conditions afforded allyloxy substituted diaryl phosphonate 5e in moderate yield. Finally, considering the significant application of the cyclic phosphonates as precursors of stabilized C-centered radicals (Terada et al. (2006) *Synlett* 2006: 133-136), a one-pot cyclization of 3a in presence of $SOCl_2$ and $K_2CO_3$ was conducted and the desired cyclic phosphonate product 5f was obtained in 93% yield.

In summary, a N-heterocyclic phosphorodiamidic acid (NHPA) organocatalysts was developed for phospha-Michael reaction of o-QMs with trialkylphosphites. This NHPA catalyst has demonstrated its high catalytic efficiency (1.5 mol % catalyst) in phosphonylation of o-QMs to synthesize versatile diaryl phosphonates under mild reaction conditions. In addition, this organocatalytic system enables diastereoselective synthesis of diaryl phosphinates employing dialkyl phenylphosphonites. Without wishing to be bound by theory, a series of control experiments and an in-situ NMR study suggest that a water molecule generated by dehydration of o-hydroxybenzyl alcohol serves as an internal nucleophile for the transformation of P(III) to P(V). On the basis of these outcomes, a plausible mechanism of the NHPA-catalyzed phospha-Michael reaction was proposed.

H. References

Taylor, M. S.; Jacobsen, E. N., Asymmetric Catalysis by Chiral Hydrogen-Bond Donors. *Angew. Chem., Int. Ed.* 2006, 45 (10), 1520-1543.

Yu, X.; Wang, W., Hydrogen-Bond-Mediated Asymmetric Catalysis. *Chem.-Asian J.* 2008, 3 (3), 516-532.

Doyle, A. G.; Jacobsen, E. N., Small-Molecule H-Bond Donors in Asymmetric Catalysis. *Chem. Rev.* 2007, 107 (12), 5713-5743.

Parmar, D.; Sugiono, E.; Raja, S.; Rueping, M., Complete Field Guide to Asymmetric BINOL-Phosphate Derived Brønsted Acid and Metal Catalysis: History and Classification by Mode of Activation; Brønsted Acidity, Hydrogen Bonding, Ion Pairing, and Metal Phosphates. *Chem. Rev.* 2014, 114 (18), 9047-9153.

Bernardi, L.; Fochi, M.; Comes Franchini, M.; Ricci, A., Bioinspired organocatalytic asymmetric reactions. *Org. Biomol. Chem.* 2012, 10 (15), 2911-2922.

Shibasaki, M.; Matsunaga, S., Design and application of linked-BINOL chiral ligands in bifunctional asymmetric catalysis. *Chem. Soc. Rev.* 2006, 35 (3), 269-279; (b) Chen, Y.; Yekta, S.; Yudin, A. K., Modified BINOL Ligands in Asymmetric Catalysis. *Chem. Rev.* 2003, 103 (8), 3155-3212.

Xie, J.-H.; Zhou, Q.-L., Chiral Diphosphine and Monodentate Phosphorus Ligands on a Spiro Scaffold for Transition-Metal-Catalyzed Asymmetric Reactions. *Acc. Chem. Res.* 2008, 41 (5), 581-593.

Zhu, S.-F.; Zhou, Q.-L., Transition-Metal-Catalyzed Enantioselective Heteroatom-Hydrogen Bond Insertion Reactions. *Acc. Chem. Res.* 2012, 45 (8), 1365-1377.

Puntigam, O.; Könczöl, L.; Nyulászi, L.; Gudat, D., Specific Photochemical Dehydrocoupling of N-Heterocyclic Phosphanes and Their Use in the Photocatalytic Generation of Dihydrogen. *Angew. Chem., Int. Ed.* 2015, 54 (39), 11567-11571.

Chong, C. C.; Hirao, H.; Kinjo, R., Metal-Free σ-Bond Metathesis in 1,3,2-Diazaphospholene-Catalyzed Hydroboration of Carbonyl Compounds. *Angew. Chem., Int. Ed.* 2015, 54 (1), 190-194.

Chong, C. C.; Kinjo, R., Hydrophosphination of CO2 and Subsequent Formate Transfer in the 1,3,2-Diazaphospholene-Catalyzed N-Formylation of Amines. *Angew. Chem., Int. Ed.* 2015, 54 (41), 12116-12120.

Chong, C. C.; Hirao, H.; Kinjo, R., A Concerted Transfer Hydrogenolysis: 1,3,2-Diazaphospholene-Catalyzed Hydrogenation of N⎵N Bond with Ammonia-Borane. *Angew. Chem., Int. Ed.* 2014, 53 (13), 3342-3346.

Ackermann, L.; Spatz, J. H.; Gschrei, C. J.; Born, R; Althammer, A., A Diaminochlorophosphine for Palladium-Catalyzed Arylations of Amines and Ketones. *Angew. Chem., Int. Ed.* 2006, 45 (45), 7627-7630.

Ackermann, L.; Born, R., Modular Diamino- and Dioxophosphine Oxides and Chlorides as Ligands for Transition-Metal-Catalyzed C—C and C—N Couplings with Aryl Chlorides. *Angew. Chem., Int. Ed.* 2005, 44 (16), 2444-2447.

Huang, H.; Kang, J. V., Amine-Catalyzed Phospha-Michael Reaction of α,β-Unsaturated Aldehydes and Ketones with Multifunctional N-Heterocyclic Phosphine-Thioureas as Phosphonylation Reagent. *Org. Lett.* 2016, 18 (17), 4372-4375.

Huang, H.; Kang, J. Y., Oxidation-Reduction Condensation of Diazaphosphites for Carbon-Heteroatom Bond Formation Based on Mitsunobu Mechanism. *Org. Lett.* 2017, 19 (3), 544-547.

Huang, H.; Palmas, J.; Kang, J. Y., A Reagent-Controlled Phospha-Michael Addition Reaction of Nitroalkenes with Bifunctional N-Heterocyclic Phosphine (NHP)-Thioureas. *J. Org. Chem.* 2016, 81 (23), 11932-11939.

Molleti, N.; Bjomberg, C.; Kang, J. Y., Phospha-Michael addition reaction of maleimides employing N-heterocyclic phosphine-thiourea as a phosphonylation reagent: synthesis of 1-aryl-2,5-dioxopyrrolidine-3-yl-phosphonate derivatives. *Org. Biomol. Chem.* 2016, 14, 10695-10704.

Molleti, N.; Kang, J. Y., Catalyst-free synthesis of [small alpha]1-oxindole-[small alpha]-hydroxy phosphonates via phospha-aldol reaction of isatins employing N-heterocyclic phosphine (NHP)-thiourea. *Org. Biomol. Chem.* 2016, 14 (38), 8952-8956.

Molleti, N.; Kang, J. Y., Synthesis of Diaryl Diazaphosphonates via 1,6-Hydrophosphonylation of p-Quinone Methides with N-Heterocyclic Phosphine-Thioureas. *Org. Lett.* 2017, 19 (4), 958-961.

Mulla, K.; Aleshire, K. L.; Forster, P. M.; Kang, J. Y., Utility of Bifunctional N-Heterocyclic Phosphine (NHP)-Thioureas for Metal-Free Carbon-Phosphorus Bond Construction toward Regio- and Stereoselective Formation of Vinylphosphonates. *J. Org. Chem.* 2016, 81 (1), 77-88.

Mulla, K.; Kang, J. Y., 1,3,2-Diazaphospholidine (N-Heterocyclic Phosphine)-Mediated Carbon-Phosphorus Bond-Forming, One-Pot Tandem Reaction: A Route to α-Amino Phosphonates. *J. Org. Chem.* 2016, 81 (11), 4550-4558.

Campbell, C. D.; Concellón, C.; Smith, A. D., Catalytic enantioselective Steglich rearrangements using chiral N-heterocyclic carbenes. *Tetrahedron: Asymmetry* 2011, 22 (7), 797-811.

Burck, S.; Gudat, D.; Nieger, M.; Du Mont, W.-W., P-Hydrogen-Substituted 1,3,2-Diazaphospholenes: Molecular Hydrides. *J. Am. Chem. Soc.* 2006, 128 (12), 3946-3955.

Durette, P. L.; MacCoss, M., U.S. Pat. No. 5,104,862 A1992.

Gouliaev, A. H.; SlO K, F. A.; Teuber, L.; Demnitz, J., US Patent WO2003059873 A12003.

Motoyoshiya, J.; Ikeda, T.; Tsuboi, S.; Kusaura, T.; Takeuchi, Y.; Hayashi, S.; Yoshioka, S.; Takaguchi, Y.; Aoyaama, H., Chemiluminescence in Autoxidation of Phosphonate Carbanions. Phospha-1,2-dioxetanes as the Most Likely High-Energy Intermediates. *J Org. Chem.* 2003, 68 (15), 5950-5955.

Harada, T.; Yamanaka, Y.; Matsushita, Y.; Fukushima, K., Patent EP2681281 A12014

Bhattacharya, A. K.; Thyagarajan, G., Michaelis-Arbuzov rearrangement. *Chem. Rev.* 1981, 81 (4), 415-430.

Rajeshwaran, G. G.; Nandakumar, M.; Sureshbabu, R.; Mohanakrishnan, A. K., Lewis Acid-Mediated Michaelis-Arbuzov Reaction at Room Temperature: A Facile Preparation of Arylmethyl/Heteroarylmethyl Phosphonates. *Org. Lett.* 2011, 13 (6), 1270-1273.

Pallikonda, G.; Chakravarty, M., FeCl3-Mediated Arylation of α-Hydroxyphosphonates with Unactivated Arenes: Pseudo-Umpolung in Allylic Phosphonates. *Eur. J. Org. Chem.* 2013, 2013 (5), 944-951.

Montel, S.; Jia, T.; Walsh, P. J., Palladium-Catalyzed α-Arylation of Benzylic Phosphine Oxides. *Org. Lett.* 2014, 16 (1), 130-133.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A compound having a structure represented by a formula:

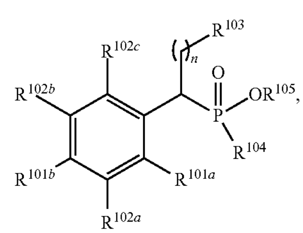

wherein n is selected from 0 and 1;

wherein $R^{101a}$ is —OH;

wherein $R^{101b}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino, provided that at least one of $R^{101a}$ and $R^{101b}$ is —OH, —SH, or C1-C4 alkylamino;

wherein each of $R^{102a}$, $R^{102b}$, and $R^{102c}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino;

wherein $R^{103}$ is selected from C4-C8 alkyl and $Ar^{101}$, provided that when $R^{103}$ is C4-C8 alkyl, then $R^{101b}$ is —SH, —OH, or C1-C4 alkylamino;

wherein $Ar^{101}$, when present, is selected from C6-C10 aryl and C5-C6 heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl;

wherein $R^{104}$ is selected from C1-C4 alkoxy and phenyl substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino; and wherein $R^{105}$ is C1-C4 alkyl, provided that when n is 0, $R^{101b}$ is —OH, and $R^{103}$ is C6 aryl or C6 heteroaryl, then either:

(a) each of $R^{102a}$ and $R^{102b}$ is hydrogen, or (b) one of $R^{102a}$ and $R^{102b}$ is hydrogen and $R^{104}$ is not the same as —$OR^5$, or a pharmaceutically acceptable salt thereof.

2. The compound of claim 1, wherein $R^{103}$ is $Ar^{101}$.

3. The compound of claim 1, wherein $R^{104}$ is C1-C4 alkoxy.

4. The compound of claim 1, wherein $R^{104}$ is unsubstituted phenyl.

5. The compound of claim 1, wherein the compound has a structure represented by a formula:

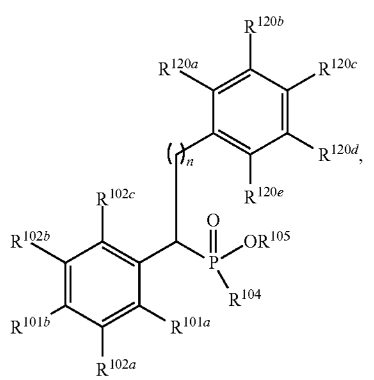

wherein each of $R^{120a}$, $R^{120b}$, $R^{120c}$, $R^{120a}$, and $R^{120e}$ are independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl.

6. A compound selected from:

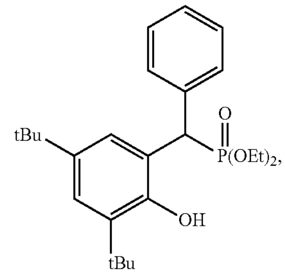

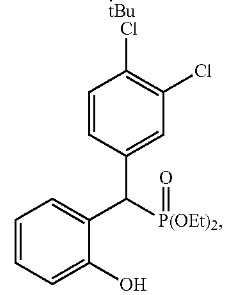

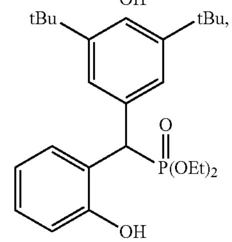

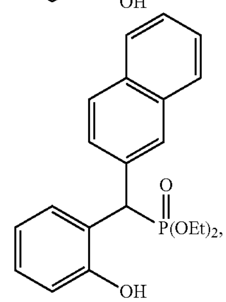

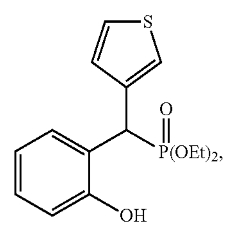

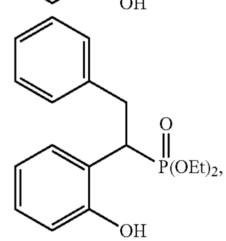

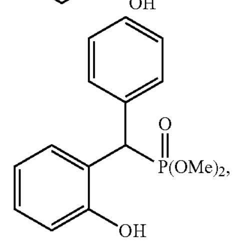

and

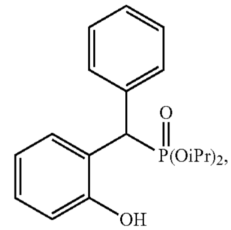

7. A compound having a structure represented by a formula:

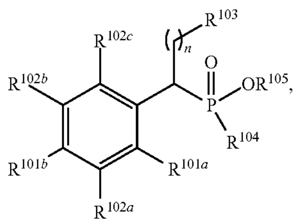

wherein n is selected from 0 and 1;

wherein each of $R^{101a}$ and $R^{101b}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino, provided that at least one of $R^{101a}$ and $R^{101b}$ is —OH, —SH, or C1-C4 alkylamino;

wherein each of $R^{102a}$, $R^{102b}$, and $R^{102C}$ is independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, and (C1-C4)(C1-C4) dialkylamino;

wherein $R^{103}$ is selected from C4-C8 alkyl and $Ar^{101}$, provided that when $R^{103}$ is C4-C8 alkyl, then either (a) at least one of $R^{101a}$ and $R^{101b}$ is —SH or C1-C4 alkylamino, or (b) $R^{101b}$ is —OH;

wherein $Ar^{101}$, when present, is selected from C6-C10 aryl and C5-C6 heteroaryl, and is substituted with 0, 1, 2, or 3 groups independently selected from halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl;

wherein $R^{104}$ is unsubstituted phenyl; and wherein $R^{105}$ is C1-C4 alkyl, provided that when n is 0, $R^{101b}$ is —OH, and $R^{103}$ is C6 aryl or C6 heteroaryl, then either:

(c) each of $R^{102a}$ and $R^{102b}$ is hydrogen, or (d) one of $R^{102a}$ and $R^{102b}$ is hydrogen, or a pharmaceutically acceptable salt thereof.

8. The compound of claim 7, wherein $R^{103}$ is $Ar^{101}$.

9. The compound of claim 7, wherein the compound has a structure represented by a formula:

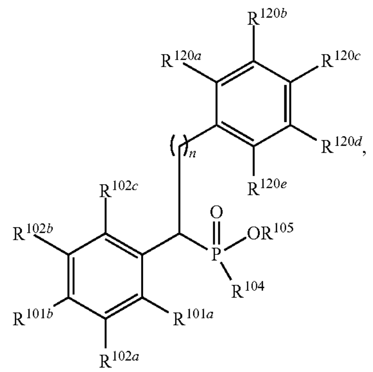

wherein each of $R^{120a}$, $R^{120b}$, $R^{120c}$, $R^{120d}$, and $R^{120e}$ are independently selected from hydrogen, halogen, —$NO_2$, —CN, —OH, —SH, —$NH_2$, C1-C4 alkyl, C2-C4 alkenyl, C2-C4 alkynyl, C1-C4 haloalkyl, C1-C4 cyanoalkyl, C1-C4 hydroxyalkyl, C1-C4 haloalkoxy, C1-C4 alkoxy, C1-C4 thioalkyl, C1-C4 alkylthiol, C1-C4 aminoalkyl, C1-C4 alkylamino, (C1-C4)(C1-C4) dialkylamino, and phenyl.

* * * * *